United States Patent [19]
Ishida et al.

[11] Patent Number: 5,561,534
[45] Date of Patent: Oct. 1, 1996

[54] IMAGE PROCESSING METHOD AND APPARATUS

[75] Inventors: Yoshihiro Ishida, Kawasaki; Kunihiro Yamamoto, Machida; Junichi Yamakawa, Kawasaki, all of Japan

[73] Assignee: Canon Kabushiki Kaisha, Tokyo, Japan

[21] Appl. No.: 912,970

[22] Filed: Jul. 10, 1992

[30] Foreign Application Priority Data

| Jul. 12, 1991 | [JP] | Japan | 3-172097 |
| Jul. 12, 1991 | [JP] | Japan | 3-172098 |
| Jul. 12, 1991 | [JP] | Japan | 3-172099 |
| Aug. 2, 1991 | [JP] | Japan | 3-194258 |
| Jan. 29, 1992 | [JP] | Japan | 4-013633 |

[51] Int. Cl.⁶ ................................. G06K 9/00
[52] U.S. Cl. .................... 358/448; 358/433; 382/199
[58] Field of Search ............................ 382/55, 25, 22, 382/21, 60, 24, 56, 47, 57, 16; 358/448, 449, 109, 107, 96, 103, 282, 28, 13, 75, 433; 364/522, 460, 520; 340/793, 728, 729; 395/142, 150, 133, 143

[56] References Cited

U.S. PATENT DOCUMENTS

| 3,639,903 | 2/1992 | Nashljunas et al. | 382/25 |
| 4,466,123 | 8/1984 | Arai et al. | 382/55 |
| 4,763,119 | 8/1988 | Matsubara et al. | 340/767 |
| 4,817,173 | 3/1989 | Furukoori | 382/21 |
| 4,823,287 | 4/1989 | Thompson | 364/522 |
| 4,918,541 | 4/1990 | Ishida et al. | 358/433 |
| 4,975,860 | 12/1990 | Kitaya et al. | 364/520 |
| 5,036,544 | 7/1991 | Sakaue et al. | 382/24 |
| 5,060,280 | 10/1991 | Mita et al. | 382/33 |
| 5,073,960 | 12/1991 | Nakai et al. | |
| 5,115,479 | 5/1992 | Murayama | 382/56 |
| 5,126,834 | 6/1992 | Enomoto et al. | 358/28 |
| 5,131,058 | 7/1992 | Ting et al. | 382/47 |
| 5,195,147 | 3/1993 | Ohta | 382/21 |
| 5,265,173 | 11/1993 | Griffin et al. | 382/22 |
| 5,357,602 | 10/1994 | Ohta | 395/142 |

FOREIGN PATENT DOCUMENTS

| 327003 | 8/1989 | European Pat. Off. |
| 356262 | 2/1990 | European Pat. Off. |
| 054752 | 11/1989 | Japan |
| 050778 | 2/1990 | Japan |

OTHER PUBLICATIONS

IEEE Computer Graphics and Application, vol. 6, No. 7, Jul. 1986, USA, pp. 61–70, XP52330 Hersch "Descriptive Contour Fill of Partly Degenerated Shapes".

IBM TDB, vol. 27, No. 11, Apr. 1985, USA, pp. 6398–6400 "Graphics Area Fill With Point Classification".

*Primary Examiner*—Paul Ip
*Attorney, Agent, or Firm*—Fitzpatrick, Cella, Harper & Scinto

[57] ABSTRACT

This invention provides an image processing method and apparatus. According to this invention, contour line data when viewed from a the main scan direction are generated on the basis of the connection relationship between a target line element and adjacent line elements before and after the target line element in one direction of continuous line elements, and a direction of an area to be painted out. It is then set that a pixel position of an odd-numbered contour encountered in a scan operation in the main scan direction indicates a forward rotation position of the area, and that an adjacent pixel position in the main scan direction of an even-numbered contour encountered in the scan operation indicates a reverse rotation position of the area. Thereafter, it is discriminated that a portion between an odd-numbered contour position, when viewed from a scan direction on each scan line, to a pixel position immediately before an even-numbered contour position is a portion inside the area of a closed figure, and remaining portions are outside the area of the closed figure.

24 Claims, 103 Drawing Sheets

| Y VALUE OF EDGE POINT HAVING LARGER VALUE OF y COORDINATES | x VALUE OF END POINT HAVING SMALLER VALUE OF y COORDINATES | x INCREMENT (INVERSE OF GRADIENT) | POINTER |
|---|---|---|---|
| $y_{max}$ | $x_{min}$ | $\Delta x$ | |

ACTIVE EDGE TABLE AT y=14

ACTIVE EDGE POINTER

FIG. 6   PRIOR ART
y = 0
y = 1
y = 2
y = 3  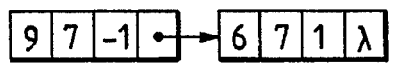
y = 4  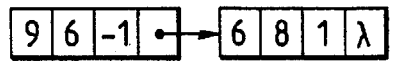
y = 5  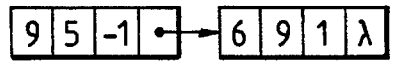
y = 6  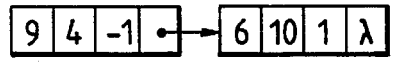
y = 7  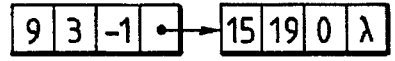
y = 8  
y = 9  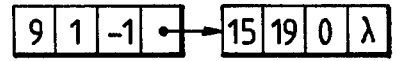
y = 10 
y = 11 
y = 12 
y = 13 
y = 14 
y = 15 
y = 16 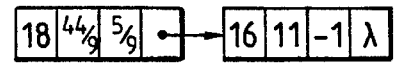
y = 17 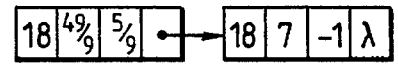
y = 18 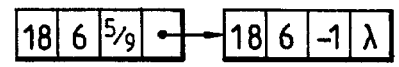
y = 19

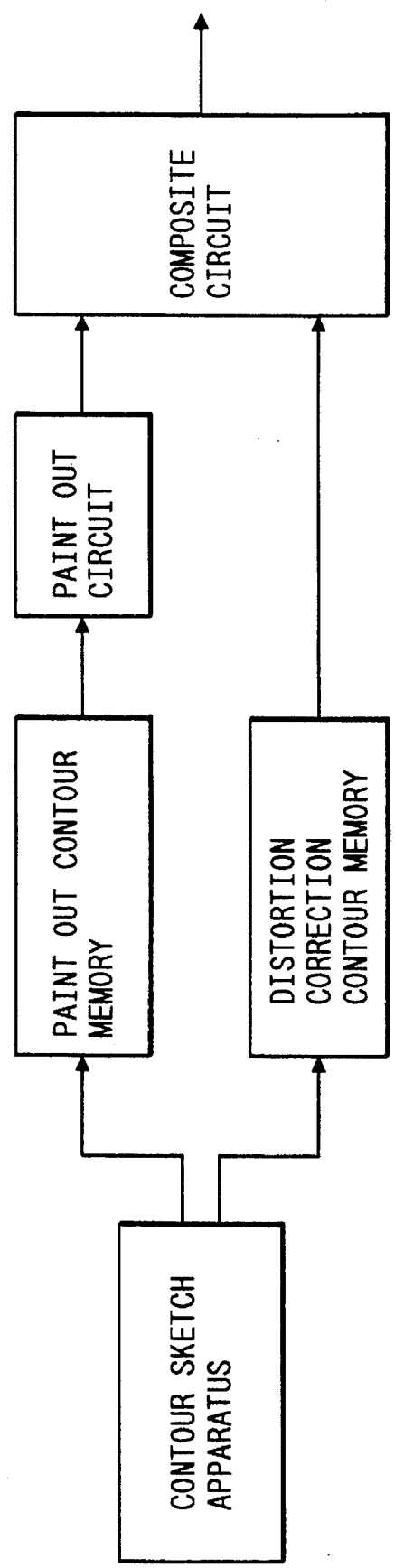

FIG. 13

| Label | Cell | Description |
|---|---|---|
| LOOP NUMBER IN IMAGE | N | CLOSED LOOP NUMBER |
| TOP NUMBER TABLE IN EACH LOOP | $L_0$ | TOP NUMBER IN 0TH LOOP |
| | $L_1$ | TOP NUMBER IN 1ST LOOP |
| | ⋮ | |
| | $L_{i-1}$ | TOP NUMBER IN i-1TH LOOP |
| | $L_i$ | TOP NUMBER IN iTH LOOP |
| | $L_{i+1}$ | TOP NUMBER IN i+1TH LOOP |
| | ⋮ | |
| | $L_{N-2}$ | TOP NUMBER IN N-2TH LOOP |
| | $L_{N-1}$ | TOP NUMBER IN N-1TH LOOP |
| TOP COORDINATES TABLE — EACH TOP COORDINATES IN 0TH LOOP | $x_{00}$, $y_{00}$ | 0TH TOP COORDINATES IN 0TH LOOP |
| | $x_{01}$, $y_{01}$ | 1ST TOP COORDINATES IN 0TH LOOP |
| | ⋮ | |
| | $x_{0j-1}$, $y_{0j-1}$ | j-1TH TOP COORDINATES IN 0TH LOOP |
| | $x_{0j}$, $y_{0j}$ | jTH TOP COORDINATES IN 0TH LOOP |
| | $x_{0j+1}$, $y_{0j+1}$ | j+1TH TOP COORDINATES IN 0TH LOOP |
| | ⋮ | |
| | $x_{0L_0-2}$, $y_{0L_0-2}$ | $L_0$-2TH TOP COORDINATES IN 0TH LOOP |
| | $x_{0L_0-1}$, $y_{0L_0-1}$ | $L_0$-1TH TOP COORDINATES IN 0TH LOOP |
| EACH TOP COORDINATES IN 1ST LOOP | $x_{10}$, $y_{10}$ | 0TH TOP COORDINATES IN 1ST LOOP |
| | ⋮ | |
| | $x_{1L_1-1}$, $y_{1L_1-1}$ | $L_1$-1TH TOP COORDINATES IN 1ST LOOP |
| EACH TOP COORDINATES IN N-1TH LOOP | $x_{N-1\ 0}$, $y_{N-1\ 0}$ | 0TH TOP COORDINATES IN N-1TH LOOP |
| | ⋮ | |
| | $x_{N-1\ L_{N-1}-1}$, $y_{N-1\ L_{N-1}-1}$ | $L_{N-1}$-1TH TOP COORDINATES IN N-1TH LOOP |

FIG. 14

| | |
|---|---|
| 1 | N |
| 10 | L |
| 10 | ⎫ POINT A |
| 6 | ⎭ |
| 19 | ⎫ POINT B |
| 6 | ⎭ |
| 19 | ⎫ POINT C |
| 15 | ⎭ |
| 16 | ⎫ POINT D |
| 15 | ⎭ |
| 14 | ⎫ POINT E |
| 13 | ⎭ |
| 11 | ⎫ POINT F |
| 16 | ⎭ |
| 8 | ⎫ POINT G |
| 16 | ⎭ |
| 6 | ⎫ POINT H |
| 18 | ⎭ |
| 1 | ⎫ POINT I |
| 9 | ⎭ |
| 7 | ⎫ POINT J |
| 3 | ⎭ |

FIG. 17

| | | |
|---|---|---|
| 0 | $\lambda$ | ← Ay0 |
| 1 | $\lambda$ | ← Ay1 |
| 2 | $\lambda$ | |
| 3 | $\lambda$ | |
| 4 | $\lambda$ | |
| 5 | $\lambda$ | |
| i-1 | $\lambda$ | |
| i | $\lambda$ | |
| i+1 | $\lambda$ | |
| Y-3 | $\lambda$ | |
| Y-2 | $\lambda$ | |
| Y-1 | $\lambda$ | |
| Y | $\lambda$ | ← AyN |

| FIG. 16A |
| FIG. 16B |

FIG. 22
y = 0
y = 1
y = 2
y = 3 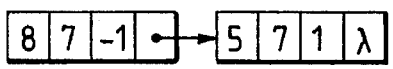
y = 4 
y = 5 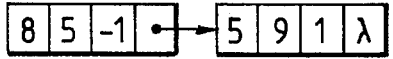
y = 6 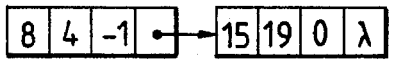
y = 7 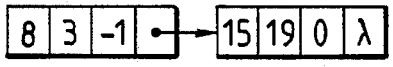
y = 8 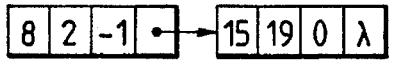
y = 9 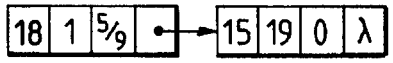
y = 10 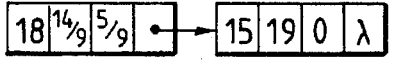
y = 11 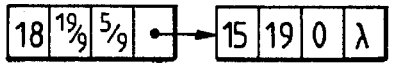
y = 12 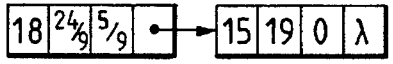
y = 13 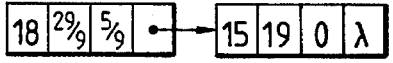
y = 14 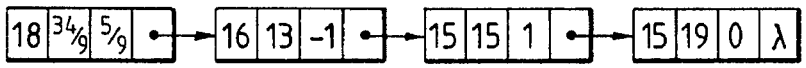
y = 15 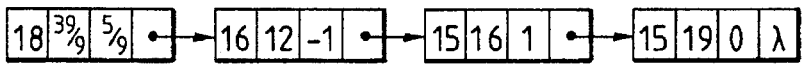
y = 16 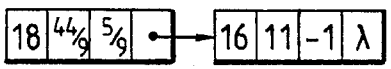
y = 17 
y = 18 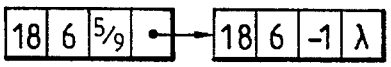
y = 19 

FIG. 28

| CASE NO. | START POINT | STATE OF START POINT | DIRECTION OF PRECEDING EDGE | DIRECTION OF PRESENT EDGE | DIRECTION OF SUBSEQUENT EDGE | STATE OF END POINT | END POINT | CASE NO. |
|---|---|---|---|---|---|---|---|---|
| START 1 | CLOSE BY ONE SCAN LINE | | UP | UP | UP | | AS IT IS | END 1 |
| START 2 | CLOSE BY ONE SCAN LINE | | DOWN | | DOWN | | AS IT IS | END 2 |
| START 3 | AS IT IS | | | | | | CLOSE BY ONE SCAN LINE | END 3 |
| START 4 | AS IT IS | | LEFT | | LEFT | | CLOSE BY ONE SCAN LINE | END 4 |
| START 5 | CLOSE BY ONE SCAN LINE | | RIGHT | | RIGHT | | AS IT IS | END 5 |
| START 6 | AS IT IS | | UP | | UP | | AS IT IS | END 6 |
| START 7 | CLOSE BY ONE SCAN LINE | | | DOWN | | | CLOSE BY ONE SCAN LINE | END 7 |
| START 8 | AS IT IS | | DOWN | | DOWN | | CLOSE BY ONE SCAN LINE | END 8 |
| START 9 | CLOSE BY ONE SCAN LINE | | LEFT | | LEFT | | AS IT IS | END 9 |
| START 10 | AS IT IS | | RIGHT | | RIGHT | | CLOSE BY ONE SCAN LINE | END 10 |

FIG. 29

| CASE NO. | START POINT | STATE OF START POINT | DIRECTION OF PRECEDING EDGE | DIRECTION OF PRESENT EDGE | DIRECTION OF SUBSEQUENT EDGE | STATE OF END POINT | END POINT | CASE NO. |
|---|---|---|---|---|---|---|---|---|
| START 11 | AS IT IS | | UP | | UP | | CLOSE BY ONE SCAN LINE | END 11 |
| START 12 | AS IT IS | | DOWN | | DOWN | | CLOSE BY ONE SCAN LINE | END 12 |
| START 13 | CLOSE BY ONE SCAN LINE | | | UP | | | AS IT IS | END 13 |
| START 14 | CLOSE BY ONE SCAN LINE | | LEFT | | LEFT | | AS IT IS | END 14 |
| START 15 | AS IT IS | | RIGHT | | RIGHT | | CLOSE BY ONE SCAN LINE | END 15 |
| START 16 | CLOSE BY ONE SCAN LINE | | UP | | UP | | CLOSE BY ONE SCAN LINE | END 16 |
| START 17 | AS IT IS | | | DOWN | | | AS IT IS | END 17 |
| START 18 | CLOSE BY ONE SCAN LINE | | DOWN | | DOWN | | AS IT IS | END 18 |
| START 19 | AS IT IS | | LEFT | | LEFT | | CLOSE BY ONE SCAN LINE | END 19 |
| START 20 | CLOSE BY ONE SCAN LINE | | RIGHT | | RIGHT | | AS IT IS | END 20 |

FIG. 33

LOOP NUMBER IN IMAGE : $N$ — CLOSED LOOP NUMBER

TOP NUMBER TABLE IN EACH LOOP:
- $L_0$ — TOP NUMBER IN 0TH LOOP
- $L_1$ — TOP NUMBER IN 1ST LOOP
- $\vdots$
- $L_{i-1}$ — TOP NUMBER IN $i-1$TH LOOP
- $L_i$ — TOP NUMBER IN $i$TH LOOP
- $L_{i+1}$ — TOP NUMBER IN $i+1$TH LOOP
- $\vdots$
- $L_{N-2}$ — TOP NUMBER IN $N-2$TH LOOP
- $L_{N-1}$ — TOP NUMBER IN $N-1$TH LOOP

TOP COORDINATES TABLE:

EACH TOP COORDINATES IN 0TH LOOP:
- $x_{00}, y_{00}$ — 0TH TOP COORDINATES IN 0TH LOOP
- $x_{01}, y_{01}$ — 1ST TOP COORDINATES IN 0TH LOOP
- $\vdots$
- $x_{0j-1}, y_{0j-1}$ — $j-1$TH TOP COORDINATES IN 0TH LOOP
- $x_{0j}, y_{0j}$ — $j$TH TOP COORDINATES IN 0TH LOOP
- $x_{0j+1}, y_{0j+1}$ — $j+1$TH TOP COORDINATES IN 0TH LOOP
- $\vdots$
- $x_{0L_0-2}, y_{0L_0-2}$ — $L_0-2$TH TOP COORDINATES IN 0TH LOOP
- $x_{0L_0-1}, y_{0L_0-1}$ — $L_0-1$TH TOP COORDINATES IN 0TH LOOP EACH TOP COORDINATES IN 1ST LOOP:
- $x_{10}, y_{10}$ — 0TH TOP COORDINATES IN 1ST LOOP
- $\vdots$
- $x_{1L_1-1}, y_{1L_1-1}$ — $L_1-1$TH TOP COORDINATES IN 1ST LOOP EACH TOP COORDINATES IN $N-1$TH LOOP:
- $x_{N-1\ 0}, y_{N-1\ 0}$ — 0TH TOP COORDINATES IN $N-1$TH LOOP
- $\vdots$
- $x_{N-1\ L_{N-1}-1}, y_{N-1\ L_{N-1}-1}$ — $L_{N-1}-1$TH TOP COORDINATES IN $N-1$TH LOOP

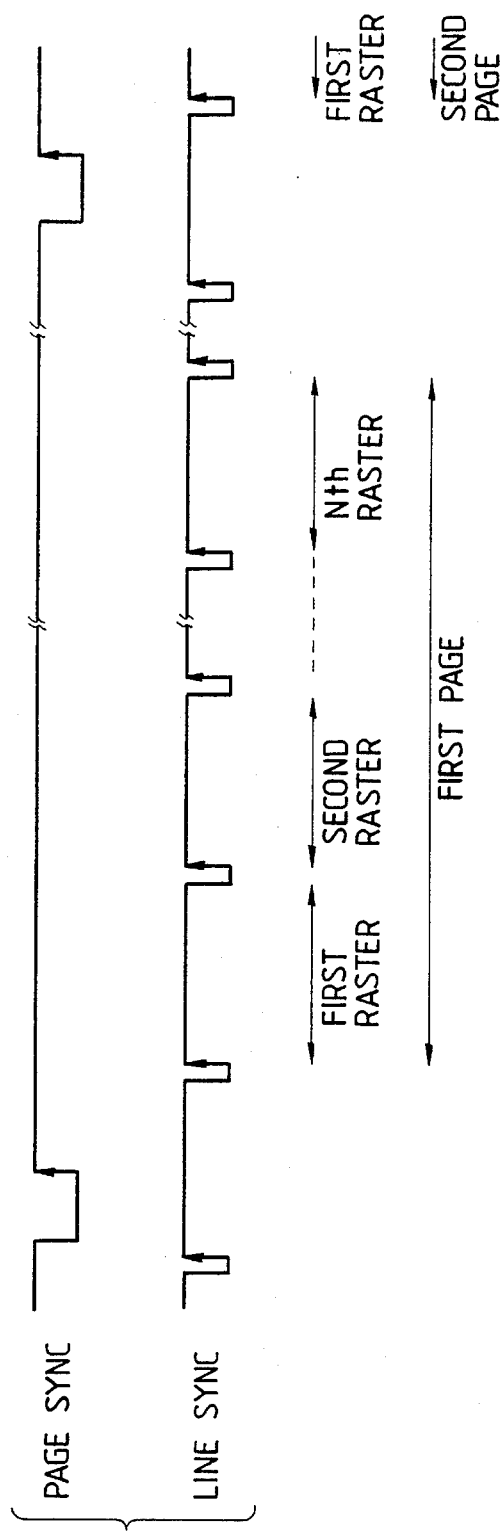
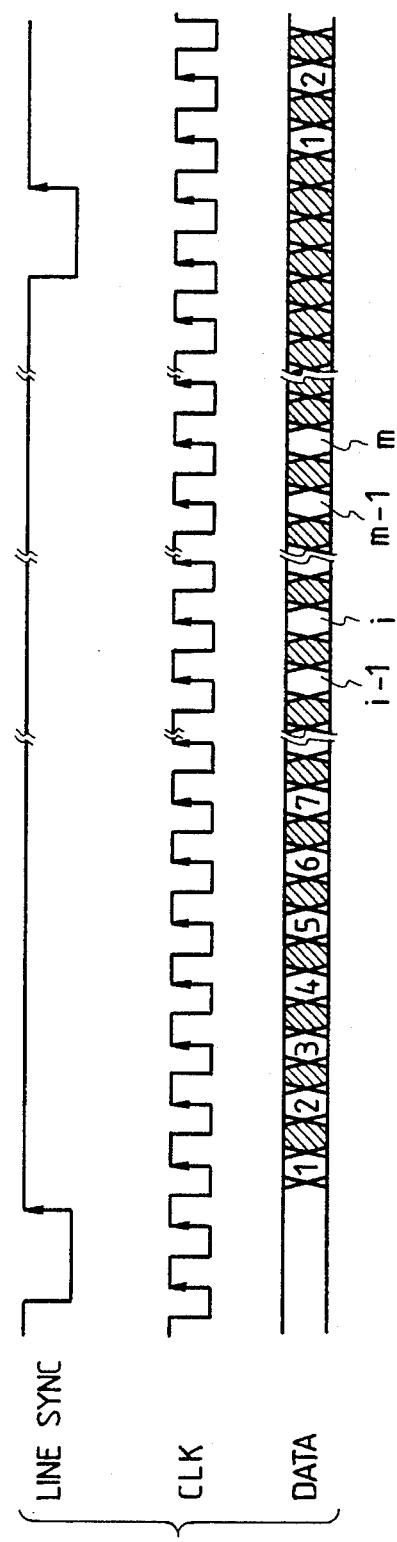

FIG. 45  CLOCKWISE START POINT Version

| DIRECTION OF PRESENT OUTLINE VECTOR | | DIRECTION OF PRECEDING OUTLINE VECTOR | | SUM OF PRECEDING VECTOR × INCREMENT AND PRESENT VECTOR × INCREMENT | START POINT OF PRESENT OUTLINE VECTOR | POINT EXCEPT START POINT OF PRESENT OUTLINE VECTOR | CASE NO. |
|---|---|---|---|---|---|---|---|
| HORIZON | RIGHT | HORIZON | RIGHT | — | NOT PLOTTED | NOT PLOTTED | ① |
| | | | LEFT | — | EXOR PLOT | NOT PLOTTED | ② |
| | | NON-HORIZON | DOWN | — | RIGHT-PIXEL SHIFT EXOR PLOT | NOT PLOTTED | ③ |
| | | | UP | — | NOT PLOTTED | NOT PLOTTED | ④ |
| | LEFT | HORIZON | RIGHT | — | RIGHT-PIXEL SHIFT EXOR PLOT | NOT PLOTTED | ⑤ |
| | | | LEFT | — | NOT PLOTTED | NOT PLOTTED | ⑥ |
| | | NON-HORIZON | DOWN | — | NOT PLOTTED | NOT PLOTTED | ⑦ |
| | | | UP | — | EXOR PLOT | NOT PLOTTED | ⑧ |
| NON-HORIZON | DOWN | HORIZON | RIGHT | — | RIGHT-PIXEL SHIFT EXOR PLOT | RIGHT-PIXEL SHIFT EXOR PLOT | ⑨ |
| | | | LEFT | — | NOT PLOTTED | RIGHT-PIXEL SHIFT EXOR PLOT | ⑩ |
| | | NON-HORIZON | DOWN | — | NOT PLOTTED | RIGHT-PIXEL SHIFT EXOR PLOT | ⑪ |
| | | | UP | 0 OR POSITIVE | RIGHT-PIXEL SHIFT EXOR PLOT | RIGHT-PIXEL SHIFT EXOR PLOT | ⑫ |
| | | | | NEGATIVE | EXOR PLOT | RIGHT-PIXEL SHIFT EXOR PLOT | ⑬ |
| | UP | HORIZON | RIGHT | — | NOT PLOTTED | EXOR PLOT | ⑭ |
| | | | LEFT | — | EXOR PLOT | EXOR PLOT | ⑮ |
| | | NON-HORIZON | DOWN | POSITIVE | RIGHT-PIXEL SHIFT EXOR PLOT | EXOR PLOT | ⑯ |
| | | | | 0 OR NEGATIVE | EXOR PLOT | EXOR PLOT | ⑰ |
| | | | UP | — | NOT PLOTTED | EXOR PLOT | ⑱ |

FIG. 46  COUNTERCLOCKWISE START POINT Version

| DIRECTION OF PRESENT OUTLINE VECTOR | | DIRECTION OF PRECEDING OUTLINE VECTOR | | SUM OF PRECEDING VECTOR × INCREMENT AND PRESENT VECTOR × INCREMENT | START POINT OF PRESENT OUTLINE VECTOR | POINT EXCEPT START POINT OF PRESENT OUTLINE VECTOR | CASE NO. |
|---|---|---|---|---|---|---|---|
| HORIZON | RIGHT | HORIZON | RIGHT | — | NOT PLOTTED | NOT PLOTTED | ㉑ |
| | | | LEFT | — | EXOR PLOT | NOT PLOTTED | ㉒ |
| | | NON-HORIZON | DOWN | — | NOT PLOTTED | NOT PLOTTED | ㉓ |
| | | | UP | — | RIGHT-PIXEL SHIFT EXOR PLOT | NOT PLOTTED | ㉔ |
| | LEFT | HORIZON | RIGHT | — | RIGHT-PIXEL SHIFT EXOR PLOT | NOT PLOTTED | ㉕ |
| | | | LEFT | — | NOT PLOTTED | NOT PLOTTED | ㉖ |
| | | NON-HORIZON | DOWN | — | EXOR PLOT | NOT PLOTTED | ㉗ |
| | | | UP | — | NOT PLOTTED | NOT PLOTTED | ㉘ |
| NON-HORIZON | DOWN | HORIZON | RIGHT | — | NOT PLOTTED | EXOR PLOT | ㉙ |
| | | | LEFT | — | EXOR PLOT | EXOR PLOT | ㉚ |
| | | NON-HORIZON | DOWN | — | NOT PLOTTED | EXOR PLOT | ㉛ |
| | | | UP | POSITIVE | RIGHT-PIXEL SHIFT EXOR PLOT | EXOR PLOT | ㉜ |
| | | | | 0 OR NEGATIVE | EXOR PLOT | EXOR PLOT | ㉝ |
| | UP | HORIZON | RIGHT | — | RIGHT-PIXEL SHIFT EXOR PLOT | RIGHT-PIXEL SHIFT EXOR PLOT | ㉞ |
| | | | LEFT | — | NOT PLOTTED | RIGHT-PIXEL SHIFT EXOR PLOT | ㉟ |
| | | NON-HORIZON | DOWN | 0 OR POSITIVE | RIGHT-PIXEL SHIFT EXOR PLOT | RIGHT-PIXEL SHIFT EXOR PLOT | ㊱ |
| | | | | NEGATIVE | EXOR PLOT | RIGHT-PIXEL SHIFT EXOR PLOT | ㊲ |
| | | | UP | — | NOT PLOTTED | RIGHT-PIXEL SHIFT EXOR PLOT | ㊳ |

FIG. 52    CLOCKWISE

| DIRECTION OF PRESENT OUTLINE VECTOR | DIRECTION OF SUBSEQUENT OUTLINE VECTOR | | SUM OF SUBSEQUENT VECTOR × INCREMENT AND PRESENT VECTOR × INCREMENT | END POINT OF PRESENT OUTLINE VECTOR | POINT EXCEPT END POINT OF PRESENT OUTLINE VECTOR | CASE NO. |
|---|---|---|---|---|---|---|
| HORIZON | RIGHT | HORIZON | RIGHT | — | NOT PLOTTED | NOT PLOTTED | ① |
|  |  | LEFT | — | RIGHT-PIXEL SHIFT EXOR PLOT | NOT PLOTTED | ② |
|  |  | NON-HORIZON | DOWN | — | NOT PLOTTED | NOT PLOTTED | ③ |
|  |  |  | UP | — | EXOR PLOT | NOT PLOTTED | ④ |
|  | LEFT | HORIZON | RIGHT | — | EXOR PLOT | NOT PLOTTED | ⑤ |
|  |  |  | LEFT | — | NOT PLOTTED | NOT PLOTTED | ⑥ |
|  |  | NON-HORIZON | DOWN | — | RIGHT-PIXEL SHIFT EXOR PLOT | NOT PLOTTED | ⑦ |
|  |  |  | UP | — | NOT PLOTTED | NOT PLOTTED | ⑧ |
| NON-HORIZON | DOWN | HORIZON | RIGHT | — | NOT PLOTTED | RIGHT-PIXEL SHIFT EXOR PLOT | ⑨ |
|  |  |  | LEFT | — | RIGHT-PIXEL SHIFT EXOR PLOT | RIGHT-PIXEL SHIFT EXOR PLOT | ⑩ |
|  |  | NON-HORIZON | DOWN | — | NOT PLOTTED | RIGHT-PIXEL SHIFT EXOR PLOT | ⑪ |
|  |  |  | UP | 0 OR POSITIVE | EXOR PLOT | RIGHT-PIXEL SHIFT EXOR PLOT | ⑫ |
|  |  |  |  | NEGATIVE | RIGHT-PIXEL SHIFT EXOR PLOT | RIGHT-PIXEL SHIFT EXOR PLOT | ⑬ |
|  | UP | HORIZON | RIGHT | — | EXOR PLOT | EXOR PLOT | ⑭ |
|  |  |  | LEFT | — | NOT PLOTTED | EXOR PLOT | ⑮ |
|  |  | NON-HORIZON | DOWN | POSITIVE | EXOR PLOT | EXOR PLOT | ⑯ |
|  |  |  |  | 0 OR NEGATIVE | RIGHT-PIXEL SHIFT EXOR PLOT | EXOR PLOT | ⑰ |
|  |  |  | UP | — | NOT PLOTTED | EXOR PLOT | ⑱ |

FIG. 53   COUNTERCLOCKWISE

| DIRECTION OF PRESENT OUTLINE VECTOR | | DIRECTION OF SUBSEQUENT OUTLINE VECTOR | | SUM OF SUBSEQUENT VECTOR x INCREMENT AND PRESENT VECTOR x INCREMENT | END POINT OF PRESENT OUTLINE VECTOR | POINT EXCEPT END POINT OF PRESENT OUTLINE VECTOR | CASE NO. |
|---|---|---|---|---|---|---|---|
| HORIZON | RIGHT | HORIZON | RIGHT | — | NOT PLOTTED | NOT PLOTTED | ⑲ |
| | | | LEFT | — | RIGHT-PIXEL SHIFT EXOR PLOT | NOT PLOTTED | ⑳ |
| | | NON-HORIZON | DOWN | — | EXOR PLOT | NOT PLOTTED | ㉑ |
| | | | UP | — | NOT PLOTTED | NOT PLOTTED | ㉒ |
| | LEFT | HORIZON | RIGHT | — | EXOR PLOT | NOT PLOTTED | ㉓ |
| | | | LEFT | — | NOT PLOTTED | NOT PLOTTED | ㉔ |
| | | NON-HORIZON | DOWN | — | NOT PLOTTED | NOT PLOTTED | ㉕ |
| | | | UP | — | RIGHT-PIXEL SHIFT EXOR PLOT | NOT PLOTTED | ㉖ |
| NON-HORIZON | DOWN | HORIZON | RIGHT | — | EXOR PLOT | EXOR PLOT | ㉗ |
| | | | LEFT | — | NOT PLOTTED | EXOR PLOT | ㉘ |
| | | NON-HORIZON | DOWN | — | NOT PLOTTED | EXOR PLOT | ㉙ |
| | | | UP | 0 OR POSITIVE | EXOR PLOT | EXOR PLOT | ㉚ |
| | | | | NEGATIVE | RIGHT-PIXEL SHIFT EXOR PLOT | EXOR PLOT | ㉛ |
| | UP | HORIZON | RIGHT | — | NOT PLOTTED | RIGHT-PIXEL SHIFT EXOR PLOT | ㉜ |
| | | | LEFT | — | RIGHT-PIXEL SHIFT EXOR PLOT | RIGHT-PIXEL SHIFT EXOR PLOT | ㉝ |
| | | NON-HORIZON | DOWN | POSITIVE | EXOR PLOT | RIGHT-PIXEL SHIFT EXOR PLOT | ㉞ |
| | | | | 0 OR NEGATIVE | RIGHT-PIXEL SHIFT EXOR PLOT | RIGHT-PIXEL SHIFT EXOR PLOT | ㉟ |
| | | | UP | — | NOT PLOTTED | RIGHT-PIXEL SHIFT EXOR PLOT | ㊱ |

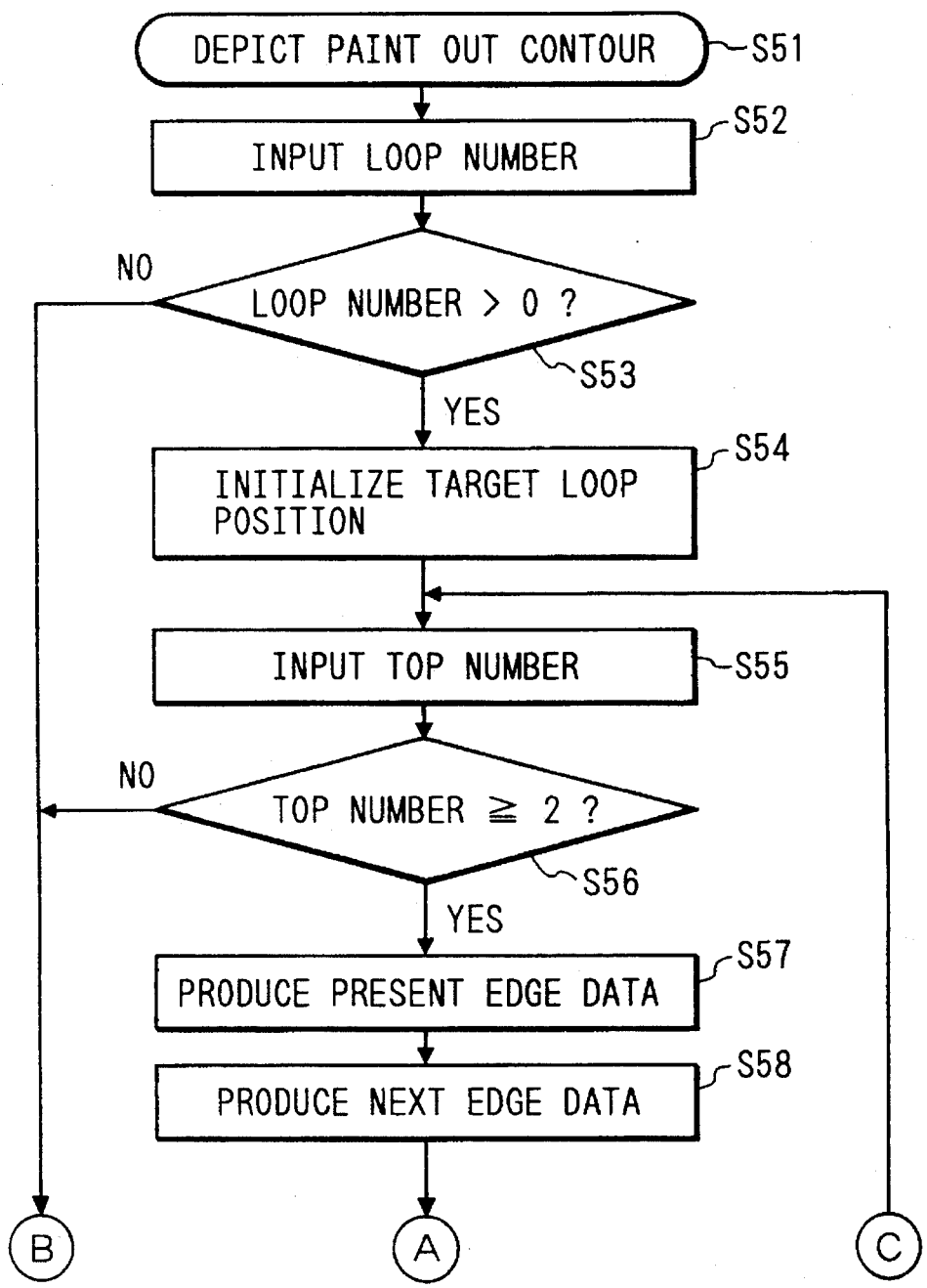

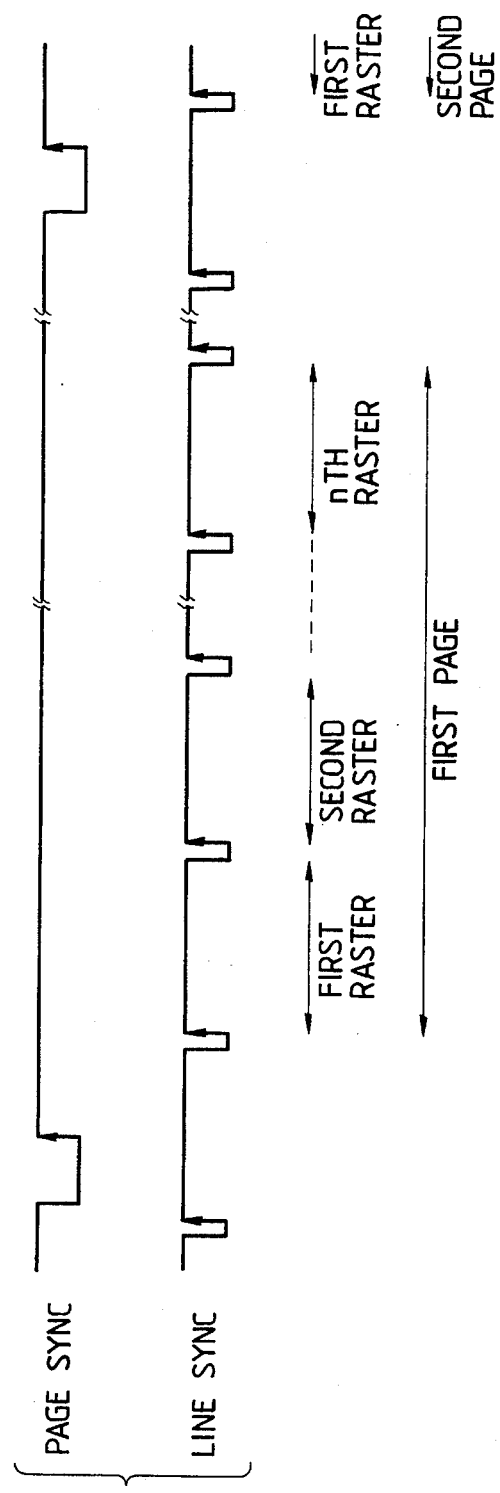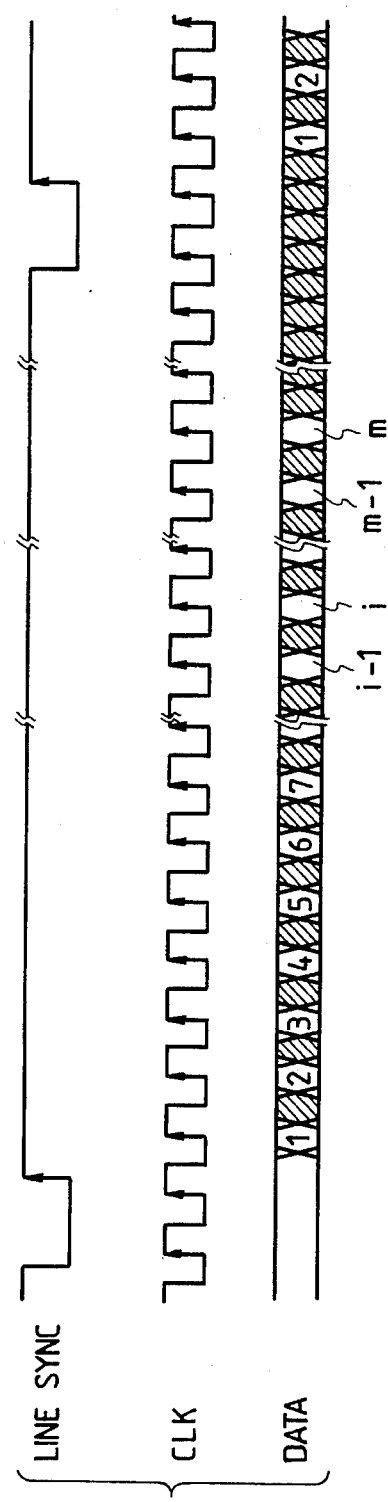

| Y VALUE OF EDGE POINT HAVING LARGER VALUE OF y COORDINATES | x VALUE OF END POINT HAVING SMALLER VALUE OF y COORDINATES | x INCREMENT (INVERSE OF GRADIENT) | POINTER |
|---|---|---|---|
| $y_{max}$ | $x_{min}$ | $\Delta x$ | |

ACTIVE EDGE TABLE AT $y=14$

ACTIVE EDGE POINTER

FIG. 68
PRIOR ART
y = 0
y = 1
y = 2
y = 3 
y = 4 
y = 5 
y = 6 
y = 7 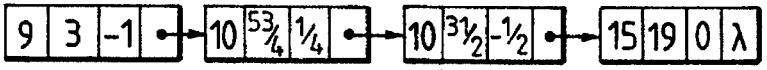
y = 8 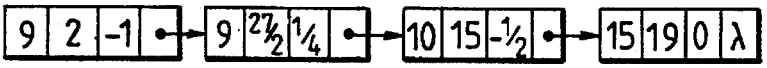
y = 9 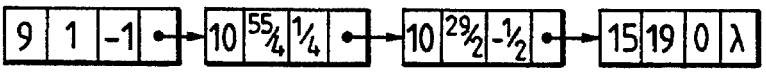
y = 10 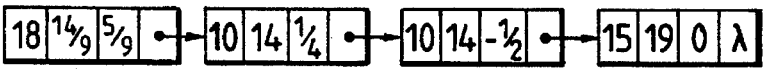
y = 11 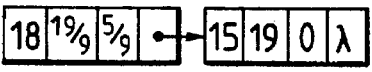
y = 12 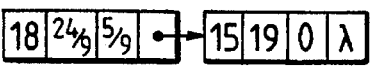
y = 13 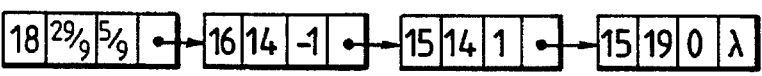
y = 14 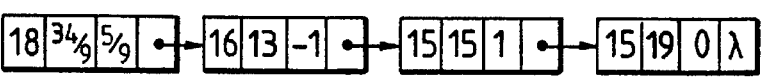
y = 15 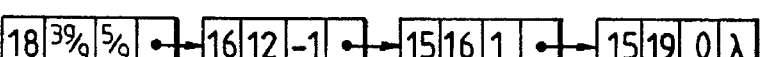
y = 16 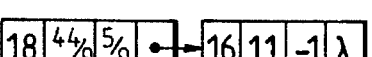
y = 17 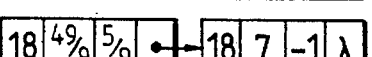
y = 18 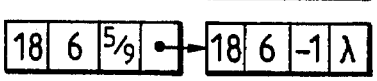
y = 19

FIG. 75

| Label | Cell | Description |
|---|---|---|
| LOOP NUMBER IN IMAGE | N | CLOSED LOOP NUMBER |
| TOP NUMBER TABLE IN EACH LOOP | $L_0$ | TOP NUMBER IN 0TH LOOP |
| | $L_1$ | TOP NUMBER IN 1ST LOOP |
| | ⋮ | |
| | $L_{i-1}$ | TOP NUMBER IN i-1TH LOOP |
| | $L_i$ | TOP NUMBER IN iTH LOOP |
| | $L_{i+1}$ | TOP NUMBER IN i+1TH LOOP |
| | ⋮ | |
| | $L_{N-2}$ | TOP NUMBER IN N-2TH LOOP |
| | $L_{N-1}$ | TOP NUMBER IN N-1TH LOOP |

TOP COORDINATES TABLE

EACH TOP COORDINATES IN 0TH LOOP:
- $x_{00}$, $y_{00}$ — 0TH TOP COORDINATES IN 0TH LOOP
- $x_{01}$, $y_{01}$ — 1ST TOP COORDINATES IN 0TH LOOP
- ⋮
- $x_{0\,j-1}$, $y_{0\,j-1}$ — j-1TH TOP COORDINATES IN 0TH LOOP
- $x_{0j}$, $y_{0j}$ — jTH TOP COORDINATES IN 0TH LOOP
- $x_{0\,j+1}$, $y_{0\,j+1}$ — j+1TH TOP COORDINATES IN 0TH LOOP
- ⋮
- $x_{0\,L_0-2}$, $y_{0\,L_0-2}$ — $L_0$-2TH TOP COORDINATES IN 0TH LOOP
- $x_{0\,L_0-1}$, $y_{0\,L_0-1}$ — $L_0$-1TH TOP COORDINATES IN 0TH LOOP

EACH TOP COORDINATES IN 1ST LOOP:
- $x_{10}$, $y_{10}$ — 0TH TOP COORDINATES IN 1ST LOOP
- ⋮
- $x_{1\,L_1-1}$, $y_{1\,L_1-1}$ — $L_1$-1TH TOP COORDINATES IN 1ST LOOP

EACH TOP COORDINATES IN N-1TH LOOP:
- $x_{N-1\,0}$, $y_{N-1\,0}$ — 0TH TOP COORDINATES IN N-1TH LOOP
- ⋮
- $x_{N-1\,L_{N-1}-1}$, $y_{N-1\,L_{N-1}-1}$ — $L_{N-1}$-1TH TOP COORDINATES IN N-1TH LOOP

FIG. 76

| | |
|---|---|
| 1 | N |
| 13 | L |
| 7 | ⎫ POINT A |
| 3 | ⎭ |
| 10 | ⎫ POINT B |
| 6 | ⎭ |
| 13 | ⎫ POINT C |
| 6 | ⎭ |
| 14 | ⎫ POINT D |
| 10 | ⎭ |
| 16 | ⎫ POINT E |
| 6 | ⎭ |
| 19 | ⎫ POINT F |
| 6 | ⎭ |
| 19 | ⎫ POINT G |
| 15 | ⎭ |
| 16 | ⎫ POINT H |
| 15 | ⎭ |
| 14 | ⎫ POINT I |
| 13 | ⎭ |
| 11 | ⎫ POINT J |
| 16 | ⎭ |
| 8 | ⎫ POINT K |
| 16 | ⎭ |
| 6 | ⎫ POINT L |
| 18 | ⎭ |
| 1 | ⎫ POINT M |
| 9 | ⎭ |

FIG. 79

| | |
|---|---|
| 0 | $\lambda$  — $A_{y0}$ |
| 1 | $\lambda$  — $A_{y1}$ |
| 2 | $\lambda$ |
| 3 | $\lambda$ |
| 4 | $\lambda$ |
| 5 | $\lambda$ |
| $i-1$ | $\lambda$ |
| $i$ | $\lambda$ |
| $i+1$ | $\lambda$ |
| $Y-3$ | $\lambda$ |
| $Y-2$ | $\lambda$ |
| $Y-1$ | $\lambda$ |
| $Y$ | $\lambda$  — $A_{yN}$ |

| FIG. 78A |
|---|
| FIG. 78B |

| CASE NO. | START POINT | DIRECTION OF PRECEDING EDGE | DIRECTION OF PRESENT EDGE | DIRECTION OF SUBSEQUENT EDGE | END POINT | CASE NO. |
|---|---|---|---|---|---|---|
| START 1 | CLOSE BY ONE SCAN LINE | UP | UP | UP | AS IT IS | END 1 |
| START 2 | AS IT IS | DOWN | | DOWN | AS IT IS | END 2 |
| START 3 | AS IT IS | LEFT | | LEFT | CLOSE BY ONE SCAN LINE | END 3 |
| START 4 | CLOSE BY ONE SCAN LINE | RIGHT | | RIGHT | AS IT IS | END 4 |
| START 5 | AS IT IS | UP | DOWN | UP | AS IT IS | END 5 |
| START 6 | CLOSE BY ONE SCAN LINE | DOWN | | DOWN | AS IT IS | END 6 |
| START 7 | CLOSE BY ONE SCAN LINE | LEFT | | LEFT | AS IT IS | END 7 |
| START 8 | AS IT IS | RIGHT | | RIGHT | CLOSE BY ONE SCAN LINE | END 8 |

FIG. 93

| CASE NO. | START POINT | DIRECTION OF PRECEDING EDGE | DIRECTION OF PRESENT EDGE | DIRECTION OF SUBSEQUENT EDGE | END POINT | CASE NO. |
|---|---|---|---|---|---|---|
| START 9 | AS IT IS | UP | UP | UP | CLOSE BY ONE SCAN LINE | END 9 |
| START 10 | AS IT IS | DOWN | | DOWN | AS IT IS | END 10 |
| START 11 | CLOSE BY ONE SCAN LINE | LEFT | | LEFT | AS IT IS | END 11 |
| START 12 | AS IT IS | RIGHT | | RIGHT | CLOSE BY ONE SCAN LINE | END 12 |
| START 13 | AS IT IS | UP | DOWN | UP | AS IT IS | END 13 |
| START 14 | CLOSE BY ONE SCAN LINE | DOWN | | DOWN | AS IT IS | END 14 |
| START 15 | AS IT IS | LEFT | | LEFT | CLOSE BY ONE SCAN LINE | END 15 |
| START 16 | CLOSE BY ONE SCAN LINE | RIGHT | | RIGHT | AS IT IS | END 16 |

FIG. 95

CLOCKWISE START

| DIRECTION OF PRESENT EDGE | DIRECTION OF PRECEDING EDGE | | START POINT OF PRESENT EDGE | EDGE EXCEPT START POINT | SIGN |
|---|---|---|---|---|---|
| HORIZON | RIGHT | HORIZON | RIGHT | × | × | a |
| | | | LEFT | ○ | × | b |
| | | NON-HORIZON | DOWN | ○ | × | c |
| | | | UP | × | × | d |
| | LEFT | HORIZON | RIGHT | ○ | × | e |
| | | | LEFT | × | × | f |
| | | NON-HORIZON | DOWN | × | × | g |
| | | | UP | ○ | × | h |
| NON-HORIZON | DOWN | HORIZON | RIGHT | ○ | ○ | i |
| | | | LEFT | × | ○ | j |
| | | NON-HORIZON | DOWN | × | ○ | k |
| | | | UP | ○ | ○ | m |
| | UP | HORIZON | RIGHT | × | ○ | n |
| | | | LEFT | ○ | ○ | p |
| | | NON-HORIZON | DOWN | ○ | ○ | q |
| | | | UP | × | ○ | r |

FIG. 97

| y | | | | | | |
|---|---|---|---|---|---|---|
| y = 0 | | | | | | |
| y = 1 | | | | | | |
| y = 2 | | | | | | |
| y = 3 | [8\|7\|-1] → [3\|7\|0\|λ] | | | | | |
| y = 4 | [8\|6\|-1] → [6\|8\|1\|λ] | | | | | |
| y = 5 | [8\|5\|-1] → [6\|9\|1\|λ] | | | | | |
| y = 6 | [8\|4\|-1] → [6\|10\|0] → [6\|10\|1] → [6\|13\|0] → [9\|16\|-½] → [6\|19\|0\|λ] | | | | | |
| y = 7 | [8\|3\|-1] → [10\|53/4\|¼] → [9\|31½\|-½] → [15\|19\|0\|λ] | | | | | |
| y = 8 | [8\|2\|-1] → [10\|27/2\|¼] → [9\|15\|-½] → [15\|19\|0\|λ] | | | | | |
| y = 9 | [17\|1\|5/9] → [10\|55/4\|¼] → [9\|29/2\|-½] → [15\|19\|0\|λ] | | | | | |
| y = 10 | [17\|14/9\|5/9] → [10\|14\|¼] → [10\|14\|0] → [15\|19\|0\|λ] | | | | | |
| y = 11 | [17\|19/9\|5/9] → [15\|19\|0\|λ] | | | | | |
| y = 12 | [17\|24/9\|5/9] → [15\|19\|0\|λ] | | | | | |
| y = 13 | [17\|29/9\|5/9] → [13\|14\|0] → [14\|14\|1] → [15\|19\|0\|λ] | | | | | |
| y = 14 | [17\|34/9\|5/9] → [16\|13\|-1] → [14\|15\|1] → [15\|19\|0\|λ] | | | | | |
| y = 15 | [17\|39/9\|5/9] → [16\|12\|-1] → [15\|16\|0] → [15\|19\|0\|λ] | | | | | |
| y = 16 | [17\|44/9\|5/9] → [16\|11\|-1\|λ] | | | | | |
| y = 17 | [17\|49/9\|5/9] → [18\|7\|-1\|λ] | | | | | |
| y = 18 | [18\|16\|0] → [18\|6\|-1\|λ] | | | | | |
| y = 19 | [ \| \| ] | | | | | |

FIG. 100

COUNTERCLOCKWISE START

| DIRECTION OF PRESENT EDGE | | DIRECTION OF PRECEDING EDGE | | START POINT OF PRESENT EDGE | EDGE EXCEPT START POINT | SIGN |
|---|---|---|---|---|---|---|
| HORIZON | RIGHT | HORIZON | RIGHT | × | × | a |
| | | | LEFT | ○ | | b |
| | | NON-HORIZON | DOWN | × | | c |
| | | | UP | ○ | | d |
| | LEFT | HORIZON | RIGHT | ○ | | e |
| | | | LEFT | × | | f |
| | | NON-HORIZON | DOWN | ○ | | g |
| | | | UP | × | | h |
| NON-HORIZON | DOWN | HORIZON | RIGHT | × | ○ | i |
| | | | LEFT | ○ | | j |
| | | NON-HORIZON | DOWN | × | | k |
| | | | UP | ○ | | m |
| | UP | HORIZON | RIGHT | ○ | | n |
| | | | LEFT | × | | p |
| | | NON-HORIZON | DOWN | ○ | | q |
| | | | UP | × | | r |

FIG. 101

| DIRECTION OF PRESENT EDGE | DIRECTION OF PRECEDING EDGE | | CLOCKWISE END | | SIGN |
|---|---|---|---|---|---|
| | | | END POINT OF PRESENT EDGE | EDGE EXCEPT END POINT | |
| RIGHT | HORIZON | RIGHT | × | × | a |
| | | LEFT | ○ | | b |
| | NON-HORIZON | DOWN | × | | c |
| | | UP | ○ | | d |
| LEFT | HORIZON | RIGHT | ○ | | e |
| | | LEFT | × | | f |
| | NON-HORIZON | DOWN | ○ | | g |
| | | UP | × | | h |
| DOWN | HORIZON | RIGHT | × | ○ | i |
| | | LEFT | ○ | | j |
| | NON-HORIZON | DOWN | × | | k |
| | | UP | ○ | | m |
| UP | HORIZON | RIGHT | ○ | | n |
| | | LEFT | × | | p |
| | NON-HORIZON | DOWN | ○ | | q |
| | | UP | × | | r |

FIG. 102

| DIRECTION OF PRESENT EDGE | | DIRECTION OF PRECEDING EDGE | | COUNTERCLOCKWISE END | | SIGN |
|---|---|---|---|---|---|---|
| | | | | END POINT OF PRESENT EDGE | EDGE EXCEPT END POINT | |
| HORIZON | RIGHT | HORIZON | RIGHT | × | × | a |
| | | | LEFT | ○ | × | b |
| | | NON-HORIZON | DOWN | ○ | × | c |
| | | | UP | × | × | d |
| | LEFT | HORIZON | RIGHT | ○ | × | e |
| | | | LEFT | × | × | f |
| | | NON-HORIZON | DOWN | × | × | g |
| | | | UP | ○ | × | h |
| NON-HORIZON | DOWN | HORIZON | RIGHT | ○ | ○ | i |
| | | | LEFT | × | ○ | j |
| | | NON-HORIZON | DOWN | × | ○ | k |
| | | | UP | ○ | ○ | m |
| | UP | HORIZON | RIGHT | × | ○ | n |
| | | | LEFT | ○ | ○ | p |
| | | NON-HORIZON | DOWN | ○ | ○ | q |
| | | | UP | × | ○ | r |

FIG. 104

CLOCKWISE
BOTH END POINTS (DIRCTION AND X INCREMENT) VERSION

| CASE NO. | START POINT | STATE OF START POINT | DIRECTION OF PRECEDING EDGE | DIRECTION OF PRESENT EDGE | DIRECTION OF SUBSEQUENT EDGE | STATE OF END POINT | END POINT | CASE NO. |
|---|---|---|---|---|---|---|---|---|
| START 1 | CLOSE BY ONE SCAN LINE | | UP | UP | UP | | AS IT IS | END 1 |
| START 2 | CLOSE BY ONE SCAN LINE | | DOWN | | DOWN | | AS IT IS | END 2 |
| START 3 | AS IT IS | | | | | | CLOSE BY ONE SCAN LINE | END 3 |
| START 4 | AS IT IS | | LEFT | | LEFT | | CLOSE BY ONE SCAN LINE | END 4 |
| START 5 | CLOSE BY ONE SCAN LINE | | RIGHT | | RIGHT | | AS IT IS | END 5 |
| START 6 | RIGHT-SHIFT BY ONE PIXEL AS IT IS | | UP | DOWN | UP | | RIGHT-SHIFT BY ONE PIXEL AS IT IS | END 6 |
| START 7 | RIGHT-SHIFT BY ONE PIXEL AND CLOSE BY ONE SCAN LINE | | | | | | RIGHT-SHIFT BY ONE PIXEL AND CLOSE BY ONE SCAN LINE | END 7 |
| START 8 | RIGHT-SHIFT BY ONE PIXEL AS IT IS | | DOWN | | DOWN | | RIGHT-SHIFT BY ONE PIXEL AND CLOSE BY ONE SCAN LINE | END 8 |
| START 9 | RIGHT-SHIFT BY ONE PIXEL AND CLOSE BY ONE SCAN LINE | | LEFT | | LEFT | | RIGHT-SHIFT BY ONE PIXEL AS IT IS | END 9 |
| START 10 | RIGHT-SHIFT BY ONE PIXEL AS IT IS | | RIGHT | | RIGHT | | RIGHT-SHIFT BY ONE PIXEL AND CLOSE BY ONE SCAN LINE | END 10 |

COUNTERCLOCKWISE
BOTH END POINTS (DIRCTION AND X INCREMENT) VERSION

| CASE NO. | START POINT | STATE OF START POINT | DIRECTION OF PRECEDING EDGE | DIRECTION OF PRESENT EDGE | DIRECTION OF SUBSEQUENT EDGE | STATE OF END POINT | END POINT | CASE NO. |
|---|---|---|---|---|---|---|---|---|
| START 11 | RIGHT-SHIFT BY ONE PIXEL AS IT IS | | UP | | UP | | RIGHT-SHIFT BY ONE PIXEL AND CLOSE BY ONE SCAN LINE | END 11 |
| START 12 | RIGHT-SHIFT BY ONE PIXEL AS IT IS | | DOWN | | DOWN | | RIGHT-SHIFT BY ONE PIXEL AND CLOSE BY ONE SCAN LINE | END 12 |
| START 13 | RIGHT-SHIFT BY ONE PIXEL AND CLOSE BY ONE SCAN LINE | | | UP | | | RIGHT-SHIFT BY ONE PIXEL AS IT IS | END 13 |
| START 14 | RIGHT-SHIFT BY ONE PIXEL AND CLOSE BY ONE SCAN LINE | | LEFT | | LEFT | | RIGHT-SHIFT BY ONE PIXEL AS IT IS | END 14 |
| START 15 | RIGHT-SHIFT BY ONE PIXEL AS IT IS | | RIGHT | | RIGHT | | RIGHT-SHIFT BY ONE PIXEL AND CLOSE BY ONE SCAN LINE | END 15 |
| START 16 | CLOSE BY ONE SCAN LINE | | UP | | UP | | CLOSE BY ONE SCAN LINE | END 16 |
| START 17 | AS IT IS | | | DOWN | | | AS IT IS | END 17 |
| START 18 | CLOSE BY ONE SCAN LINE | | DOWN | | DOWN | | AS IT IS | END 18 |
| START 19 | AS IT IS | | LEFT | | LEFT | | CLOSE BY ONE SCAN LINE | END 19 |
| START 20 | CLOSE BY ONE SCAN LINE | | RIGHT | | RIGHT | | AS IT IS | END 20 |

FIG. 111  CLOCKWISE START POINT Version

| DIRECTION OF PRESENT EDGE | | DIRECTION OF PRECEDING EDGE | | SUM OF PRECEDING EDGE × INCREMENT AND PRESENT VECTOR × INCREMENT | START POINT OF PRESENT EDGE | EDGE EXCEPT START POINT OF PRESENT EDGE | CASE NO. |
|---|---|---|---|---|---|---|---|
| HORIZON | RIGHT | HORIZON | RIGHT | — | NOT PLOTTED | NOT PLOTTED | a |
| | | | LEFT | — | EXOR PLOT | NOT PLOTTED | b |
| | | NON-HORIZON | DOWN | — | RIGHT-PIXEL SHIFT EXOR PLOT | NOT PLOTTED | c |
| | | | UP | — | NOT PLOTTED | NOT PLOTTED | d |
| | LEFT | HORIZON | RIGHT | — | RIGHT-PIXEL SHIFT EXOR PLOT | NOT PLOTTED | e |
| | | | LEFT | — | NOT PLOTTED | NOT PLOTTED | f |
| | | NON-HORIZON | DOWN | — | NOT PLOTTED | NOT PLOTTED | g |
| | | | UP | — | EXOR PLOT | NOT PLOTTED | h |
| NON-HORIZON | DOWN | HORIZON | RIGHT | — | RIGHT-PIXEL SHIFT EXOR PLOT | RIGHT-PIXEL SHIFT EXOR PLOT | i |
| | | | LEFT | — | NOT PLOTTED | RIGHT-PIXEL SHIFT EXOR PLOT | j |
| | | NON-HORIZON | DOWN | — | NOT PLOTTED | RIGHT-PIXEL SHIFT EXOR PLOT | k |
| | | | UP | 0 OR POSITIVE | RIGHT-PIXEL SHIFT EXOR PLOT | RIGHT-PIXEL SHIFT EXOR PLOT | m |
| | | | | NEGATIVE | EXOR PLOT | RIGHT-PIXEL SHIFT EXOR PLOT | n |
| | UP | HORIZON | RIGHT | — | NOT PLOTTED | EXOR PLOT | p |
| | | | LEFT | — | EXOR PLOT | EXOR PLOT | q |
| | | NON-HORIZON | DOWN | POSITIVE | RIGHT-PIXEL SHIFT EXOR PLOT | EXOR PLOT | r |
| | | | | 0 OR NEGATIVE | EXOR PLOT | EXOR PLOT | s |
| | | | UP | — | NOT PLOTTED | EXOR PLOT | t |

FIG. 113 y = 0 y = 1 y = 2 y = 3  | 8 | 7 | -1 | → | 3 | 8 | 0 | λ | y = 4  | 8 | 6 | -1 | → | 6 | 9 | 1 | λ | y = 5  | 8 | 5 | -1 | → | 6 | 10 | 1 | λ | y = 6  | 8 | 4 | -1 | → | 6 | 11 | 0 | → | 6 | 11 | 1 | → | 6 | 14 | 0 | → | 9 | 16 | -½ | → | 6 | 20 | 0 | λ | y = 7  | 8 | 3 | -1 | → | 10 | 57/4 | ¼ | → | 9 | 31½ | -½ | → | 15 | 20 | 0 | λ | y = 8  | 8 | 2 | -1 | → | 10 | 29/2 | ¼ | → | 9 | 15 | -½ | → | 15 | 20 | 0 | λ | y = 9  | 17 | 1 | 5/9 | → | 10 | 59/4 | ¼ | → | 9 | 29/2 | -½ | → | 15 | 20 | 0 | λ | y = 10 | 17 | 14/9 | 5/9 | → | 10 | 15 | ¼ | → | 10 | 15 | 0 | → | 15 | 20 | 0 | λ | y = 11 | 17 | 19/9 | 5/9 | → | 15 | 20 | 0 | λ | y = 12 | 17 | 24/9 | 5/9 | → | 15 | 20 | 0 | λ | y = 13 | 17 | 29/9 | 5/9 | → | 13 | 14 | 0 | → | 14 | 14 | 1 | → | 15 | 20 | 0 | λ | y = 14 | 17 | 34/9 | 5/9 | → | 16 | 14 | -1 | → | 14 | 15 | 1 | → | 15 | 20 | 0 | λ | y = 15 | 17 | 39/9 | 5/9 | → | 16 | 13 | -1 | → | 15 | 16 | 0 | → | 15 | 20 | 0 | λ | y = 16 | 17 | 44/9 | 5/9 | → | 16 | 12 | -1 | λ | y = 17 | 17 | 49/9 | 5/9 | → | 18 | 8 | -1 | λ | y = 18 | 18 | 6 | 0 | → | 18 | 7 | -1 | λ | y = 19 | | | |

FIG. 117  COUNTERCLOCKWISE START POINT Version

| DIRECTION OF PRESENT EDGE | | DIRECTION OF PRECEDING EDGE | | SUM OF PRECEDING EDGE × INCREMENT AND PRESENT VECTOR × INCREMENT | START POINT OF PRESENT EDGE | EDGE EXCEPT START POINT OF PRESENT EDGE | CASE NO. |
|---|---|---|---|---|---|---|---|
| HORIZON | RIGHT | HORIZON | RIGHT | — | NOT PLOTTED | NOT PLOTTED | a |
| | | | LEFT | — | EXOR PLOT | NOT PLOTTED | b |
| | | NON-HORIZON | DOWN | — | NOT PLOTTED | NOT PLOTTED | c |
| | | | UP | — | RIGHT-PIXEL SHIFT EXOR PLOT | NOT PLOTTED | d |
| | LEFT | HORIZON | RIGHT | — | RIGHT-PIXEL SHIFT EXOR PLOT | NOT PLOTTED | e |
| | | | LEFT | — | NOT PLOTTED | NOT PLOTTED | f |
| | | NON-HORIZON | DOWN | — | EXOR PLOT | NOT PLOTTED | g |
| | | | UP | — | NOT PLOTTED | NOT PLOTTED | h |
| NON-HORIZON | DOWN | HORIZON | RIGHT | — | NOT PLOTTED | EXOR PLOT | i |
| | | | LEFT | — | EXOR PLOT | EXOR PLOT | j |
| | | NON-HORIZON | DOWN | — | NOT PLOTTED | EXOR PLOT | k |
| | | | UP | POSITIVE | RIGHT-PIXEL SHIFT EXOR PLOT | EXOR PLOT | m |
| | | | | 0 OR NEGATIVE | EXOR PLOT | EXOR PLOT | n |
| | UP | HORIZON | RIGHT | — | RIGHT-PIXEL SHIFT EXOR PLOT | RIGHT-PIXEL SHIFT EXOR PLOT | p |
| | | | LEFT | — | NOT PLOTTED | RIGHT-PIXEL SHIFT EXOR PLOT | q |
| | | NON-HORIZON | DOWN | 0 OR POSITIVE | RIGHT-PIXEL SHIFT EXOR PLOT | RIGHT-PIXEL SHIFT EXOR PLOT | r |
| | | | | NEGATIVE | EXOR PLOT | RIGHT-PIXEL SHIFT EXOR PLOT | s |
| | | | UP | — | NOT PLOTTED | RIGHT-PIXEL SHIFT EXOR PLOT | t |

FIG. 118  CLOCKWISE END POINT Version

| DIRECTION OF PRESENT EDGE | DIRECTION OF SUBSEQUENT EDGE | | SUM OF SUBSEQUENT EDGE × INCREMENT AND PRESENT EDGE × INCREMENT | END POINT OF PRESENT EDGE | EDGE EXCEPT END POINT OF PRESENT EDGE | CASE NO. |
|---|---|---|---|---|---|---|
| HORIZON | HORIZON | RIGHT | — | NOT PLOTTED | NOT PLOTTED | a |
| | | LEFT | — | RIGHT-PIXEL SHIFT EXOR PLOT | NOT PLOTTED | b |
| | NON HORIZON | DOWN | — | NOT PLOTTED | NOT PLOTTED | c |
| | | UP | — | EXOR PLOT | NOT PLOTTED | d |
| LEFT | HORIZON | RIGHT | — | EXOR PLOT | NOT PLOTTED | e |
| | | LEFT | — | NOT PLOTTED | NOT PLOTTED | f |
| | NON-HORIZON | DOWN | — | RIGHT-PIXEL SHIFT EXOR PLOT | NOT PLOTTED | g |
| | | UP | — | NOT PLOTTED | NOT PLOTTED | h |
| DOWN | HORIZON | RIGHT | — | NOT PLOTTED | RIGHT-PIXEL SHIFT EXOR PLOT | i |
| | | LEFT | — | RIGHT-PIXEL SHIFT EXOR PLOT | RIGHT-PIXEL SHIFT EXOR PLOT | j |
| | NON-HORIZON | DOWN | — | NOT PLOTTED | RIGHT-PIXEL SHIFT EXOR PLOT | k |
| | | UP | 0 OR POSITIVE | EXOR PLOT | RIGHT-PIXEL SHIFT EXOR PLOT | m |
| | | | NEGATIVE | RIGHT-PIXEL SHIFT EXOR PLOT | RIGHT-PIXEL SHIFT EXOR PLOT | n |
| UP | HORIZON | RIGHT | — | EXOR PLOT | EXOR PLOT | p |
| | | LEFT | — | NOT PLOTTED | EXOR PLOT | q |
| | NON-HORIZON | DOWN | POSITIVE | EXOR PLOT | EXOR PLOT | r |
| | | | 0 OR NEGATIVE | RIGHT-PIXEL SHIFT EXOR PLOT | EXOR PLOT | s |
| | | UP | — | NOT PLOTTED | EXOR PLOT | t |

FIG. 119  COUNTERCLOCKWISE END POINT Version

| DIRECTION OF PRESENT EDGE | | DIRECTION OF SUBSEQUENT EDGE | | SUM OF SUBSEQUENT EDGE × INCREMENT AND PRESENT EDGE × INCREMENT | END POINT OF PRESENT EDGE | EDGE EXCEPT END POINT OF PRESENT EDGE | CASE NO. |
|---|---|---|---|---|---|---|---|
| HORIZON | RIGHT | HORIZON | RIGHT | — | NOT PLOTTED | NOT PLOTTED | a |
| | | | LEFT | — | RIGHT-PIXEL SHIFT EXOR PLOT | NOT PLOTTED | b |
| | | NON HORIZON | DOWN | — | EXOR PLOT | NOT PLOTTED | c |
| | | | UP | — | NOT PLOTTED | NOT PLOTTED | d |
| | LEFT | HORIZON | RIGHT | — | EXOR PLOT | NOT PLOTTED | e |
| | | | LEFT | — | NOT PLOTTED | NOT PLOTTED | f |
| | | NON-HORIZON | DOWN | — | NOT PLOTTED | NOT PLOTTED | g |
| | | | UP | — | RIGHT-PIXEL SHIFT EXOR PLOT | NOT PLOTTED | h |
| NON-HORIZON | DOWN | HORIZON | RIGHT | — | EXOR PLOT | EXOR PLOT | i |
| | | | LEFT | — | NOT PLOTTED | EXOR PLOT | j |
| | | NON-HORIZON | DOWN | — | NOT PLOTTED | EXOR PLOT | k |
| | | | UP | 0 OR POSITIVE | EXOR PLOT | EXOR PLOT | m |
| | | | | NEGATIVE | RIGHT-PIXEL SHIFT EXOR PLOT | EXOR PLOT | n |
| | UP | HORIZON | RIGHT | — | NOT PLOTTED | RIGHT-PIXEL SHIFT EXOR PLOT | p |
| | | | LEFT | — | RIGHT-PIXEL SHIFT EXOR PLOT | RIGHT-PIXEL SHIFT EXOR PLOT | q |
| | | NON-HORIZON | DOWN | POSITIVE | EXOR PLOT | RIGHT-PIXEL SHIFT EXOR PLOT | r |
| | | | | 0 OR NEGATIVE | RIGHT-PIXEL SHIFT EXOR PLOT | RIGHT-PIXEL SHIFT EXOR PLOT | s |
| | | | UP | — | NOT PLOTTED | RIGHT-PIXEL SHIFT EXOR PLOT | t |

IMAGE PROCESSING METHOD AND APPARATUS

BACKGROUND OF THE INVENTION

1. Field of the Invention

The present invention relates to an image processing method and apparatus and, more particularly, to an image processing method and apparatus, which can paint out a portion inside a closed contour constituted by a plurality of line elements.

2. Related Background Art

In an apparatus of this type, to paint out a portion inside a closed area is a fundamental image processing function, and various paint out methods have been developed so far.

In the most fundamental method, a paint out range is sequentially instructed in units of pixel lines of a random-access memory (RAM) by software, and line pixels within the instructed range are painted out.

A typical example of such a method is described in an article "Fundamentals of Interactive Computer Graphics" (written by J. D. FOLEY/A. VAN DAM, published by Addison-Wesley, 1982, pp. 456 to 460).

This method will be briefly described below.

As for a closed figure F1 given by a top data string, as shown in FIG. 2A, bucket data (FIG. 3) of edges e1 to e10 constituting the figure are generated, and are arranged in the form of an edge table (ET) shown in FIG. 4. At this time, horizontal edges are excluded, and bucket data of only non-horizontal edges are generated. The edge table (ET) has pointer bucket tables Ay0 to Ayn (when an image consists of (n+1) rasters from a 0th raster to an nth raster), the number of which is equal to the number of scan line rasters that can be stored in an image memory. The bucket data of non-horizontal ones of the edges e1 to e10 are connected to the pointer bucket tables each corresponding to a y coordinate value of an edge point having a smaller y coordinate value in a list structure. When a plurality of bucket data form a list structure from the same pointer bucket table, these bucket data are sorted in the ascending order of x values (xmin) of their edge points having smaller y coordinate values, thereby forming the list structure. The pointer bucket table having no corresponding edge bucket data stores a marker code X indicating this. When a y coordinate value is not a minimal or maximal value in the y direction of an edge, a position advanced by one scan from an original y coordinate value along the corresponding edge is determined as an edge point having a smaller y coordinate value so as not to cause a judgement error in a figure element inside/outside judgment, and the edge table (ET) is generated based on this point. In FIG. 2A, an edge point B of the edge e3, an edge point I of the edge e9, and an edge point G of the edge e8 correspond to such points.

Edge bucket data Ae1 to Ae10 corresponding to the edges store y values (ymaxe1 to ymaxe10) of edge points having larger y coordinate values of the corresponding edges e1 to e10, x values (xmine1 to xmine10) of edge points having smaller y coordinate values of the edges, increments ($\Delta$xe1 to $\Delta$xe10) of x coordinate values obtained when the corresponding y coordinate values are increased by one, and pointers (Pe1 to Pe10) for connecting the edge bucket data of edges whose edge points having the smaller y coordinate values have a common y coordinate value in the ascending order of power from edge bucket data having a smaller x coordinate value. $\lambda$ in the pointers Pe1 to Pe10 means that there is no edge bucket to be connected any more (FIG. 3).

Note that the x direction coincides with a scan line direction (the right direction in FIG. 2A), and the y direction coincides with an increment direction (the downward direction in FIG. 2A) of scan lines.

Paint out processing is executed by utilizing the edge table (ET) generated in this manner. A scan line y coordinate value is set to be a minimum y coordinate value having edge bucket data in the edge table (ET). The edge bucket data are connected in association with the set scan line y coordinate value, thereby initializing an active edge table (AET; FIG. 5) to an empty state.

Thereafter, the following processing is repeated until both the active edge table (AET) and the edge table (ET) become empty.

(1) A new active edge table (AET) for connecting the edge bucket data associated with the scan line y coordinate value is formed by combining information of the edge table (ET) and information of the active edge 10 table (AET) at that time, while maintaining the sort order of x coordinate values (xmin) of the active edge table (AET).

(2) Two each of edge bucket data having smaller x coordinate values (xmin) of the active edge table (AET) are paired, a section therebetween is determined as a paint out section in a figure element, and paint out processing inside the section is executed.

(3) Edge bucket data having the scan line y coordinate value as a y value (ymax) of an edge point having a larger y coordinate value is deleted from the active edge table (AET) for an operation on the next scan line.

(4) The x coordinate values (xmin) of edge bucket data remaining in the active edge table (AET) are updated by utilizing increment data ($\Delta$x) for an operation on the next scan line. More specifically, a new xmin is obtained by xmin+$\Delta$x.

(5) After the x coordinate values (xmin) are updated, the edge bucket data are re-sorted on the basis of the updated x coordinate values (xmin).

(6) The scan line y coordinate value is incremented, and the control returns to the processing (i).

In this manner, paint out processing is executed. FIG. 5 shows the active edge table (AET) associated with the figure F1 shown in FIG. 2A when the scan line 10 y coordinate value is "14". FIG. 6 shows a transition of the state of the active edge table (AET) for the respective scan line y coordinate values (0 to 19).

Besides the above-mentioned method, various other methods for performing paint out processing at high speed by hardware have been proposed.

In a method of this type, after only pixels defining a contour of a figure are sketched on an image memory, the image memory is raster-scanned, so that paint out processing is started from an odd-numbered contour line dot on a scan line, and is ended at an even-numbered contour line dot (to be referred to as an odd-even inversion method hereinafter).

However, when the odd-even inversion method is used, if a contour is simply sketched, portions not to be painted out (e.g., L1, L2, L3, L4, and L5 in FIG. 7) are undesirably painted out, and a portion to be painted out (a broken line portion on the line L3) is left unpainted.

A proposal that sets contour sketch rules based on the above-mentioned drawback to improve the above-mentioned method is known.

For example, Japanese Patent Publication No. 1-54752 discloses a contour pixel write technique according to the following five rules.

Rule 1: Do not write a horizontal line segment;

Rule 2: Express each line segment by one pixel per line;

Rule 3: Do not write the start point of each line segment;

Rule 4: EX-OR a contour line pixel and pixel data stored at a memory address at which this pixel is to be written, and write the EX-ORed result; and Rule 5: Instruct line segments in one direction, e.g., in a downward direction or a an upward direction.

The rule 1 prevents formation of an odd number of contour pixels in one line by contour pixels P1 and P2, and P4 and P3 included in horizontal contour line portions such as lines L2 and L4 in FIG. 7.

The rule 2 is to always represent a contour line by one pixel per line regardless of the angle of a line segment.

The rule 3 is to remove an upward or downward top. When line segments are instructed in one direction, e.g., a downward direction according to the rule 5, the rule 3 removes contour line pixels P5 and P6 as upward tops in FIG. 7.

The rules 4 and 5 remove a contour line pixel (P7 in FIG. 7) of a top in a direction opposite to the top processed according to the rule 3.

However, in the former prior art, i.e., in the 10 software method, since not only designation of a paint out range but also execution of a paint out operation itself are performed by software, the processing time becomes too long. FIG. 8 shows the processing result of the figure F1 shown in FIG. 2A by this conventional method. Like in a section between P2 and P1 in FIG. 8, points on the horizontal edge are often left unpainted, resulting in distortion of a generated figure.

In the latter prior art, i.e., in the method of performing paint out processing at high speed by hardware, the paint out execution speed can be higher than that in the former method. However, since all the contour lines must be sketched first, an image memory having a size corresponding to the entire image is required, resulting in high cost. FIG. 9B shows a result obtained by determining the paint out range of the figure F1 (FIG. 2A) by the conventional method (latter), and executing the paint out operation by a method recommended in the above-mentioned patent publication. However, in this method, top pixels such as P5 and P7 in FIG. 9B, and portions such as sections between P5 and P8, between P9 and P10, between P11 and P3, and between P12 and P7 are left unpainted, resulting in distortion of a generated figure.

In order to compensate for the distortion of the figure generated by the conventional methods, a method for additionally sketching only contour lines, and logically ORing the contour line pixels and the distorted figure pixels in units of pixels so as to output a figure free from distortion, as shown in, e.g., FIG. 10, is also attempted. In this case, however, a memory capacity required for processing is increased by a capacity for holding only the contour lines in addition to a memory on which the figure is generated, and an extra time and circuit for generating an image of only contour lines are required.

However, in the above-mentioned method, top pixels and some horizontal portions are left unpainted, and a distorted figure is reproduced. In the above-mentioned patent publication, after the contour line pixels are written, when lines on the memory are scanned to paint out from an odd-numbered contour line pixel to the next even-numbered contour line pixel, if the paint out operation is not started from the even-numbered contour line pixel according to the method recommended in the above-mentioned patent publication, pixels on the right contour line of the figure are deleted, and a figure smaller by one size than an original figure is reproduced.

FIG. 9A shows a case wherein the contour is sketched according to the above-mentioned rules. FIG. 9B shows a painted out result of the figure obtained, as shown in FIG. 9A, by the method recommended in the above-mentioned patent publication. In FIG. 9A, "x" marks indicate pixels which are not written as contour line pixels. In FIG. 9B, top pixels P5 and P7 are not painted, and a horizontal line between P1 and P2 is not painted out. When the figure is painted out by the recommended method, sections between P5 and P8, between P9 and P10, between P11 and P3, and between P12 and P7 are not painted out.

Japanese Laid-Open Patent Application No. 2-50778 discloses a method, which sets rules for determining whether or not pixels corresponding to points at two ends of a horizontal line (including a portion of continuous horizontal pixels generated upon sketching of an oblique line) is sketched in a contour sketch operation. However, this method has no disclosure about processing of top pixels, and does not consider a judgment error or distortion caused at the top pixels.

In order to compensate for the distortion of the figure generated by the conventional methods, a method for additionally sketching only contour lines, and logically ORing the contour line pixels and the distorted figure pixels in units of pixels so as to output a figure free from distortion is also attempted. In this case, however, a memory capacity required for processing is increased by a capacity for holding only the contour lines in addition to a memory on which the figure is generated, and an extra time and circuit for generating an image of only contour lines are required (see FIG. 30).

However, in the above-mentioned method, a distorted figure is reproduced. After the contour line pixels are written, when lines on the memory are scanned to paint out from an odd-numbered contour line pixel to the next even-numbered contour line pixel, if the paint out operation is not started from the even-numbered contour line pixel, pixels on the right contour line of the figure are deleted, and a figure smaller by one size than an original figure is reproduced.

FIG. 9A shows a case wherein the contour is sketched according to the above-mentioned rules. FIG. 9B shows a painted out result of the figure obtained in FIG. 9A. In FIG. 9A, "x" marks indicate pixels which are not written as contour line pixels. When the figure is painted out by the method recommended in the prior art, sections between P5 and P8, between P9 and P10, between P11 and P3, and between P12 and P7 are not painted out.

Japanese Laid-Open Patent Application No. 2-50778 discloses a method, which sets rules for determining whether or not pixels corresponding to points at two ends of a horizontal line (including a portion of continuous horizontal pixels generated upon sketching of an oblique line) is sketched in a contour sketch operation. However, this method has no disclosure about processing of top pixels, and does not consider a judgment error or distortion caused at the top pixels.

In order to compensate for the distortion of the figure generated by the conventional methods, a method for additionally sketching only contour lines, and logically ORing the contour line pixels and the distorted figure pixels in units of pixels so as to output a figure free from distortion, as shown in, e.g., FIG. 7, is also attempted. In this case, however, a memory capacity required for processing is increased by a capacity for holding only the contour lines in addition to a memory on which the figure is generated, and an extra time and circuit for generating an image of only contour lines are required.

Still another background art will be described below.

As for a closed figure F1 given by a top data string, as shown in FIG. 64A, bucket data (FIG. 65) of edges e1 to e13 constituting the figure are generated, and are arranged in the form of an edge table (ET) shown in FIG. 66. At this time, horizontal edges are excluded, and bucket data of only non-horizontal edges are generated. The edge table (ET) has pointer bucket tables Ay0 to Ayn (when an image consists of (n+1) rasters from a 0th raster to an nth raster), the number of which is equal to the number of scan line rasters that can be stored in an image memory. The bucket data of non-horizontal ones of the edges e1 to e13 are connected to the pointer bucket tables each corresponding to a y coordinate value of an edge point having a smaller y coordinate value in a list structure. When a plurality of bucket data form a list structure from the same pointer bucket table, these bucket data are sorted in the ascending order of x values (xmin) of their edge points having smaller y coordinate values, thereby forming the list structure. The pointer bucket table having no corresponding edge bucket data stores a marker code λ indicating this. When a y coordinate value is not a minimal or maximal value in the y direction of an edge, a position advanced by one scan from an original y coordinate value along the corresponding edge is determined as an edge point having a smaller y coordinate value so as not to cause a judgement error in a figure element inside/outside judgment, and the edge table (ET) is generated based on this point. In FIG. 64A, an edge point C of the edge e3, an edge point M of the edge e12, and an edge point L of the edge e11 correspond to such points.

Edge bucket data Ae1 to Ae13 corresponding to the edges store y values (ymaxe1 to ymaxe13) of edge points having larger y coordinate values of the corresponding edges e1 to e13, x values (xmine1 to xmine13) of edge points having smaller y coordinate values of the edges, increments (Δxe1 to Δxe13) of x coordinate values obtained when the corresponding y coordinate values are increased by one, and pointers (Pe1 to Pe13) for connecting the edge bucket data of edges whose edge points having the smaller y coordinate values have a common y coordinate value in the ascending order of power from edge bucket data having a smaller x coordinate value. λ in the pointers Pe1 to Pe13 means that there is no edge bucket to be connected any more (FIG. 65).

Note that the x direction coincides with a scan line direction (the right direction in FIG. 64A), and the y direction coincides with an increment direction (the downward direction in FIG. 64A) of scan lines.

Paint out processing is executed by utilizing the edge table (ET) generated in this manner. A scan line y coordinate value is set to be a minimum y coordinate value having edge bucket data in the edge table (ET). The edge bucket data are connected in association with the set scan line y coordinate value, thereby initializing an active edge table (AET; FIG. 67) to an empty state.

Thereafter, the following processing is repeated until both the active edge table (AET) and the edge table (ET) become empty.

(1) A new active edge table (AET) for connecting the edge bucket data associated with the scan line y coordinate value is formed by combining information of the edge table (ET) and information of the active edge table (AET) at that time, while maintaining the sort order of x coordinate values (xmin) of the active edge table (AET).

(2) Two each of edge bucket data having smaller x coordinate values (xmin) of the active edge table (AET) are paired, a section therebetween is determined as a paint out section in a figure element, and paint out processing inside the section is executed.

(3) Edge bucket data having the scan line y coordinate value as a y value (ymax) of an edge point having a larger y coordinate value is deleted from the active edge table (AET) for an operation on the next scan line.

(4) The x coordinate values (xmin) of edge bucket data remaining in the active edge table (AET) are updated by utilizing increment data (Δx) for an operation on the next scan line. More specifically, a new xmin is obtained by xmin+Δx.

(5) After the x coordinate values (xmin) are updated, the edge bucket data are re-sorted on the basis of the updated x coordinate values (xmin).

(6) The scan line y coordinate value is incremented, and the control returns to the processing (1).

In this manner, paint out processing is executed. FIG. 67 shows the active edge table (AET) associated with the figure F1 shown in FIG. 64A when the scan line y coordinate value is "14". FIG. 68 shows a transition of the state of the active edge table (AET) for the respective scan line y coordinate values (0 to 19).

Besides the above-mentioned method, various other methods for performing paint out processing at high speed by hardware have been proposed.

In a method of this type, after only pixels defining a contour of a figure are sketched on an image memory, the image memory is raster-scanned, so that paint out processing is started from an odd-numbered contour line dot on a scan line, and is ended at an even-numbered contour line dot (to be referred to as an odd-even inversion method hereinafter).

However, when the odd-even inversion method is used, if a contour is simply sketched, portions not to be painted out (e.g., L1, L2, L3, L4, L5, and L6 in FIG. 69) are undesirably painted out, and portions to be painted out (broken line portions on the lines L3 and L4) are left unpainted.

A proposal that sets contour sketch rules based on the above-mentioned drawback to improve the above-mentioned method is known.

For example, Japanese Patent Publication No. 1-54752 discloses a contour pixel write technique according to the above-mentioned five rules.

The rule 1 prevents formation of an odd number of contour pixels in one line by contour pixels at positions between P10 and P9, between P11 and P1, and between P4 and P3 included in horizontal contour line portions such as lines L2 and L4 in FIG. 69.

The rule 2 is to always represent a contour line by one pixel per line regardless of the angle of a line segment.

The rule 3 is to remove an upward or downward top. When line segments are instructed in one direction, e.g., a downward direction according to the rule 5, the rule 3 removes contour line pixels P5 and P6 as upward tops in FIG. 69.

The rules 4 and 5 remove contour line pixels (P7 and P8 in FIG. 69) of a top in a direction opposite to the top processed according to the rule 3.

However, in the former prior art, i.e., in the software method, since not only designation of a paint out range but also execution of a paint out operation itself are performed by software, the processing time becomes too long. FIG. 70 shows the processing result of the figure F1 shown in FIG. 64A by this conventional method. Like in a section between P2 and P1 in FIG. 70, points on the horizontal edge are often left unpainted, resulting in distortion of a generated figure.

In the latter prior art, i.e., in the method of performing paint out processing at high speed by hardware, the paint out execution speed can be higher than that in the former method. However, since all the contour lines must be sketched first, an image memory having a size corresponding to the entire image is required, resulting in high cost. FIG. 71 shows a result obtained by determining the paint out range of the figure F1 (FIG. 64A) by the conventional method (latter), and executing the paint out operation by a method recommended in the above-mentioned patent publication. However, in this method, top pixels such as P5 and P8 in FIG. 71, and portions such as sections between P5 and P10, between P9 and P10, between P9 and P15, between P11 and P1, between P1 and P12, between P13 and P3, and between P14 and P8 are left unpainted, resulting in distortion of a generated figure.

In order to compensate for the distortion of the figure generated by the conventional methods, a method for additionally sketching only contour lines, and logically ORing the contour line pixels and the distorted figure pixels in units of pixels so as to output a figure free from distortion, as shown in, e.g., FIG. 72, is also attempted. In this case, however, a memory capacity required for processing is increased by a capacity for holding only the contour lines in addition to a memory on which the figure is generated, and an extra time and circuit for generating an image of only contour lines are required.

SUMMARY OF THE INVENTION

The present invention has been made in consideration of the prior arts, and has as its object to provide an image processing method and apparatus, which can obtain an intended paint out result at high speed and with a small memory capacity when a portion inside a contour is to be painted out.

It is another object of the present invention to provide an image processing method comprising: the contour line data generation step of generating contour line data when viewed from a main scan direction on the basis of a connection relationship between a target line element and adjacent line elements before and after the target line element in one direction in which line elements continue, and a direction of an area to be painted out; the setting step of setting that a pixel position of an odd-numbered contour encountered in a scan operation in the main scan direction indicates a forward rotation position of the area, and setting that an adjacent pixel position in a scan direction of an even-numbered contour encountered in the scan operation indicates a reverse rotation position of the area; and the discrimination step of discriminating that a portion from an odd-numbered contour position up to a pixel position immediately before an even-numbered position when viewed from a scan direction on each scan line is inside the area of a closed figure, and other portions are outside the area of the closed figure, and to provide an image processing apparatus for carrying out this method.

It is still another object of the present invention to provide an image processing method and apparatus, which can realize easy processing for painting out a portion inside complicated contour lines at high speed with low cost without distorting a figure.

It is still another object of the present invention to provide the following image processing method and apparatus. That is, whether or not a target line element is processed as an object to be sketched is discriminated in line elements for determining a closed contour. When it is determined that the target line element is processed as the object to be sketched, the two end positions of the target line element are corrected on the basis of a connection relationship between the target line element and adjacent line elements before and after the target line element, and a direction of an area to be painted out. Line elements are sequentially sketched on a memory on the basis of the corrected two end positions. Thereafter, a paint out operation is executed under an assumption that a pixel position of an odd-numbered contour encountered in a scan operation in a main scan direction with respect to the memory indicates a forward rotation position of the area, and an adjacent pixel position present in a scan direction of an even-numbered contour encountered in the scan operation indicates a reverse rotation position of the area.

It is still another object of the present invention to provide an image processing method and apparatus, which can easily generate a complicated painted figure at high speed on the basis of vector data representing a series of line segments constituting contour lines of the figure without distorting the figure.

It is still another object of the present invention to provide an image processing method in which a contour of a figure is expressed by an outline vector string directed to form one or a plurality of closed loops, an outline is generated based on the outline vectors to perform a raster-scan operation, and it is determined that an area surrounded by the contour is started from an odd-numbered intersection between the outline and a main scan line, and the surrounded area is ended at a position immediately before an even-numbered intersection immediately before the odd-numbered intersection, comprising the steps of: discriminating a direction of each outline vector, and a direction of a vector immediately before the vector; and controlling a sketch operation of each outline vector based on the discrimination result to determine whether a start point of each line vector, and points on the contour other than the start point are not plotted, or are plotted at pixel positions corresponding to positions on the vector, or are plotted at neighboring pixel positions in a main scan direction of pixels corresponding to the positions on the vector, and to provide an image processing apparatus for carrying out this method.

It is still another object of the present invention to provide an image processing method and apparatus, wherein a direction of each outline vector, a direction of a vector before the vector, and whether a top between the two vectors is a projected or recessed top in a figure are discriminated, and a sketch operation of each outline vector is controlled based on the discrimination result to determine whether a start point of each line vector, and points on the contour other than the start point are not plotted, or are plotted at pixel positions corresponding to positions on the vector, or are plotted at neighboring pixel positions in a main scan direction of pixels corresponding to the positions on the vector.

It is still another object of the present invention to provide an image processing method and apparatus, wherein a direction of each outline vector, and a direction of a vector next to the vector are discriminated, and a sketch operation of each outline vector is controlled based on the discrimination result to determine whether an end point of each line vector, and points on the contour other than the end point are not plotted, or are plotted at pixel positions corresponding to positions on the vector, or are plotted at neighboring pixel positions in a main scan direction of pixels corresponding to the positions on the vector.

It is still another object of the present invention to provide an image processing method and apparatus, wherein a direction of each outline vector, a direction of a vector next to the vector, and whether a top between the two vectors is a projected or recessed top in a figure are discriminated, and a sketch operation of each outline vector is controlled based on the discrimination result to determine whether an end point of each line vector, and points on the contour other than the end point are not plotted, or are plotted at pixel positions corresponding to positions on the vector, or are plotted at neighboring pixel positions in a main scan direction of pixels corresponding to the positions on the vector.

It is still another object of the present invention to provide the following image processing method and apparatus. That is, a direction of each outline vector is discriminated, and classification is made in consideration of a direction of an outline vector immediately before the outline vector. Only points along each outline vector are plotted while independently controlling whether a start point (or end point) of each vector and points on the vector other than the start point (or end point) are not plotted, or are plotted, or are plotted at neighboring positions in a main scan direction, thereby sketching an outline.

It is still another object of the present invention to provide the following image processing method and apparatus. That is, contour line data when viewed from a main scan direction is generated on the basis of a connection relationship between a target line element and adjacent line elements before and after the target line element in one direction of continuous line elements in line elements for determining a closed contour, and a direction of an area to be painted out. In this case, a case wherein an odd-numbered contour position encountered in the main scan direction is the same as an even-numbered contour position encountered in the main scan direction immediately after the odd-numbered contour position is excluded. It is set that a pixel position of an odd-numbered contour encountered in the scan operation in the main scan direction indicates a forward rotation position of the area, and an adjacent pixel position in the main scan direction of an even-numbered contour encountered in the scan operation indicates a reverse rotation position of the area. When viewed from the scan direction on each scan line, a portion from the odd-numbered contour position to a pixel position immediately before the even-numbered position is determined as a portion inside the area of a closed figure, and other portions are determined as portions outside the area of the closed figure.

BRIEF DESCRIPTION OF THE DRAWINGS

FIG. 6 is an explanatory view of transition of the active edge table (AET) according to the conventional method;

FIG. 10 is a diagram of an arrangement for another conventional method obtained by improving the second conventional method;

FIG. 13 is a view showing outline data in the form of a coordinate string of an outline figure;

FIG. 14 is a view showing contour data in the form of a coordinate string of the figure shown in FIG. 2B;

FIG. 17 is a view showing an initialized address pointer area;

FIG. 22 is an explanatory view of transition of an active edge table (AET);

FIG. 28 is a view showing bucket data generation rules for a clockwise outline in the embodiment shown in FIG. 25;

FIG. 29 is a view showing bucket data generation rules for a counterclockwise outline in the embodiment shown in FIG. 25;

FIG. 33 is a view showing coordinate expressions of outline vectors;

FIG. 38 is a timing chart showing the relationship between a page sync signal and a scan sync signal;

FIG. 39 is a timing chart showing the scan sync signal, a pixel sync signal, and a pixel data signal;

FIG. 45 shows a list of rules used in the embodiment shown in FIG. 31;

FIG. 46 shows a list of rules used in still another embodiment of the present invention;

FIG. 52 shows a list of rules used in still another embodiment of the present invention;

FIG. 53 shows a list of rules used in still another embodiment of the present invention;

FIGS. 54, 54A and 54B are flow charts showing paint out contour sketch processing;

FIG. 59 is a timing chart of a page sync signal and a scan sync signal in the embodiment;

FIG. 60 is a timing chart of a scan sync signal and a pixel sync signal in the embodiment;

FIG. 68 is an explanatory view of transition of the active edge table (AET) according to the conventional method;

FIG. 75 is a view showing contour data in the form of a coordinate string of an outline figure;

FIG. 76 is a view showing contour data in the form of a coordinate string of the figure shown in FIG. 64B;

FIG. 79 is a view showing an initialized address pointer area;

FIG. 84 is an explanatory view of transition of an active edge table (AET);

FIG. 92 is a view showing bucket data generation rules for a clockwise outline in the embodiment shown in FIG. 87; and FIG. 93 is a view showing bucket data generation rules for a counterclockwise outline in the embodiment shown in FIG. 87.

FIG. 95 is a table showing the generating regulations for the bucket data according to a first embodiment of the present invention.

FIG. 97 is a view for the explanation of the transition of the active edge table (AET) according to the first embodiment.

FIG. 100 is a view showing the generating regulations for the bucket data for the counterclockwise outline according to a second embodiment of the present invention.

FIG. 101 is a view showing the generating regulations for the bucket data for the clockwise outline when the target edge is divided into the terminating point and others according to a third embodiment of the present invention.

FIG. 102 is a view showing the generating regulations for the bucket data for the counterclockwise outline when the target edge is divided into the terminating point and others according to a fourth embodiment of the present invention.

FIG. 104 is a view showing the generating regulations for the bucket data according to a eighth embodiment of the present invention.

FIG. 106 is a view for the explanation of the active edge table (AET) produced from the edge table shown in FIG. 105.

FIG. 110 is a view showing the generating regulations for the bucket data for the counterclockwise outline according to a variation of the eighth embodiment.

FIG. 111 is a view showing the generating regulations for the bucket data according to a ninth embodiment of the present invention.

FIG. 113 is view showing the data structure of the active edge table (AET) produced from the edge table shown in FIG. 112.

FIG. 117 is a view showing the generating regulations for the bucket data for the counterclockwise outline of a variation of the ninth embodiment.

FIG. 118 is a view showing the generating regulations for the bucket data for the clockwise outline when the target edge is divided into the terminating point and others according to a variation of the ninth embodiment.

FIG. 119 is a view showing the generating regulations for the bucket data for the counterclockwise outline when the target edge is divided into the terminating point and others according to a variation of the ninth embodiment.

DETAILED DESCRIPTION OF THE PREFERRED EMBODIMENTS

<Description of First Embodiment>

The first embodiment of the present invention will be described below with reference to the accompanying drawings.

<Brief Description of Operation>

The operation of this embodiment will be briefly described below.

Figure 11:
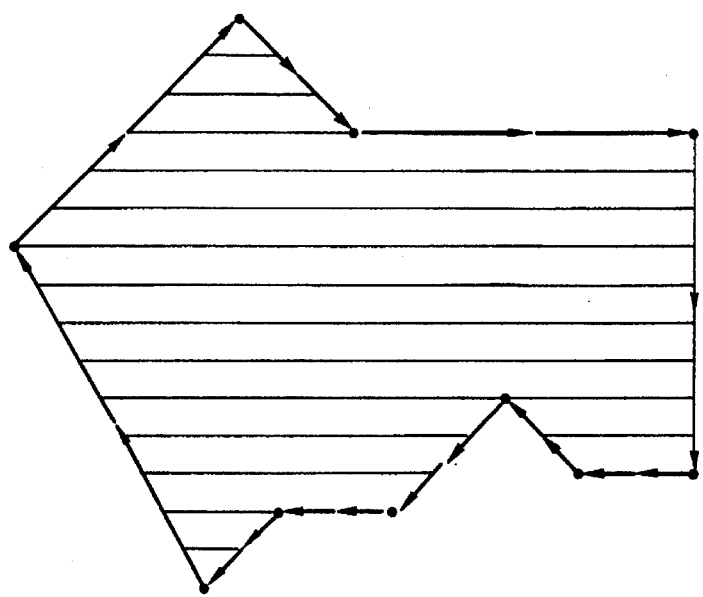
FIG. 11 is a view for explaining an inner area of a clockwise outline closed figure.
Figure 12:
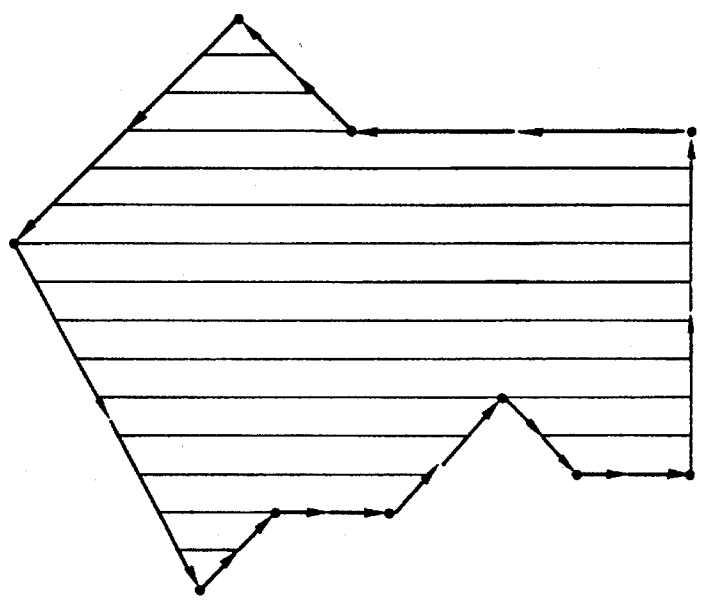
FIG. 12 is a view for explaining an inner area of a counterclockwise outline closed figure.

In this embodiment, a contour directed in a predetermined direction is used as a contour of a figure. More specifically, a contour of a figure to be processed is expressed as a group of outline vectors (line elements) contiguous in a clockwise direction of a timepiece, or a group of outline vectors contiguous in a counterclockwise direction. It can be considered that the outline vectors contiguous in the clockwise direction mean that a corresponding figure is painted out when portions on the right side of the outline vectors are painted out (FIG. 11). The outline vectors contiguous in the counterclockwise direction mean that a corresponding figure is painted out when portions on the left side of the outline vectors are painted out (FIG. 12).

In this embodiment, the direction and inclination of each outline vector are checked, and whether or not the two edge points of the vector, and points on the vector other than the two edge points are used in discrimination of a boundary point is discriminated on the basis of the direction and inclination of an outline vector immediately before the outline vector, and the direction and inclination of an outline vector immediately after the outline vector. Thereafter, whether a point is plotted at a corresponding pixel position on a memory or is plotted at a position adjacent by one pixel in the main scan direction is controlled depending on an odd- or even-numbered boundary discrimination edge intersecting a scan line in each scan operation. Thereafter, data for one scan-line is horizontally scanned to paint pixels from a pixel at an odd-numbered plot to a pixel immediately before an even-numbered plot.

<Description of Arrangement of Apparatus>

An image processing apparatus of this embodiment will be described in detail below.

Figure 1:
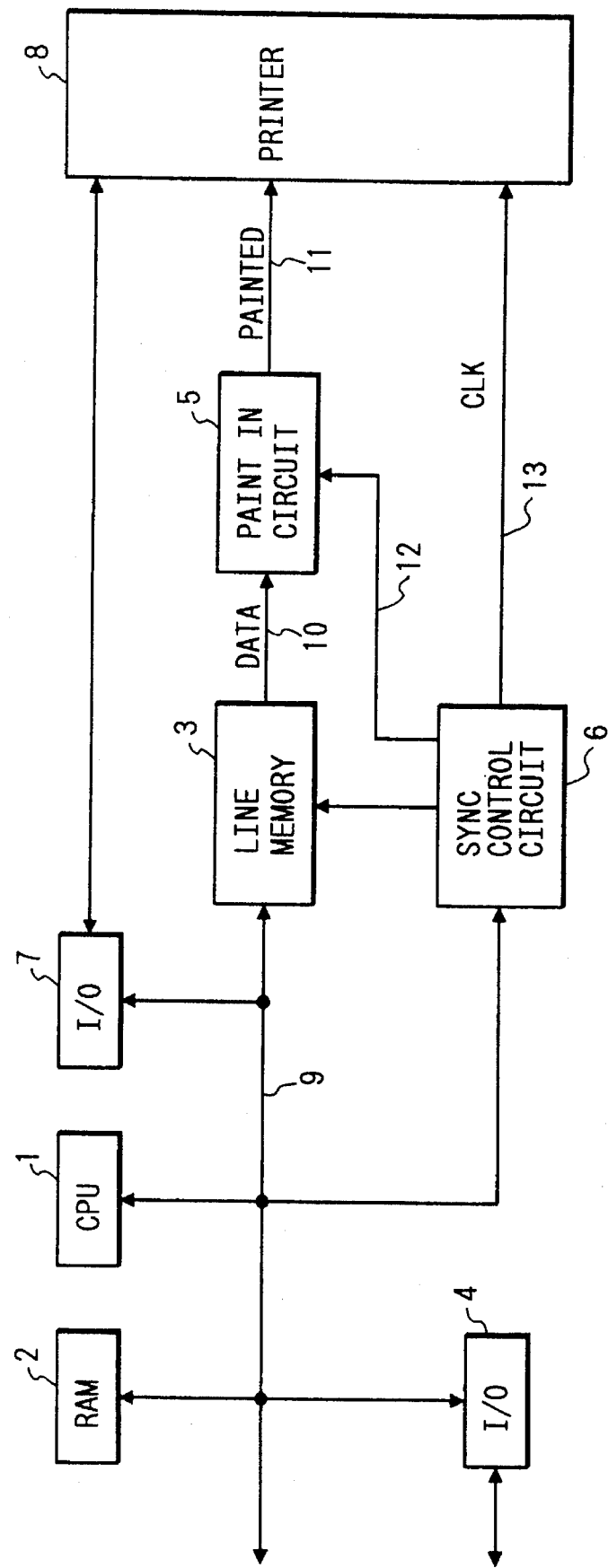
FIG. 1 is a block diagram showing an arrangement of an apparatus applied to a raster-scan type video printer according to an embodiment of the present invention.

FIG. 1 is a block diagram of an image processing apparatus applied to a raster-scan type video printer of this embodiment. In FIG. 1, a microprocessor (CPU) 1 is connected to a RAM (random-access memory) 2, a line memory 3, a sync control circuit 6, and I/O ports 4 and 7 through a bus 9. Note that the control processing sequence of the CPU 1 is stored in its internal ROM (not shown) as a program. A paint out circuit 5 receives contour image data 10 output from the line memory 3 by a raster-scan operation according to a sync signal 12 from the sync control circuit 6, and outputs painted out image data 11. A printer 8 is interface-connected to the CPU 1 through the I/O port 7. The printer 8 is connected to a video interface for receiving a sync signal 13 from the sync control circuit 6, and the painted out image data 11.

Contour data is constituted by data indicating the number of closed loops included in an objective image, and a group of data each indicating the number of tops constituting each closed loop. The tops on each closed loop are expressed as a group of data which maintain the relationship of adjacent tops according to an order having a predetermined direction on the closed loop. This content is shown in FIG. 13.

Figure 2A:
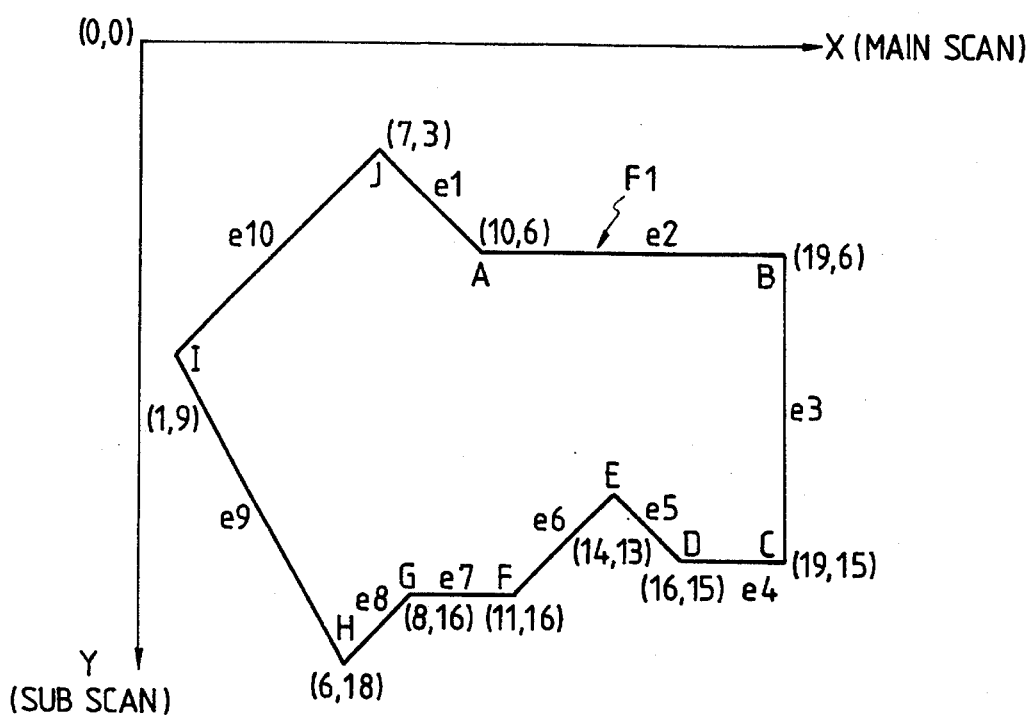
FIG. 2A is a view showing an example of outline figure data.
Figure 2B:
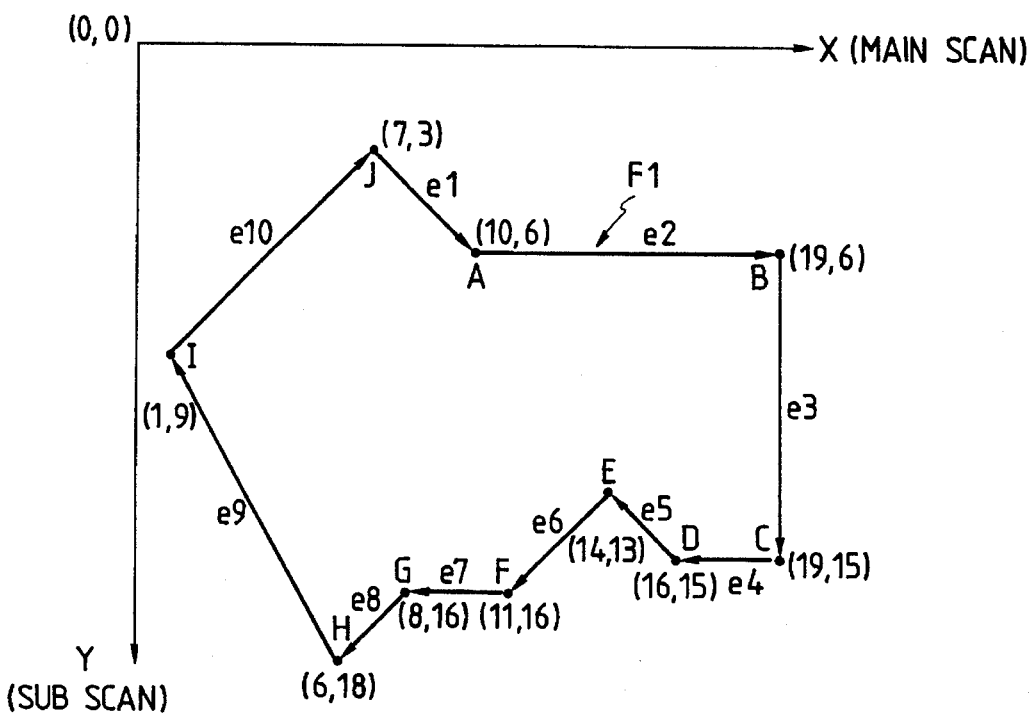
FIG. 2B is a view showing an example of clockwise outline figure data used in the embodiment.

As described above, in this embodiment, contour data is considered as a group of data aligned in a predetermined direction. For example, FIG. 2B shows an example of clockwise outline data, and its contour data is as shown in FIG. 14. In FIG. 14, the outline of a figure F1 shown in FIG. 2B is expressed as a series of points which make a round in the order of A→B→C→D →E→F→G→H→I→J→A to have the point A as the start point.

In the following description of this embodiment, assume that the origin of coordinates is present at the upper left corner of an image, the main scan direction (right direction) is defined as the x-axis, and the sub scan direction (vertical direction) is defined as the y-axis. In addition, an outline is assumed to have a clockwise data expression. Note that the start point in each closed loop can be an arbitrary point on the loop.

<Description of Main Processing>

Figure 15:
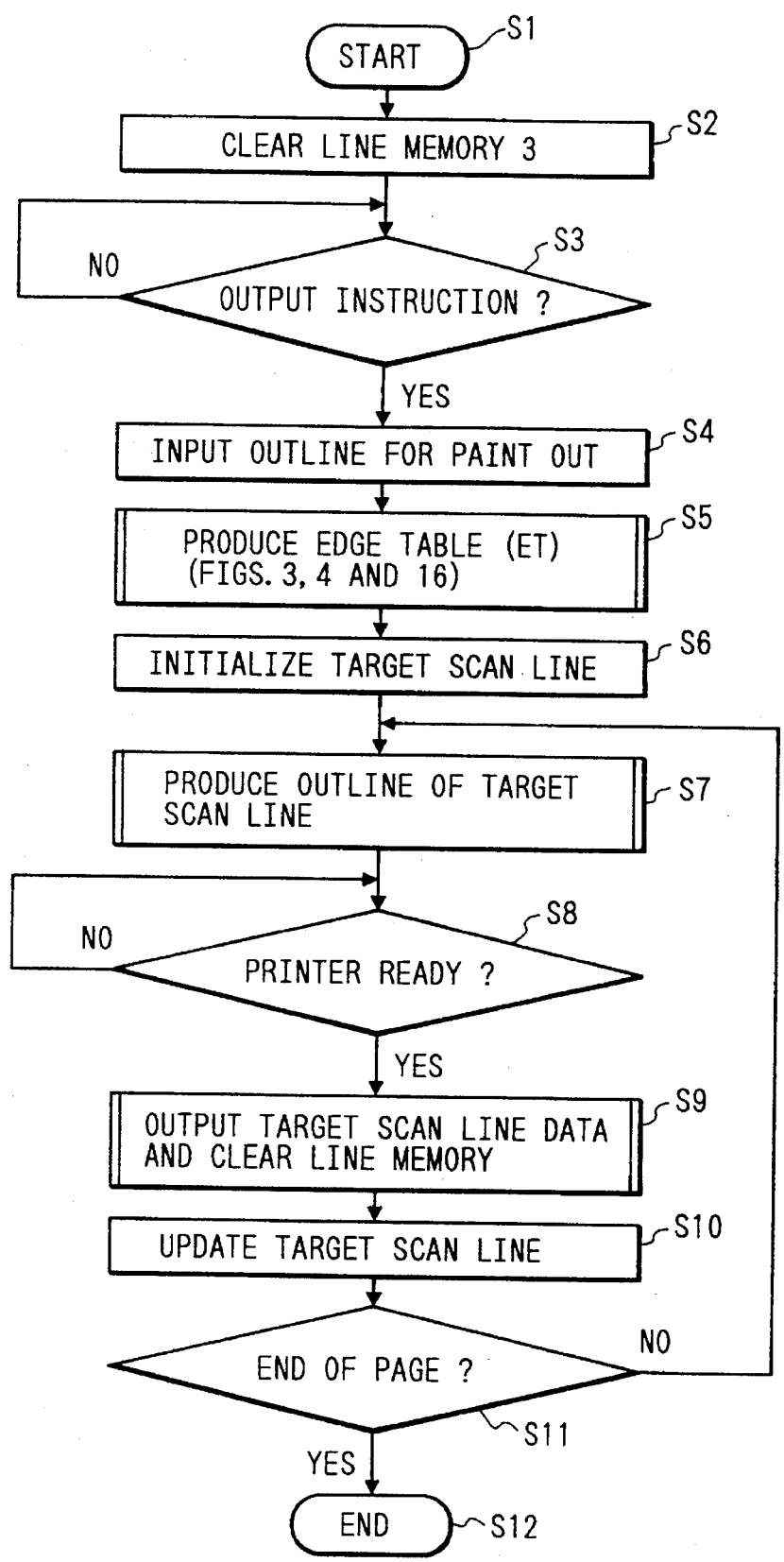
FIG. 15 is a flow chart showing an operation of an apparatus of the embodiment.

FIG. 15 shows the operation processing sequence of the CPU 1 of this embodiment, and the operation processing sequence will be described below.

Figures 3, 5:
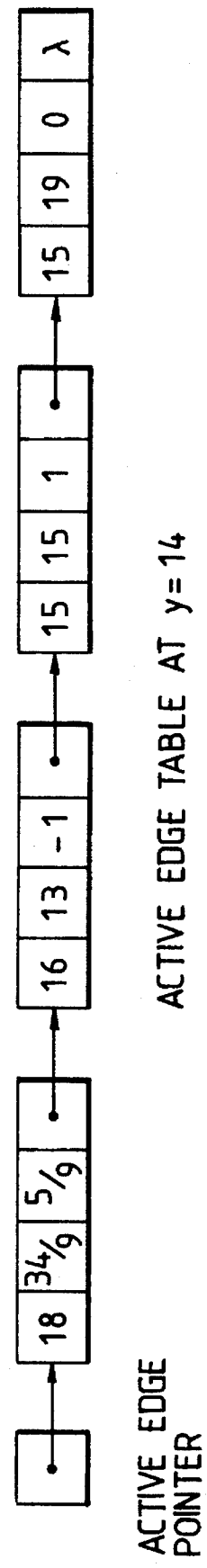
FIG. 3 is a view showing edge bucket data.
FIG. 5 is an explanatory view of an active edge table (AET)
Figure 4:
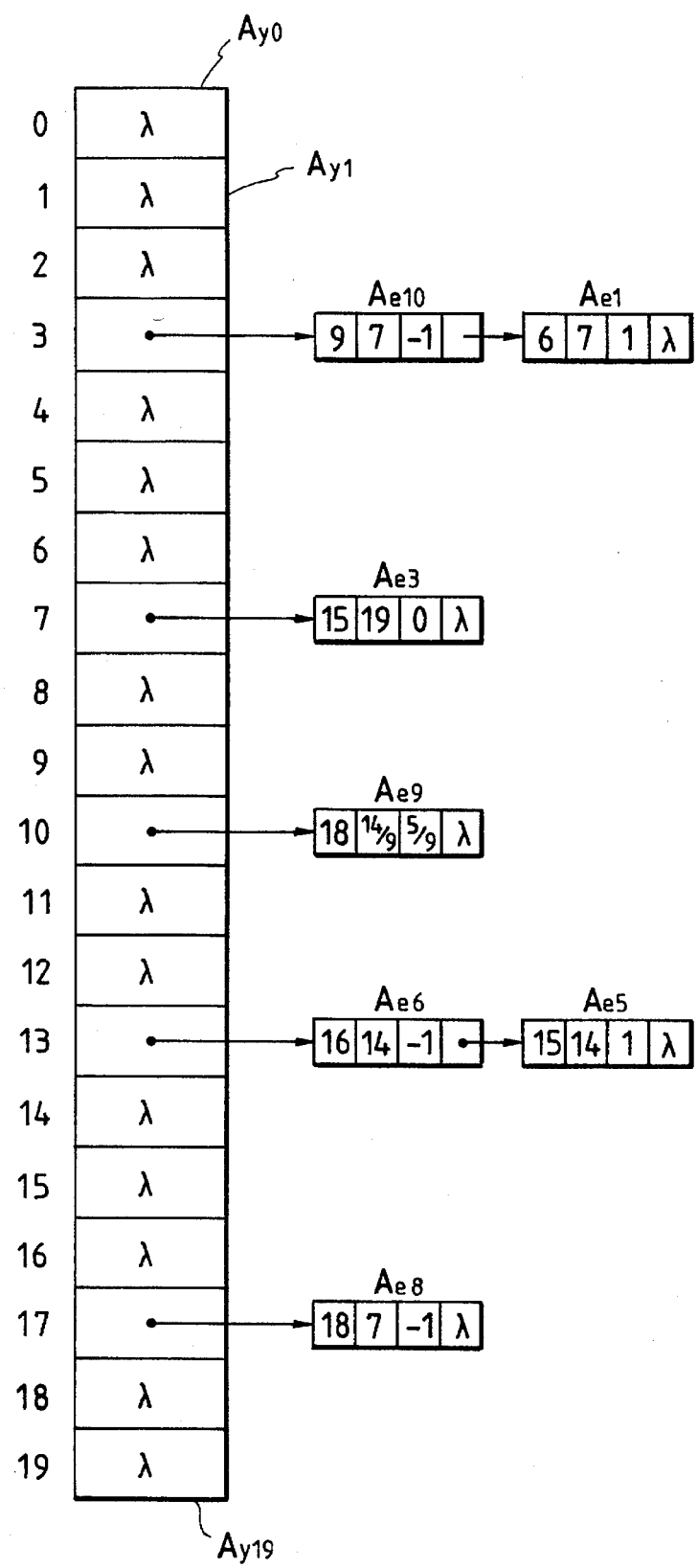
FIG. 4 is an explanatory view of an edge table (ET) of the figure shown in FIG. 2A according to a conventional method.
Figure 7:
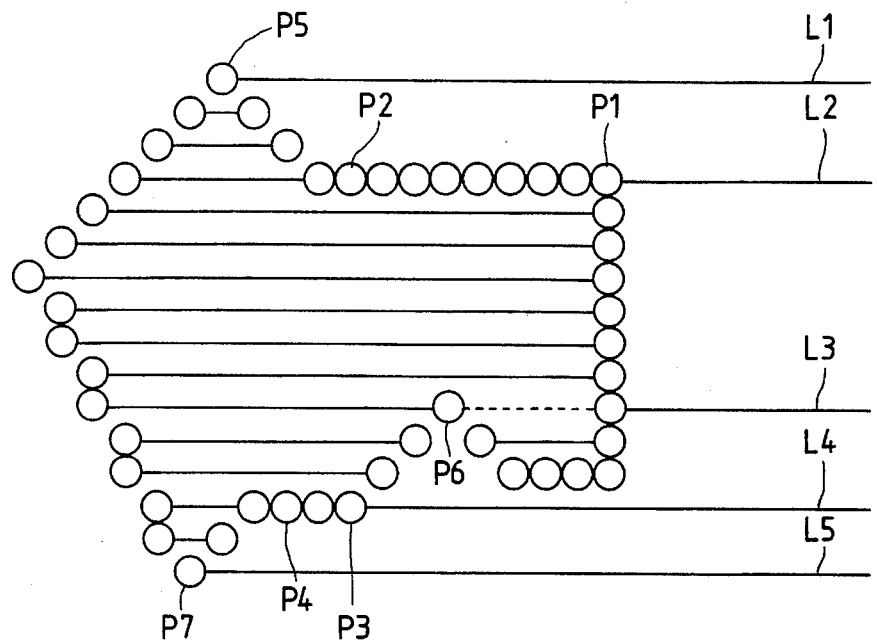
FIG. 7 is a view for explaining a problem inherent in the odd-even inversion method.
Figure 8:
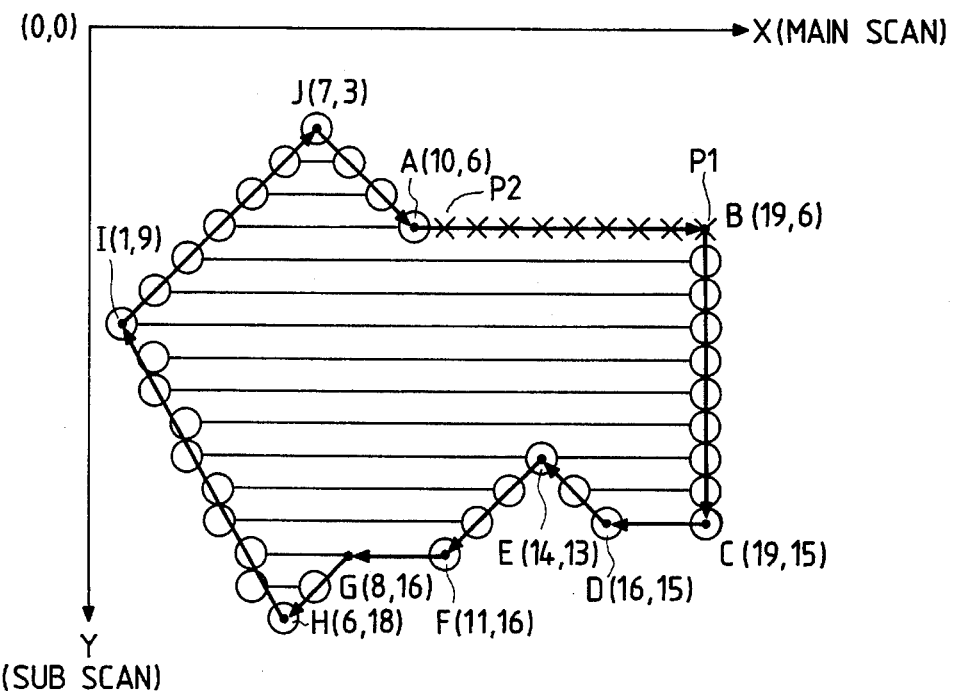
FIG. 8 is an explanatory view of a processing result of the figure shown in FIG. 2A according to the conventional method.
Figure 9A:
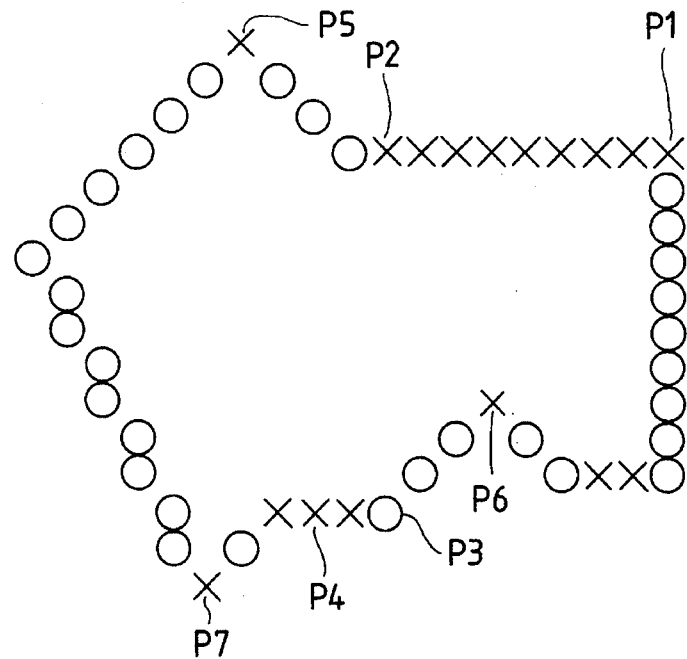
FIGS. 9A and 9B are explanatory views of a processing result of the figure shown in FIG. 2A according to the second conventional method.
Figure 9B:
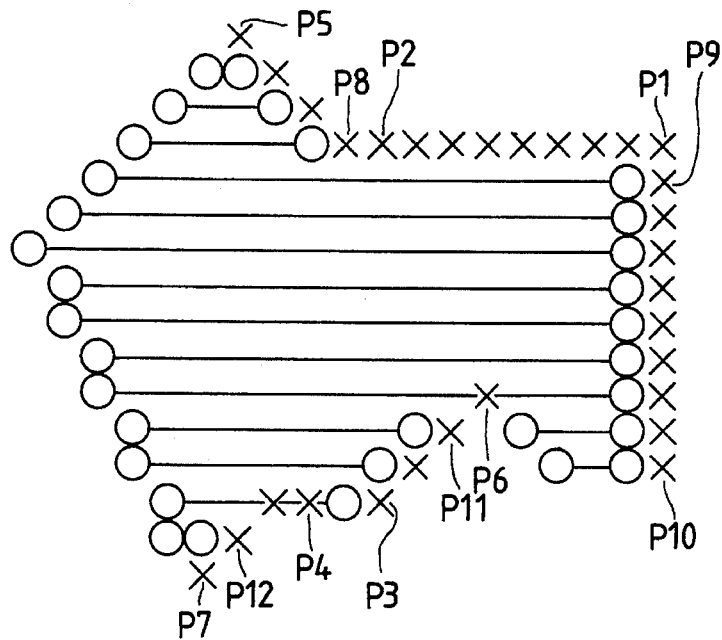

When the CPU 1 starts its processing in step S1, the flow advances to step S2. In step S2, the line memory 3 is reset. At this time, the CPU 1 (FIG. 1) sets an additional circuit (not shown) to write a predetermined value "0" in the line memory 3 as input data, and at the same time, controls the sync control circuit 6 to write the predetermined value in the line memory 3 for one frame, thereby resetting the line memory 3. Upon reception of an instruction from the CPU 1, the sync control circuit 6 sequentially generates addresses over the entire area in the line memory so as to write the predetermined value set by the CPU 1 in the line memory 3, and generates sync signals required for this write access so as to write the predetermined value in a series of predetermined address areas in the line memory 3, thereby resetting the line memory. Thereafter, the sync control circuit 6 informs a signal indicating the end of the reset operation to the CPU 1 through a control register (not shown). Upon detection of this signal, the CPU 1 can detect that the line memory is reset. After the CPU 1 clears the line memory in step S2, the flow then advances to step S3. In step S3, the CPU 1 checks if an image is input from an external circuit via the I/O port 4, and waits for until an output instruction is issued. If the CPU 1 determines in step S3 that the image is input from the external circuit, the flow 10 advances to step S4. In step S4, the CPU 1 receives paint out contour data from the external circuit through the I/O port 4, and stores the data in the RAM 2. Note that the external circuit means not only an apparatus connected through an external interface but also an auxiliary storage device (not shown). The paint out contour data is a group of outline vector data expressed in a format shown in, e.g., FIG. 13, as described above. In step S5, data corresponding to edges are generated in the data format shown in FIG. 3 described above according to rules shown in FIG. 28, and an edge table (ET) in the format shown in FIG. 4 is generated. Thereafter, the flow advances to step S6. The details of the processing in step S5 will be described later.

In step S6, a target scan line position is set at the start scan line position in a page. More specifically, a scan line position of y=0 is set. In addition, an active edge pointer area shown in FIG. 5 is assured. The flow then advances to step S7. In step S7, an active edge table (AET) in the format shown in FIG. 5 described above is generated at the target scan position, and contour points are plotted on the line memory 3 on the basis of this table. The details of the processing in step S7 will be described later. Upon completion of the processing in step S7, the flow advances to step S8, and the control waits for until a 10 printer is set in a recording enable state (ready).

When the printer is ready, the flow advances to step S9. In step S9, an operation for painting out an area between contour points is performed on the basis of contour point data at the scan line position sketched in step S7, while the line memory is simultaneously cleared again. The processing content of step S9 will be described later. Upon completion of the processing in step S9, the flow advances to step S10. In step S10, the target scan line position is advanced by one line. More specifically, when the target scan line position is y=i so far, a new scan line position is determined as y=i+1. The flow then advances to step S11. In step S11, it is checked if processing is completed up to the final scan line position in the page. If YES in step S11, the flow advances to step S12, and a series of processing operations are ended. If NO in step S11, the flow returns to step S7 to continue processing for the next line. Whether or not the processing reaches the final scan line is discriminated as follows in a routine (not shown). That is, the number of scan lines included in a page to be sketched is held in advance, and is compared with the target scan line position.

<Description of Edge Table Generation Processing>

Figures 16, 16A:
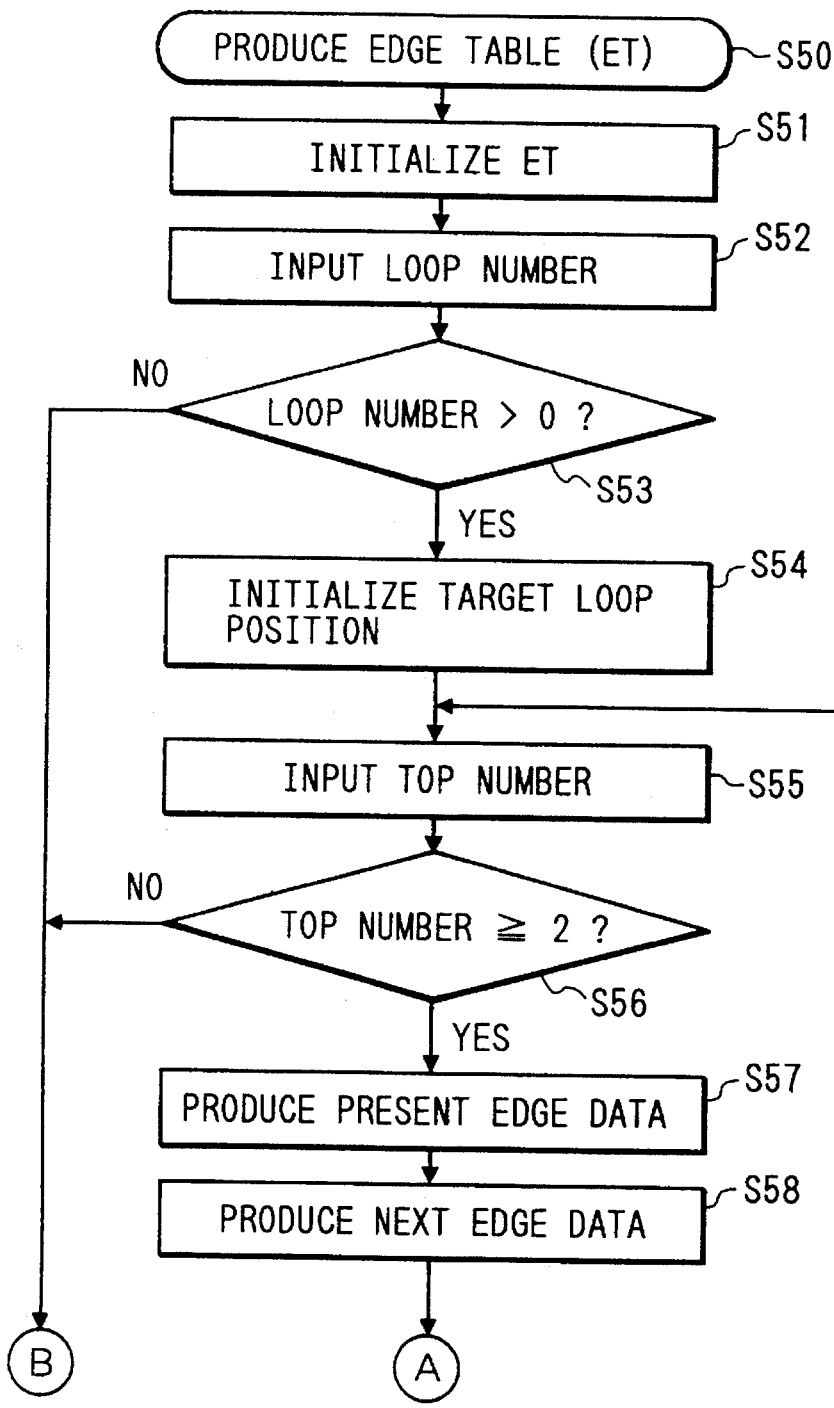
FIGS. 16, 16A and 16B are flow charts showing a generation sequence of an edge table (ET) in the embodiment.
Figure 16B:
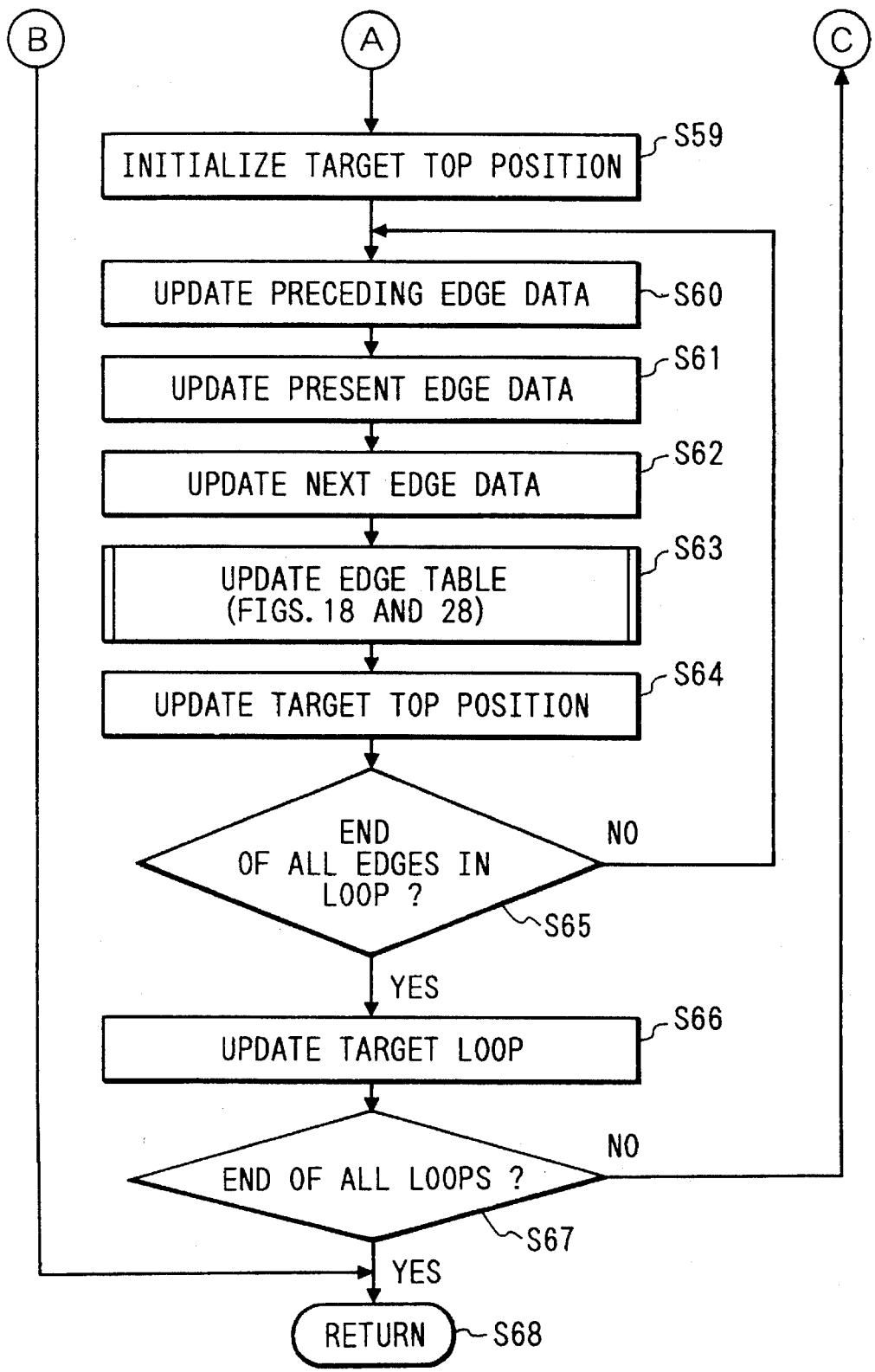

The details of the edge table generation processing in step S5 will be described below with reference to the flow chart shown in FIG. 16.

When the processing is started in step S50, the flow advances to step S51. In step S51, an edge table is initialized. More specifically, as shown in FIG. 17, address pointer (to be also referred to as "pointer bucket" hereinafter) areas Ay0 to AyN corresponding to the number of scan lines ((N+1) lines from 0 to N) included in a page to be generated are assured on the RAM 2, and a marker value "λ" indicating the absence of reference data is stored in each area. In step S52, the number N of closed loops of outline data given in the format shown in FIG. 13 is looked up, and the flow then advances to step S53. It is checked in step S53 if the number N of loops is a value larger than 0. If NO in step S53, i.e., if it is determined that the number N of loops is equal to or smaller than 0, the flow advances to step S68 to end the series of processing operations. The control then returns to the main routine. However, if YES in step S53, the flow advances to step S54.

In step S54, an intra-loop top number table pointer is initialized to a position where the number of tops in a 0th loop of each intra-loop top number table of outline data given in the format shown in FIG. 13 is stored, and the flow then advances to step S55. In step S55, intra-loop top number data at the position indicated by the intra-loop top number table pointer is looked up, and the flow advances to step S56. In step S56, it is checked if the number of tops is 2 or more. If NO in step S56, since this does not express a closed area, the flow advances to step S68. However, if YES in step S56, the flow advances to step S57.

In step S57, an edge having the final top of the corresponding loop as a start point, and the first top as an end point is considered as a present edge (target edge), and the direction and x increment of this edge are calculated. More specifically, assuming that the start point coordinates of the present edge are represented by (xstart, ystart), and the end point coordinates are represented by (xend, yend), when ystart=yend, it is determined that the direction of the edge is the horizontal direction, and the x increment is not calculated. At this time, when xstart >xend, the present edge is determined as a leftward edge; when xstart<xend, the present edge is determined as a rightward edge. At this time, xstart=xend means an edge of only one point, i.e., having a start point coinciding with an end point, and this edge is a portion of an edge before or after it, or an isolated point. Assume that such an edge is excluded from a top string of edges constituting a contour when data shown in FIG. 13 are formed.

When ystart>yend, the direction of the edge is determined as an upward direction, and the x increment is calculated by (xstart−xend)/(ystart−yend).

When ystart<yend, the direction of the edge is determined as a downward direction, and the x increment is calculated by (xend−xstart)/(yend−ystart).

Upon completion of the processing in step S57, the flow advances to step S58. In step S58, an edge having the first top (0th top) of the corresponding loop as the start point, and the next top (1st top) as the end point is determined as the next edge (an edge connected next to the target edge on the contour loop, i.e., an edge having the end point of the target edge as the start point), and the direction and x increment of this edge are calculated in the same manner as in step S57. Upon completion of the processing in step S58, the flow advances to step S59. In step S59, the target top coordinate table pointer is set to be an address value where 0th top coordinate data of the corresponding loop in FIG. 13 is stored, and the flow advances to step S60. In step S60, the present edge data (the direction and x increment of the present edge) immediately before this time is determined as a preceding edge (an edge connected immediately before the target edge on the contour loop, i.e., an edge having the start point of the target edge as the end point). The flow then advances to step S61. In step S61, the next edge data (the direction and x increment of the next edge) immediately before this time is determined as present edge data. The flow then advances to step S62. In step S62, the next edge data (the direction and x increment of the next edge) is calculated in the same manner as in step S57. At this time, the start point of the next edge is the end point of the present edge, and the end point of the next edge is the next top on the loop with respect to the end point of the present edge, as a matter of course. These points can be obtained by looking up data of the top position next to the target top position and the top position next to the next top position. When the target top position at this time is present at the final top of the corresponding loop, the next edge has the 0th top of the corresponding loop as the start point, and has the 1st top as the end point. When the target top position is present at a top immediately before the final top of the corresponding loop, control is made so that the next edge has the final top as the start point, and the 0th top as the end point.

Upon completion of the processing in step S62, the flow advances to step S63. In step S63, bucket data in the format shown in FIG. 3 described above are generated for the present edge data on the basis of the preceding edge data, the present edge data, and the next edge data at this time. The generated bucket data are added in the edge table to update the edge table. The content of this processing will be described in detail later. Upon completion of the processing in step S63, the flow advances to step S64. In step S64, the value of the target top coordinate table pointer is updated to the position of the coordinate table of the next top on the loop. In step S65, it is checked if processing for all the edges in the corresponding loop is completed. If YES in step S65, the flow advances to step S66; otherwise, the flow returns to step S60 to continue the series of processing operations for the next edge. Whether or not processing for all the edges is completed can be determined as follows. That is, the number of times of execution of step S65 is counted, and it is checked if the number of times exceeds the number of tops included in the corresponding loop.

In step S66, the intra-loop top number table pointer is updated to a position where the next loop data is held, and the flow then advances to step S67. In step S67, it is checked if the series of processing operations are completed for all the loops included in this contour data. If YES in step S67, the flow advances to step S68; otherwise, the flow returns to step S55 to continue the series of processing operations for the next loop.

Whether or not processing for all the loops is completed can be determined as follows. That is, the number of times of execution of step S67 is counted, and it is checked if the number of times exceeds the number of loops included in the contour data. In step S68, the edge table (ET) generation processing is ended, and the control returns to the main routine.

<Description of Edge Table Updating Processing>

The processing content in step S63 of FIG. 16 will be described below with reference to FIG. 28 and FIGS. 18A and 18B. In step S63, the processing progresses using the directions and x increments of the present edge, the preceding edge, and the next edge. FIG. 28 shows generation rules upon generation of bucket data in the format shown in FIG. 3 for the present edge.

When the present edge is a horizontal edge, i.e., a leftward or rightward edge, no bucket data is generated for this edge, and the edge table is not updated. Therefore, FIG. 28 has no description about this edge. When the present edge is an upward or downward edge, cases of start 1 to start 10 and end 1 to end 10 are considered depending on the content of the preceding edge data. In FIG. 28, in the column of "state of start point", the present edge is indicated by a solid arrow, the preceding edge is indicated by a broken arrow, the direction of an arrow indicates the direction of the corresponding edge, and hatching indicates that the hatched side of an edge is an area to be painted out. In the column of "state of end point", the present edge is indicated by a solid arrow, the preceding edge is indicated by a broken arrow, the direction of an arrow indicates the direction of the corresponding edge, and hatching indicates that the hatched side of an edge is an area to be painted out.

Paying attention to processing of the start point of the present edge, cases (start 1 to start 5) wherein the present edge is an upward edge will be described below. When the preceding edge is also an upward edge (case No. start 1), bucket data is generated so that the start point of the present edge is located at a point moved from the actual position toward the end point along the edge by one scan line (in FIG. 28, this is expressed as "close by one scan line"). When the preceding edge is a downward edge, if the end point of the preceding edge, i.e., the start point of the present edge corresponds to a recessed top of a closed figure (case No. start 2), bucket data is also generated so that the start point is located at a point moved from the actual position toward the end point along the edge by one scan line. When the end point of the preceding edge corresponds to a projected top of a closed figure (case No. start 3), bucket data is generated so that the start point is the point itself at the actual position. Note that the case No. start 2 or start 3 can be determined by comparing the x increments of the present and preceding edges. Assume that the x increment of the preceding edge is represented by $\Delta$xpre, and that of the present edge is represented by $\Delta$xnow. When $\Delta$xpre>$\Delta$xnow, the case No. start 2 is determined; when $\Delta$xpre<$\Delta$xnow, the case No. start 3 is determined. However, when $\Delta$xpre= $\Delta$xnow, the case No. start 3 is determined in this embodiment. When the preceding edge is a leftward edge (case No. start 4), bucket data is generated so that the start point of the present edge is the point itself of the actual position. When the preceding edge is a rightward edge (case No. start 5), bucket data is generated so that the start point of the present edge is located at a point moved from the actual position toward the end point along the edge by one scan line.

Cases (start 6 to start 10) wherein the present edge is a downward edge will be described below. When the preceding edge is an upward edge, if the end point of the preceding edge, i.e., the start point of the present edge corresponds to a projected top of a closed figure (case No. start 6), bucket data is generated so that the start point is the point itself of the actual position. When the start point of the present edge corresponds to a recessed top of a closed figure (case No. start 7), bucket data is generated so that the start point is located at a point moved from the actual position toward the end point along the edge by one scan line. When the preceding edge is a downward edge (case No. start 8) and is a rightward edge (case No. start 10), bucket data is generated so that the start point is the point itself of the actual position, When the preceding edge is a leftward edge (case No. start 9), bucket data is generated so that the start point is located at a point moved from the actual position toward the end point along the edge by one scan line. Note that the case No. start 6 or start 7 can be determined by comparing the x increments $\Delta$xnow and $\Delta$xpre of the present and preceding edges. When $\Delta$xpre<$\Delta$xnow, the case No. start 6 is determined; when $\Delta$xpre>$\Delta$xnow, the case No. start 7 is determined. However, when $\Delta$xpre=$\Delta$xnow, the case No. start 6 is determined in this embodiment.

Cases paying attention to processing of the end point of the present edge will be explained below.

Cases (end 1 to end 5) wherein the present edge is an upward edge will be described below. When the next edge is also an upward edge (case No. end 1), bucket data is generated so that the end point of the present edge is the point itself of the actual position. When the next edge is a downward edge, if the start point of the next edge, i.e., the end point of the present edge corresponds to a recessed top of a closed figure (case No. end 3), bucket data is generated so that the end point of the present edge is located at a point returned from the actual position toward the start point along the edge by one scan line (in FIG. 28, this is expressed as "close by one scan line"). When the end point of the present edge corresponds to a projected top of a closed figure (case No. end 2), bucket data is generated so that the end point of the present edge is the point itself of the actual position. When the next edge is a leftward edge, bucket data is generated so that the end point of the present edge is located at a point returned from the actual position toward the start point along the edge by one scan line. When the next edge is a rightward edge, bucket data is generated so that the end point of the present edge is the point itself of the actual position. Note that the case No. end 2 or end 3 can be determined by comparing the x increments $\Delta$xnow and $\Delta$xpost of the present and preceding edges. When $\Delta$xnow<$\Delta$xpost, the case No. end 2 is determined; when $\Delta$xnow<$\Delta$xpost, the case No. end 3 is determined. However, when $\Delta$xnow=$\Delta$xpost, the case No. end 2 is determined in this embodiment.

Cases (end 6 to end 10) wherein the present edge is a downward edge will be described below. When the next edge is an upward edge, if the start point of the next edge, i.e., the end point of the present edge corresponds to a projected top of a closed figure (case No. end 6), bucket data is generated so that the end point of the present edge is the point itself of the actual position. When the end point of the present edge corresponds to a recessed top of a closed figure (case No. end 7), bucket data is generated so that the end point of the present edge is located at a point returned from the actual position toward the start point along the edge by one scan line. When the next edge is a downward edge (case No. end 8), bucket data is generated so that the end point of the present edge is located at a point returned from the actual position toward the start point along the edge by one scan line. When the next edge is a leftward edge (case No. end 9), bucket data is generated so that the end point of the present edge is the point itself of the actual position. When the next edge is a rightward edge (case No. end 10), bucket data is generated so that the end point of the present edge is located at a point returned from the actual position toward the start point along the edge by one scan line. Note that the case No. end 6 or end 7 can be determined by comparing the x increments $\Delta$xnow and $\Delta$xpost of the present and preceding edges. When $\Delta$xnow<$\Delta$xpost, the case No. end 6 is determined; when $\Delta$xnow>$\Delta$xpost, the case No. end 7 is determined. However, when $\Delta$xnow=$\Delta$xpost, the case No. end 6 is determined in this embodiment.

The bucket data in the format shown in FIG. 3 is generated for the present data according to the above-mentioned generation rules.

The above-mentioned processing is performed in step S63. After all, the CPU 1 executes processing according to the flow charts shown in FIGS. 18A and 18B.

When the series of processing operations are started in step S630, the flow advances to step S631. At this time, input data include the preceding edge data (the direction and x increment $\Delta$xpre of the preceding edge) updated in step S60, the present edge data (the coordinate values (xstart, ystart) and (xend, yend) of the start and end points, direction, and x increment $\Delta$xnow of the present edge) updated in step S61, and the next edge data (the direction and x increment $\Delta$xpost of the next edge) generated in step S62. In step S631, it is checked if the present edge is a horizontal edge (i.e., one of rightward and leftward edges). If YES in step S631, the flow advances to step S644 to end the series of processing operations, and the control returns to step (S64) next to the step that called this processing.

If NO in step S631, the flow advances to step S632 to check if the present edge is an upward edge. If YES in step S632, the flow advances to step S633, and bucket data for the upward edge is generated. However, if NO in step S632 (i.e., if the present edge is a downward edge), the flow advances to step S645, and bucket data for the downward edge is generated.

If it is determined that the present edge is an upward edge, and the flow advances to step S633, an edge bucket in the format of FIG. 3 is temporarily generated without modifications. More specifically, the edge bucket is formed to have ymax=ystart, xmin=xend, and $\Delta$x=$\Delta$xnow, and a pointer stores X (a marker indicating no connection destination) in this case. In step S643, a value ymin indicating to which pointer bucket this edge bucket is to be connected upon registration of this edge bucket in the ET is also set. In this case, ymin=yend is set. Note that ymax is a y value of an edge point having a larger y coordinate value of the two edge points (start and end points) of the present edge, and xmin and ymin are x and y values of an edge point having a smaller y coordinate value. In addition, the x increment Δx means a change in x coordinate per scan line when a point on the present edge is moved from a point having a smaller y coordinate value toward a point having a larger y coordinate value along the present edge. In this embodiment, since the positive direction of the x coordinate is assumed to be the rightward direction, and the positive direction of the y coordinate is assumed to be the downward direction, ymax, xmin, Δx, and ymin are set, as described above. Upon completion of the processing in step S633, the flow advances to step S643. In step S634, it is checked if the preceding edge is a downward edge. If YES in step S634, the flow advances to step S635; otherwise, the flow advances to step S636. In step S635, whether the start point of the present edge corresponds to the case No. start 2 or start 3 is discriminated by the above-mentioned method. If it is determined that the start point of the present edge corresponds to the case No. start 2, the flow advances to step S637; otherwise, the flow advances to step S638. In step S636, whether or not the start point of the present edge corresponds to the case No. start 4 (i.e., whether the start point corresponds to the case No. start 1 or start 5) is discriminated. If it is determined that the start point of the present edge corresponds to the case No. start 4, the flow advances to step S638; otherwise, the flow advances to step S637. In step S637, ymax is decreased by "1", i.e., the position of the start point of the upward edge is closed by one scan line. Upon completion of the processing in step S637, the flow advances to step S638. Thus, processing for the start point when the present edge is an upward edge is ended.

In step S638, it is checked if the next edge is a downward edge. If YES in step S638, the flow advances to step S639; otherwise, the flow advances to step S640. In step S639, whether or not the end point of the present edge corresponds to the case No. end 2 or end 3 is discriminated by the above-mentioned method. If it is determined that the end point of the present edge corresponds to the case No. end 2, the flow advances to step S643; otherwise, the flow advances to step S641. In step S640, whether or not the end point of the present edge corresponds to the case No. end 4 (i.e., whether the end point of the present edge corresponds to the case No. end 1 or end 5) is discriminated. If it is determined that the end point of the present edge corresponds to the case No. end 4, the flow advances to step S641; otherwise, the flow advances to step S643. In step S641, xmin is increased by Δx. More specifically, the x coordinate value is corrected so that the position of the end point of the upward edge is closed by one scan line. Upon completion of the processing in step S641, the flow advances to step S642. In step S642, ymin is increased by "1". More specifically, the y value is corrected so that the position of the end point of the upward edge is closed by one scan line. Upon completion of the processing in step S642, the flow advances to step S643.

On the other hand, a case will be explained below wherein it is determined in step S632 that the present edge is not an upward edge, i.e., is a downward edge.

In this case, the flow advances to step S645, and an edge bucket in the format shown in FIG. 3 is temporarily generated without modifications. More specifically, the edge bucket is generated to have ymax =yend, xmin=xstart, and Δ=Δxnow, and a pointer stores λ (a marker indicating no connection destination) in this case. In addition, ymin=ystart is set. In step S646, it is checked if the preceding edge is an upward edge. If YES in step S646, the flow advances to step S647; otherwise, the flow advances to step S648.

In step S647, whether the start point of the present edge corresponds to the case No. start 6 or start 7 is discriminated by the above-mentioned method. If it is determined that the start point of the present edge corresponds to the case No. start 6, the flow advances to step S651; if it is determined that the start point of the present edge corresponds to the case No. start 7, the flow advances to step S649. In step S648, whether or not the start point of the present edge corresponds to the case No. start 9 (i.e., whether the start point of the present edge corresponds to the case No. start 8 or start 10) is discriminated. If it is determined that the start point of the present edge corresponds to the case No. start 9, xmin is increased by Δx in step S649. More specifically, the x coordinate value is corrected so that the position of the start point of the downward edge is closed by one 10 scan line. Upon completion of the processing in step S649, the flow advances to step S650, and ymin is increased by "1". That is, the y value is corrected so that the position of the start point of the downward edge is closed by one scan line. Thus, processing for the start point of the present edge is ended.

Upon completion of the processing in step S650, the flow advances to step S651. In step S651, it is checked if the next edge is an upward edge. If YES in step S651, the flow advances to step S652; otherwise, the flow advances to step S653. In step S652, whether the end point of the present edge corresponds to the case No. end 6 or end 7 is discriminated by the above-mentioned method. If it is determined that the end point of the present edge corresponds to the case No. end 6, the flow advances to step S643; if it is determined that the end point of the present edge corresponds to the case No. end 7, the flow advances to step S654. In step S653, whether or not the end point of the present edge corresponds to the case No. end 9 (i.e., whether the end point of the present edge corresponds to the case No. end 8 or end 10) is discriminated. If it is determined that the end point of the present edge corresponds to the case No. end 9, the flow advances to step S643; otherwise, the flow advances to step S654. In step S654, ymax is decreased by "1". More specifically, the position of the end point of the downward edge is closed by one scan line. Upon completion of the processing in step S654, the flow advances to step S643.

As described above, an edge bucket for the present edge is generated according to the rules described in FIG. 28 depending on whether the present edge is an upward or downward edge.

In step S643, the generated edge bucket is additionally registered in the edge table (ET). More specifically, the edge bucket of the present edge is added to a list connection of edge buckets connected to the pointer bucket Ay ymin corresponding to y=ymin in the edge table. An area for holding the edge bucket of the present edge is assured on the RAM 2. Then, the value of the pointer bucket Ay ymin is checked. If the value is still "λ", it is rewritten to an address of the area for holding the edge bucket of the present edge, and the edge bucket of the present edge is list-connected to the pointer bucket. When the value of the pointer bucket Ay ymin already has a value other than "λ", since there are some list-connected edge buckets, the edge bucket of the present edge is inserted in the list-connected edge bucket string so that the values xmin of these edge buckets are sorted in the ascending order when viewed from the pointer bucket side. This insertion can be realized as follows. That is, the value of a point of a bucket at a position immediately before an insertion position is copied to the pointer portion of the edge bucket of the present edge to rewrite the pointer portion of the immediately preceding bucket with the address value of the edge bucket of the present edge. In this manner, when the processing in step S643 is completed, the flow advances to step S644. In step S644, the series of processing operations for updating the edge table are ended, and the control returns to a main routine that called this processing.

<Description of Target Scan Line Contour Generation Processing>

The "target scan line contour generation processing" in step S7 in FIG. 15 will be described below. Note that processing progresses according to the following sequence using an active edge table (AET) at that time.

Note that the active edge table (AET) is initialized in step S6, and is initially in an empty state (written with a marker λ). Even when the flow advances to step S8 by temporarily ending the processing, the state of the active edge table is held until step S7 is executed again.

(1) A new active edge table (AET) for connecting edge bucket data associated with a scan line y coordinate value is formed by combining information of the edge table (ET) and information of the active edge table (AET) at that time, while maintaining the sort order of x coordinate values (xmin) of the active edge table (AET).

(2) Bucket data connected to the active edge table (AET) are accessed from one having a smaller x coordinate value (xmin), and a value held at an address on the line memory 2 corresponding to an odd-numbered x coordinate value position is rewritten as a value obtained by EX-ORing a bit value (0 or 1) stored at that address with "1". A value held at an address on the line memory 3 corresponding to a right neighboring pixel of a pixel at an even-numbered x coordinate value position is rewritten as a value obtained by EX-ORing a bit value (0 or 1) stored at that address with "1".

(3) Edge bucket data having the scan line y coordinate value as a y value (ymax) of an edge point having a larger y coordinate value is deleted from the active edge table (AET) for an operation on the next scan line.

(4) The x coordinate values (xmin) of edge bucket data remaining in the active edge table (AET) are updated by utilizing increment data (Δx) for an operation on the next scan line. More specifically, a new xmin is obtained by xmin+Δx.

(5) After the x coordinate values (xmin) are updated, the edge bucket data are re-sorted on the basis of the updated x coordinate values (xmin).

In this manner, only a contour of a closed figure on a target scan line at that time is sketched, so that a point intersecting the scan line at an odd-numbered position is written at the corresponding memory address of the line memory, and as a point intersecting the scan line at an even-numbered position, its right neighboring point by one pixel is written at the corresponding memory address of the line memory. When the active edge table (AET) is empty at that time, nothing is sketched. In this manner, step S7 is ended. The line memory 3 has a capacity corresponding to pixels aligned in the scan direction (x direction) included in the scan line, and stores pixel data so that the addresses are continuously increased in the ascending order along the main scan direction.

<Description of Target Scan Line Data & Line Memory Clear Processing>

The processing content in step S9 in FIG. 15 will be described below.

Figure 19:
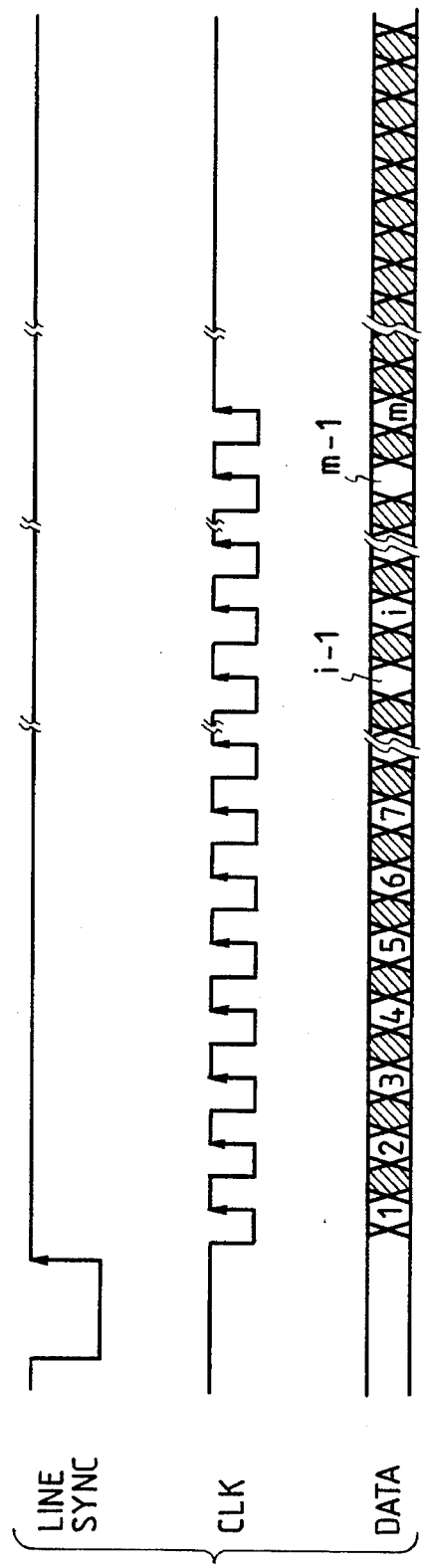
FIG. 19 is an explanatory view of a sync signal generated by a sync control circuit.

In step S9, an operation for painting an area between contour points is performed on the basis of contour point data at the scan line position sketched in step S7, while the line memory is simultaneously cleared again. When the flow advances to step S9, the CPU 1 sets the additional circuit (not shown), so that data to be input to the line memory 3 until the processing in step S9 is completed becomes a predetermined value "0", and at the same time, enables the sync control circuit 6 to output data of one scan line. The CPU 1 then waits for a signal indicating the end of the series of operations sent back from the sync control circuit 6. When the sync control circuit 6 is enabled by the CPU 1, it generates addresses from the start address of the line memory 3, and causes the line memory 3 to output data held at the corresponding address positions onto a signal line 10. At the same time, the sync control circuit 6 executes an operation for writing the predetermined value "0" set by the CPU 1 at each address. The sync control circuit 6 stops after this operation is performed by the predetermined number of pixels, and outputs a signal for informing the end of the series of processing operations for the scan line to the CPU 1. In synchronism with this series of operations, the sync control circuit 6 outputs a sync signal shown in FIG. 19 as a signal 12 to the paint in circuit 5, and a sync signal 13 to the printer 8. "Line Sync" in FIG. 19 represents a scan line sync signal, and the leading edge of this signal means the start of processing for one scan line. "CLK" is a pixel sync signal, and the leading edge of this signal indicates an effective data timing. The leading edge of the signal CLK immediately after the signal Line Sync indicates the effective data timing of the first pixel of the corresponding scan line, and thereafter, the leading edge after one clock indicates the data timing of a pixel adjacent to the first pixel in the main scan direction. FIG. 19 shows the sync signals when m pixels are present on the scan line.

Figure 20:
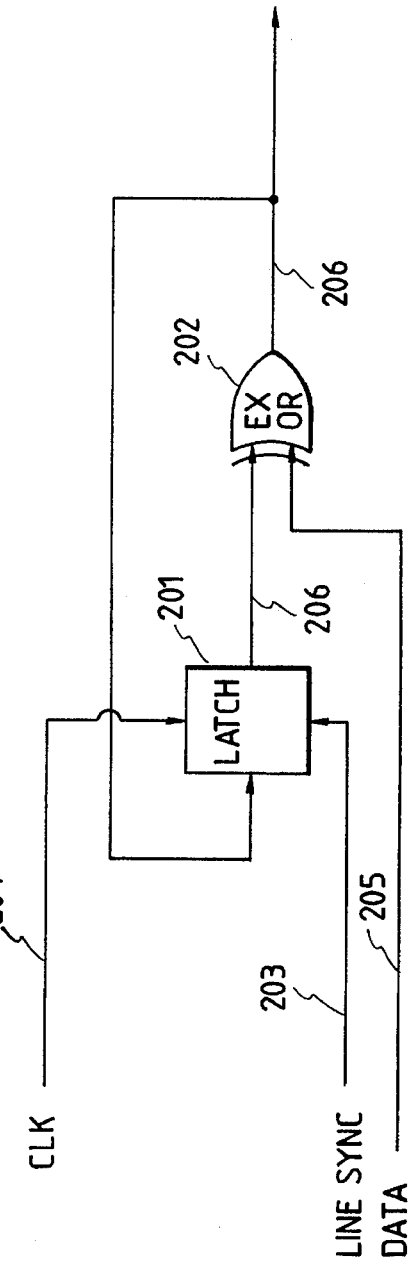
FIG. 20 is a diagram of a paint in circuit.

FIG. 20 shows an arrangement of the paint in circuit 5 of this embodiment. With the above-mentioned operations, the data 10 output from the line memory 3 is only contour data on one scan line. The circuit shown in FIG. 20 outputs pixel signals "1" from an odd-numbered contour pixel signal on the data 10 to a pixel signal immediately before an even-numbered contour pixel, and outputs pixel signals "0" for other pixel areas using the sync signal 12. At this time, the input data 10 is input as a Data signal 205, and includes "1"s corresponding to only contour positions, and "0"s for other positions. In response to the input Line Sync signal, a value held by a latch 201 is initialized to "0", and is reset to output "0" to an EX-OR gate 202. Then, the gate 202 outputs an EX-ORed result of data 205 input in synchronism with the CLK signal 204 and an output 206 from the latch 201 onto the signal line 206. Data on the signal line 206 is output data 11 to the printer 8. The data on the signal line 206 is latched by the latch 201 in synchronism with the CLK signal 204, and is held for generating the next data. This series of operations are repeated by the number of pixels.

Figure 21:
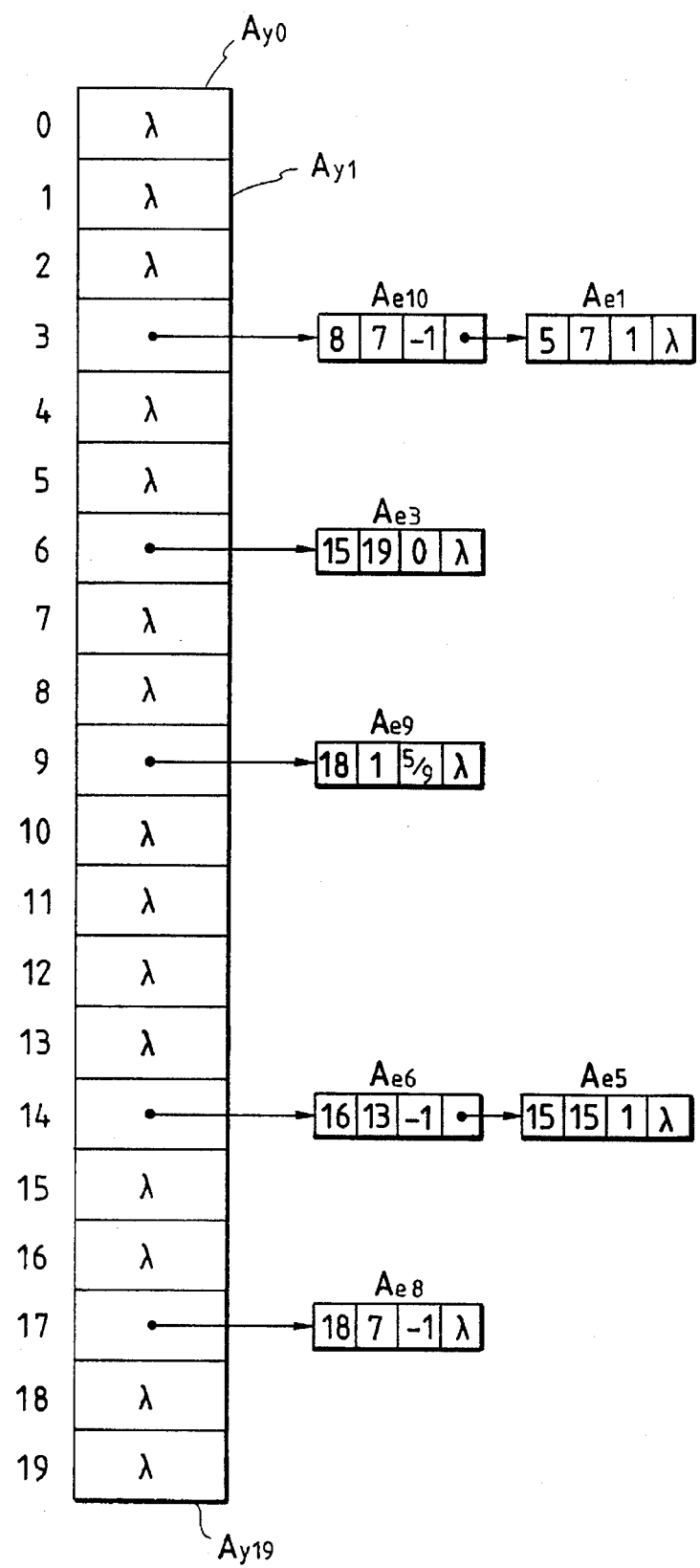
FIG. 21 is an explanatory view of an edge table (ET) based on the figure shown in FIG. 2B.

FIG. 21 shows the edge table obtained by this embodiment for FIG. 2B. As for a figure F1 in FIG. 2B, an edge e10 is an upward edge, its preceding edge e9 is an upward edge, and the next edge e1 is a downward edge. For this reason, the start point of the edge e10 corresponds to the case No. start 1 in FIG. 28, and its end point corresponds to the case No. end 2 in FIG. 28. Since the position of the start point of the edge e10 is closed by one scan line, the position of its start point is expressed not by (1, 9) but by (2, 8), and the position of its end point remains (7, 3). Therefore, a larger y coordinate value is 8, an x value of an edge point having a smaller y coordinate value is 7, and an x increment is −1. Thus, we have:

e10: ymax=8, xmin=7, Δx=−1, ymin=3

Similarly, the edge e1 is a downward edge, its start point corresponds to the case No. start 6, and its end point corresponds to the case No. end 10. The position (10, 6) of the end point is closed to (9, 5). Therefore, we have:

e1: ymax=5, xmin=7, Δx=1, ymin=3

Since an edge e2 is a horizontal edge, no edge bucket is generated.

An edge e3 is a downward edge, its start point corresponds to the case No. start 10, and its end point corresponds to the case No. end 9. Therefore, we have:

e3: ymax=15, xmin=19, Δx=0, ymin=6

Since an edge e4 is a horizontal edge, no edge bucket is generated.

An edge e5 is an upward edge, its start point corresponds to the case No. start 4, and its end point corresponds to the case No. end 3. Therefore, we have:

e5: ymax=15, xmin=15, Δx=1, ymin=14

An edge e6 is a downward edge, its start point corresponds to the case No. start 7, and its end point corresponds to the case No. end 9. Therefore, we have:

e6: ymax=16, xmin=13, Δx=−1, ymin=14

Since an edge e7 is a horizontal edge, no edge bucket is generated.

An edge e8 is a downward edge, its start point corresponds to the case No. start 9, and its end point corresponds to the case No. end 6. Therefore, we have:

e8: ymax=18, xmin=7, Δx=−1, ymin=17

An edge e9 is an upward edge, its start point corresponds to the case No. start 3, and its end point corresponds to the case No. end 1. Therefore, we have:

e9: ymax=18, xmin=1, Δx=5/9, ymin=9

Figure 23:
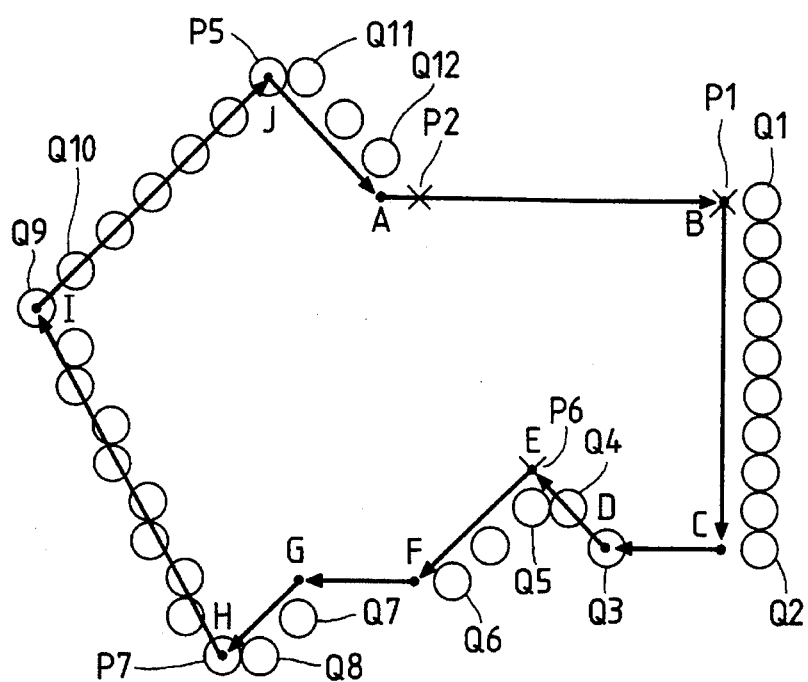
FIG. 23 is an explanatory view of contour pixels output for the figure shown in FIG. 2B.
Figure 24:
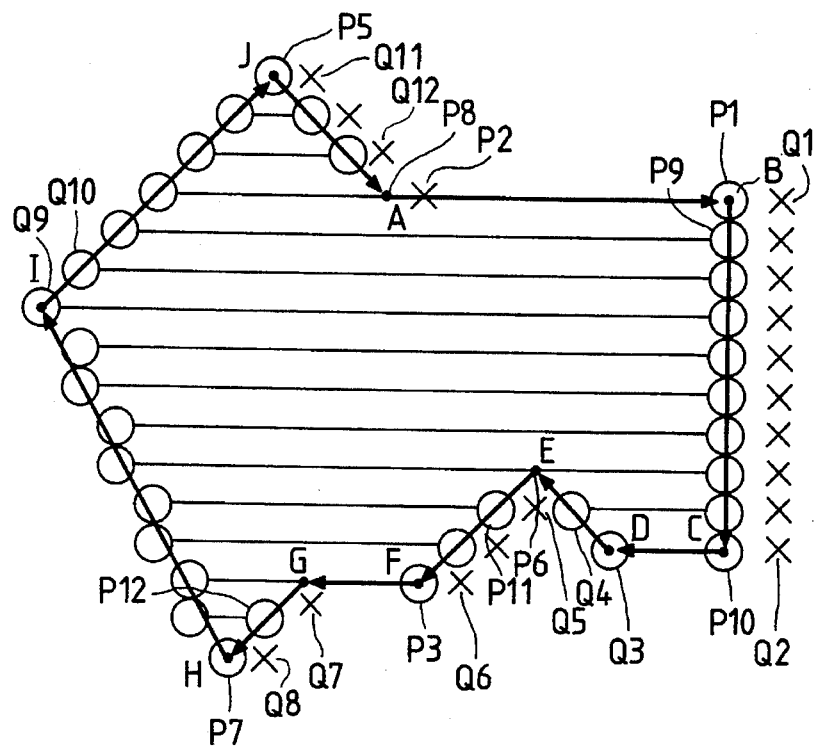
FIG. 24 is an explanatory view of a processing result of the figure shown in FIG. 2B.

FIG. 21 shows the edge table summarizing the above-mentioned data. FIG. 22 shows a change in active edge table (AET) when the AET is generated based on FIG. 21, and a target scan line is sequentially incremented from y=0 by one. FIG. 23 shows a figure obtained by plotting pixels at an x-min position of an odd-numbered edge bucket and a pixel adjacent to an xmin position of an even-numbered edge bucket in the main scan direction as contour pixels in each scan line according to the AET shown in FIG. 22. In FIG. 23, pixels at position between P5 and Q10 are contour pixels for the edge e10. Similarly, pixels at positions between Q9 and Q7, between Q1 and Q2, between Q4 and Q3, between Q5 and Q6, and between Q7 and Q8 are contour pixels for the edges e9, e3, e5, e6, and e8, respectively. FIG. 24 shows an output obtained when contour data shown in FIG. 23 is painted from the odd-numbered contour pixel on each scan line to a pixel immediately before the even-numbered pixel, as described above. As shown in FIG. 24, all the top pixels and pixels on the horizontal edges can be painted without being distorted.

In the above-mentioned discussion, ymax and ymin are processed as a non-negative integer. xmin and Δx are processed as real number data having sufficient precision (i.e., having decimal part information) in use. An x coordinate value used when a scan line is updated to the next line has a value obtained by adding calculated Δx to the x coordinate value of the immediately preceding edge in a calculation. However, a pixel on the memory can only be plotted at an integer position. Therefore, an actual x coordinate value changes when a carry is generated from the fraction by adding Δx.

<Description of Second Embodiment>

In the first embodiment, the rules for the pairs of case Nos. start 1 and end 1 and start 8 and end 8 in the edge bucket generation rules shown in FIG. 28 may be changed as follows.

More specifically, case No. start 1: the position of the start point of the present edge is set "as it is", and case No. end 1: the position of the end point of the present edge is "closed by one scan line".

Case No. start 8: the position of the start point of the present edge is "closed by one scan line", and case No. end 8: the position of the end point of the present edge is set "as it is".

Figure 18A:
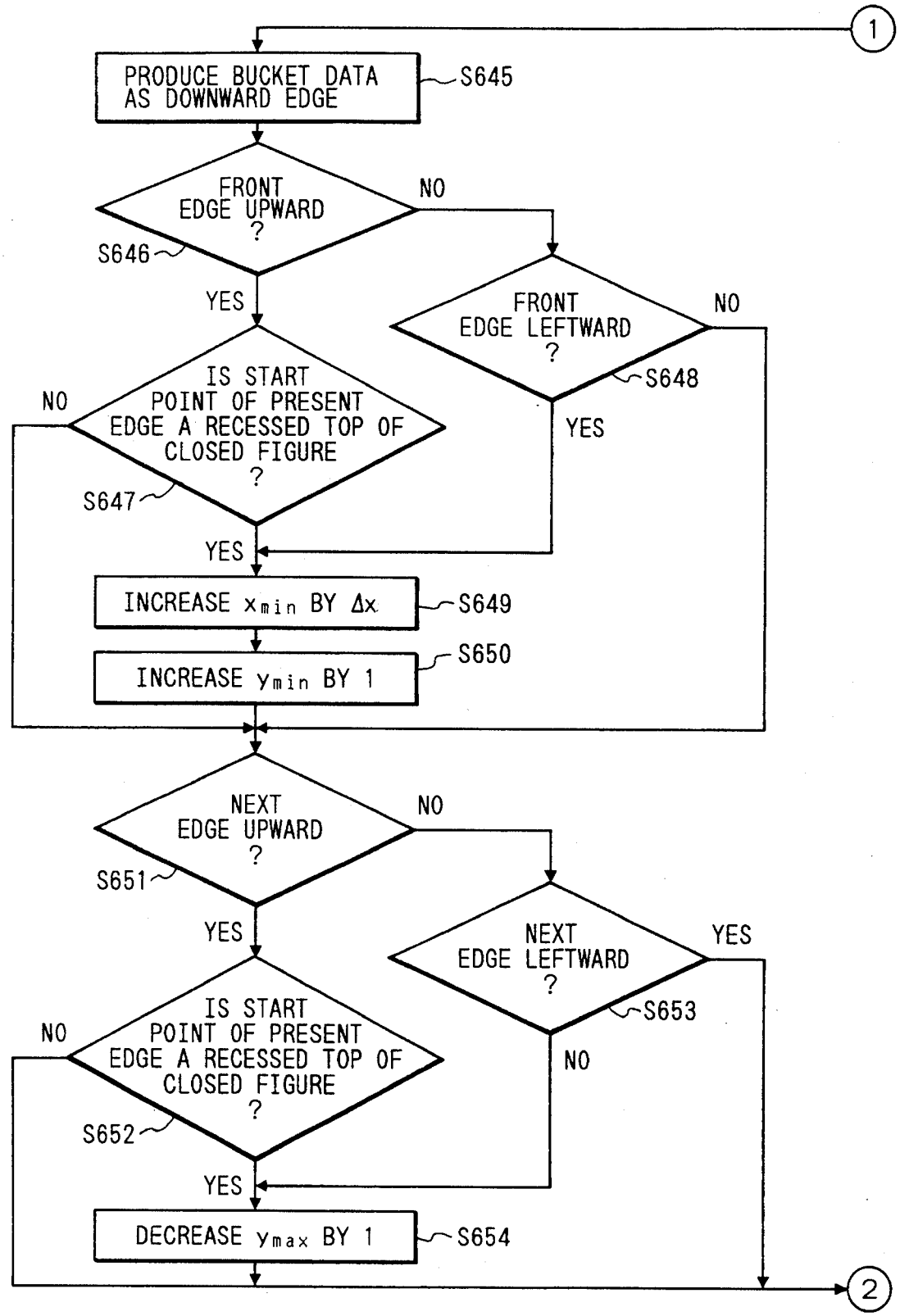
FIGS. 18A and 18B are flow charts showing a sequence for generating bucket data, and updating an edge table.
Figure 18B:
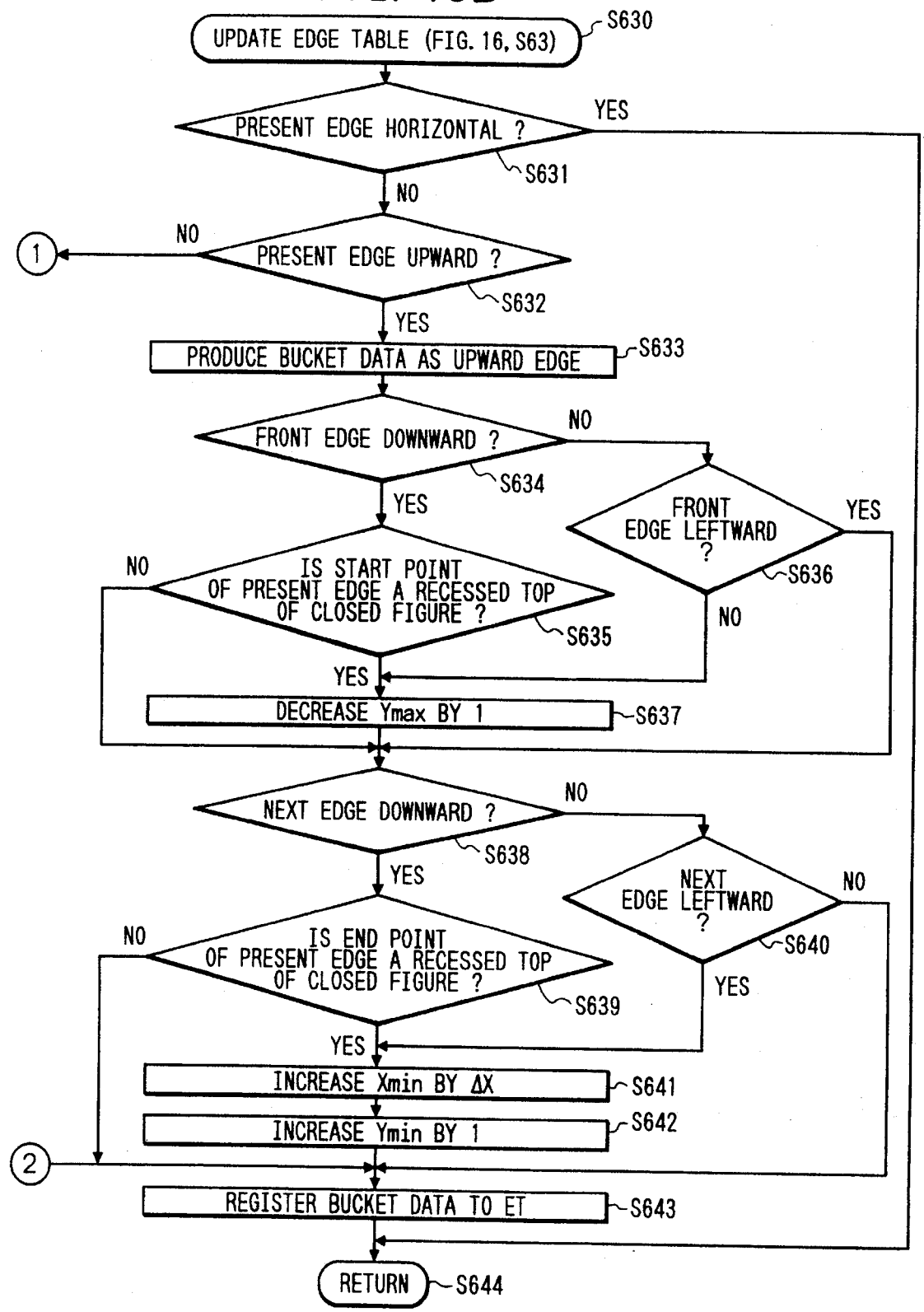

In the processing flow shown in FIGS. 18A and 18B, it is obvious to those who are skilled in the art that step S636 for the case No. start 1, and step S640 for the case No. end 1 are changed according to the change in rule. Also, it is obvious to those who are skilled in the art that step S648 for the case No. start 8, and step S653 for the case No. end 8 are changed according to the change in rule.

The above-mentioned changes imply that a top common to two outline edges as two continuous upward or downward edges may be processed either as only a point on an edge having the top as an end point or as only a point on an edge having the top as a start point. That is, such a top may be subjected to either one of the above-mentioned operations unless it is processed as a point on both the edges or is determined as a point excluded from both the edges.

<Description of Third Embodiment>

In the description of the first embodiment, an outline has a clockwise data expression. However, the present invention is not limited to this, but may be applied to an outline having a counterclockwise data expression. In the case of the counterclockwise data expression, edge bucket generation rules shown in FIG. 29 can be used. In this case, processing of the start point of the present edge is determined on the basis of the directions and inclinations of the present and preceding edges, and processing of the end point of the present edge is determined on the basis of the basis of the directions and inclinations of the present and next edges. The edge table updating processing flow according to the edge bucket generation rules in 10 the counterclockwise data expression is substantially the same as those shown in FIGS. 18A and 18B, excluding that "YES" and "NO" in steps S636, S640, S648, and S653 are reversed.

<Description of Fourth Embodiment>

Like in the modification for the first embodiment described in the second embodiment, in the rules shown in FIG. 29 of the third embodiment, case Nos. start 11 and end 11, and case Nos. start 18 and end 18 may be combined, and may be modified as follows:

Case No. start 11: the position of the start point of the present edge is "closed by one scan line", and case No. end 11: the position of the end point of the present edge is set "as it is".

Case No. start 18: the position of the start point of the present edge is set "as it is", and case No. end 18: the position of the end point of the present edge is "closed by one scan line".

Description of Fifth Embodiment

In the above embodiment, the origin of the coordinates is set at the upper left corner of the image. However, the present invention is not limited to this. More specifically, when directions, the discrimination methods, and processing of ymax, ymin, xmin, Δx, and the like in the above description may be changed according to the origin position and the direction of the coordinates, the same processing as described above can be attained.

Description of Sixth Embodiment

In the above embodiment, the main scan direction in the paint out operation is determined as a left-to-right direction of an image. However, the present invention is not limited to this. The main scan direction may be a direction opposite to the left-to-right direction, i.e., is a right-to-left direction. In this case, when contour pixels are to be sketched from the active edge table (AET) on the line memory, as for an odd-numbered x coordinate value upon accessing from a smaller x coordinate value (xmin), a pixel as an EX-ORed result with "1" is sketched at a memory address corresponding to a pixel adjacent to the pixel at that position, and as for an even-numbered x coordinate value, a pixel as an EX-ORed result with "1" is sketched at a memory address corresponding to the pixel at that position. Thereafter, contour pixel data is read out from the line memory in a direction opposing the right-to-left direction of an image to execute the paint in method.

Description of Seventh Embodiment

In the above embodiment, an edge having only one point, i.e., an edge whose start point coincides with an end point (point edge) is excluded in advance from a top string of edges constituting a contour when the data shown in FIG. 13 is formed. However, the present invention is not limited to this. More specifically, when edge data is checked, point edge data may be ignored, and the above-mentioned processing may be continued. In the processing shown in FIG. 16, in present edge data generation step S57, next edge data generation step S58, and next edge data generation step S62, if an edge being processed is a point edge, the next top data is immediately read, and is determined as a new point (xend, yend), thus continuing the processing. At this time, the target top position may be updated or the number of processed tops may be adjusted according to the number of skipped tops. In this manner, point edges can be removed during generation of the edge table.

Description of Eighth Embodiment

Figure 25:
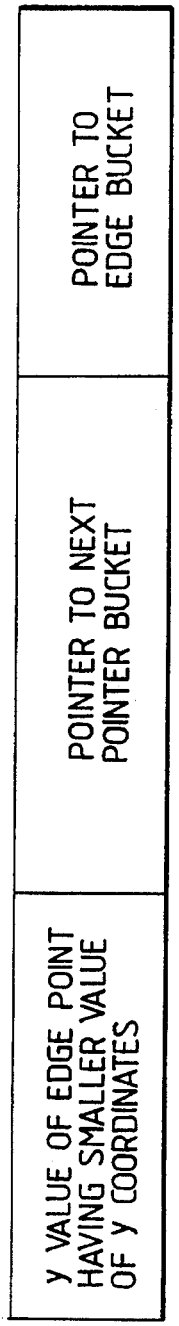
FIG. 25 is an explanatory view of a pointer bucket according to another embodiment of the present invention.
Figure 26:
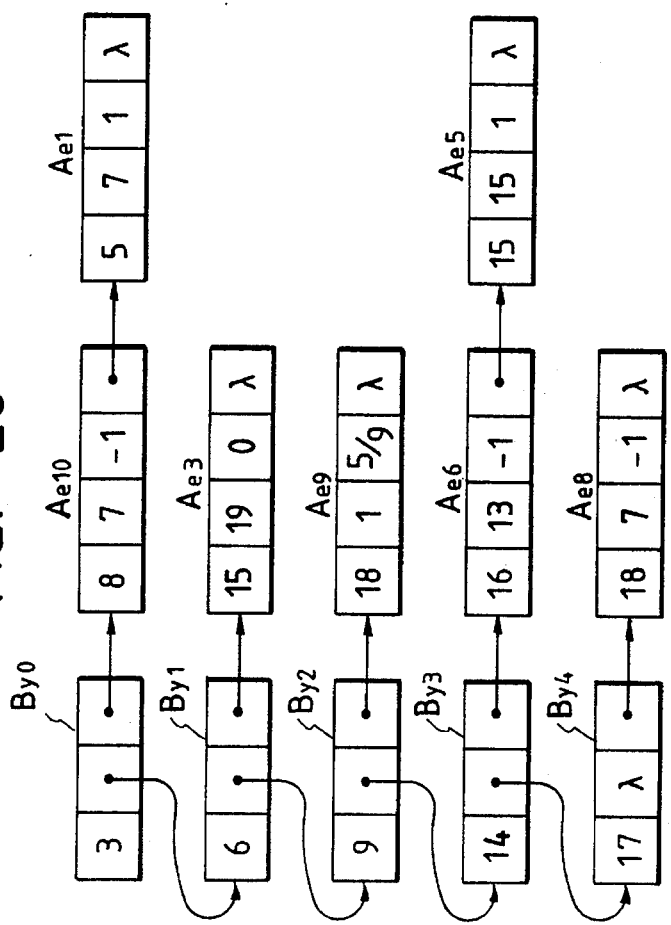
FIG. 26 is an explanatory view of an edge table (ET) of the figure shown in FIG. 2B in the embodiment shown in FIG. 25.

The architecture of the edge table is not limited to the above-mentioned architecture. More specifically, a pointer bucket may have a data format having a two-dimensional list structure, as shown in FIG. 25. The pointer bucket is constituted by an item for holding a y coordinate value (ymin) (paying attention to the fact that even when a plurality of edge buckets are list-connected from this pointer bucket, the plurality of all these edges have an equal ymin) of an edge point having a smaller y coordinate value of an edge of an edge bucket list-connected from this pointer bucket, an item of a pointer to the next one of pointer buckets having list-connected edge buckets when the y coordinate values are viewed in the ascending order, and an item of a pointer to the edge bucket connected to the pointer bucket. FIG. 26 shows an edge table constituted by pointer buckets in the format shown in FIG. 25. FIG. 26 shows the edge table generated for an outline figure shown in FIG. 2B. In this manner, the edge table having a two-dimensional list structure can be generated in substantially the same procedure as in the above embodiment. However, in this embodiment, pointer bucket areas are not assured in advance in correspondence with the number of scan lines of an image.

Every time one edge bucket is generated, it is checked if the existing pointer buckets hold ymin of an edge expressed by the generated edge bucket. If such a pointer bucket is found, the generated edge bucket is added to the list of edge buckets of the pointer bucket; otherwise, a new pointer bucket is generated, and ymin is stored in the pointer bucket to list-connect the generated edge bucket. Thereafter, the new pointer bucket is added and inserted in the list of pointer buckets in the order of ymin.

An active edge table can be generated using the above-mentioned edge table in the same manner as in the above embodiment.

When the two-dimensional list structure is employed, pointer bucket areas corresponding to the number of scan lines of an image need not be prepared. In particular, when an image to be processed has a larger size, a random-memory area required for an edge table can be advantageously decreased.

Description of Ninth Embodiment

Figure 27:
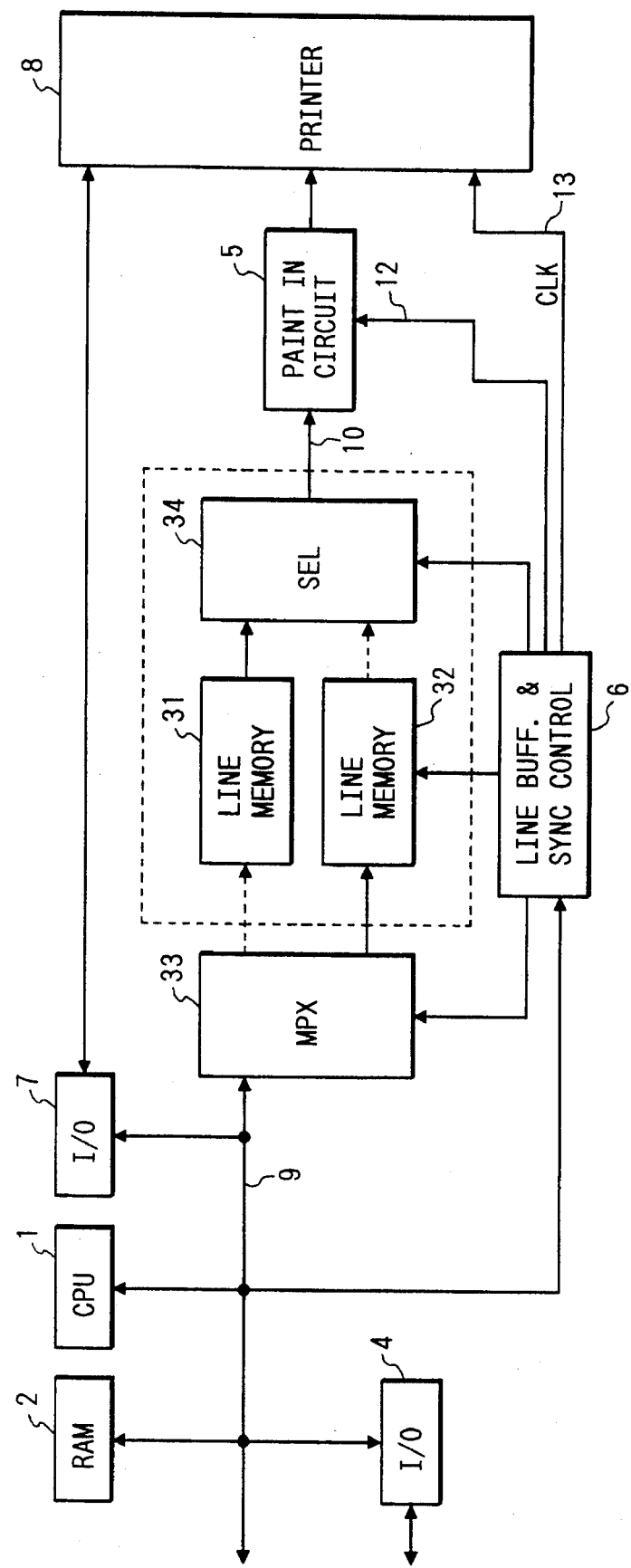
FIG. 27 is a block diagram showing an arrangement of an apparatus applied to a raster-scan type video printer according to the embodiment shown in FIG. 25.
Figure 30:
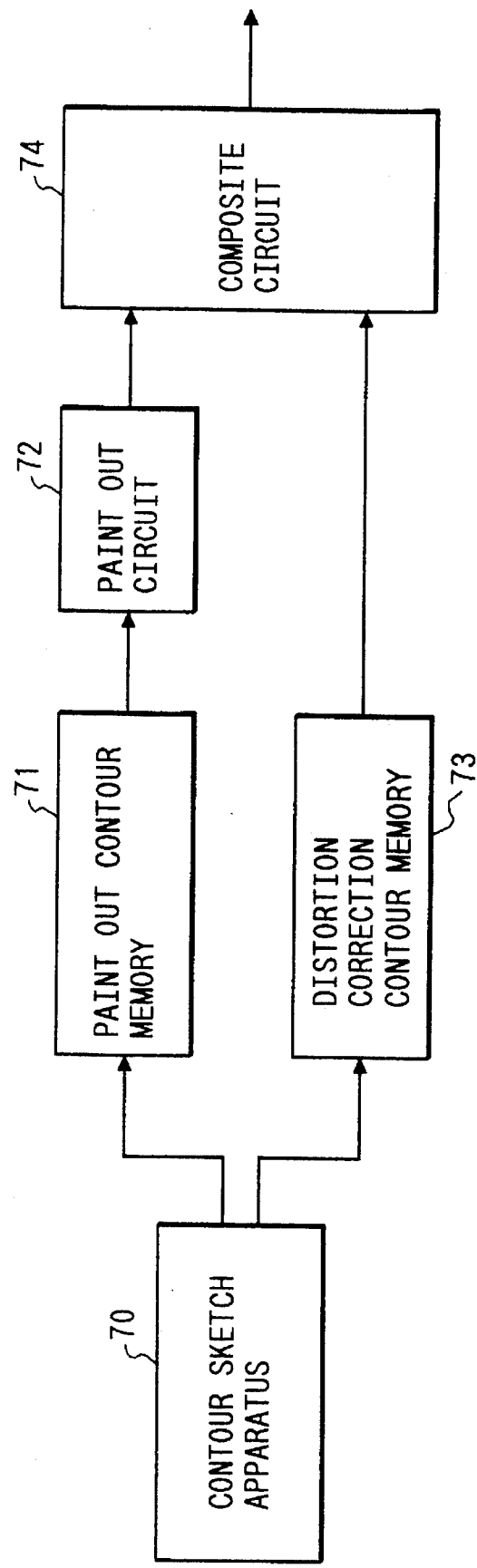
FIG. 30 is a block diagram of a conventional circuit.

This embodiment can be realized by an apparatus arrangement having a plurality of line memories, as shown in FIG. 27. In FIG. 27, the same reference numerals denote the same parts as in FIG. 1. In FIGS. 27, two lines memories 31 and 32 for two scan lines are prepared. One of the two line memories is used when a CPU 1 sketches contour pixels on a given scan line, and the other memory is used when contour pixel data on the other scan line sketched immediately therebefore are output to a paint in circuit 5. More specifically, two processing operations can be simultaneously executed. The line memory which completed the output operation is used for storing contour pixels for the next scan line to be sketched. In order to attain a toggle operation in this manner, a multiplexer 33 and a selector 34 are used to switch the inputs/outputs of the line memories 31 and 32. The multiplexer 33 and the selector 34 are controlled by a sync control buffer 6'. The sync control buffer switches the line memories to be connected to the multiplexer 33 and the selector 34 every time the CPU 1 completes the write operation of contour pixels, and enables the memory to output the scan line data, and every time the other line memory completes the generation/output operation of painted in data. Every time the line memories are switched, the sync control buffer informs of the CPU 1 that the sketch operation of the next scan line is allowed, and causes the memory on which contour pixels are sketched to perform the generation/output operation of painted in data.

In this manner, the wait time required between adjacent processing operations for a plurality of scan lines can be decreased, and high-speed processing can be realized as a whole.

Note that the present invention may be applied to a system constituted by a plurality of devices, or an apparatus consisting of a single device. The present invention may also be applied to a case wherein the present invention is achieved by supplying a program to a system or apparatus.

As described above, according to this embodiment, the direction of a present outline vector is checked, and whether or not edge points of the present vector are used in judgment of boundary points defining a closed section of a closed figure is discriminated on the basis of the direction and inclination of an outline vector immediately before the present outline vector, and the direction and inclination of an outline vector immediately after the present vector. Thereafter, contour pixel data are generated in units of scan lines by plotting a pixel at a corresponding pixel position on the memory when an odd-numbered boundary judgment edge intersecting the scan line is detected in units of scan lines, and plotting a pixel at a position of a right neighboring pixel of a corresponding pixel position on the memory when an even-numbered boundary judgment edge is found. Thereafter, the contour pixel data for one scan line are horizontally scanned, and it is determined that a portion between an odd-numbered contour pixel and an even-numbered contour pixel is an inner area of a closed figure. Thus, figure paint out processing can be performed at high speed and with low cost without causing distortion.

As described above, according to the present invention, when a portion inside a contour is painted out, an intended painted out result can be obtained at high speed using a small memory capacity.

<Description of 10th Embodiment>

Figure 31:
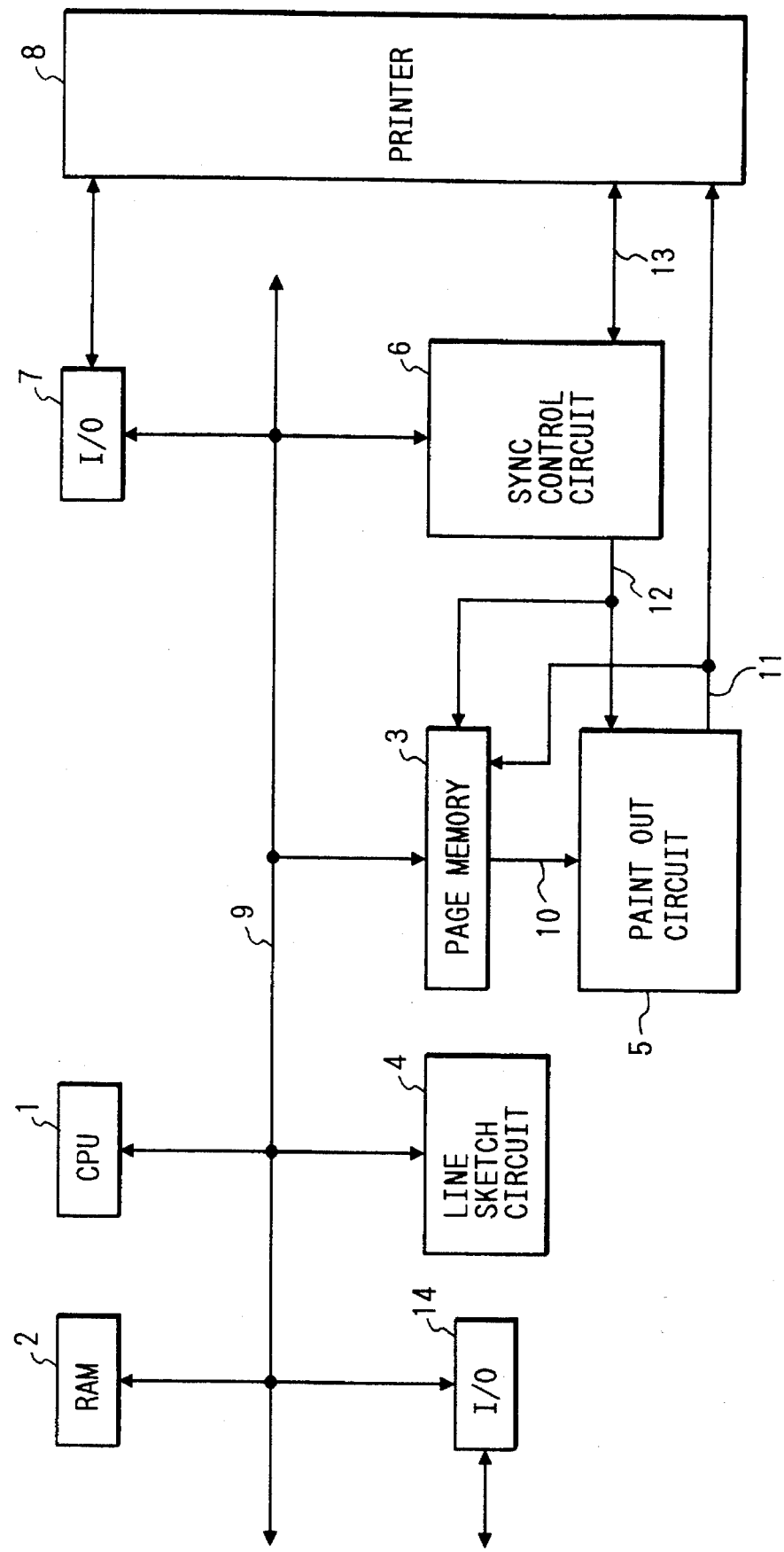
FIG. 31 is a block diagram showing an arrangement of an apparatus applied to a raster-scan type video printer according to still another embodiment of the present invention.

FIG. 31 shows the 10th embodiment of the present invention, which is arranged for a raster-scan type video printer. A microprocessor (CPU) 1 is connected to a RAM (random-access memory) 2, a page memory 3, a line sketch circuit 4, a sync control circuit 6, and I/O ports 7 and 14 through a bus 9. A paint out circuit 5 receives contour image data output from the page memory 3 by a raster-scan operation according to a sync signal 12 from the sync control circuit 6, and outputs painted out image data 11.

A printer 8 is interface-connected to the CPU 1 through the I/O port 7. The printer 8 is connected to a sync signal 13 from the sync control circuit 6, and the painted out image data 11 as a video interface.

Contour data is expressed by data indicating the number of closed loops included in an objective image, a group of data each indicating the number of tops constituting each closed loop, and a group of data indicating coordinates of adjacent tops in a predetermined order on each of the closed loops. The content of the contour data is shown in FIG. 33.

Figure 32:
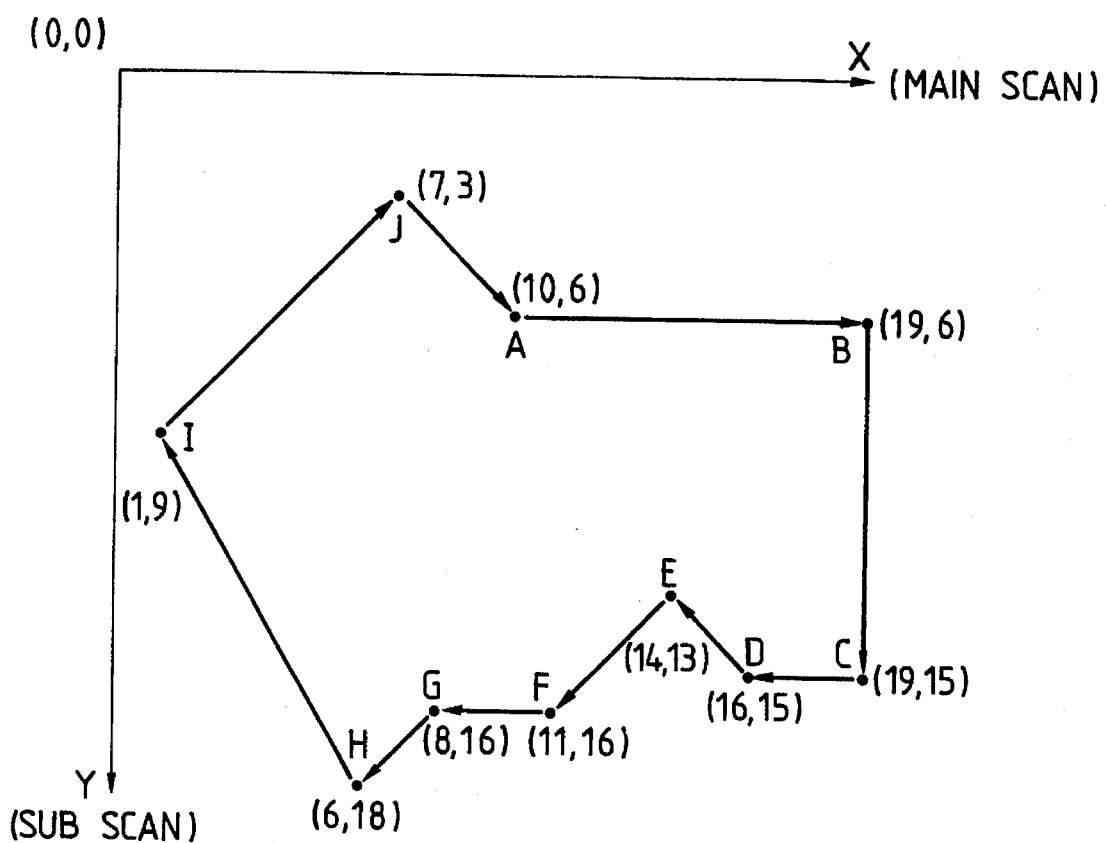
FIG. 32 is a view showing an example of clockwise outline data.
Figure 34:
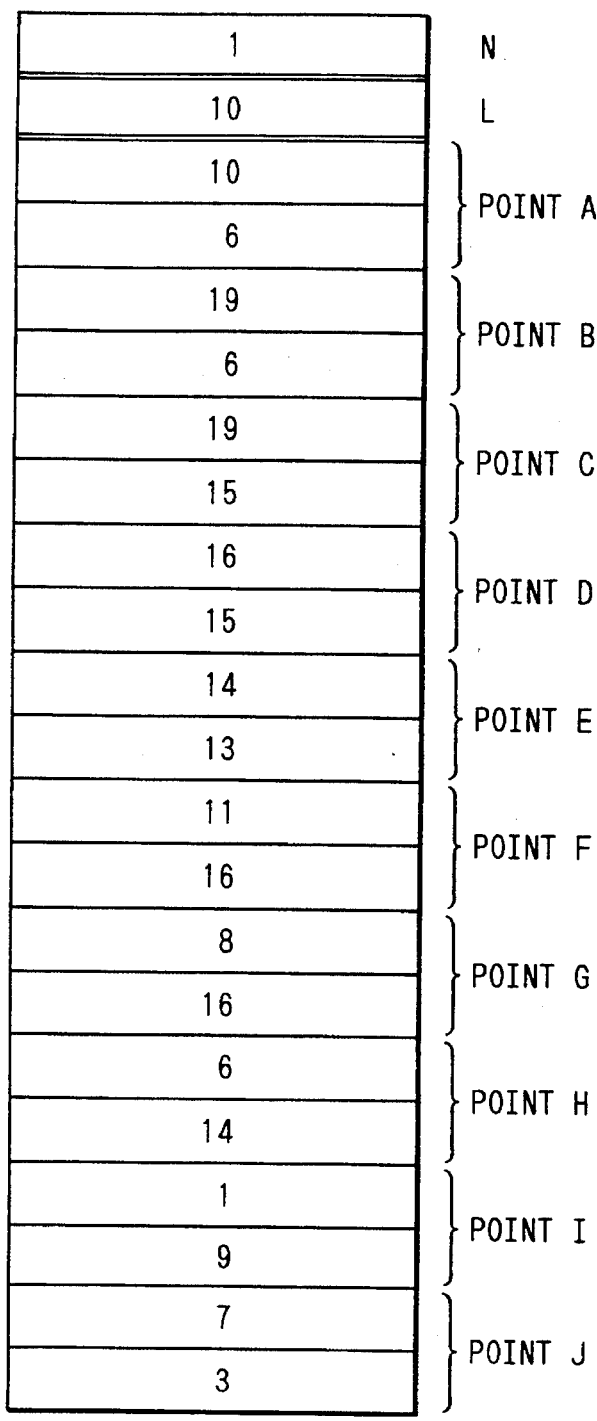
FIG. 34 is a view showing outline vector coordinate expressions of outline data shown in FIG. 32.

FIG. 32 shows an example of a clockwise outline figure. FIG. 34 shows the contour data of FIG. 32. In FIG. 34, the outline shown in FIG. 32 is expressed as a series of points which make a round in the order of A→B →C→D→E→ F→G→H→I→J→A to have the point A as the start point.

In the following description, assume that the origin of coordinates is present at the upper left corner of an image, the main scan direction is defined as the x-axis, and the sub scan direction is defined as the y-axis. In addition, an outline is assumed to have a clockwise data expression. Note that the start point in each closed loop can be an arbitrary point on the loop.

Figure 35:
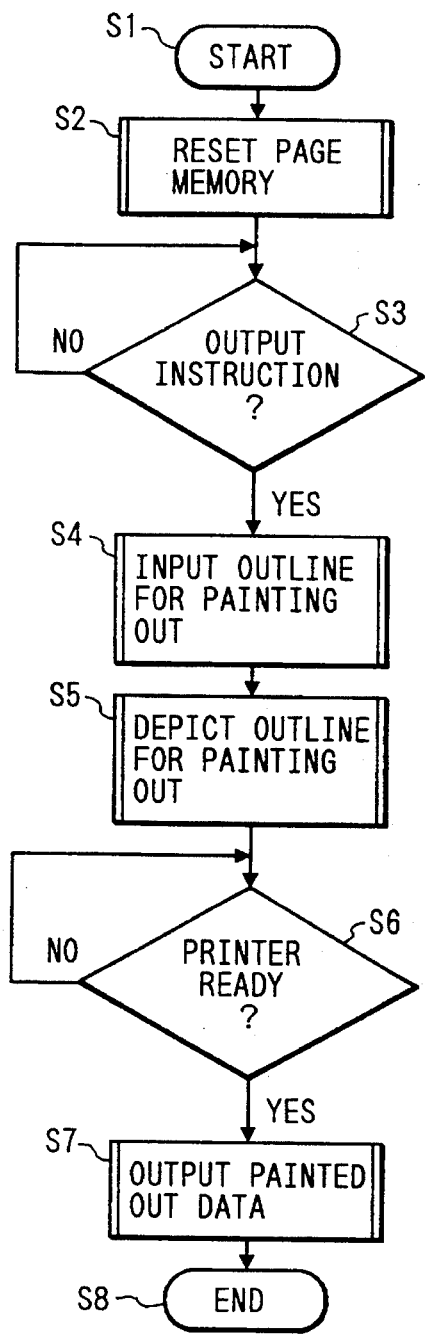
FIG. 35 is a flow chart for explaining an operation of the apparatus of the embodiment shown in FIG. 31.

FIG. 35 shows the operation of the apparatus according to the 10th embodiment of the present invention. The operation will be described below with reference to the flow chart shown in FIG. 35. When the CPU 1 starts its processing in step S1, the flow advances to step S2. In step S2, the CPU 1 resets the page memory 3. At this time, the CPU 1 controls the paint out circuit 5 to output predetermined data to the page memory through the sync control circuit 6, and causes the sync control circuit 6 to write the predetermined data in the page memory 3 for one frame, thereby resetting the page memory.

Figure 37:
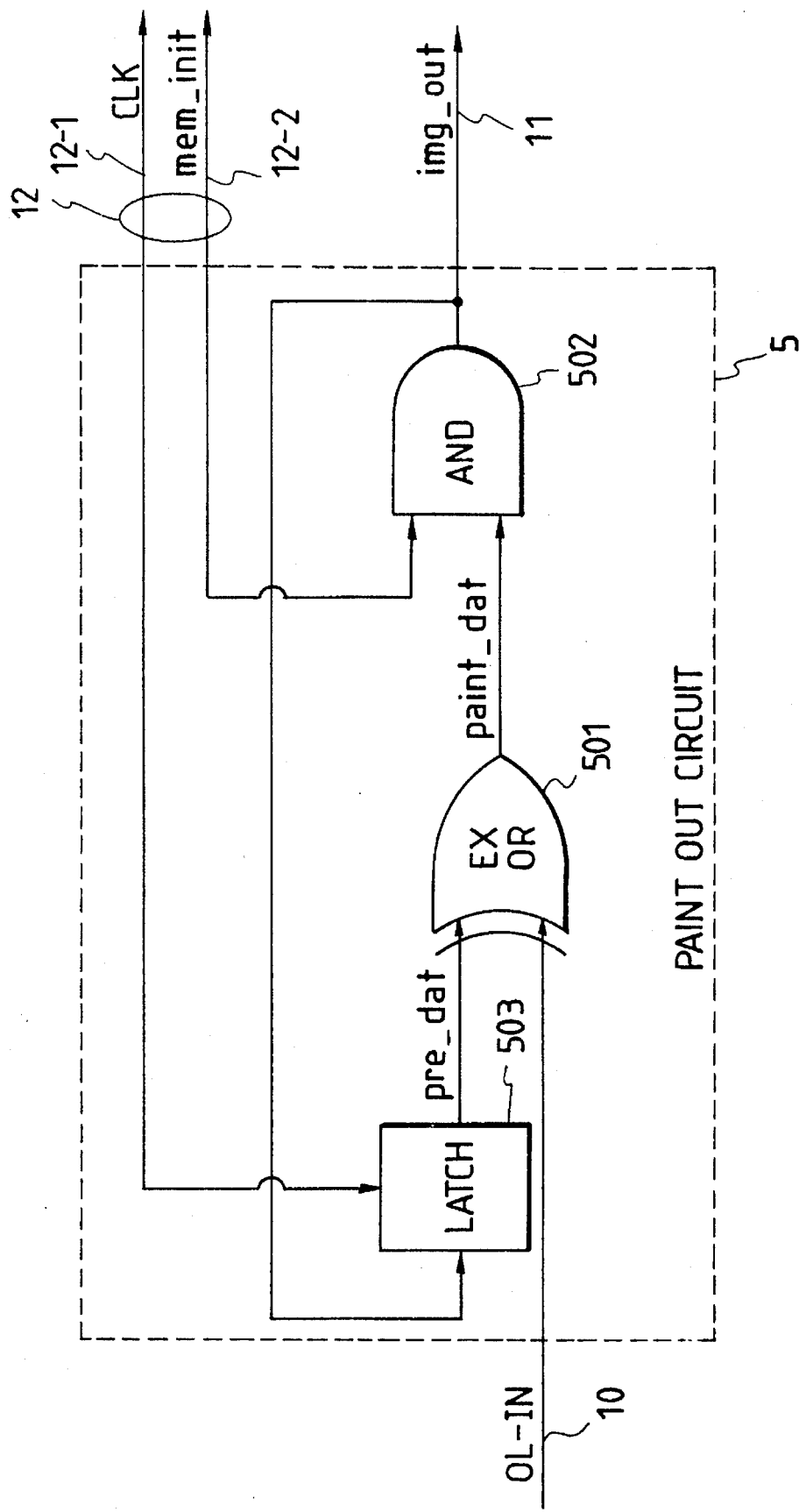
FIG. 37 is a diagram showing a paint out circuit.

FIG. 37 shows an arrangement of the paint out circuit 5. In step S2, the sync control circuit 6 fixes a signal line 12-2 at Low level under the control of the CPU 1, so that an output 11 from the paint out circuit 5 is set at Low level. The sync control circuit 6 writes this output 11 in the page memory 3 in synchronism with the sync signal, thereby resetting the page memory 3 to all "0"s.

FIG. 38 is a timing chart showing the relationship between a page sync signal (Page Sync) indicating the head of one page, and a scan line sync signal (Line Sync) indicating the head of each scan line in the page. FIG. 39 shows the scan line sync signal (Line Sync) indicating the head of one scan line, a pixel sync signal (CLK) for giving a pixel data determination timing in one scan line, and pixel data. The reset operation is started in response to the page sync signal, and is carried out by sequentially updating memory addresses in response to the scan sync signal and the pixel sync signal by an additional circuit (not shown) of the page memory 3.

Upon completion of the reset operation of the page memory 3, the flow advances to step S3. In step S3, the CPU 1 checks through the I/O port 14 if an output instruction of an image is detected. If YES in step S3, the flow advances to step S4; otherwise, the CPU 1 waits for the output instruction.

In step S4, paint out contour data is input from an external circuit or an auxiliary storage device (not shown) to the RAM area 2 through the I/O port 14. The flow then advances to step S5, and the CPU 1 controls the line sketch circuit 4 according to rules described in FIG. 45, thereby sketching a paint out contour on the page memory 3.

The flow then advances to step S6 to check through the I/O port 7 if the printer is ready. If YES in step S6, the flow advances to step S7; otherwise, the CPU 1 waits until the printer is ready. In step S7, the CPU 1 controls the sync control circuit 6 to read out the paint out contour image on the page memory 3, and causes the paint out circuit 5 to output a binary painted out image onto a signal line 11.

The paint out contour sketch processing in step S5 will be described in detail below.

Figure 36:
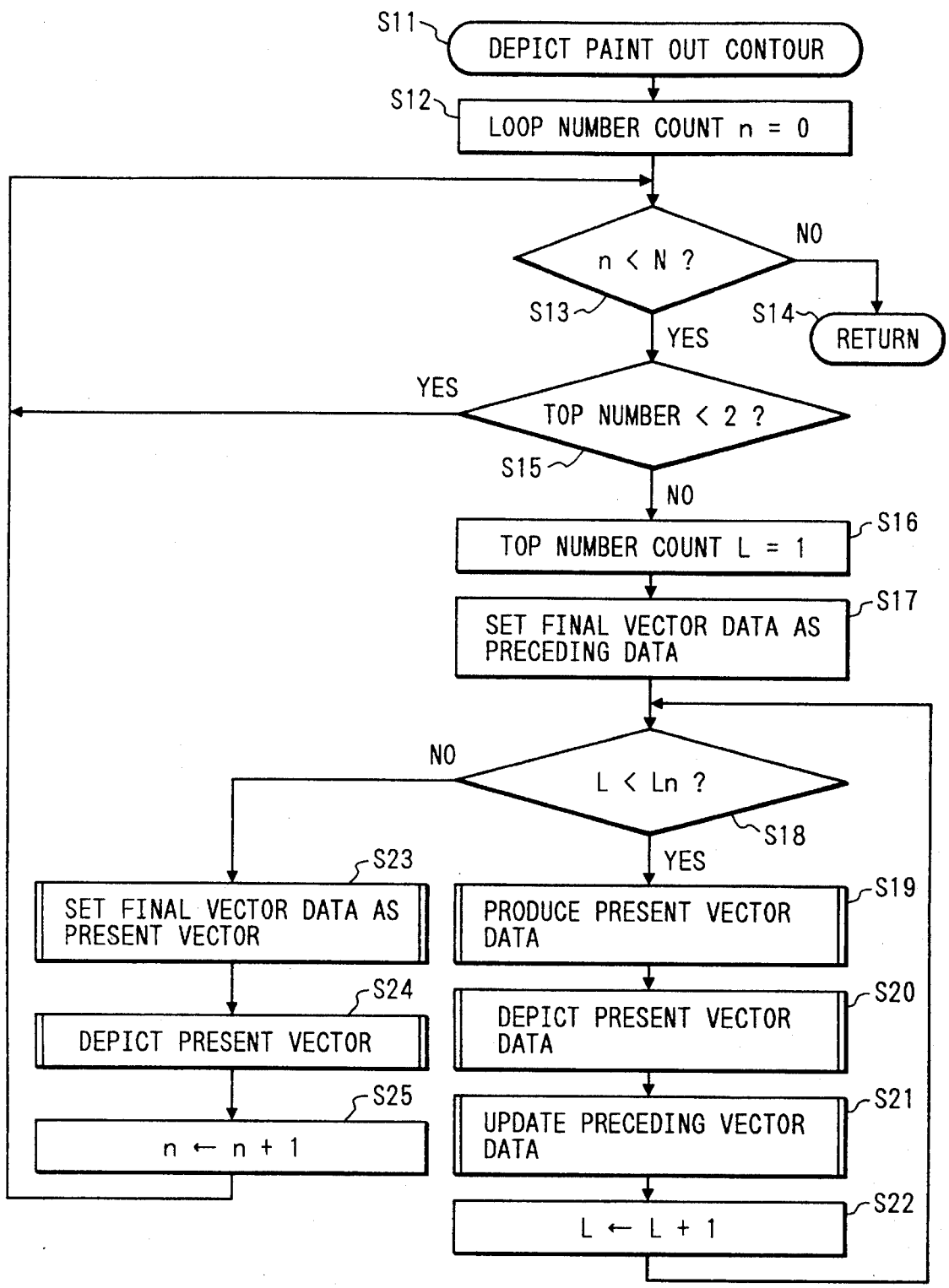
FIG. 36 is a flow chart for explaining a paint out contour sketch routine.

FIG. 36 is a flow chart showing the paint out contour sketch processing in step S5. When the CPU 1 starts contour sketch processing in step S11, it initializes a register for holding the number n of processed closed loops to 0 in step S12. The flow then advances to step S13. Note that contour data is held in the RAM area 2 in the format shown in FIG. 33. In step S13, the CPU 1 compares the number N of closed loops included in the contour data with the number n of processed loops to check if N is larger than n.

If YES in step S13, the CPU 1 determines that non-processed loops remain, and the flow advances to step S15. Otherwise, the CPU 1 determines that there is no non-processed loop, and the flow advances to step S14 to end the contour sketch processing. In step S15, the CPU 1 checks if the number $L_i$ of tops in a loop (assume that n=i now) i indicated by the number n of processed loops is smaller than 2. If YES in step S15, the CPU 1 determines that there is no top to be processed as a closed loop, and the flow returns to step S13. Otherwise, the flow advances to step S16.

In step S16, the CPU 1 initializes a register for holding the number L of processed tops to 1, and the flow then advances to step S17. In step S17, the CPU 1 generates preceding vector data as vector data before a vector to be processed first in step S18 and subsequent steps on the basis of final vector data. More specifically, assuming that an ith loop includes Li tops, the CPU 1 determines, as a preceding vector, a vector having a top represented by coordinates $(xi_{L_i-1}, yi_{L_i-1})$ as a start point, and a top represented by coordinates $(xi_0, yi_0)$ as an end point, checks if the preceding vector is an upward, downward, rightward, or leftward vector, and stores the checking result in the working area on the RAM 2. In addition, the CPU 1 stores a change $(xi_0-xi_{L_i-1})/yi_0-yi_{L_i-1}$ in the x direction when the top position is changed from the start point toward the end point by a unit length in the y direction along the vector.

In the coordinate system shown in FIG. 32, an upward vector means that the y coordinate value of the end point is smaller than the y coordinate value of the start point, and a downward vector means that the y coordinate value of the start point is smaller than the y coordinate value of the end point (or vice versa when the direction of the y-axis is reversed). When the start and end points have an equal y coordinate value, and the x coordinate value of the start point is smaller than the x coordinate value of the end point, a rightward vector is determined, and when the x coordinate value of the end point is smaller than the x coordinate value of the start point, a leftward vector is determined (or vice versa when the direction of the x-axis is reversed). When the coordinate values of the start point are the same as those of the end point, since these points indicate the same point, pre-processing is performed, so that such a vector is not present.

When the preceding vector data is set in this manner, the flow advances to step S18. In step S18, the CPU 1 checks if the number L of processed tops is smaller than the number $L_i$ of tops in a loop. If YES in step S18, the CPU 1 determines that non-processed tops remain, and the flow advances to step S19; otherwise, the CPU 1 determines that the processing is ended up to the final point in a top coordinate table, and the flow advances to step S23 to execute processing for a vector having the final point in the top coordinate table of this closed loop as a start point, and the first point in the table as an end point. In step S19, if a value held by the processed top counter L at that time is j, the CPU 1 pays attention to a vector having a (j-1)th top as a start point and a jth top as an end point, and calculates the direction of this vector (to be referred to as a present vector hereinafter), and a change in the x direction (to be referred to as an x increment hereinafter) when the top position is changed from the start point toward the end point by a unit length along the vector in the y direction in the same manner as in step S17. Thereafter, the flow advances to step S20.

In step S20, the CPU 1 controls the line sketch circuit 4 to perform a contour sketch operation for paint out processing according to the rules shown in FIG. 45 using the direction and x increment of the preceding vector, and the direction and x increment of the present vector held in the working area on the RAM 2. The details of this operation will be described later.

Upon completion of the contour sketch operation of the present vector, the flow advances to step S21. In step S21, the direction and x increment of the present vector used in step S20 are updated as the direction and x increment of the preceding vector, and they are stored in the working area on the RAM 2. In step S22, the value held by the processed top count register is incremented by one, and the flow returns to step S18. In step S23, a vector having the final point in the top coordinate table of this closed loop as a start point, and the first point in the table as an end point is determined as the present vector, and its direction and 10 x increment are generated. Thereafter, the flow advances to step S24.

In step S24, the CPU 1 controls the line sketch circuit 4 to perform the paint out contour sketch operation according to the rules shown in FIG. 45 on the basis of the direction and x increment of the preceding vector, and the direction and x increment of the present vector in the same manner as in step S20. Thereafter, the flow advances to step S25. In step S25, processing for this closed loop is ended, and the value held by the non-processed loop count register is incremented by one. Thereafter, the flow returns to step S13.

The contour sketch operation for paint out processing executed in steps S20 and S24 will be described below. The CPU 1 executes this sketch processing according to the rules shown in FIG. 45 with reference to the direction and x increment of the preceding vector, and the direction and x increment of the present vector stored on the RAM 2.

The sketch or depiction operation is selectively controlled for one point on the coordinates of the start point of the present vector, and for contour points (including the end point) on the present vector up to the end point excluding the start point. The sketch operation of the points on a contour is controlled in a one-out-of-three selection manner for the start point and other contour points on the vector. That is, whether a point is sketched or depicted at an address on the page memory 3 corresponding to coordinates of each point to be sketched, or is sketched at a right neighboring pixel address on the x-axis, or is not sketched is selected. If it is selected that a point is sketched (or plotted), when the point is sketched at a position address along the vector or is sketched at a right neighboring pixel address, an EX-ORed result between a value written at the corresponding address in advance and "1" is written at the address as a new value.

More specifically, when a value written at the address is "0", "1" is written; when it is "1", "0" is written. When the present outline vector is a horizontal vector, i.e., is a rightward or leftward vector (case Nos. 1 to 8 in FIG. 45), contour points other than the start point are not sketched regardless of the direction and x increment of the preceding outline vector.

At this time, when the direction of the present vector is the same as that of the preceding vector, i.e., when both the present and preceding vectors are rightward vectors (case No. 1) or are leftward vectors (case No. 6), the start point is not plotted. When the preceding vector is an upward vector, and the present vector is a rightward vector (case No. 4), and when the 10 preceding vector is a downward vector, and the present vector is a leftward vector (case No. 7), the start point is not plotted, either. When the preceding vector is a leftward vector, and the present vector is a rightward vector (case No. 2), and when the preceding vector is an upward vector, and the present vector is a leftward vector (case No. 8), the start point is plotted at its pixel position address. When the preceding vector is a downward vector, and the present vector is a rightward vector (case No. 3), and when the preceding vector is a rightward vector, and the present vector is a leftward vector (case No. 5), the start point is plotted at a right neighboring pixel position address of the pixel of the start point.

Cases (case Nos. 9 to 18) wherein the present vector is a non-horizontal vector will be described below. When the present vector is a downward vector (case Nos. 9 to 13), contour points other than the start point are respectively plotted at right neighboring pixel position addresses of positions along the present outline vector. When the present outline vector is an upward vector (case Nos. 14 to 18), contour points other than the start point are plotted at the pixel position addresses along the present outline vector regardless of the direction and x increment of the preceding vector.

As for the start point, when the present outline vector is a non-horizontal vector, if the present and preceding vectors have the same direction, i.e., if both the present and preceding vectors are downward vectors (case No. 11) or are upward vectors (case No. 18), the start point is not plotted like in the case wherein the present vector is a horizontal vector.

The start point is not plotted when the preceding vector is a leftward vector, and the present vector is a downward vector (case No. 10), and when the preceding vector is a rightward vector, and the present vector is an upward vector (case No. 14). When the preceding vector is a rightward vector, and the present vector is a downward vector (case No. 9), the start point is plotted at a right neighboring pixel position address of the position of the start point. When the preceding vector is an upward vector, and the present vector is a downward vector (case Nos. 12 and 13), if the sum of the x increments of the preceding and present vectors is 0 or positive (case No. 12), the start point is plotted at a right neighboring pixel position address of the start point; if the sum is negative (case No. 13), the start point is plotted at the pixel position address of the start point.

When the preceding vector is a leftward vector, and the present vector is an upward vector (case No. 15), the start point is plotted at the pixel position address of the start point. When the preceding vector is a downward vector, and the present vector is an upward vector (case Nos. 16 and 17), if the sum of the x increments of the preceding and present vectors is positive (case No. 16), the start point is plotted at a right neighboring pixel position address of the start point; if the sum is negative (case No. 17), the start point is plotted at the pixel position address of the start point.

Figure 40:
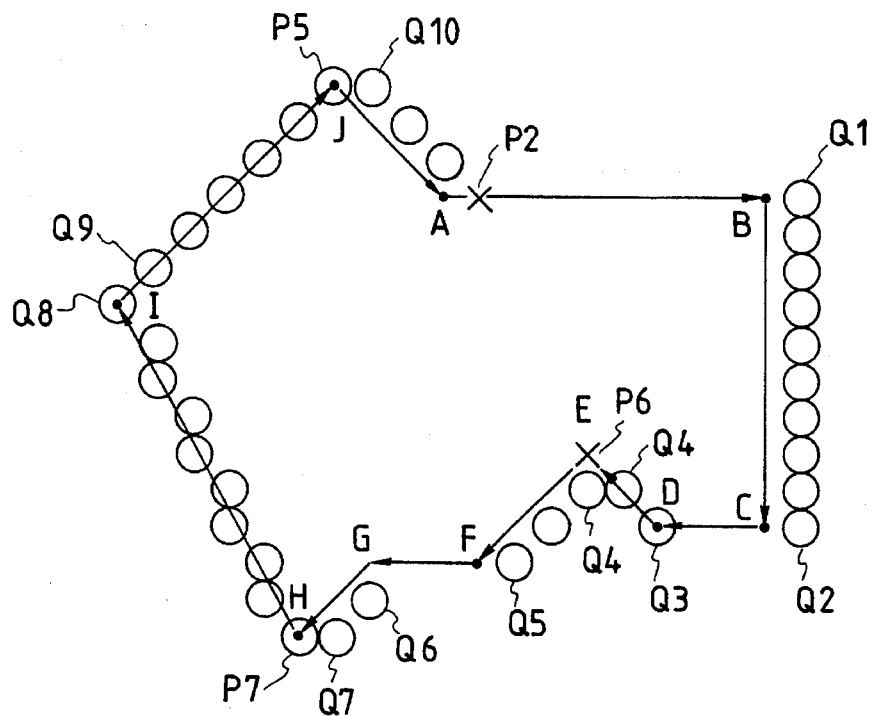
FIG. 40 is a view showing a sketch result of a paint out contour obtained by the embodiment shown in FIG. 31.

FIG. 40 shows a paint out contour sketch result obtained by applying the rules shown in FIG. 45 to the example shown in FIG. 32. In FIG. 32, if a contour vector AB is determined as a present vector, a preceding vector is a vector JA. The vector JA is a downward vector, and has an x increment of 1. The vector AB is a rightward vector, and has an x increment of ∞. This case corresponds to the case No. 3, and the start point of the vector AB is plotted at a position P2. When a vector BC is a present vector, this case corresponds to the case No. 9, and points on the vector BC are plotted at their right neighboring address positions between Q1 and Q2. When a vector CD is a present vector, this corresponds to the case No. 7, no point is plotted. When a vector DE is a present vector, this corresponds to the case No. 15, and points are plotted at positions Q3, Q4, and P6. When a vector EF is a present vector, a preceding vector DE is an upward vector, and has an x increment of −1. In this case, the present vector EF is a downward vector, and has an x increment of −1.

Therefore, the vector EF corresponds to the case No. 13, and points are plotted at a position P6, and positions between Q4 and Q5. Since one point has already been plotted at the position P6 in the processing of the vector DE, this position is reset to 0 at this time. When a vector FG is a present vector, this corresponds to the case No. 7, and no point is plotted. When a vector GH is a present vector, this corresponds to the case No. 10, and points are plotted at positions Q6 and Q7. When a vector HI is a present vector, the preceding vector GH is a downward vector, and has an x increment of −1. The present vector HI is an upward vector, and has an x increment of −⅝. Therefore, this case corresponds to the case No. 13.

Thus, points are plotted along the vector HI between positions P7 and Q8. When a vector IJ is a present vector, this case corresponds to the case No. 18, no point is plotted at the position Q8, and points are plotted along the vector IJ between positions Q9 and P5. When the vector JA is a present vector, the preceding vector IJ is a upward vector, and has an x increment of +1. The present vector JA is a downward vector, and has an x increment of +1. Therefore, this case corresponds to the case No. 12. Thus, a series of pixels are plotted at their right neighboring address positions along the vector JA between positions Q10 and P2. Since one point has already been plotted at the position P2 in the processing of the vector AB, this position is re-plotted as 0 in the processing of the vector JA.

Figure 41:
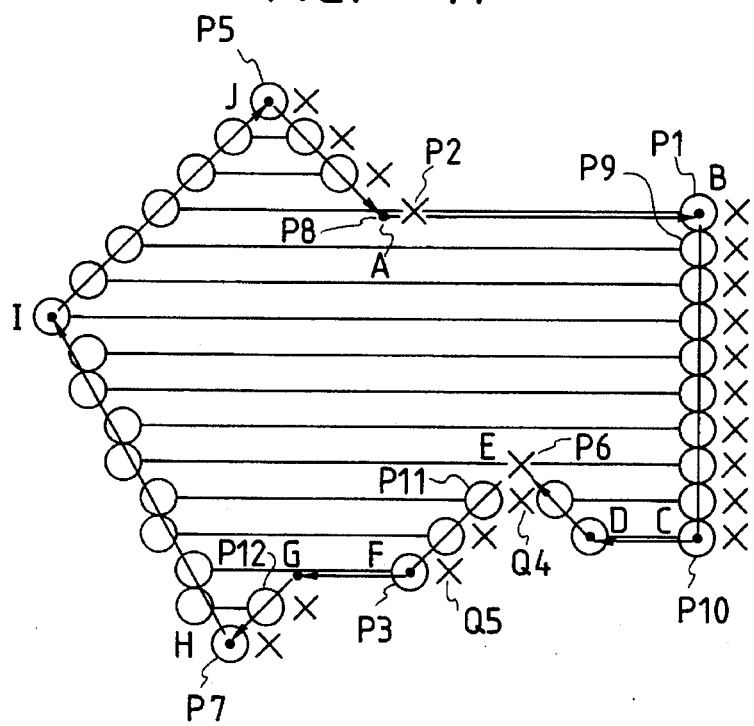
FIG. 41 is a view showing an example of a painted out figure obtained by the embodiment shown in FIG. 31.

FIG. 41 shows an image obtained by raster-scanning the paint out contour obtained in this manner so as to determine that a section between an odd-numbered "1" pixel position appearing on the horizontal scan line, and a position immediately before the next even-numbered "1" pixel position is a paint out section, and remaining sections are non-paint out sections. The image obtained in FIG. 41 can reproduce an inner area surrounded by the contour vectors without causing any distortion.

Figure 42:
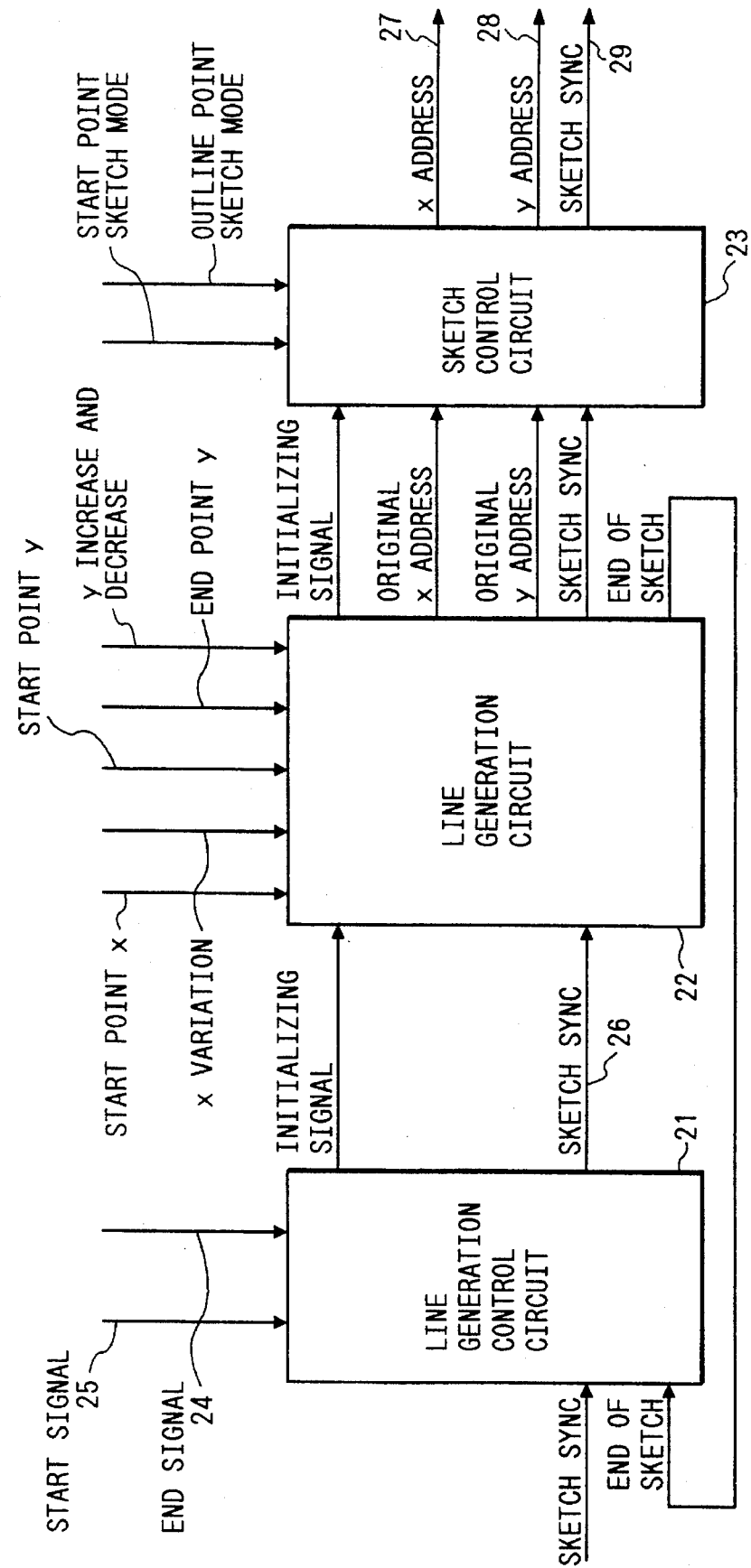
FIG. 42 is a functional block diagram of a line sketch circuit.

The line sketch circuit 4 will be described below. FIG. 42 is a functional block diagram of the line sketch circuit 4. The line sketch circuit 4 is constituted by three sections, i.e., a line generation control circuit 21, a line generation circuit 22, and a sketch control circuit 23. The line sketch circuit 4 is controlled by the CPU 1 every time an outline vector is sketched, thereby line-sketching outline vectors one by one.

Figure 44:
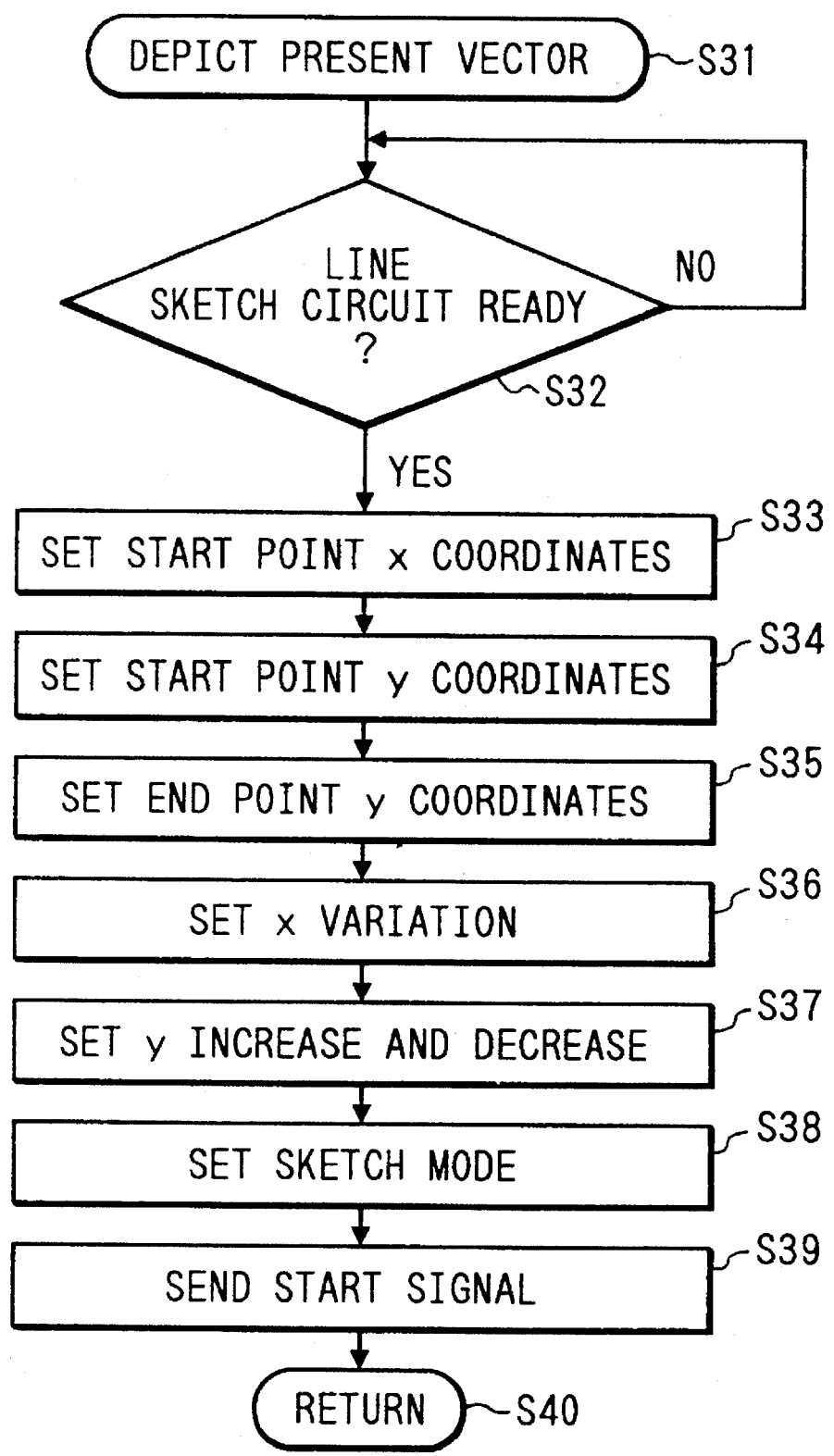
FIG. 44 is a flow chart for explaining a present vector sketch routine.

The line sketch operation is performed in the present vector sketch routine in steps S20 and S24 in FIG. 36. FIG. 44 shows details of this routine. When this routine is started in step S31, the flow advances to step S32. In step S32, an end signal 24 output from the line generation control circuit 21 is monitored to check if the line sketch circuit completes the previous processing, and is ready for the next processing. If YES in step S32, the flow advances to step S33; otherwise, the control waits until the line sketch circuit is ready. In step S33, the x coordinate value of the start point of a vector to be sketched is set in the line generation circuit 22, and the flow advances to step S34.

In step S34, the y coordinate value of the start point of the vector to be sketched is set in the line generation circuit 22, and the flow advances to step S35. In step S35, the y coordinate value of the end point of the vector to be sketched is set in the line generation circuit 22, and the flow advances to step S36. In step S36, the x increment is set, and the flow advances to step S37. In step S37, whether the count of the y coordinate value is up or down is set, and the flow advances to step S38. In step S38, a total of 4-bit data, i.e., 2-bit data indicating whether or not the start point and points on the contour (contour points) other than the start point are to be plotted (to be referred to as an output mode hereinafter), and 2-bit data indicating whether a pixel is plotted at a pixel address corresponding to the position on the contour or is plotted at a right neighboring pixel address (to be referred to as a shift mode hereinafter) (these 2-bit data will be respectively referred to as a start point sketch mode and a contour point sketch mode hereinafter) are set in the sketch control circuit 23, and the flow then advances to step S39.

In step S39, a start signal 25 is supplied to the line generation circuit 21, and the flow then advances to step S40. In step S36, the control returns to the routine shown in FIG. 36. As described above, upon reception of the start signal 25, the initialized line sketch circuit 4 starts its operation.

Figure 43:
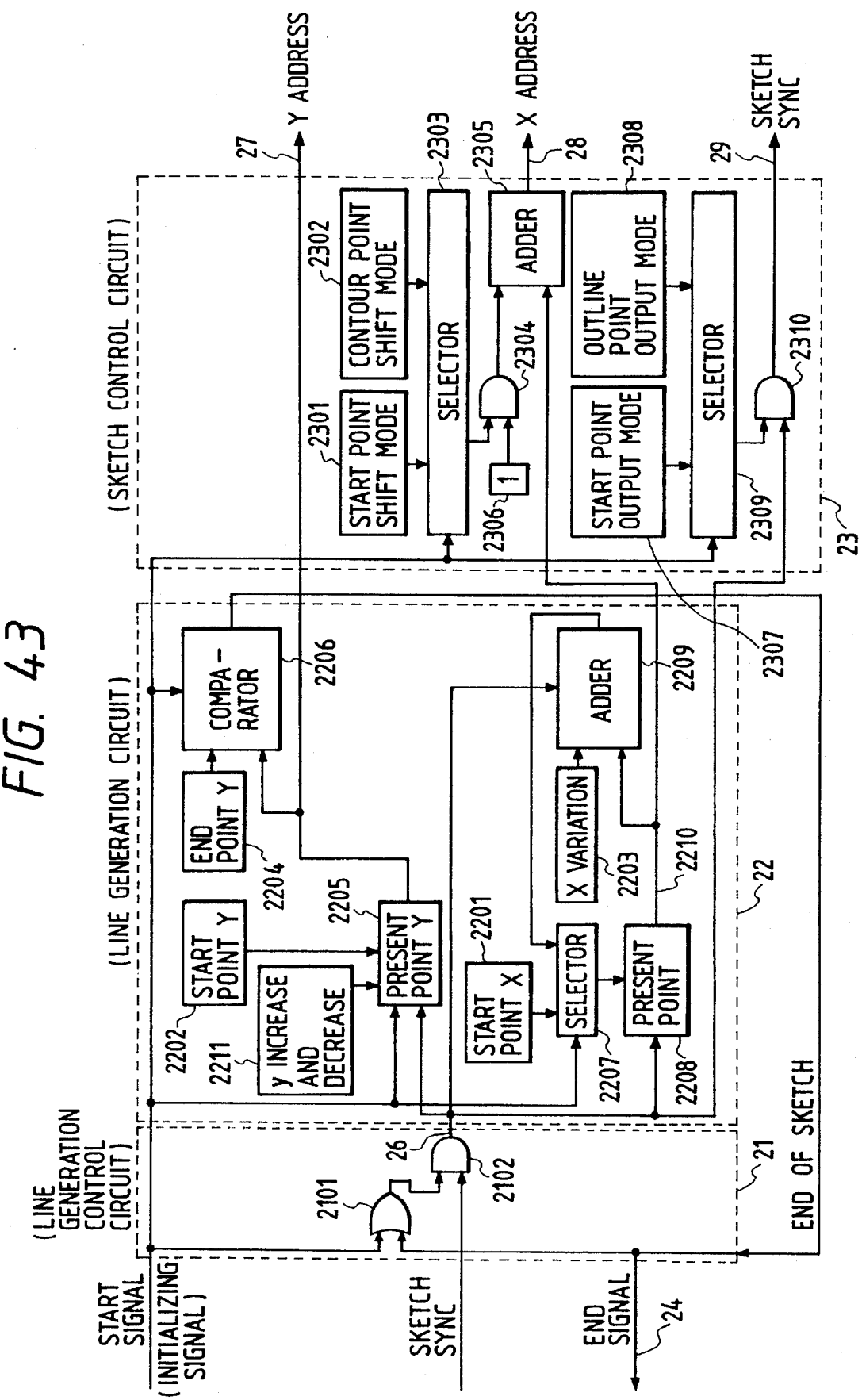
FIG. 43 is a circuit diagram of the line sketch circuit.

FIG. 43 shows the schematic arrangement of the line sketch circuit 4 whose functional blocks are shown in FIG. 42.

The start signal 25 is a pulse signal which indicates "start" when it is at High level. The pulse width of the start signal 25 is properly set by an additional circuit (not shown). The CPU 1 supplies a signal serving as a trigger for this pulse signal. The end signal 24 is a signal which indicates an end state when it is at Low level. When the end signal 24 is at High level, this means that the line sketch circuit is being operated. A logical sum of the start and end signals is output from an OR gate 2101.

When a sketch sync signal as a steadily generated clock supplied from an external circuit and having a predetermined period is controlled by an AND gate 2102 according to the output from the OR gate 2101, a sketch sync signal from the start point to the end point of the vector is generated. A buffer 2202 is set with the y coordinate value of the start point by the CPU 1. Similarly, a buffer 2204 is set with the y coordinate value of the end point, a buffer 2201 is set with the x coordinate value of the start point, and a buffer 2203 is set with the x increment. Upon reception of the start signal, an up-down counter 2205 loads the y coordinate value of the start point held in the buffer 2202 as an initial count value.

The up-down counter 2205 directly outputs the held count value onto a signal line 2210. A comparator 2206 operates in response to the start signal, and compares the output from the up-down counter 2205 with the y coordinate value of the end point held in the buffer 2204. When the comparator 2206 detects that the value held in the buffer 2204 is equal to the output value from the up-down counter 2205, it outputs a Low-level signal, and holds this level until it receives the next start signal. Otherwise, the comparator 2206 outputs a High-level signal.

The up-down counter 2205 performs a count-down or count-up operation in synchronism with a sketch sync signal 26, thereby updating the y address of a pixel to be sketched. Whether the up-down counter 2205 performs a count-down or count-up operation is determined according to a value held in a y increase and decrease buffer 2211, which is set by the CPU 1. When the buffer 2211 is set with a value "1", the count-up operation is performed; when it is set with "0", the count-down operation is performed. When "1" is set, this indicates that a downward vector is to be sketched, and when "0" is set, this indicates that an upward vector is to be sketched.

When a horizontal vector is to be sketched, either the value "1" or "0" may be set. In this case, however, the comparator 2206 does not output a High-level signal, and a sync signal for only one pixel upon input of the start signal is output from the gate 2102. As a result, the line sketch circuit 4 performs an operation for only the start point. A selector 2207 selects one of the x coordinate value of the start point held in the buffer 2201, and the output from an adder 2209 according to the start signal, and outputs the selected value.

More specifically, only when the start signal is input, the selector 2207 selects and outputs the output from the buffer 2201; otherwise, it selects and outputs the output from the adder 2209. A latch 2208 latches the output from the selector 2207 in synchronism with the sketch sync signal 26, and outputs the latched value as the x coordinate value of a point to be 10 plotted at the present timing. The adder 2209 calculates and outputs the sum of the output from the latch 2208 and the x increment held in the buffer 2203. In this manner, the x address of a pixel to be sketched is updated in synchronism with the sketch sync signal 26. A buffer 2301 is written with information indicating whether the start point of the vector is sketched at a pixel position on the vector or at a right neighboring pixel position, by the CPU 1, and outputs this value to a selector 2303.

A buffer 2302 is written with information indicating whether contour points other than the start point on the vector are plotted at pixel positions on the vector or at right neighboring pixel positions, by the CPU 1, and outputs this value to the selector 2303. When each of the buffers 2301 and 2302 holds "0", this means that points are plotted at pixel positions on the vector. When each of the buffers 2301 and 2302 holds "1", this means that points are plotted at right neighboring pixel positions. Only when the start signal is input, the selector 2303 selects and outputs the output from the buffer 2301; otherwise, it selects and outputs the output from the buffer 2302.

An AND gate 2304 outputs a logical sum of the output from the selector 2303, and a predetermined value "1". An adder 2305 adds an output value 2210 from the latch 2208 and the output from the AND gate 10 2304 to generate and output an x coordinate value 28 of an output point. A buffer 2307 is written by the CPU 1 with information indicating whether or not the start point of the vector is plotted, and outputs this value to a selector 2309. A buffer 2308 is written by the CPU 1 with information indicating whether or not contour points other than the start point on the vector are plotted, and outputs this value to the selector 2309. When each of these buffers holds "0", this means that points are not plotted; when they holds "1", this means that points are plotted.

Only when the start signal is input, the selector 2309 selects and outputs the output from the buffer 2307; otherwise, it selects and outputs the output from the buffer 2308. An AND gate 2310 calculates a logical sum of the output from the selector 2309 and the sketch sync signal 26 to generate a sketch sync signal 29 for the corresponding pixel. The timings of the signals 27, 28, and 29 generated in this manner are adjusted by an additional circuit (not shown), and these signals are respectively output as X address, Y address, and write signals for a plot position on the page memory 3. In the page memory 3, the additional circuit (not shown) writes a value obtained by EX-ORing a value held at an address determined by the X address signal 27 and the Y address signal 28, and a constant "1" at that address (read modify write), thereby sketching a paint out contour.

After the paint out contour is sketched on the page memory 3, the CPU 1 enables the sync control circuit 6 to generate paint out data. An operation for generating a painted out image according to this embodiment will be described below with reference to FIGS. 37, 38, and 39.

When the sync control circuit 6 is enabled by the CPU 1 to generate a painted out image, it fixes the signal line 12-2 (FIG. 37) at High level to set the paint out circuit to output painted out data, and generates the above-mentioned page sync signal, scan line sync signal, and pixel sync signal shown in FIGS. 38 and 39.

The sync control circuit 6 sets the page memory to output data to be held at an address obtained by counting a sync signal by an additional circuit (not shown) to the paint out circuit 5 through the signal line 10. The page sync signal, scan sync signal, and pixel sync signal are supplied to the page memory 3 and the paint out circuit 5 through the signal lines 12. The address generation additional circuit (not shown) of the page memory 3 is reset in response to the page sync signal, generates a sub scan position by counting the scan line sync signal, and generates a main scan position by counting the pixel sync signal.

The count value of the pixel sync signal is reset in response to each scan line sync signal. The paint out circuit fetches the output 10 from the page memory 3 in synchronism with the pixel sync signal, and causes a gate 501 to EX-OR the fetched value and the output from a latch 503. The paint out circuit then causes a gate 502 to logically AND the EX-ORed result and a value supplied from the signal line 12-2, and outputs the AND result as painted out image data onto the signal line 11. The data output onto the signal line 11 is held in the latch 503 as previous pixel data. The latch 503 is reset to "0" in response to the scan sync signal.

In this manner, data on the page memory 3 are raster-scanned in synchronism with the sync signal, so that these data are output as "1" from an odd-numbered "1" appearance timing in single raster data to a timing immediately before the next even-numbered "1" appearance timing, and are output as "0" at other timings. Thus, painted out pixel data are generated as raster-scanned data in synchronism with the sync signal.

The present invention has been described with reference to the 10th embodiment.

The contour sketch rules adopted in this embodiment are as shown in FIG. 45. The explanation has been given under an assumption that a clockwise contour is raster-scanned, i.e., is main-scanned in the left-to-right direction, and is sub-scanned in the up-to-down direction. However, the present invention is not limited to such an assumption.

<Description of 11th Embodiment>

Counterclockwise contour data may adopt rules shown in FIG. 46. More specifically, when a present outline vector is a horizontal vector, i.e., is a rightward or leftward vector (case Nos. 21 to 28 in FIG. 46), contour points other than a start point are not plotted regardless of the direction and x increment of a preceding outline vector.

At this time, when the present outline vector has the same direction as that of the preceding outline vector, i.e., when both the present and preceding vectors are rightward vectors (case No. 21) or are leftward vectors (case No. 26), the start point is not plotted. When the preceding vector is a downward vector, and the present vector is a rightward vector (case No. 23), and when the preceding vector is an upward vector, and the present vector is a leftward vector (case No. 28), the start point is not plotted, either.

When the preceding vector is a leftward vector, and the present vector is a rightward vector (case No. 22), and when the preceding vector is a downward vector, and the present vector is a leftward vector (case No. 27), the start point is plotted at a pixel position address of the start point. When the preceding vector is an upward vector, and the present vector is a rightward vector (case No. 24), and when the preceding vector is a rightward vector, and the present vector is a leftward vector (case No. 25), the start point is plotted at a right neighboring pixel position address of the pixel position of the start point.

Cases (case Nos. 29 to 38) will be described below wherein the present outline vector is a non-horizontal vector. When the present outline vector is a downward vector (case Nos. 29 to 33), contour points other than the start point are plotted at pixel position addresses along the present outline vector regardless of the direction and x increment of the preceding outline vector.

When the present outline vector is an upward vector (case Nos. 34 to 38), contour points other than the start points are plotted at right neighboring pixel position addresses of positions along the present outline vector regardless of the direction and x increment of the preceding outline vector. As for the start point, when the present outline vector is a non-horizontal vector, if the present and preceding vectors have the same direction, i.e., when both the present and preceding vectors are downward vectors (case No. 31) or are upward vectors (case No. 38), the start point is not plotted like in the case wherein the present vector is a horizontal vector.

When the preceding vector is a rightward vector, and the present vector is a downward vector (case No. 29), and when the preceding vector is a leftward vector, and the present vector is an upward vector (case No. 35), the start point is not plotted, either. When the preceding vector is a leftward vector, and the present vector is a downward vector (case No. 30), the start point is plotted at the pixel position address of the start point. When the preceding vector is an upward vector, and the present vector is a downward vector (case Nos. 32 and 33), if the sum of the x increments of the preceding and present vectors is positive (case No. 32), the start point is plotted at the right neighboring pixel position address of the pixel position of the start address; if it is 0 or negative (case No. 33), the start point is plotted at the pixel position address of the start point.

When the preceding vector is a rightward vector, and the present vector is an upward vector (case No. 34), the start point is plotted at the right neighboring pixel position address of the pixel position of the start point. When the preceding vector is a downward vector, and the present vector is an upward vector (case Nos. 36 and 37), if the sum of the x increments of the preceding and present vectors is 0 or positive (case No. 36), the start point is plotted at the right neighboring pixel position address of the pixel position of the start point; if it is negative (case No. 37), the start point is plotted at the pixel position address of the start point. These plot operations are executed by writing values obtained by EX-ORing values already set at the corresponding addresses, and a constant "1".

The cases of clockwise contour data (10th embodiment) and counterclockwise contour data (11th embodiment) have been described under an assumption that the main scan operation is performed in the left-to-right direction.

<Description of 12th Embodiment>

When the main scan operation is performed in a direction opposite to that described above, i.e., in the right-to-left direction, the paint out operation is ended at a contour point where the paint out operation is started in the above embodiments, and is started at a contour point where the paint out operation is ended in the above embodiments.

For this reason, in FIGS. 45 and 46, an EX-OR plot portion can be replaced with a pixel left-shift EX-OR plot portion, and a pixel right-shift EX-OR plot portion can be replaced with an EX-OR plot portion.

Thus, in paint out processing, the paint out operation is started from an odd-numbered contour line dot (which was an even-numbered contour line dot in the above embodiments since the scan direction is reversed) on a scan line, and the paint out section is ended at a position immediately before an even-numbered contour line pixel position (which was an odd-numbered contour line dot in the above embodiments since the scan direction is reversed).

As for the rules for all the above-mentioned examples, whether or not points other than the start point of the present outline vector are plotted is determined according to only the direction of the present vector. Whether points other than the start point of the present outline vector are not plotted, or are plotted at pixel positions on the vector, or are plotted at neighboring pixel positions in the main scan direction of the pixel positions on the vector is determined depending on whether the present outline vector is a horizontal vector, or an upward or downward vector.

As for the start point, whether or not the start point is not plotted, or is plotted at a pixel position on the vector, or is plotted at a neighboring pixel position in the main scan direction of the pixel position on the vector is determined according to the combination of the directions of the present and preceding vectors excluding a case wherein the present vector is a non-horizontal vector, and the preceding vector has a direction opposite to that of the present vector.

When the present vector is a non-horizontal vector, and the preceding vector has a direction opposite to that of the present vector, whether the start point is plotted at a pixel position on the vector, or is plotted at a neighboring pixel position in the main scan direction of the pixel position on the vector is determined according to the sum of x increments of the preceding and present vectors.

<Description of 13th Embodiment>

In the above-mentioned rules, the reason why a sum of x increments is checked when a present vector is a non-horizontal vector, and a preceding vector has a direction opposite to that of the present vector (i.e., the preceding vector is also a non-horizontal vector, and has a direction opposite to that of the present vector) is to discriminate whether the start point of the present vector corresponds to a projected or recessed top in a closed figure. The rules are set, so that the top pixel is set to be a black pixel according to this discrimination result.

However, when the distortion of this top is allowed independently of the projected or recessed top in a closed figure, x increment data need not be managed, and discrimination processing of the contour point sketch rules can be facilitated.

<Description of 14th Embodiment>

In the above embodiments, contour lines are sketched by using the line sketch circuit. However, the present invention is not limited to this. For example, the line sketch operation itself may be directly executed by the CPU 1 itself.

<Description of 15th Embodiment>

In the above embodiments, the present invention is arranged for a printer. However, the present invention is not limited to this, but may be applied to a display device.

<Description of 16th Embodiment>

In the above embodiments, contour data does not include a vector whose start and end points have the same coordinate values in a closed loop. Even when such a vector is included, it may be ignored in processing of vectors in a closed loop, and the processing for the next vector may be performed without updating an x increment.

<Description of 17th Embodiment>

The operation of this embodiment will be described below with reference again to the flow chart shown in FIG. 35. When the CPU 1 starts its processing in step S1, the flow advances to step S2. In step S2, the CPU 1 resets the page memory 3. At this time, the CPU 1 controls the paint out circuit 5 to output predetermined data to the page memory through the sync control circuit 6, and causes the sync control circuit 6 to write the predetermined data in the page memory 3 for one frame, thereby resetting the page memory.

FIG. 37 shows an arrangement of the paint out circuit 5. As has been described in the 10th embodiment, in step S2, the sync control circuit 6 fixes a signal line 12-2 at Low level under the control of the CPU 1, so that an output 11 from the paint out circuit 5 is set at Low level. The sync control circuit 6 writes this output 11 in the page memory 3 in synchronism with the sync signal, thereby resetting the page memory 3 to all "0"s.

FIG. 38 is a timing chart showing the relationship between a page sync signal (Page Sync) indicating the head of one page, and a scan line sync signal (Line Sync) indicating the head of each scan line in the page, as has been described in the 10th embodiment. FIG. 39 shows the scan line sync signal (Line Sync) indicating the head of one scan line, a pixel sync signal (CLK) for giving a pixel data determination timing in one scan line, and pixel data. The reset operation is started in response to the page sync signal, and is carried out by sequentially updating memory addresses in response to the scan sync signal and the pixel sync signal by an additional circuit (not shown) of the page memory 3.

Upon completion of the reset operation of the page memory 3, the flow advances to step S3. In step S3, the CPU 1 checks through the I/O port 14 if an output instruction of an image is detected. If YES in step S3, the flow advances to step S4; otherwise, the CPU 1 waits for the output instruction.

In step S4, paint out contour data is input from an external circuit or an auxiliary storage device (not shown) to the RAM area 2 through the I/O port 14. The flow then advances to step S5, and the CPU 1 controls the line sketch circuit 4 according to rules described in FIG. 52, thereby sketching a paint out contour on the page memory 3.

The flow then advances to step S6 to check through the I/O port 7 if the printer is ready. If YES in step S6, the flow advances to step S7; otherwise, the CPU 1 waits for until the printer is ready. In step S7, the CPU 1 controls the sync control circuit 6 to read out the paint out contour image on the page memory 3, and causes the paint out circuit 5 to output a binary painted out image onto a signal line 11.

The paint out contour sketch processing in step S5 will be described in detail below.

Figure 47:
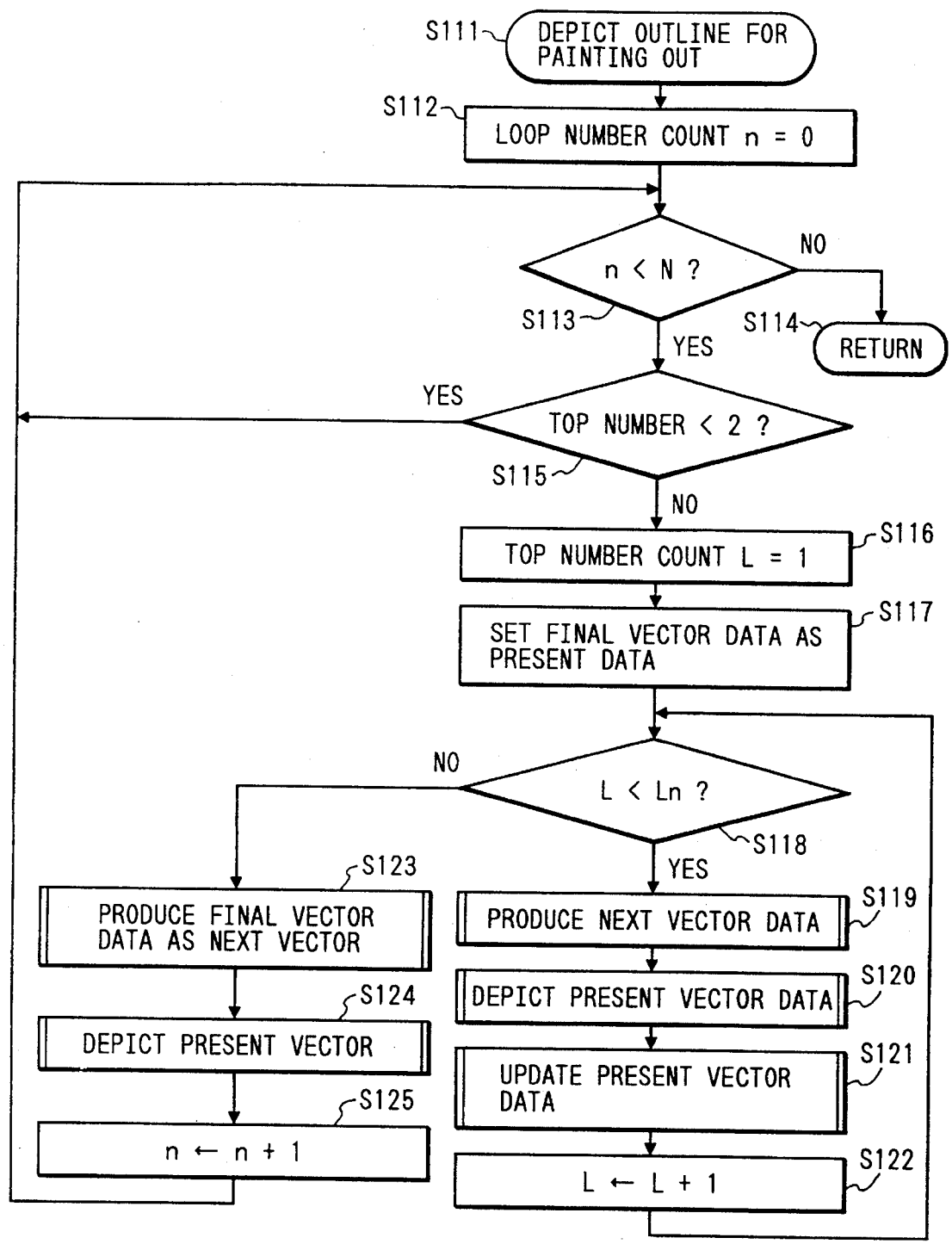
FIG. 47 is a flow chart for explaining a paint out contour sketch routine.

FIG. 47 is a flow chart showing the paint out contour sketch processing in step S5. When the CPU 1 starts contour sketch processing in step S111, it initializes a register for holding the number n of processed closed loops to 0 in step S112. The flow then advances to step S113. Note that contour data is held in the RAM area 2 in the format shown in FIG. 33, as described above. In step S113, the CPU 1 compares the number N of closed loops included in the contour data with the number n of processed loops to check if N is larger than n.

If YES in step S113, the CPU 1 determines that non-processed loops remain, and the flow advances to step S115. Otherwise, the CPU 1 determines that there is no non-processed loop, and the flow advances to step S114 to end the contour sketch processing. In step S115, the CPU 1 checks if the number $L_i$ of tops in a loop (assume that n=i now) i indicated by the number n of processed loops is smaller than 2. If YES in step S115, the CPU 1 determines that there is no top to be processed as a closed loop, and the flow returns to step S113. Otherwise, the flow advances to step S116.

In step S116, the CPU 1 initializes a register for holding the number L of processed tops to 1, and the flow then advances to step S117. In step S117, the CPU 1 generates present vector data as vector data to be processed first in step S118 and subsequent steps on the basis of final vector data. More specifically, assuming that an ith loop includes Li tops, the CPU 1 determines, as a present vector, a vector having a top represented by coordinates ($xi_{Li-1}$, $yi_{Li-1}$) as a start point, and a top represented by coordinates ($xi_0$, $yi_0$) as an end point, checks if the present vector is an upward, downward, rightward, or leftward vector, and stores the checking result in the working area on the RAM 2. In addition, the CPU 1 stores a change $(xi_0-xi_{Li-1})/|yi_0-yi_{Li-1}|$ in the x direction when the top Li-1 Li-1 position is changed from the start point toward the end point by a unit length in the y direction along the vector.

In the coordinate system shown in FIG. 32, an upward vector means that the y coordinate value of the end point is smaller than the y coordinate value of the start point, and a downward vector means that the y coordinate value of the start point is smaller than the y coordinate value of the end point (or vice versa when the direction of the y-axis is reversed). When the start and end points have an equal y coordinate value, and the x coordinate value of the start point is smaller than the x coordinate value of the end point, a rightward vector is determined, and when the x coordinate value of the end point is smaller than the x coordinate value of the start point, a leftward vector is determined (or vice versa when the direction of the x-axis is reversed). When the coordinate values of the start point are the same as those of the end point, since these points indicate the same point, pre-processing is performed, so that such a vector is not present.

When the present vector data is set in this manner, the flow advances to step S118. In step S118, the CPU 1 checks if the number L of processed tops is smaller than the number $L_i$ of tops in a loop. If YES in step S118, the CPU 1 determines that non-processed tops remain, and the flow advances to step S119; otherwise, the CPU 1 determines that the processing is ended up to the final point in a top coordinate table, and the flow advances to step S123 to execute processing for a vector having the final point in the top coordinate table of this closed loop as a start point, and the first point in the table as an end point. In step S119, if a value held by the processed top counter L at that time is j, the CPU 1 pays attention to a vector having a (j-1)th top as a start point and a jth top as an end point, and calculates the direction of this vector (to be referred to as a subsequent or next vector hereinafter), and a change in the x direction (to be referred to as an x increment hereinafter) when the top position is changed from the start point toward the end point by a unit length along the vector in the y direction in the same manner as in step S117. Thereafter, the flow advances to step S120.

In step S120, the CPU 1 controls the line sketch circuit 4 to perform a contour sketch operation for paint out processing according to the rules shown in FIG. 52 using the direction and x increment of the present vector, and the direction and x increment of the next vector held in the working area on the RAM 2. The details of this operation will be described later.

Upon completion of the contour sketch operation of the next vector, the flow advances to step S121. In step S121, the direction and x increment of the next vector used in step S120 are updated as the direction and x increment of the present vector, and they are stored on the working area on the RAM 2. In step S122, the value held by the processed top count register is incremented by one, and the flow returns to step S118. In step S123, a vector having the final point in the top coordinate table of this closed loop as a start point, and the first point in the table as an end point is determined as the next vector, and its direction and x increment are generated. Thereafter, the flow advances to step S124.

In step S124, the CPU 1 controls the line sketch circuit 4 to perform the paint out contour sketch operation according to the rules shown in FIG. 45 on the basis of the direction and x increment of the present vector, and the direction and x increment of the next vector in the same manner as in step S120. Thereafter, the flow advances to step S125. In step S125, processing for this closed loop is ended, and the value held by the non-processed loop count register is incremented by one. Thereafter, the flow returns to step S113.

The contour sketch operation for paint out processing executed in steps S120 and S124 will be described below. The CPU 1 executes this sketch processing according to the rules shown in FIG. 52 with reference to the direction and x increment of the present vector, and the direction and x increment of the next vector stored on the RAM 2.

The sketch operation is selectively controlled for one point on the coordinates of the end point of the present vector, and for contour points (including the end point) on the present vector up to the end point excluding the end point. The sketch operation of the points on a contour is controlled in a one-out-of-three selection manner for the end point and other contour points on the vector. That is, whether a point is sketched at an address on the page memory 3 corresponding to coordinates of each point to be sketched, or is sketched at a right neighboring pixel address on the x-axis, or is not sketched is selected. If it is selected that a point is sketched (or plotted), when the point is sketched at a position address along the vector or is sketched at a right neighboring pixel address, an EX-ORed result between a value written at the corresponding address in advance and "1" is written at the address as a new value.

More specifically, when a value written at the address is "0", "1" is written; when it is "1", "0" is written. When the present outline vector is a horizontal vector, i.e., is a rightward or leftward vector (case Nos. 1 to 8 in FIG. 52), contour points other than the end point are not sketched regardless of the direction and x increment of the next outline vector.

At this time, when the direction of the present vector is the same as that of the next vector, i.e., when both the present and next vectors are rightward vectors (case No. 1) or are leftward vectors (case No. 6), the end point is not plotted. When the next vector is a downward vector, and the present vector is a rightward vector (case No. 3), and when the next vector is an upward vector, and the present vector is a leftward vector (case No. 8), the end point is not plotted, either. When the next vector is a leftward vector, and the present vector is a rightward vector (case No. 2), and when the next vector is a downward vector, and the present vector is a leftward vector (case No. 7), the end point is plotted at a right neighboring pixel position address of the pixel position of the end point. When the next vector is an upward vector, and the present vector is a rightward vector (case No. 4), and when the next vector is a rightward vector, and the present vector is a leftward vector (case No. 5), the end point is plotted at the pixel position address of the end point.

Cases (case Nos. 9 to 18) wherein the present vector is a non-horizontal vector will be described below. When the present outline vector is a downward vector (case Nos. 9 to 13), contour points other than the end points are plotted at right neighboring pixel positions of the positions along the present outline vector regardless of the direction and x increment of the next outline vector. When the present outline vector is an upward vector (cases Nos. 14 to 18), contour points other than the end point are plotted at the pixel position addresses along the present outline vector regardless of the direction and x increment of the next vector.

As for the end point, when the present outline vector is a non-horizontal vector, if the present and next vectors have the same direction, i.e., if both the present and next vectors are downward vectors (case No. 11) or are upward vectors (case No. 18), the end point is not plotted like in the case wherein the present vector is a horizontal vector.

When the next vector is a rightward vector, and the present vector is a downward vector (case No. 9), and when the next vector is a leftward vector, and the present vector is an upward vector (case No. 15), the end point is not plotted, either. When the next vector is a leftward vector, and the present vector is a downward vector (case No. 9), the end point is plotted at a right neighboring pixel position address of the position of the end point. When the next vector is an upward vector, and the present vector is a downward vector (case Nos. 12 and 13), if the sum of the x increments of the next and present vectors is 0 or positive (case No. 12), the end point is plotted at the pixel position address of the end point; if it is negative (case No. 13), the end point is plotted at a right neighboring pixel position address of the position of the end point.

When the next vector is a rightward vector, and the present vector is an upward vector (case No. 14), the end point is plotted at the pixel position address of the end point. When the next vector is a downward vector, and the present vector is an upward vector (case Nos. 16 and 17), if the sum of the x increments of the next and present vectors is positive (case No. 16), the end point is plotted at the pixel position address of the end point; if it is 0 or negative (case No. 17), the end point is plotted at a right neighboring pixel position address of the position of the end point.

Figure 48:
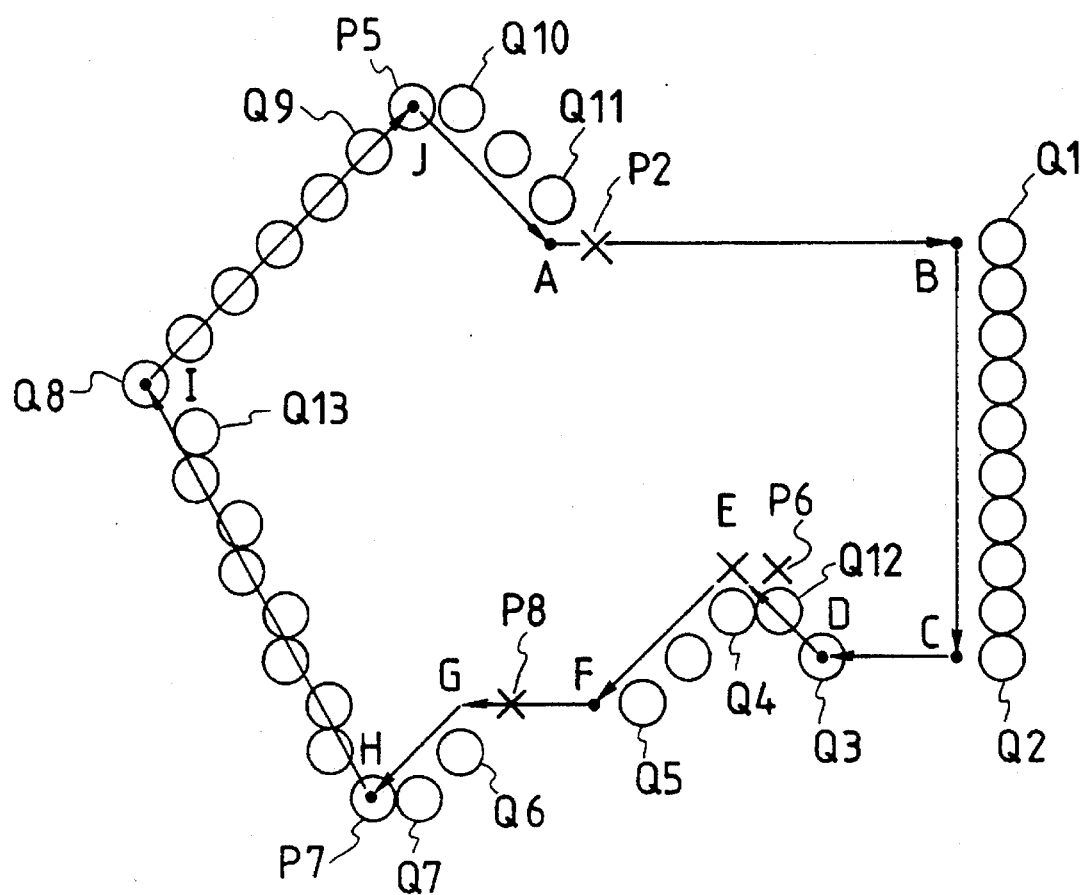
FIG. 48 is a view showing a sketch result of a paint out contour obtained by the present invention.

FIG. 48 shows a paint out contour sketch result obtained by applying the rules shown in FIG. 52 to the example shown in FIG. 32. In FIG. 32, if a contour vector AB is determined as a next vector, a present vector is a vector JA. The vector JA is a downward vector, and has an x increment of 1. The vector AB is a rightward vector, and has an x increment of ∞. This case corresponds to the case No. 9. In this case, points are plotted at positions between Q10 and Q11, and no point is plotted at a position P2. Next, the present vector is the vector AB, and the next vector is a vector BC. This case corresponds to the case No. 3. In this case, neither the end point nor points other than the end point are plotted. Thereafter, when the vector BC is the present vector, this case corresponds to the case No. 10, and points are plotted at right neighboring pixel positions of the vector BC between Q1 and Q2. When a vector CD is the present vector, this corresponds to the case No. 8, and no point is plotted. When a vector DE is the present vector, the present vector is an upward vector, and has an x increment of '1. The next vector EF is a downward vector, and has an x increment of −1. Therefore, this case corresponds to the case No. 17, and points are plotted at position Q12 and P6.

When a vector EF is the present vector, this corresponds to the case No. 10, and points are plotted at a position P6, and positions between Q4 and Q5. Since one point has already been plotted at the position P6 in the processing of the vector DE, this position is reset to 0 at this time. When a vector FG is the present vector, this case corresponds to the case No. 7, and a point is plotted at a position P8. When a vector GH is the present vector, the present vector GH is a downward vector, and has an x increment of −1. In this case, the next vector is an upward vector, and has an x increment of −5/9. This case corresponds to the case No. 13, and points are plotted at P8, Q6, and Q7. Since the position P8 has already become "1" in the processing of the vector FG, it is reset to "0" in this case. When a vector HI is the present vector, this case corresponds to the case No. 18, and points are plotted at positions between P7 and Q13 along the vector HI. When a vector IJ is the present vector, the present vector IJ is an upward vector, and has an x increment of +1. The next vector JA is a downward vector, and has an x increment of +1. Therefore, this case corresponds to the case No. 16, and points are plotted at positions between Q8 and Q9, and at a position P5. When the vector JA is the present vector, this case corresponds to the case No. 9, and a series of pixels are plotted at their right neighboring address positions along the vector JA between positions Q10 and Q11. In this case, no pixel is plotted at a position P2.

FIG. 41 shows an image obtained by raster-scanning the paint out contour obtained in this manner so as to determine that a section between an odd-numbered "1" pixel position appearing on the horizontal scan line, and a position immediately before the next even-numbered "1" pixel position is a paint out section, and remaining sections are non-paint out sections. The image obtained in FIG. 41 can reproduce an inner area surrounded by the contour vectors without causing any distortion.

Figure 49:
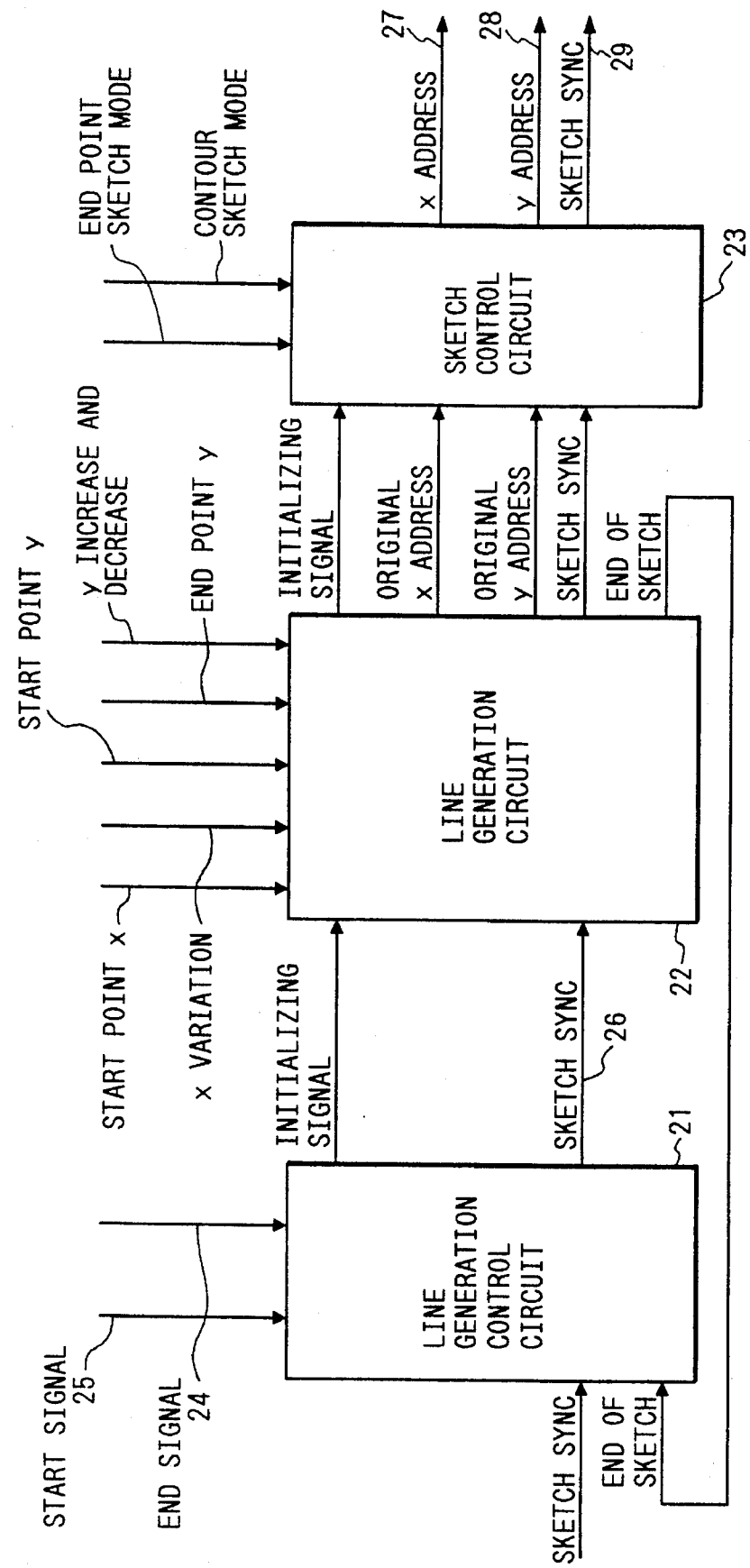
FIG. 49 is a functional block diagram of a line sketch circuit.

The line sketch circuit 4 will be described below. FIG. 49 is a functional block diagram of the line sketch circuit 4. The line sketch circuit 4 is constituted by three sections, i.e., a line generation control circuit 21, a line generation circuit 22, and a sketch control circuit 23. The line sketch circuit 4 is controlled by the CPU 1 every time an outline vector is sketched, thereby line-sketching outline vectors one by one.

Figure 51:
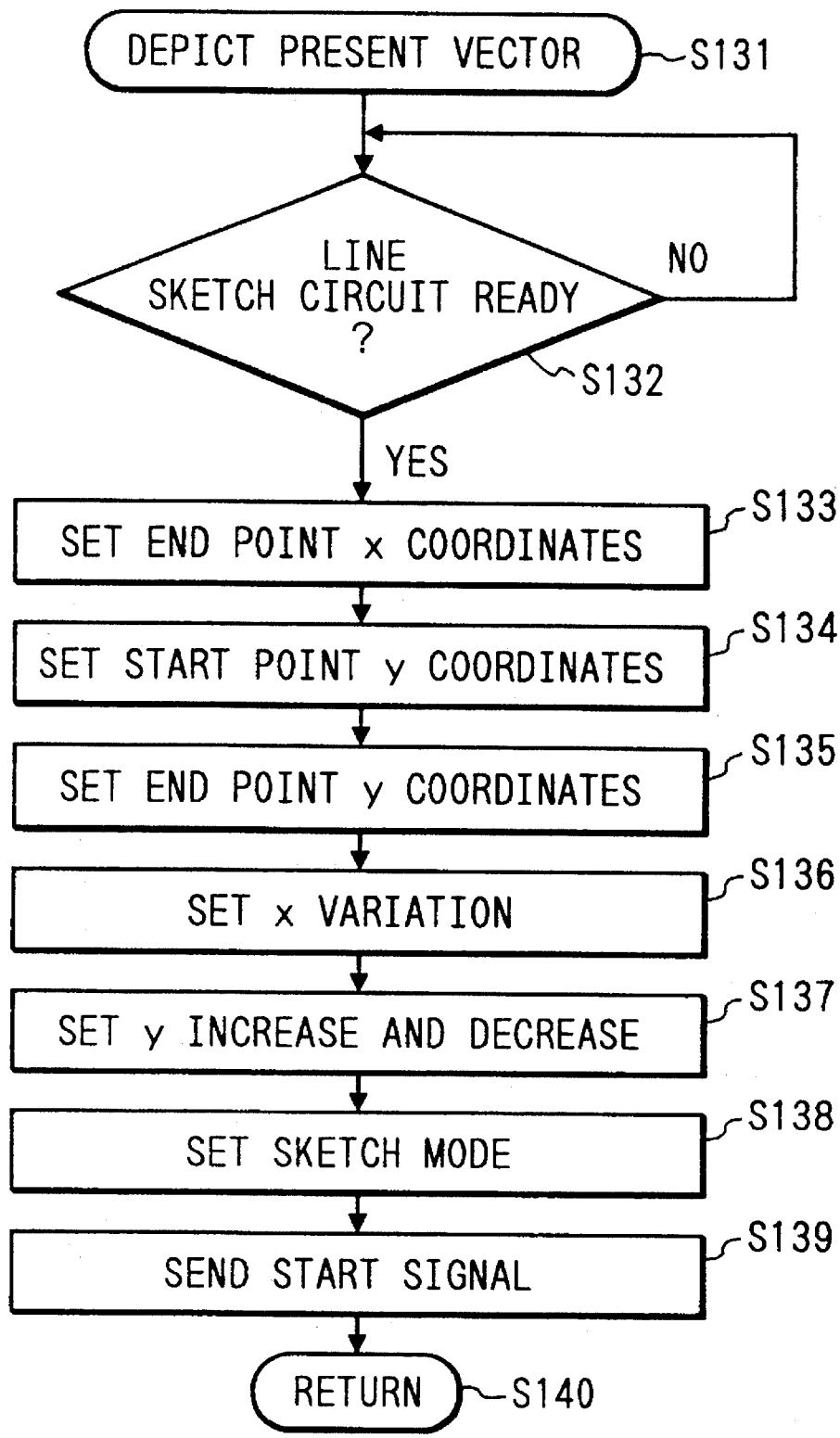
FIG. 51 is a flow chart for explaining a present vector sketch routine.

The line sketch operation is performed in the present vector sketch routine in steps S120 and S124 in FIG. 47. FIG. 51 shows details of this routine. When this routine is started in step S131, the flow advances to step S132. In step S132, an end signal 24 output from the line generation control circuit 21 is monitored to check if the line sketch circuit completes the previous processing, and is ready for the next processing. If YES1 in step S132, the flow advances to step S133; otherwise, the control waits for until the line sketch circuit is ready. In step S133, the x coordinate value of the end point of a vector to be sketched is set in the line generation circuit 22, and the flow advances to step S134.

In step S134, the y coordinate value of the start point of the vector to be sketched is set in the line generation circuit 22, and the flow advances to step S135. In step S135, the y coordinate value of the end point of the vector to be sketched is set in the line generation circuit 22, and the flow advances to step S136. In step S136, the x increment is set, and the flow advances to step S137. In step S137, whether the count of the y coordinate value is up or down is set, and the flow advances to step S138. In step S138, a total of 4-bit data, i.e., 2-bit data indicating whether or not the end point and points on the contour (contour points) other than the end point are to be plotted (to be referred to as an output mode hereinafter), and 2-bit data indicating whether a pixel is plotted at a pixel address corresponding to the position on the contour or is plotted at a right neighboring pixel address (to be referred to as a shift mode hereinafter) (these 2-bit data will be respectively referred to as an end point sketch mode and a contour point sketch mode hereinafter) are set in the sketch control circuit 23, and the flow then advances to step S139.

In step S139, a start signal 25 is supplied to the line generation circuit 21, and the flow then advances to step S140. In step S136, the control returns to the routine shown in FIG. 47. As described above, upon reception of the start signal 25, the initialized line sketch circuit 4 starts its operation.

Figure 50:
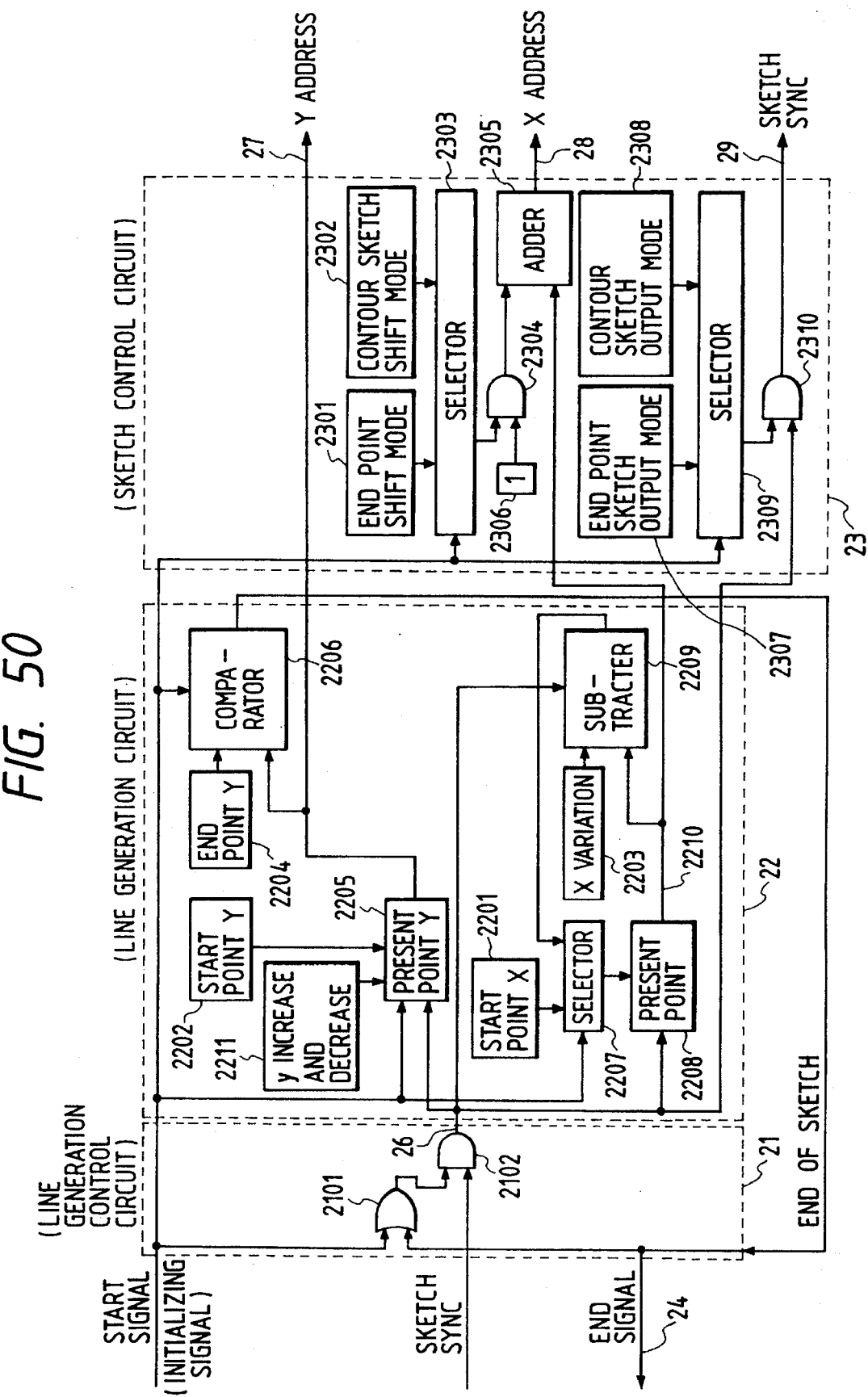
FIG. 50 is a circuit diagram of the line sketch circuit.

FIG. 50 shows the schematic arrangement of the line sketch circuit 4 whose functional blocks are shown in FIG. 49.

The start signal 25 is a pulse signal which indicates "start" when it is at High level. The pulse width of the start signal 25 is properly set by an additional circuit (not shown). The CPU 1 supplies a signal serving as a trigger for this pulse signal. The end signal 24 is a signal which indicates an end state when it is at Low level. When the end signal 24 is at High level, this means that the line sketch circuit is being operated. A logical sum of the start and end signal is output from an OR gate 2101.

When a sketch sync signal as a steadily generated clock supplied from an external circuit and having a predetermined period is controlled by an AND gate 2102 according to the output from the OR gate 2101, a sketch sync signal from the start point to the end point of the vector is generated. A buffer 2202 is set with the y coordinate value of the end point by the CPU 1. Similarly, a buffer 2204 is set with the y coordinate value of the start point, a buffer 2201 is set with the x coordinate value of the end point, and a buffer 2203 is set with the x increment. Upon reception of the start signal, an up-down counter 2205 loads the y coordinate value of the end point held in the buffer 2202 as an initial count value.

The up-down counter 2205 directly outputs the held count value onto a signal line 2210. A comparator 2206 operates in response to the start signal, and compares the output from the up-down counter 2205 with the y coordinate value of the start point held in the buffer 2204. When the comparator 2206 detects that the value held in the buffer 2204 is equal to the output value from the up-down counter 2205, it outputs a Low-level signal, and holds this level until it receives the next start signal. Otherwise, the comparator 2206 outputs a High-level signal.

The up-down counter 2205 performs a count-down or count-up operation in synchronism with a sketch sync signal 26, thereby updating the y address of a pixel to be sketched. Whether the up-down counter 2205 performs a count-down or count-up operation is determined according to a value held in a y increase and decrease buffer 2211, which is set by the CPU 1. When the buffer 2211 is set with a value "1", the count-up operation is performed; when it is set with "0", the count-down operation is performed. When "1" is set, this indicates that an upward vector is to be sketched, and when "0" is set, this indicates that a downward vector is to be sketched. Each edge is plotted on the memory from the end point side toward the start point side.

When a horizontal vector is to be sketched, either the value "1" or "0" may be set. In this case, however, the comparator 2206 does not output a High-level signal, and a sync signal for only one pixel upon input of the start signal is output from the gate 2102. As a result, the line sketch circuit 4 performs an operation for only the end point. A selector 2207 selects one of the x coordinate value of the end point held in the buffer 2201, and the output from a subtracter 2209 according to the start signal, and outputs the selected value.

More specifically, only when the start signal is input, the selector 2207 selects and outputs the output from the buffer 2201; otherwise, it selects and outputs the output from the subtracter 2209. A latch 2208 latches the output from the selector 2207 in synchronism with the sketch sync signal 26, and outputs the latched value as the x coordinate value of a point to be plotted at the present timing. The subtracter 209 calculates and outputs the difference of the output from the latch 2208 and the x increment held in the buffer 2203. In this manner, the x address of a pixel to be sketched is updated in synchronism with the sketch sync signal 26. A buffer 2301 is written with information indicating whether the start point of the vector is sketched at a pixel position on the vector or at a right neighboring pixel position, by the CPU 1, and outputs this value to a selector 2303.

A buffer 2302 is written with information indicating whether contour points other than the start point on the vector are plotted at pixel positions on the vector or at right neighboring pixel positions, by the CPU 1, and outputs this value to the selector 2303. When each of the buffers 2301 and 2302 holds "0", this means that points are plotted at pixel positions on the vector. When each of the buffers 2301 and 2302 holds "1", this means that points are plotted at right neighboring pixel positions. Only when the start signal is input, the selector 2303 selects and outputs the output from the buffer 2301; otherwise, it selects and outputs the output from the buffer 2302.

An AND gate 2304 outputs a logical sum of the output from the selector 2303, and a predetermined value "1". An adder 2305 adds an output value 2210 from the latch 2208 and the output from the AND gate 2304 to generate and output an x coordinate value 28 of an output point. A buffer 2307 is written by the CPU 1 with information indicating whether or not the end point of the vector is plotted, and outputs this value to a selector 2309. A buffer 2308 is written by the CPU 1 with information indicating whether or not contour points other than the end point on the vector are plotted, and outputs this value to the selector 2309. When each of these buffers holds "0", this means that points are not plotted; when they holds "1", this means that points are plotted.

Only when the start signal is input, the selector 2309 selects and outputs the output from the buffer 2307; otherwise, it selects and outputs the output from the buffer 2308. An AND gate 2310 calculates a logical sum of the output from the selector 2309 and the sketch sync signal 26 to generate a sketch sync signal 29 for the corresponding pixel.

The timings of the signals 27, 28, and 29 generated in this manner are adjusted by an additional circuit (not shown), and these signals are respectively output as x address, y address, and write signals for a plot position on the page memory 3. In the page memory 3, the additional circuit (not shown) writes a value obtained by EX-ORing a value held at an address determined by the x address signal 27 and the y address signal 28, and a constant "1" at that address (read modify write), thereby sketching a paint out contour.

After the paint out contour is sketched on the page memory 3, the CPU 1 enables the sync control circuit 6 to generate paint out data. An operation for generating a painted out image according to this embodiment has already been described above with reference to FIGS. 47, 48, and 49, and a detailed description thereof will be omitted.

The contour sketch rules adopted in this embodiment are as shown in FIG. 52. The explanation has been given under an assumption that a clockwise contour is raster-scanned, i.e., is main-scanned in the left-to-right direction, and is sub-scanned in the up-to-down direction. However, the present invention is not limited to such an assumption.

<Description of 18th Embodiment>

Counterclockwise contour data may adopt rules shown in FIG. 53. More specifically, when a present outline vector is a horizontal vector, i.e., is a rightward or leftward vector (case Nos. 19 to 26), contour points other than an end point are not plotted regardless of the direction and x increment of a next outline vector.

At this time, when the present outline vector has the same direction as that of the preceding outline vector, i.e., when both the present and next vectors are rightward vectors (case No. 19) or are leftward vectors (case No. 24), the end point is not plotted. When the next vector is a downward vector, and the present vector is a leftward vector (case No. 23), and when the next vector is an upward vector, and the present vector is a rightward vector (case No. 22), the end point is not plotted, either.

When the next vector is a downward vector, and the present vector is a rightward vector (case No. 21), and when the next vector is a rightward vector, and the present vector is a leftward vector (case No. 23), the end point is plotted at the pixel position address of the end point. When the next vector is an upward vector, and the present vector is a leftward vector (case No. 26), and when the next vector is a leftward vector, and the present vector is a rightward vector (case No. 20), the end point is plotted at a right neighboring pixel position address of the pixel position of the end point.

Cases wherein the present outline vector is a non-horizontal vector (case Nos. 27 to 36) will be described below. When the present outline vector is a downward vector (case Nos. 27 to 31), contour points other than the end point are plotted at pixel position addresses along the present outline vector regardless of the direction and x increment of the next outline vector.

When the present vector is an upward vector (case Nos. 32 to 36), contour points other than the end point are plotted at right neighboring pixel position addresses of positions along the present outline vector regardless of the direction and x increment of the next outline vector. As for the end point, when the present outline vector is a non-horizontal vector, if the present and next vectors have the same direction, i.e., if both the present and next vectors are downward vectors (case No. 29) or if they are upward vectors (case No. 36), the end point is not plotted like in the case wherein the present outline vector is a horizontal vector.

When the next vector is a leftward vector, and the present vector is a downward vector (case No. 28), and when the next vector is a rightward vector, and the present vector is an upward vector (case No. 32), the end point is not plotted, either. When the next vector is a rightward vector, and the present vector is a downward vector (case No. 27), the end point is plotted at the pixel position address of the end point. When the next vector is an upward vector, and the present vector is a downward vector (case Nos. 30 and 31), if the sum of the x increments of the next and present vectors is negative (case No. 31), the end point is plotted at a right neighboring pixel position address of the pixel position of the end point; if it is 0 or positive (case No. 30), the end point is plotted at the pixel position address of the end point.

When the next vector is a leftward vector, and the present vector is an upward vector (case No. 33), the end point is plotted at a right neighboring pixel position address of the pixel position of the end point. When the next vector is a downward vector, and the present vector is an upward vector (case Nos. 34 and 35), if the sum of the x increments of the next and present vectors is 0 or negative (case No. 35), the end point is plotted at a right neighboring pixel position address of the pixel position of the end point; if it is positive (case No. 34), the end point is plotted at the pixel position address of the end point. These plot operations are executed by writing values obtained by EX-ORing values already set at the corresponding addresses, and a constant "1".

The cases of clockwise contour data (17th embodiment) and counterclockwise contour data (11th embodiment) have been described under an assumption that the main scan operation is performed in the left-to-right direction.

<Description of 19th Embodiment>

When the main scan operation is performed in a direction opposite to that described above, i.e., in the right-to-left direction, the paint out operation is ended at a contour point where the paint out operation is started in the above embodiments, and is started at a contour point where the paint out operation is ended in the above embodiments.

For this reason, in FIGS. 52 and 53, an EX-OR plot portion can be replaced with a pixel left-shift EX-OR plot portion, and a pixel right-shift EX-OR plot portion can be replaced with an EX-OR plot portion.

Thus, in paint out processing, the paint out operation is started from an odd-numbered contour line dot (which was an even-numbered contour line dot in the above embodiments since the scan direction is reversed) on a scan line, and the paint out section is ended at a position immediately before an even-numbered contour line pixel position (which was an odd-numbered contour line dot in the above embodiments since the scan direction is reversed).

As for the rules for all the above-mentioned examples, whether or not points other than the end point of the present outline vector are plotted is determined according to only the direction of the present vector. Whether points other than the end point of the present outline vector are not plotted, or are plotted at pixel positions on the vector, or are plotted at neighboring pixel positions in the main scan direction of the pixel positions on the vector is determined depending on whether the present outline vector is a horizontal vector, or an upward or downward vector.

As for the end point, whether or not the end point is not plotted, or is plotted at a pixel position on the vector, or is plotted at a neighboring pixel position in the main scan direction of the pixel position on the vector is determined according to the combination of the directions of the present and next vectors excluding a case wherein the present vector is a non-horizontal vector, and the next vector has a direction opposite to that of the present vector.

When the present vector is a non-horizontal vector, and the next vector has a direction opposite to that of the present vector, whether the end point is plotted at a pixel position on the vector, or is plotted at a neighboring pixel position in the main scan direction of the pixel position on the vector is determined according to the sum of x increments of the next and present vectors.

<Description of 20th Embodiment>

In the above-mentioned rules, the reason why a sum of x increments is checked when a present vector is a non-horizontal vector, and a next vector has a direction opposite to that of the present vector (i.e., the next vector is also a non-horizontal vector, and has a direction opposite to that of the present vector) is to discriminate whether the start point of the present vector corresponds to a projected or recessed top in a closed figure. The rules are set, so that the top pixel is set to be a black pixel according to this discrimination result.

However, when the distortion of this top is allowed independently of the projected or recessed top in a closed figure, x increment data need not be managed, and discrimination processing of the contour point sketch rules can be facilitated by, e.g., plotting the end point in the same manner as contour points on the vector other than the end point.

<Description of 21st Embodiment>

In the above embodiments, contour lines are sketched by using the line sketch circuit. However, the present invention is not limited to this. For example, the line sketch operation itself may be directly executed by the CPU 1 itself.

<Description of 22nd Embodiment>

In the above embodiments, the present invention is arranged for a printer. However, the present invention is not limited to this, but may be applied to a display device.

<Description of 23rd Embodiment>

In the above embodiments, contour data does not include a vector whose start and end points have the same coordinate values in a closed loop. Even when such a vector is included, it may be ignored in processing of vectors in a closed loop, and the processing for the next vector may be performed without updating an x increment.

As described above, outline vectors directed as contour data are used, and cases are classified in consideration of the direction of each outline vector, and the direction of an outline vector immediately before the outline vector. In each case, whether or not a start point (or end point) of the vector, and points on the vector other than the start point (or end point) are not plotted, or are plotted, or are plotted at neighboring pixels positions in the main scan direction is controlled to sketch only contour lines by writing values obtained EX-ORing already set values and a constant. Thereafter, the contour line image is raster-scanned. In each raster-scan operation, a section between an intersection with an odd-numbered contour point (a pixel on this point is included) and an intersection with an even-numbered contour point (a pixel on this point is not included) is set as a paint out section. Thus, a complicated paint out figure can be easily generated at low cost without causing distortion.

<Description of 24th Embodiment>

An embodiment according to the present invention will be described below with reference to the accompanying drawings.

<Brief Description of Operation>

The operation of this embodiment will be briefly described below.

In this embodiment, a contour directed in a predetermined direction is used as a contour of a figure. More specifically, a contour of a figure to be processed is expressed as a group of outline vectors (line elements) contiguous in a clockwise direction of a timepiece, or a group of outline vectors contiguous in a counterclockwise direction. It can be considered that the outline vectors contiguous in the clockwise direction mean that a corresponding figure is painted out when portions on the right side of the outline vectors are painted out (FIG. 11). The outline vectors contiguous in the clockwise direction mean that a corresponding figure is painted out when portions on the left side of the outline vectors are painted out (FIG. 12).

In this embodiment, the direction and inclination of each outline vector are checked, and whether or not the two edge points of the vector, and points on the vector other than the two edge points are used in discrimination of a boundary point is discriminated on the basis of the direction and inclination of an outline vector immediately before the outline vector, and the direction and inclination of an outline vector immediately after the outline vector. Thereafter, whether a point is plotted at a corresponding pixel position on a memory or is plotted at a position adjacent by one pixel in the main scan direction is controlled depending on an odd- or even-numbered boundary discrimination edge intersecting a scan line in each scan operation. When a non-horizontal vector is to be sketched, one pixel is plotted per scan line.

Thereafter, data for one scan line is horizontally scanned to start a paint out operation from a pixel at an odd-numbered plot and to stop the paint out operation at an even-numbered plot.

<Description of Arrangement of Apparatus>

An image processing apparatus of this embodiment will be described in detail below.

FIG. 31 is a block diagram of an image processing apparatus applied to a raster-scan type video printer of this embodiment. In FIG. 31, a microprocessor (CPU) 1 is connected to a RAM (random-access memory) 2, a page memory 3, a line sketch circuit 4, a sync control circuit 6, and I/O ports 4 and 14 through a bus 9. Note that the control processing sequence of the CPU 1 is stored in its internal ROM (not shown) as a program. A paint out circuit 5 receives contour image data 10 output from the page memory 3 by a raster-scan operation according to a sync signal 12 from the sync control circuit 6, and outputs painted out image data 11. A printer 8 is interface-connected to the CPU 1 through the I/O port 7. The printer 8 is connected to a sync signal 13 from the sync control circuit 6, and the painted out image data 11 as a video interface.

Contour data is constituted by data indicating the number of closed loops included in an objective image, and a group of data each indicating the number of tops constituting each closed loop. The tops on each closed loop are expressed as a group of data which maintain the relationship of adjacent tops according to an order having a predetermined direction on the closed loop. This content is shown in FIG. 33.

As described above, in this embodiment, contour data is considered as a group of data aligned in a predetermined direction. FIG. 32 shows an example of clockwise outline data. The outline shown in FIG. 32 is expressed as a series of points which make a round in the order of A→B→C→D→E→F→G→H→I→J→A to have the point A as the start point. FIG. 34 shows contour data of this closed figure.

In the following description of this embodiment, assume that the origin of coordinates is present at the upper left corner of an image, the main scan direction (right direction) is defined as the x-axis, and the sub scan direction (downward direction) is defined as the y-axis. In addition, an outline is assumed to have a clockwise data expression. Note that the start point in each closed loop can be an arbitrary point on the loop.

<Description of Main Processing>

FIG. 35 shows the operation processing sequence of the CPU 1 of this embodiment, and the operation processing sequence will be described below.

When the CPU 1 starts its processing in step S1, the flow advances to step S2. In step S2, the page memory 3 is reset. At this time, the CPU 1 controls the sync control circuit 6, so that the paint out circuit 5 outputs predetermined data to the page memory. More specifically, the CPU 1 causes the sync control circuit 6 to write predetermined data (e.g., "0") in the entire area of the page memory 3, thereby resetting the page memory 3.

Figure 58:
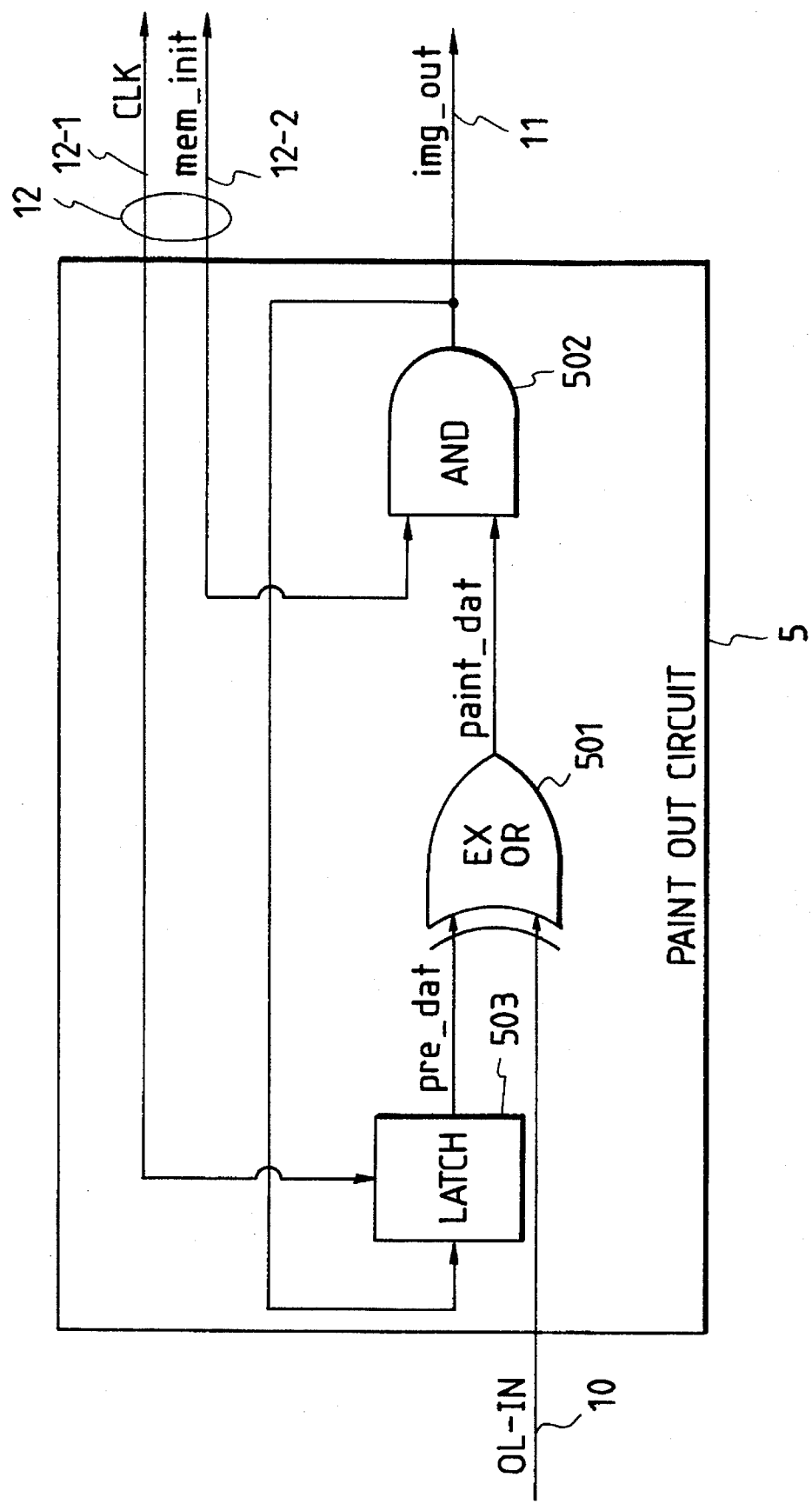
FIG. 58 is a circuit diagram of a paint out circuit of the embodiment.

FIG. 58 shows the circuit arrangement of the paint out circuit 5 of this embodiment. In step S2, the sync control circuit 6 fixes a signal line 12-2 at logic level "0 (LOW)" under the control of the CPU 1, so that the output 11 from the paint out circuit 5 can be controlled to LOW level. The sync control circuit 6 writes the output 11 in the page memory 3 in synchronism with a sync signal, thereby resetting the entire address space of the page memory 3 to "0". FIG. 59 is a timing chart showing the relationship between a page sync signal (Page Sync) indicating the head of one page, and a scan line sync signal (Line Sync) indicating the head of each scan line of this page. FIG. 60 is a timing chart showing the scan line sync signal (Line Sync) indicating the head of each scan line, and pixel data in the scan line. The above-mentioned reset processing is started in response to the page sync signal, and is carried out by sequentially changing memory addresses by an additional circuit (not shown) of the page memory 3 in synchronism with the scan line sync signal and a pixel sync signal.

Referring back to FIG. 35, upon completion of the reset processing of the page memory 3, the flow advances to step S3 to check if an output instruction of an image is input through the I/O port 14. The control waits until the instruction is input. If the image output instruction is detected, the flow advances to step S4, and paint out contour data is input from an external circuit or an auxiliary storage device (not shown) to the RAM area 2 through the I/O port 14. The flow then advances to step S5, and the CPU 1 controls the line sketch circuit 4 to sketch or depict a paint out contour according to the rules shown in FIG. 28. It is then checked in step S6 if the printer is ready. If YES in step S6, the flow advances to step S7; otherwise, the control waits until the printer is ready.

If the printer is ready, and the flow advances to step S7, the CPU 1 controls the sync control circuit 6 to read out the paint out contour image on the page memory 3 line by line, and causes the paint out circuit 5 to generate and output a painted out binary image onto the signal line 11.

<Description of Paint out Contour Depict Processing>

Figure 54B:
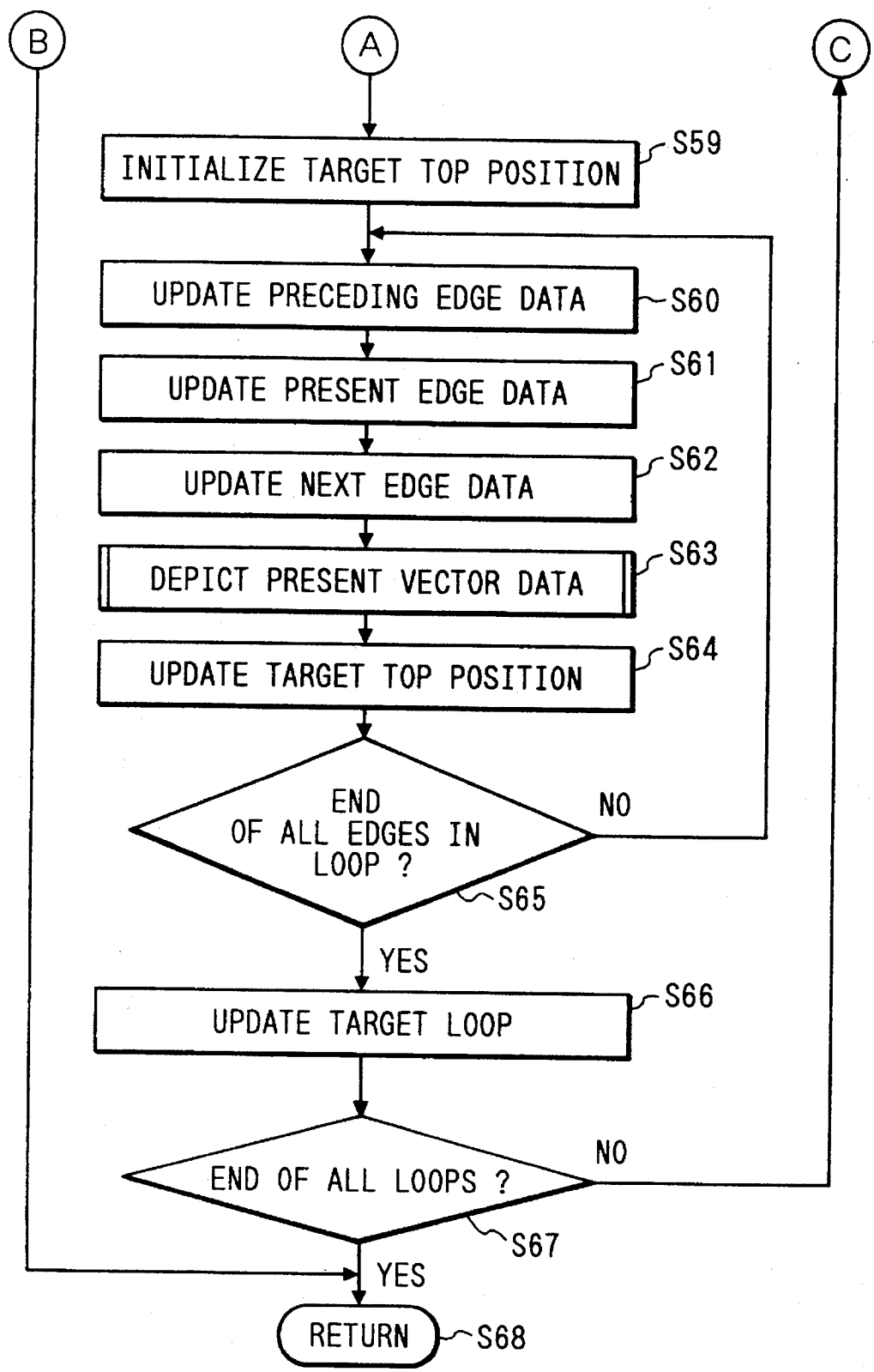

The details of the "paint out contour depict" processing in step S5 in the above-mentioned processing will be described below. FIG. 54 is a flow chart showing the paint out contour depict processing.

When the CPU 1 starts the contour depict processing in step S51, the flow advances to step S52. In step S52, the CPU 1 looks up the number N of closed loops of outline data given in the format shown in FIG. 33, and the flow advances to step S53. In step S53, the CPU 1 checks if the number N of loops is larger than "0", i.e., if there is at least one closed area. If no closed loop is present, the flow advances to step S68, and a series of processing operations are ended. The control returns to the main routine.

If it is determined in step S53 that there is at least one closed loop, the flow advances to step S54, an intra-loop top number table pointer is initialized to a position where the number of tops in a 0th loop is stored of a top number table in each loop of outline data given in the format shown in FIG. 33, and the flow then advances to step S55. In step S55, the CPU 1 looks up an intra-loop top number table at a position indicated by the intra-loop top number table pointer, and checks in step S56 if the number of tops is 2 or more. If NO in step S56, since a closed loop cannot be formed, the flow advances to step S68 to end the processing. However, if YES in step S56, the flow advances to step S57, and an edge having the final top in a target loop as a start point, and the first top as an end point is determined as a present edge. Then, the direction and x increment of this present edge are calculated. More specifically, assuming that the start point coordinates of this edge are represented by (xstart, ystart), and the end point coordinates are represented by (xend, yend), when ystart=yend, the direction of the edge is parallel to the horizontal direction. When the edge is a horizontal edge, the x increment is not calculated. At this time, if xstart>xend, the present edge is determined as a leftward edge; if xstart<xend, the present edge is determined as a rightward edge. At this time, xstart=xend means an edge consisting of only one point whose start point coincides with an end point, and such an edge is part of a preceding or next edge, or an isolated point. Assume that such an edge is removed in advance from a top string of edges constituting a contour when the data shown in FIG. 33 are formed.

When xstart>yend, the present edge is determined as an upward edge, and the x increment is calculated by (xstart−xend)/(ystart−yend).

When ystart<yend, the present edge is determined as a downward edge, and the x increment is calculated by (xend−xstart)/(yend−ystart).

Upon completion of the processing in step S57, the flow advances to step S58. In step S58, an edge having the first top (0th top) of the corresponding loop as a start point, and the next top (1st top) as an end point is determined as a next edge (an edge connected next to the target edge on a contour loop, i.e., an edge having the end point of the target edge as the start point), and the direction and x increment of this edge are calculated like in step S57. Upon completion of the processing in step S58, the flow advances to step S59. In step S59, a target top coordinate table pointer is set to be an address value where 0th top coordinate data of the corresponding loop in FIG. 33 is stored, and thereafter, the flow advances to step S60. In step S60, the present edge data (the direction and x increment of the present edge) immediately before this time is determined as preceding edge (an edge connected immediately before the target edge on the contour loop, i.e., an edge having the start point of the target edge as an end point) data. The flow then advances to step S61. In step S61, the next edge data (the direction and x increment of the next edge) immediately before this time is determined as the present edge data. The flow then advances to step S62. In step S62, the next edge data (the direction and x increment of the next edge) are calculated like in step S57. At this time, the start point of the next edge is the end point of the present edge, and the end point of the next edge is the next top on the loop with respect to the end point of the present edge, as a matter of course. These points can be obtained by looking up data of a top position next to the target top position and a top position next to the next top position. When the target top position at that time corresponds to the final top of the corresponding loop, the next edge has the 0th top of the corresponding loop as the start point, and the first top as the end point. When the target top position corresponds to a top immediately before the final top of the loop, control is also made, so that the final top becomes the start point, and the 0th top becomes the end point.

Upon completion of the processing in step S62, the flow advances to step S63, and depict processing associated with the present edge data is executed on the basis of the preceding edge data, the present edge data, and the next edge data, and the rules shown in FIG. 28 according to the flow charts shown in FIGS. 55A and 55B (details of this processing will be described later).

Upon completion of the processing in step S63, the flow advances to step S64, and the target top coordinate table pointer value is updated to the position of the next top coordinate table on the loop. In step S65, it is checked if processing for all the edges in the corresponding loop is completed. If YES in step S65, the flow advances to step S66. Otherwise, the flow returns to step S60, the above-mentioned series of processing operations are continued while the edge processed as the next edge so far is determined as the present edge. Whether or not processing for all the edges is completed can be discriminated as follows. That is, the number of times of execution of step S65 is counted, and it is then checked if the number of times exceeds the number of tops included in the corresponding loop.

In step S66, the intra-loop top number table pointer is updated to a position where data of the next loop are held, and the flow then advances to step S67. In step S67, it is checked if the series of processing operations are completed for all the loops included in the contour data. If YES in step S67, the flow advances to step S68; otherwise, the flow returns to step S55 to continue the series of processing operations for the next loop.

Whether or not processing for all the loops is completed can be discriminated as follows. That is, for example, the number of times of execution of step S67 is counted, and it is then checked if the number of times exceeds the number of loops included in the contour data. In step S68, it is determined that paint out contour depict processing is ended, and the control returns to the main routine.

<Description of Present Vector Data Depict Processing>

The processing content of "present vector data depict processing" in step S63 in FIG. 54 will be described below with reference to the flow charts shown in FIGS. 55A and 55B.

In step S63, processing is executed using the directions and x increments of the present, preceding, and next edges. FIG. 28 shows the generation rules upon depiction of a contour vector for the present edge.

When the present edge is a horizontal edge, i.e., is a leftward or rightward edge, no contour vector (a group of pixels expressing the contour vector) is generated for this present edge. When the present edge is an upward edge, pixels on the edge are basically plotted as contour pixels; when it is a downward edge, pixels on the edge are basically plotted at positions shifted by one pixel from original positions in the scan direction. The two edge points of each contour edge are selectively processed depending on the contents of the preceding and next edge data.

In FIG. 28, in the column of "state of start point", the present edge is indicated by a solid arrow, the preceding edge is indicated by a broken arrow, the direction of an arrow indicates the direction of the corresponding edge, and hatching indicates that the hatched side of an edge is an area to be painted out. In the column of "state of end point", the present edge is indicated by a solid arrow, the preceding edge is indicated by a broken arrow, the direction of an arrow indicates the direction of the corresponding edge, and hatching indicates that the hatched side of an edge is an area to be painted out.

Paying attention to processing of the start point of the present edge, cases (start 1 to start 5) wherein the present edge is an upward edge will be described below.

When the preceding edge is also an upward edge (case No. start 1), contour pixels are plotted so that the start point of the present edge is located at a point moved from the actual position toward the end point along the edge by one scan line. When the preceding edge is a downward edge, if the end point of the preceding edge, i.e., the start point of the present edge corresponds to a recessed top of a closed figure (case No. start 2), contour pixels are also plotted so that the start point is located at a point moved from the actual position toward the end point along the edge by one scan line. When the end point of the preceding edge corresponds to a projected top of a closed figure (case No. start 3), contour pixels are plotted so that the start point is the point itself at the actual position. Note that the case No. start 2 or start 3 can be determined by comparing the x increments of the present and preceding edges. Assume that the x increment of the preceding edge is represented by Δxpre, and that of the present edge is represented by Δxnow. When Δxpre>Δxnow, the case No. start 2 is determined; when Δxpre<Δxnow, the case No. start 3 is determined. However, when Δxpre=Δxnow, the case No. start 3 is determined in this embodiment. When the preceding edge is a leftward edge (case No. start 4), contour pixels are plotted so that the start point of the present edge is the point itself of the actual position. When the preceding edge is a rightward edge (case No. start 5), contour pixels are plotted so that the start point of the present edge is located at a point moved from the actual position toward the end point along the edge by one scan line.

Cases (start 6 to start 10) wherein the present edge is a downward edge will be examined below.

When the preceding edge is an upward edge, if the end point of the preceding edge, i.e., the start point of the present edge corresponds to a projected top of a closed figure (case No. start 6), contour pixels are plotted so that the start point is the point itself of the actual position. When the start point of the present edge corresponds to a recessed top of a closed figure (case No. start 7), contour pixels are plotted so that the start point is located at a point moved from the actual position toward the end point along the edge by one scan line. When the preceding edge is a downward edge (case No. start 8) and is a rightward edge (case No. start 10), contour pixels are plotted so that the start point is the point itself of the actual position. When the preceding edge is a leftward edge (case No. start 9), contour pixels are plotted so that the start point is located at a point moved from the actual position toward the end point along the edge by one scan line. Note that the case No. start 6 or start 7 can be determined by comparing the x increments Δxnow and Δxpre of the present and preceding edges. When Δxpre<Δxnow, the case No. start 6 is determined; when Δxpre>Δxnow, the case No. start 7 is determined. However, when Δxpre=Δxnow, the case No. start 6 is determined in this embodiment.

Cases paying attention to processing of the end point of the present edge will be explained below.

Cases (end 1 to end 5) wherein the present edge is an upward edge will be described below. When the next edge is also an upward edge (case No. end 1), contour pixels are plotted so that the end point of the present edge is the point itself of the actual position. When the next edge is a downward edge, if the start point of the next edge, i.e., the end point of the present edge corresponds to a recessed top of a closed figure (case No. end 3), contour pixels are plotted so that the end point of the present edge is located at a point returned from the actual position toward the start point along the edge by one scan line. When the end point of the present edge corresponds to a projected top of a closed figure (case No. end 2), contour pixels are plotted so that the end point of the present edge is the point itself of the actual position. When the next edge is a leftward edge, contour pixels are plotted so that the end point of the present edge is located at a point returned from the actual position toward the start point along the edge by one scan line. When the next edge is a rightward edge, contour pixels are plotted so that the end point of the present edge is the point itself of the actual position. Note that the case No. end 2 or end 3 can be determined by comparing the x increments Δxnow and Δxpost of the present and preceding edges. When Δxnow<Δxpost, the case No. end 2 is determined; when Δxnow>Δxpost, the case No. end 3 is determined. However, when Δxnow=Δxpost, the case No. end 2 is determined in this embodiment.

Cases (end 6 to end 10) wherein the present edge is a downward edge will be described below. When the next edge is an upward edge, if the start point of the next edge, i.e., the end point of the present edge corresponds to a projected top of a closed figure (case No. end 6), contour pixels are plotted so that the end point of the present edge is the point itself of the actual position. When the end point of the present edge corresponds to a recessed top of a closed figure (case No. end 7), contour pixels are plotted so that the end point of the present edge is located at a point returned from the actual position toward the start point along the edge by one scan line. When the next edge is a downward edge (case No. end 8), contour pixels are plotted so that the end point of the present edge is located at a point returned from the actual position toward the start point along the edge by one scan line. When the next edge is a leftward edge (case No. end 9), contour pixels are plotted so that the end point of the present edge is the point itself of the actual position. When the next edge is a rightward edge (case No. end 10), contour pixels are plotted so that the end point of the present edge is located at a point returned from the actual position toward the start point along the edge by one scan line. Note that the case No. end 6 or end 7 can be determined by comparing the x increments Δxnow and Δxpost of the present and preceding edges. When Δxnow<Δxpost, the case No. end 6 is determined; when Δxnow>Δxpost, the case No. end 7 is determined. However, when Δxnow=Δxpost, the case No. end 6 is determined in this embodiment.

The way of processing of the two edge points of the contour vector is determined (i.e., correction values of coordinate positions of the two edge points are determined) according to the above-mentioned generation rules. Contour pixels for the present edge are generated.

The above-mentioned processing is performed in step S63. After all, the CPU 1 executes processing according to the flow charts shown in FIGS. 55A and 55B.

When the series of processing operations are started in step S630, the flow advances to step S631. At this time, input data include the preceding edge data (the direction and x increment Δxpre of the preceding edge) updated in step S60, the present edge data (the coordinate values (xstart, ystart) and (xend, yend) of the start and end points, direction, and x increment Δxnow of the present edge) updated in step S61, and the next edge data (the direction and x increment Δxpost of the next edge) generated in step S62. In step S631, it is checked if the present edge is a horizontal edge (i.e., one of rightward and leftward edges). If YES in step S631, the flow advances to step S644 to end the series of processing operations, and the control returns to step (S64) next to the step that called this processing.

If NO in step S631, the flow advances to step S632 to check if the present edge is an upward edge. If YES in step S632, the flow advances to step S633, and thereafter, the way of processing for the two edge points for the upward edge is discriminated. However, if NO in step S632 (i.e., if the present edge is a downward edge), the flow advances to step S645, and thereafter, the way of processing for the two edge points for the downward edge is discriminated.

If it is determined that the present edge is an upward edge, and the flow advances to step S633, edge point data for plotting contour pixels is temporarily generated without modifications. More specifically, ymax=ystart, xmin=xend, $\Delta x=\Delta xnow$, and ymin=yend are set.

Note that ymax is a y value of an edge point having a larger y coordinate value of the two edge points (start and end points) of the present edge, and xmin and ymin are x and y values of an edge point having a smaller y coordinate value. In addition, the x increment $\Delta x$ means a change in x coordinate per scan line when a point on the present edge is moved from a point having a smaller y coordinate value toward a point having a larger y coordinate value along the present edge. In this embodiment, since the positive direction of the x coordinate is assumed to be the rightward direction, and the positive direction of the y coordinate is assumed to be the downward direction (in this case, the upward direction of a vector means a direction to decrease the y coordinate value), ymax, xmin, $\Delta x$, and ymin are set, as described above. Upon completion of the processing in step S633, the flow advances to step S643. In step S634, it is checked if the preceding edge is a downward edge. If YES in step S634, the flow advances to step S635; otherwise, the flow advances to step S636. In step S635, whether the start point of the present edge corresponds to the case No. start 2 or start 3 is discriminated by the above-mentioned method. If it is determined that the start point of the present edge corresponds to the case No. start 2, the flow advances to step S637; otherwise, the flow advances to step S638. In step S636, whether or not the start point of the present edge corresponds to the case No. start 4 (i.e., whether the start point corresponds to the case No. start 1 or start 5) is discriminated. If it is determined that the start point of the present edge corresponds to the case No. start 4, the flow advances to step S638; otherwise, the flow advances to step S637. In step S637, ymax is decreased by "1", i.e., the position of the start point of the upward edge is closed by one scan line. Upon completion of the processing in step S637, the flow advances to step S638. Thus, processing for the start point when the present edge is an upward edge is ended.

In step S638, it is checked if the next edge is a downward edge. If YES in step S638, the flow advances to step S639; otherwise, the flow advances to step S640. In step S639, whether or not the end point of the present edge corresponds to the case No. end 2 or end 3 is discriminated by the above-mentioned method. If it is determined that the end point of the present edge corresponds to the case No. end 2, the flow advances to step S643; otherwise, the flow advances to step S641. In step S640, whether or not the end point of the present edge corresponds to the case No. end 4 (i.e., whether the end point of the present edge corresponds to the case No. end 1 or end 5) is discriminated. If it is determined that the end point of the present edge corresponds to the case No. end 4, the flow advances to step S641; otherwise, the flow advances to step S643. In step S641, xmin is increased by $\Delta x$. More specifically, the x coordinate value is corrected so that the position of the end point of the upward edge is closed by one scan line. Upon completion of the processing in step S641, the flow advances to step S642. In step S642, ymin is increased by "1". More specifically, the y value is corrected so that the position of the end point of the upward edge is closed by one scan line. Upon completion of the processing in step S642, the flow advances to step S643.

On the other hand, a case will be explained below wherein it is determined in step S632 that the present edge is not an upward edge, i.e., is a downward edge.

In this case, the flow advances to step S645. In step S645, it is determined that the present edge is a downward edge, and edge point data for plotting contour pixels is temporarily generated without modifications. More specifically, ymax=yend, xmin=xstart+1, and $\Delta x=\Delta xnow$ are set. In this case, "xmin=xstart+1" means that as for the downward edge, pixels are basically plotted at positions shifted one pixel from pixels on the edge in the scan direction in this embodiment.

In step S646, it is checked if the preceding edge is an upward edge. If YES in step S646, the flow advances to step S647; otherwise, the flow advances to step S648. In step S647, whether the start point of the present edge corresponds to the case No. start 6 or start 7 is discriminated by the above-mentioned method. If it is determined that the start point of the present edge corresponds to the case No. start 6, the flow advances to step S651; if it is determined that the start point of the present edge corresponds to the case No. start 7, the flow advances to step S649. In step S648, whether or not the start point of the present edge corresponds to the case No. start 9 (i.e., whether the start point of the present edge corresponds to the case No. start 8 or start 10) is discriminated. If it is determined that the start point of the present edge corresponds to the case No. start 9, xmin is increased by $\Delta x$ in step S649. More specifically, the x coordinate value is corrected so that the position of the start point of the downward edge is closed by one scan line. Upon completion of the processing in step S649, the flow advances to step S650, and ymin is increased by "1". That is, the y value is corrected so that the position of the start point of the downward edge is closed by one scan line. Thus, processing for the start point of the present edge is ended.

Upon completion of the processing in step S650, the flow advances to step S651. In step S651, it is checked if the next edge is an upward edge. If YES in step S651, the flow advances to step S652; otherwise, the flow advances to step S653. In step S652, whether the end point of the present edge corresponds to the case No. end 6 or end 7 is discriminated by the above-mentioned method. If it is determined that the end point of the present edge corresponds to the case No. end 6, the flow advances to step S643; if it is determined that the end point of the present edge corresponds to the case No. end 7, the flow advances to step S654. In step S653, whether or not the end point of the present edge corresponds to the case No. end 9 (i.e., whether the end point of the present edge corresponds to the case No. end 8 or end 10) is discriminated. If it is determined that the end point of the present edge corresponds to the case No. end 9, the flow advances to step S643; otherwise, the flow advances to step S654. In step S654, ymax is decreased by "1". More specifically, the position of the end point of the downward edge is closed by one scan line. Upon completion of the processing in step S654, the flow advances to step S643.

As described above, edge point data for plotting contour pixels for the present edge is generated according to the rules described in FIG. 28 depending on whether the present edge is an upward or downward edge.

In step S643, the line sketch circuit (to be described later) is initialized, and the edge point data (ymax, xmin, ymin, Δx) for plotting contour pixels for the present edge generated in the above-mentioned processing is set, thereby depicting the present edge on the page memory 3. Upon completion of the depict processing of the present edge, the control returns to the main routine that called this routine.

Figure 56:
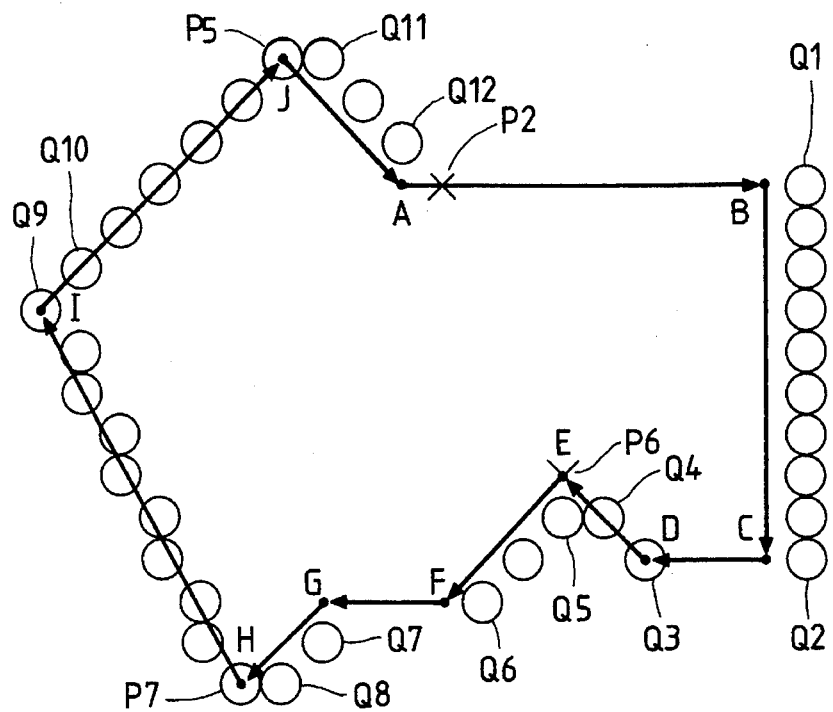
FIG. 56 is a view showing a sketch result of a paint out contour obtained by processing according to still another embodiment of the present invention.

FIG. 56 shows a depiction result of the contour data shown in FIG. 32 on the page memory 3 according to the rules in FIG. 28 (by executing the above-mentioned processing). In FIG. 32, if a contour vector [A→B] (defined as a vector having a point A as a start point, and a point B as an end point) is determined as a present vector, [J→A] is a preceding vector. The vector [J→A] is a downward vector, and its x increment Δxpre is "1". The vector [A→B] is a rightward vector. The next vector [B→C] is a downward vector, and its x increment Δxpost is "0". Since the present vector [A→B] is a horizontal vector, it is not depicted. If the vector [B→C] is determined as the present vector, the previous vector [A→B] is a rightward vector, its x increment Δxpost="0", and the present vector [B→C] is a downward vector. For this reason, the start point of the vector [B→C] corresponds to the case No. start 10. Since the next vector [C→D] is a leftward vector, the end point of the present edge corresponds to the case No. end 9. Therefore, it is determined that the two edge points of the present vector [B→C] at that time are located at the positions of points B and C without being closed, and edge point data for plotting contour pixels is generated. In this case, since the vector [B→C] is a downward vector, pixels on the edge are plotted at pixel positions shifted by one pixel in the scan direction, in other words, contour pixels are plotted as neighboring pixels in the scan direction. As a result, pixels between Q1 and Q2 in FIG. 56 are depicted as contour pixels for the vector [B→C].

Paying attention to the vector [C→D] (when the vector [C→D] is determined as the present vector), the vector [C→D] is not depicted since it is a horizontal vector.

In the case of a vector [D→E], the vector [D→E] is an upward edge, its start point D corresponds to the case No. start 4, and its end point E corresponds to the case No. end 3. Therefore, the edge is plotted while the position of the start point is left unchanged, and the position of the end point is closed by one scan line. As a result, pixels Q3 and Q4 in FIG. 56 are depicted.

A vector [E→F] is a downward edge, its start point E corresponds to the case No. start 7, and its end point F corresponds to the case No. end 9. Therefore, the position of the start point is closed by one line, the position of the end point is left unchanged, and pixels on the edge are depicted at positions shifted by one pixel in the scan direction (pixels between Q5 and Q6 in FIG. 56).

A vector [F→G] is not depicted since it is a horizontal edge.

A vector [G→H] is a downward edge, its start point corresponds to the case No. start 9, and its end point corresponds to the case No. end 6. Therefore, the position of the start point is closed by one line, the position of the end point is left unchanged, and pixels on the edge are depicted at neighboring pixel positions in the scan direction (Q7 and Q8 in FIG. 56).

A vector [H→I] is an upward edge, its start point corresponds to the case No. start 3, and its end point corresponds to the case No. end 1. Therefore, pixels on the edge are depicted (pixels between P7 and Q9 in FIG. 56) while the positions of both the start and end points are left unchanged.

A vector [I→J] is an upward edge, its start point corresponds to the case No. start 1, and its end point corresponds to the case No. end 2. Therefore, the position of the start point is closed by one scan line, the position of the end point is left unchanged, and pixels on the edge are depicted (pixels between Q10 and P5).

A vector [I→J] is a downward edge, its start point corresponds to the case No. start 6, and its end point corresponds to the case No. end 10. Therefore, the position of the start point is left unchanged, the position of the end point is closed by one scan line, and pixels on the edge are depicted at positions shifted by one pixel in the scan direction (pixels between Q11 and Q12).

Figure 57:
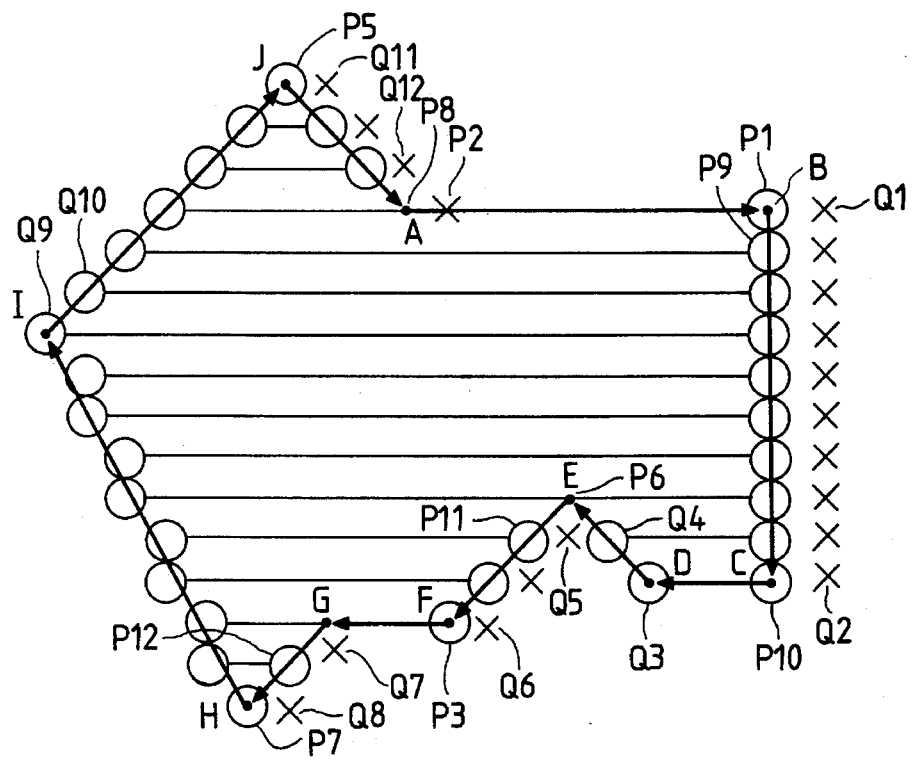
FIG. 57 is a view showing a painted out result obtained by processing of the embodiment.

In this manner, a paint out contour is depicted on the page memory 3. The memory is raster-scanned to execute processing while determining a section from a pixel position plotted as odd-numbered "1" appearing on the horizontal scan line to a position immediately before a pixel plotted as next even-numbered "1" as a paint out section, and remaining sections as non-paint out sections. FIG. 57 shows an image obtained by this processing. As shown in FIG. 57, upon execution of the processing of this embodiment, a result free from distortion can be obtained.

<Description of Line Sketch Circuit>

The line sketch circuit 4 shown in FIG. 31 will be described below. This circuit is enabled in step S643 in FIG. 55B.

Figure 61:
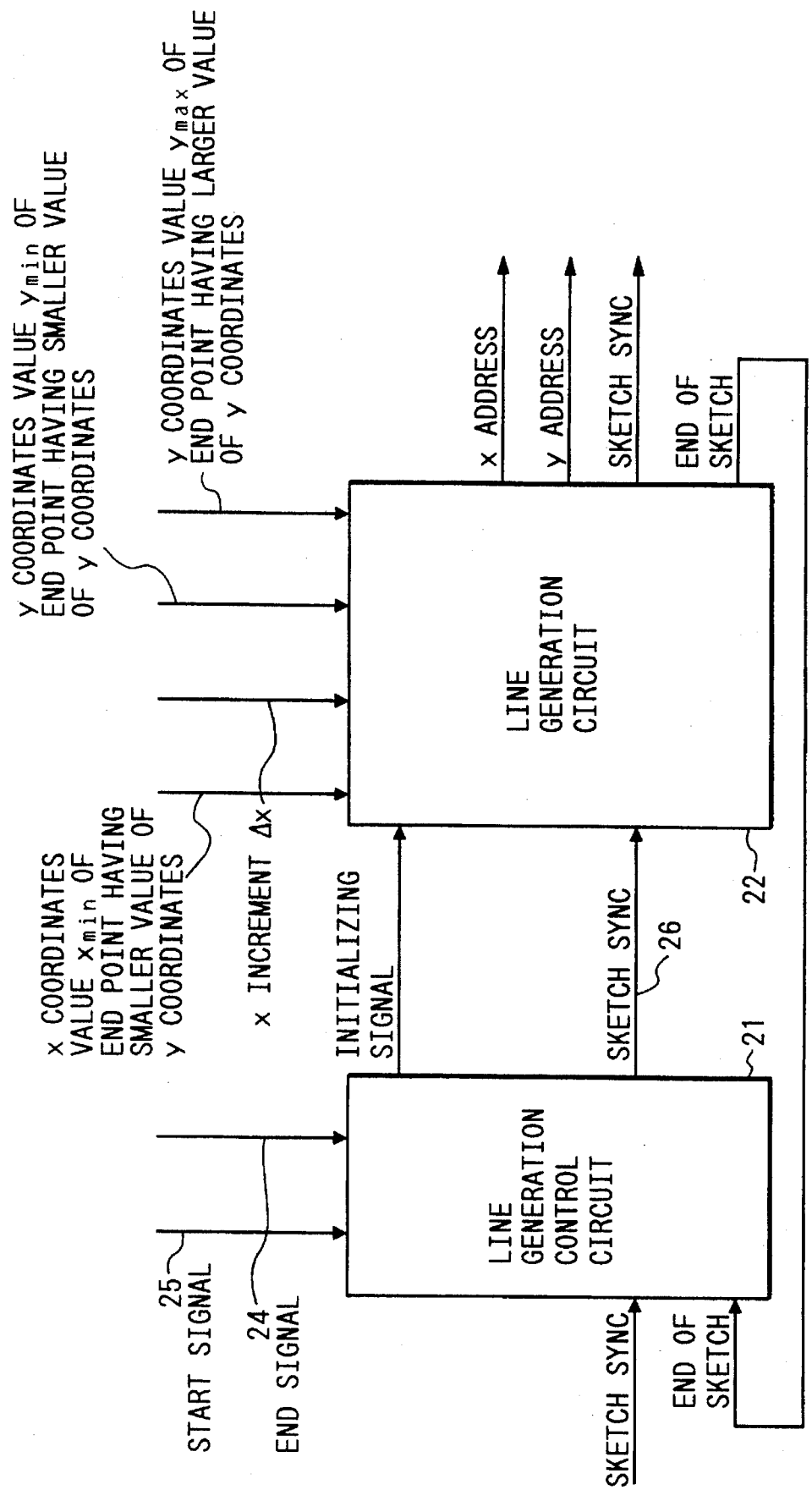
FIG. 61 is a block diagram of a line sketch circuit of the embodiment.

FIG. 61 is a block diagram of the line sketch circuit 4. As shown in FIG. 61, this circuit is constituted by two sections, i.e., a line generation control circuit 21 and a line generation circuit 22.

The line sketch circuit 4 is controlled by the CPU 1 every time each outline vector is depicted, thereby line-depicting outline vectors one by one.

Figure 55A:
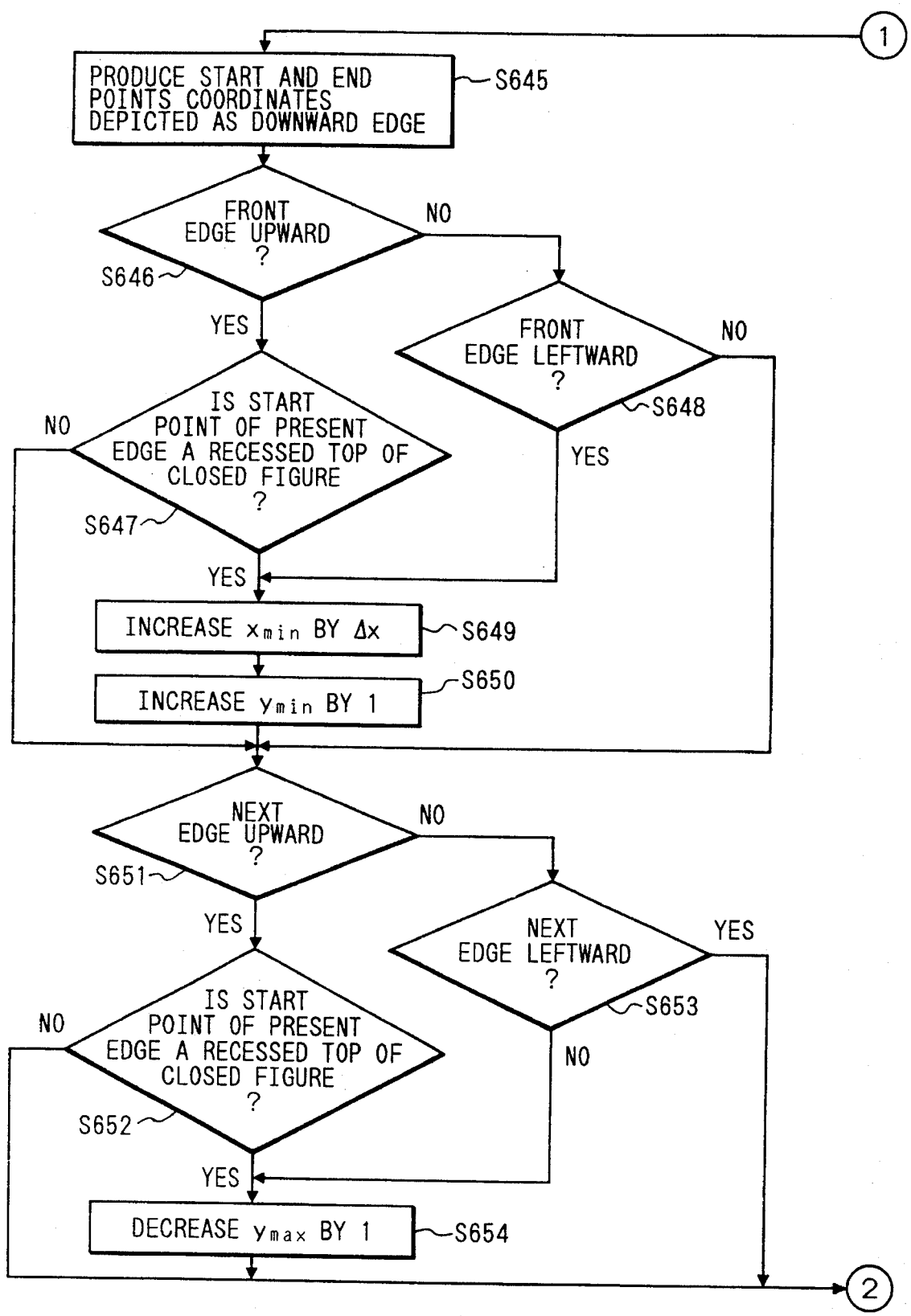
FIGS. 55A and 55B are flow charts for explaining vector sketch processing.
Figure 55B:
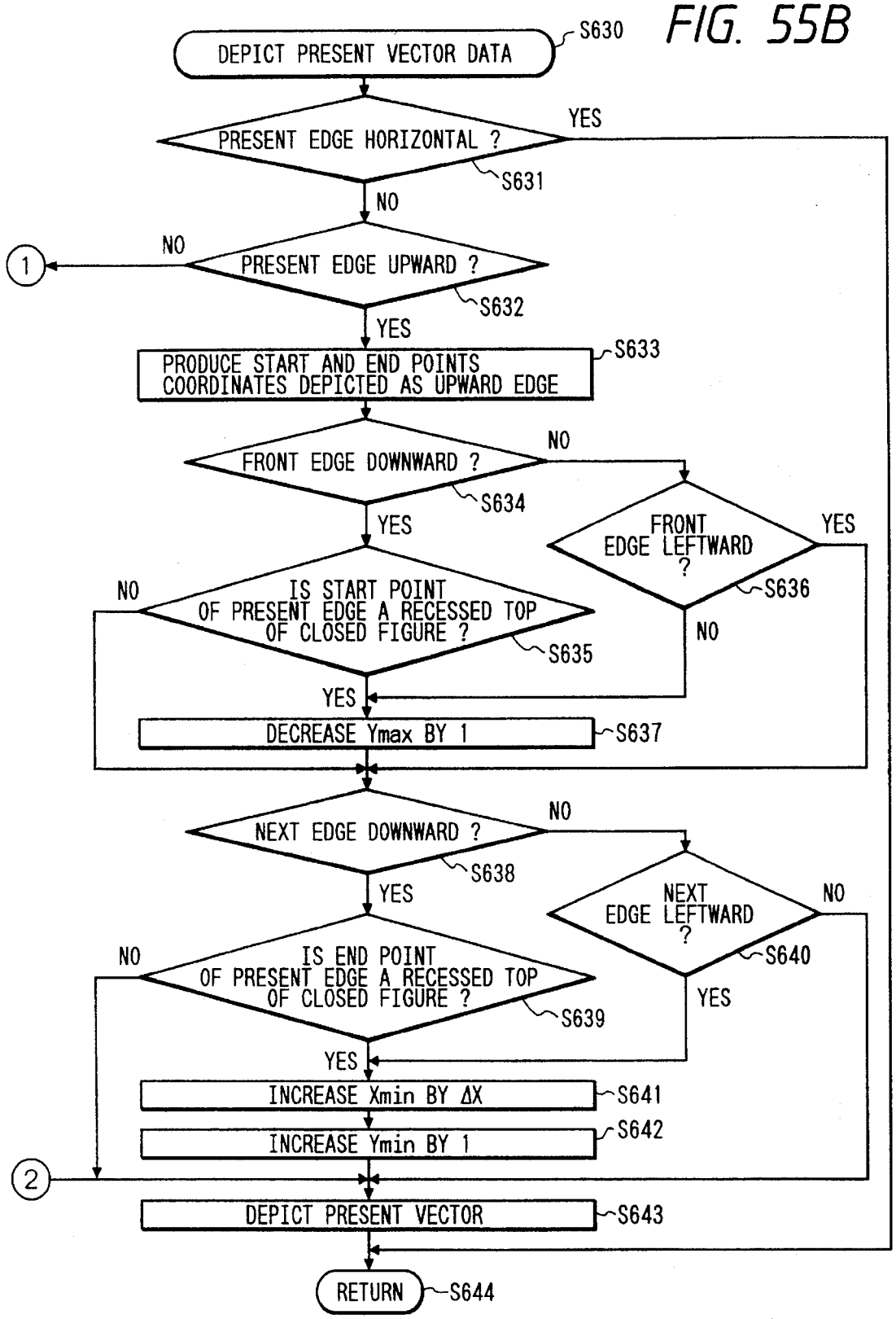

Again, in FIGS. 55A and 55B, processing executed before step S643 is to consequently determine ymax, xmin, ymin, and Δx.

Figure 62:
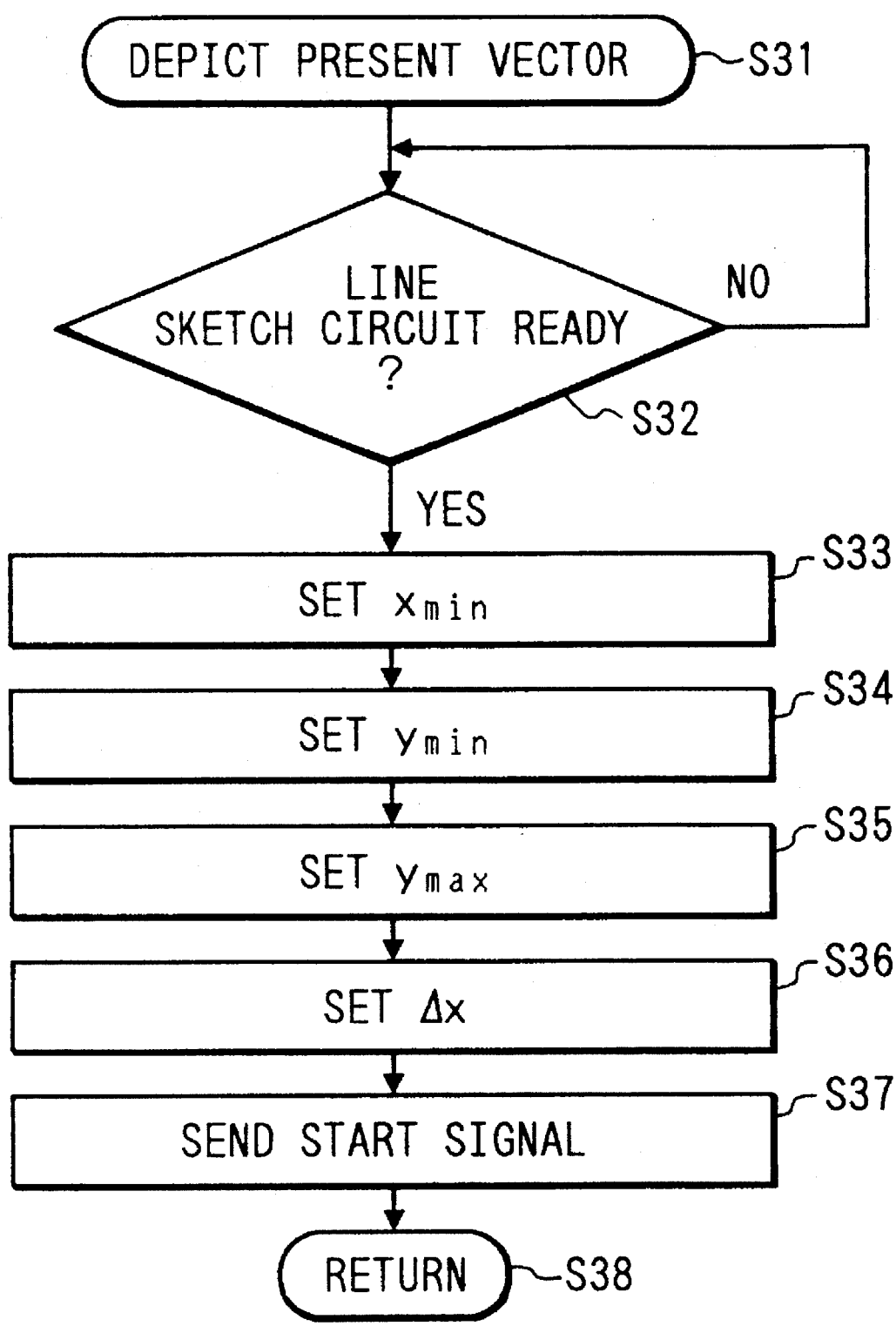
FIG. 62 is a flow chart for executing a vector sketch operation.

The processing content for the line sketch circuit 4, i.e., the details of the content in step S643 will be described below with reference to the flow chart shown in FIG. 62.

When this processing is started in step S31, the level of an end signal 24 output from the line generation control circuit 21 in the line sketch circuit 4 is checked in step S32, thereby discriminating whether or not the line sketch circuit is ready (i.e., whether or not the depict processing of a previously instructed line is completed, and the next instruction can be set). If NO in step S32, the control waits until the line sketch circuit is ready.

If the line sketch circuit is ready, the flow advances to step S33, and the x coordinate value xmin of an edge point having a smaller y coordinate value of the vector to be depicted is set in the line generation circuit 22 in the circuit 4. The y coordinate value ymin of the edge point having the smaller y coordinate value (step S34), and the y coordinate value ymax of an edge point having a larger y coordinate value (step S35) are similarly set, and in step S36, the x increment Δx is set in the line generation circuit 22. In step S37, a start signal 25 for starting a depict operation is supplied to the line generation control circuit 21. Thereafter, the flow advances to step S38, and the control returns to the routine shown in FIGS. 55A and 55B.

Figure 63:
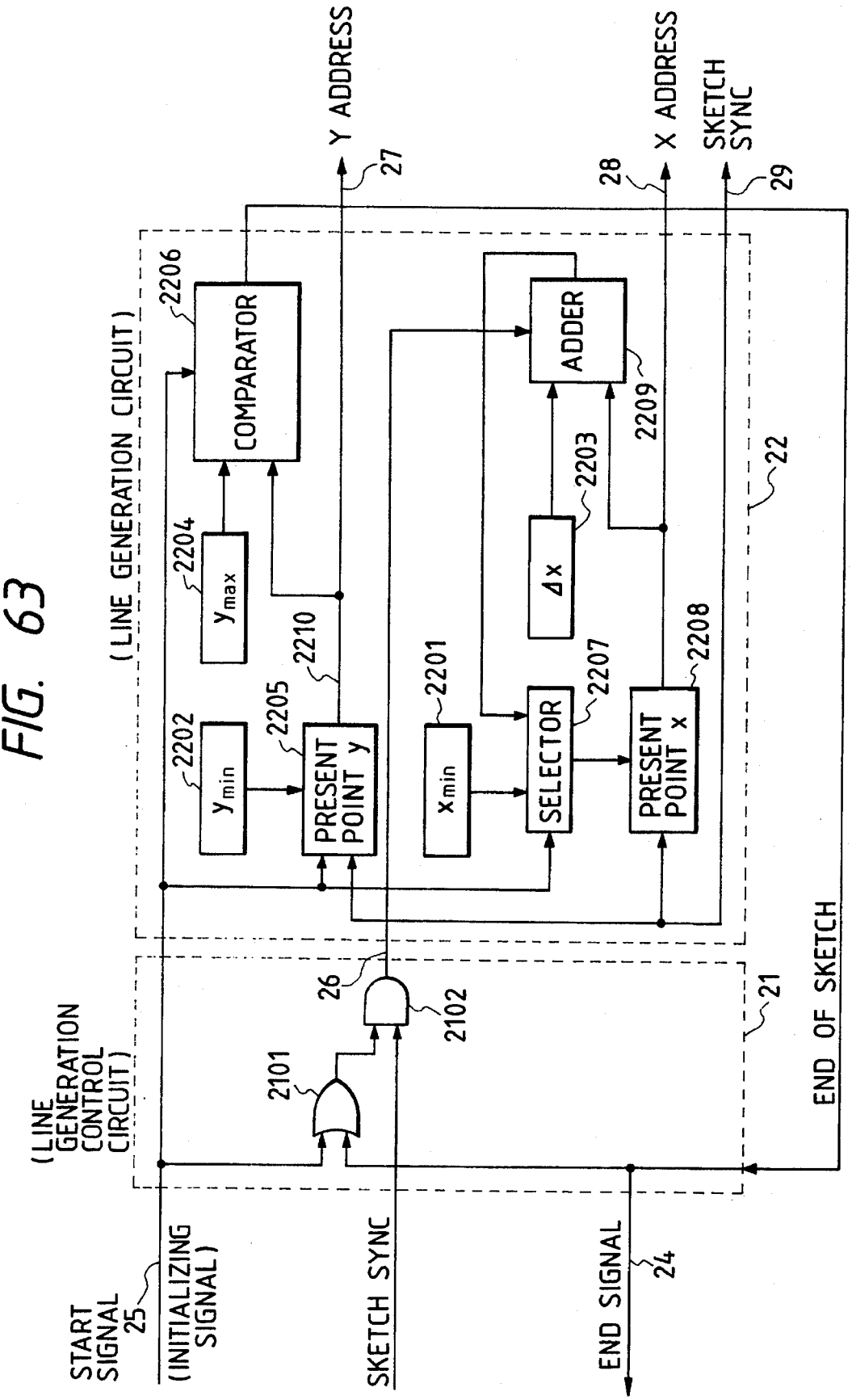
FIG. 63 is a circuit diagram of a line generation circuit shown in FIG. 61.

As described above, upon reception of the start signal 25, the initialized line sketch circuit 4 starts its operation. FIG. 63 shows the detailed arrangement of the line sketch circuit 4 whose functional blocks are shown in FIG. 61.

The start signal 25 is a pulse signal indicating the start when it is at High level (logic level "1"), and its pulse width is properly set by an additional circuit (not shown). The CPU 1 supplies a signal serving as a trigger for this pulse. An end signal is a signal indicating the end when it is at Low level (logic level "0"). When the end signal is at High level, it indicates that the line sketch circuit is busy. A logical sum of the start and end signals is output from an OR gate 2101. When a sketch sync signal as a steadily generated clock supplied from an external circuit and having a predetermined period is controlled by an AND gate 2102 according to the output from the OR gate 2101, a sketch sync signal from the start point (the edge point having the smaller y coordinate value in this case) to the end point (the edge point having the larger y coordinate value in this case) of the vector is generated.

A buffer 2202 is set with the y coordinate value (ymin) of the edge point having the smaller y coordinate value by the CPU 1. A buffer 2204 is set with the y coordinate value (ymax) of the edge point having the larger y coordinate value. A buffer 2201 is set with the x coordinate value (xmin) of the edge point having the smaller y coordinate value. A buffer 2203 is set with the x increment (Δx). Upon reception of the start signal, an up counter 2205 loads the y coordinate value (ymin) of the edge point having the smaller y coordinate value held in the buffer 2202 as an initial value of a count value. The up counter 2205 directly outputs the held count value onto a signal line 2210. A comparator 2206 operates upon reception of the start signal, and compares the output from the up counter 2205 with the y coordinate value (ymax) of the edge point having the larger y coordinate value held in the buffer 2204. When the comparator 2206 detects that the two outputs are equal to each other, it outputs a Low-level signal, and holds this level until it receives the next start signal. When the comparator 2206 detects that the two outputs are not equal to each other, it outputs a High-level signal. The up counter 2205 performs a count-up operation in synchronism with a sketch sync signal 26, thereby updating y addresses of pixels to be depicted or sketched. A selector 2207 selects one of the x coordinate value (xmin) of the edge point having the smaller y coordinate value held in the buffer 2201, and an output value from an adder 2209 in response to a selection signal, and outputs the selected value. More specifically, only when the start signal is input, the selector 2207 selects and outputs the output from the buffer 2201; otherwise, it selects the output from the adder 2209. A latch 2208 latches the output from the selector 2207 in synchronism with the sketch sync signal 26, and outputs the latched value as the x coordinate value of a point to be plotted at the present time. The adder 2209 calculates the sum of the output from the latch 2208 and the x increment (Δx) held in the buffer 2203 in synchronism with the sketch sync signal 26, and outputs the sum. In this manner, the x addresses of pixels to be depicted are updated in synchronism with the sketch sync signal 26.

The timings of signals 27, 28, and 29 generated as described above are adjusted by an additional circuit (not shown), and these signals are respectively output as x address, y address, and write signals for plot positions on the page memory 3.

In the page memory 3, the additional circuit (not shown) writes a value obtained by EX-ORing a value held at an address determined by the x address signal 27 and the y address signal 28, and a constant "1" at that address (read modify write), thereby depicting a paint out contour.

After the paint out contour is depicted on the page memory 3 in this manner, the sync control circuit 6 is enabled by the CPU 1, and painted out data is generated. The operation of this embodiment associated with generation of a painted out image will be described below with reference to FIGS. 58, 59, and 60 described above.

When the sync control circuit 6 is enabled by the CPU 1 to generate a painted out image, it fixes the signal line 12-2 (FIG. 58) at High level to set the paint out circuit to output painted out data, and generates a page sync signal (Page Sync), a scan line sync signal (Line Sync), and a pixel sync signal (CLK) shown in FIGS. 59 and 60. The sync control circuit 6 sets the page memory 3 to output data to be held at an address obtained by counting a sync signal by an additional circuit (not shown) to the paint out circuit 5 through the signal line 10. The page sync signal, scan sync signal, and pixel sync signal are supplied to the page memory 3 and the paint out circuit 5 through the signal lines 12. The address generation additional circuit (not shown) of the page memory 3 is reset in response to the page sync signal, generates a sub scan position by counting the scan line sync signal, and generates a main scan position by counting the pixel sync signal. The count value of the pixel sync signal is reset in response to each scan line sync signal. The paint out circuit fetches the output 10 from the page memory 3 in synchronism with the pixel sync signal, and causes a gate 501 to EX-OR the fetched value and the output from a latch 503. The paint out circuit then causes a gate 502 to logically AND the EX-ORed result and a value supplied from the signal line 12-2, and outputs the AND result as painted out image data onto the signal line 11. The data output onto the signal line 11 is held in the latch 503 as preceding pixel data. The latch 503 is reset to "0" in response to the scan sync signal. In this manner, data on the page memory 3 are raster-scanned in synchronism with the sync signal, so that these data are output as "1" from an odd-numbered "1" appearance timing in single raster data to a timing immediately before the next even-numbered "1" appearance timing, and are output as "0" at other timings. Thus, painted out pixel data are generated as raster-scanned data in synchronism with the sync signal.

In the above-mentioned discussion, ymax and ymin are processed as a non-negative integer. xmin and Δx are processed as real number data having sufficient precision (i.e., having decimal part information), and only its integer part is used as a pixel address. More specifically, although the outputs from the buffer 2201, the latch 2208, and buffer 2203 include decimal part information, the x address signal 28 corresponds to only an integer part of the output from the latch 2208. Upon rounding of a decimal part, when the value xmin is set in the buffer 2201, a value obtained by adding "0.5" to xmin in advance can be set as an initial value. When xmin itself is set in the buffer 2201 without adding "0.5" to xmin, it is processed such that the decimal part is cut, and corresponding processing is executed using this value.

<Description of 25th Embodiment>

In the 24th embodiment described above, the rules for the pairs of case Nos. start 1 and end 1 and start 8 and end 8 in the rules for generating edge point data for plotting contour pixels shown in FIG. 28 may be changed as follows.

More specifically, case No. start 1: the position of the start point of the present edge is set "as it is", and case No. end 1: the position of the end point of the present edge is "closed by one scan line".

Case No. start 8: the position of the start point of the present edge is "closed by one scan line", and case No. end 8: the position of the end point of the present edge is set "as it is".

In the processing flow shown in FIGS. 55A and 55B, it is obvious to those who are skilled in the art that step S636 for the case No. start 1, and step S640 for the case No. end 1 are changed according to the change in rule. Also, it is obvious to those who are skilled in the art that step S648 for the case No. start 8, and step S653 for the case No. end 8 are changed according to the change in rule.

The above-mentioned changes imply that a top common to two outline edges as two continuous upward or downward edges may be processed either as only a point on an edge having the top as an end point or as only a point on an edge having the top as a start point. That is, such a top may be subjected to either one of the above-mentioned operations unless it is processed as a point on both the edges or is determined as a point excluded from both the edges.

<Description of 26th Embodiment>

In the description of the 24th embodiment, an outline has a clockwise data expression. However, the present invention is not limited to this, but may be applied to an outline having a counterclockwise data expression. In the case of the counterclockwise data expression, rules for generating edge point data for plotting contour pixels shown in FIG. 29 can be used. In this case, processing of the start point of the present edge is determined on the basis of the directions and inclinations of the present and preceding edges, and processing of the end point of the present edge is determined on the basis of the basis of the directions and inclinations of the present and next edges. The edge table generation processing flow according to the rules for generating edge point data for plotting contour pixels in the counterclockwise data expression is substantially the same as those shown in FIGS. 55A and 55B, excluding that "YES" and "NO" in steps S636, S640, S648, and S653 are reversed.

<Description of 27th Embodiment>

Like in the modification for the 24th embodiment described in the 25th embodiment, in the rules shown in FIG. 29 of the 26th embodiment, case Nos. start 11 and end 11, and case Nos. start 18 and end 18 may be combined, and may be modified as follows:

Case No. start 11: the position of the start point of the present edge is "closed by one scan line", and case No. end 11: the position of the end point of the present edge is set "as it is".

Case No. start 18: the position of the start point of the present edge is set "as it is", and case No. end 18: the position of the end point of the present edge is "closed by one scan line".

<Description of 28th Embodiment>

In the above embodiments, the origin of the coordinates is set at the upper left corner of the image. However, the present invention is not limited to this. More specifically, when directions, the discrimination methods, and processing of ymax, ymin, xmin, Δx, and the like in the above description may be changed according to the origin position and the direction of the coordinates, the same processing as described above can be attained.

<Description of 29th Embodiment>

In the above embodiments, the main scan direction in the paint out operation is determined as a left-to-right direction of an image. However, the present invention is not limited to this. The main scan direction may be a direction opposite to the left-to-right direction, i.e., is a right-to-left direction. In this case, the edge point data for plotting contour pixels is generated, so that when the present edge is an upward edge, pixels are plotted at pixels positions on the edge, and when the present edge is a downward edge, pixels are plotted at neighboring pixel positions in the scan direction from the positions on the edge. Then, processing may be made while a portion where the x coordinate value xmin of the edge point is set as a neighboring pixel in the scan direction from a position on the edge (i.e., decrease 1; xmin=xstart−1 or xmin=xend−1). After contour pixels are depicted at corresponding memory addresses by writing values obtained by EX-ORing pixel data at corresponding addresses and "1", contour pixel data may be read out from the line memory in a direction opposing the right-to-left direction of an image to execute the paint out method.

<Description of 30th Embodiment>

In the above embodiments, the present invention is arranged for a printer. However, the present invention is not limited to this, but may be applied to a display device.

<Description of 31st Embodiment>

In the above embodiment, an edge having only one point, i.e., an edge whose start point coincides with an end point (point edge) is excluded in advance from a top string of edges constituting a contour when the data shown in FIG. 33 is formed. However, the present invention is not limited to this. More specifically, when edge data is to be checked, point edge data may be ignored, and the above-mentioned processing may be continued. In the processing shown in FIG. 54, in present edge data generation step S57, next edge data generation step S58, and next edge data generation step S62, if an edge being processed is a point edge, the next top data is immediately read, and is determined as a new point (xend, yend), thus continuing the processing. At this time, the target top position may be updated or the number of processed tops may be adjusted according to the number of skipped tops. In this manner, point edges can be removed during generation of the edge table.

Note that the present invention may be applied to a system constituted by a plurality of devices, or an apparatus consisting of a single device. The present invention may also be applied to a case wherein the present invention is achieved by supplying a program to a system or apparatus.

As described above, according to this embodiment, the direction of a present outline vector is checked, and whether or not edge points of the present vector are used in judgment of boundary points defining a closed section of a closed figure is discriminated on the basis of the direction and inclination of an outline vector immediately before the present outline vector, and the direction and inclination of an outline vector immediately after the present vector. When the edge points are used in judgment, only contour lines are depicted by writing values obtained by EX-ORing corresponding pixel data and a predetermined value, while controlling whether points on a vector are plotted at pixel positions on the memory or are plotted at neighboring pixel positions in the main scan direction. Thereafter, the contour image is raster-scanned. A section from an intersection with an odd-numbered contour point (including this point) to an intersection with an odd-numbered contour point (excluding this point) is determined as a paint out section in each raster scan. Thus, a complicated paint out figure can be easily generated at high speed with low cost without causing distortion.

As described above, according to the present invention, processing for painting out a portion inside complicated contour lines can be easily realized at high speed with low cost without distorting a figure.

<Description of 32nd Embodiment>

The 32nd embodiment of the present invention will be described below with reference to the accompanying drawings.

<Brief Description of Operation>

The operation of this embodiment will be briefly described below.

Figure 73:
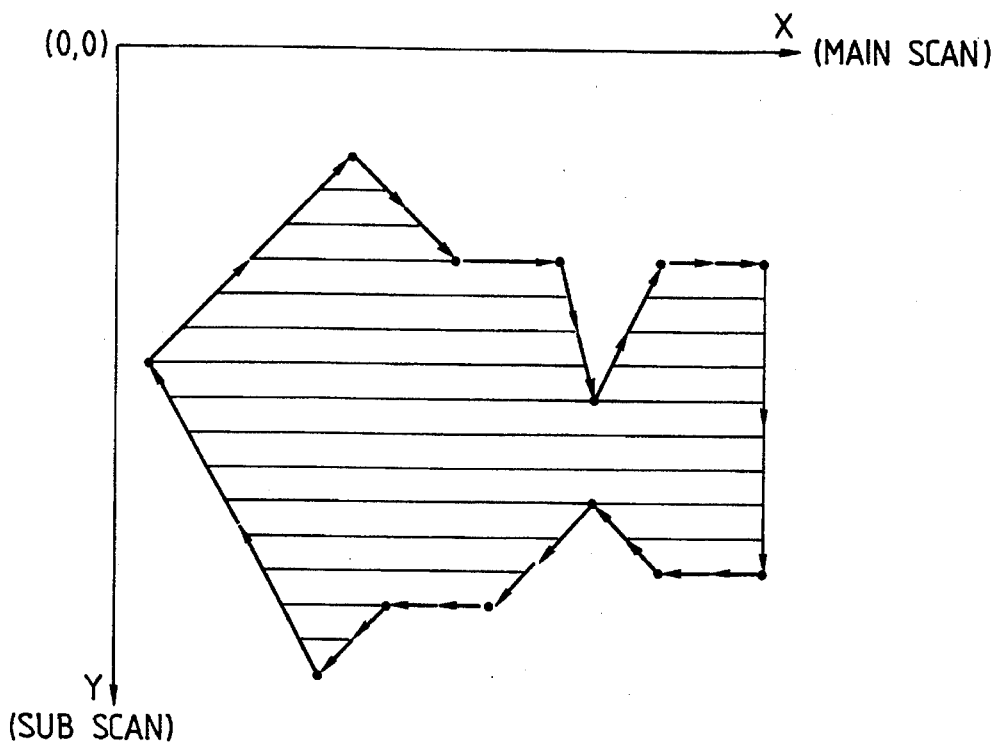
FIG. 73 is a view for explaining an inner area of a clockwise outline closed figure.
Figure 74:
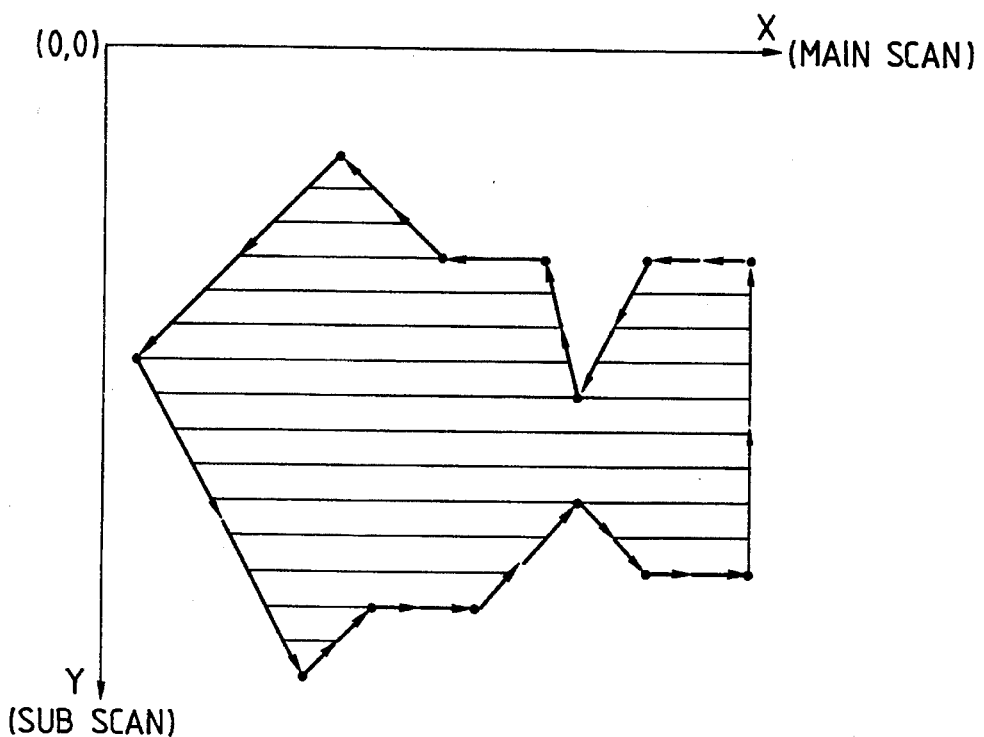
FIG. 74 is a view for explaining an inner area of a counterclockwise outline closed figure.

In this embodiment, a contour directed in a predetermined direction is used as a contour of a figure. More specifically, a contour of a figure to be processed is expressed as a group of outline vectors (line elements) contiguous in a clockwise direction of a timepiece, or a group of outline vectors contiguous in a counterclockwise direction. It can be considered that the outline vectors contiguous in the clockwise direction mean that a corresponding figure is painted out when portions on the right side of the outline vectors are painted out (FIG. 73). The outline vectors contiguous in the clockwise direction mean that a corresponding figure is painted out when portions on the left side of the outline vectors are painted out (FIG. 74).

In this embodiment, the direction of each outline vector are checked, and whether or not the two edge points of the vector, and points on the vector other than the two edge points are used in discrimination of a boundary point is discriminated on the basis of the direction of an outline vector immediately before the outline vector, and the direction of an outline vector immediately after the outline vector. Thereafter, whether a point is plotted at a corresponding pixel position on a memory or is plotted at a position adjacent by one pixel in the main scan direction is controlled depending on an odd- or even-numbered boundary discrimination edge intersecting a scan line in each scan operation. In this case, when the even-numbered boundary edge position and the odd-numbered boundary edge position immediately thereafter are the same pixel position, no point is plotted at this pixel position. Thereafter, data for one scan line is horizontally scanned to paint from a pixel at an odd-numbered plot to a pixel immediately before an even-numbered plot.

<Description of Arrangement of Apparatus>

An image processing apparatus of this embodiment will be described in detail below.

FIG. 1 is a block diagram of an image processing apparatus applied to a raster-scan type video printer of this embodiment. In FIG. 1, a microprocessor (CPU) 1 is connected to a RAM (random-access memory) 2, a line memory 3, a sync control circuit 6, and I/O ports 4 and 7 through a bus 9. Note that the control processing sequence of the CPU 1 is stored in its internal ROM (not shown) as a program. A paint out circuit 5 receives contour image data 10 output from the line memory 3 by a raster-scan operation according to a sync signal 12 from the sync control circuit 6, and outputs painted out image data 11. A printer 8 is interface-connected to the CPU 1 through the I/O port 7. The printer 8 is connected to a sync signal 13 from the sync control circuit 6, and the painted out image data 11 as a video interface.

Contour data is constituted by data indicating the number of closed loops included in an objective image, and a group of data each indicating the number of tops constituting each closed loop. The tops on each closed loop are expressed as a group of data which maintain the relationship of adjacent tops according to an order having a predetermined direction on the closed loop. This content is shown in FIG. 75.

Figure 64A:
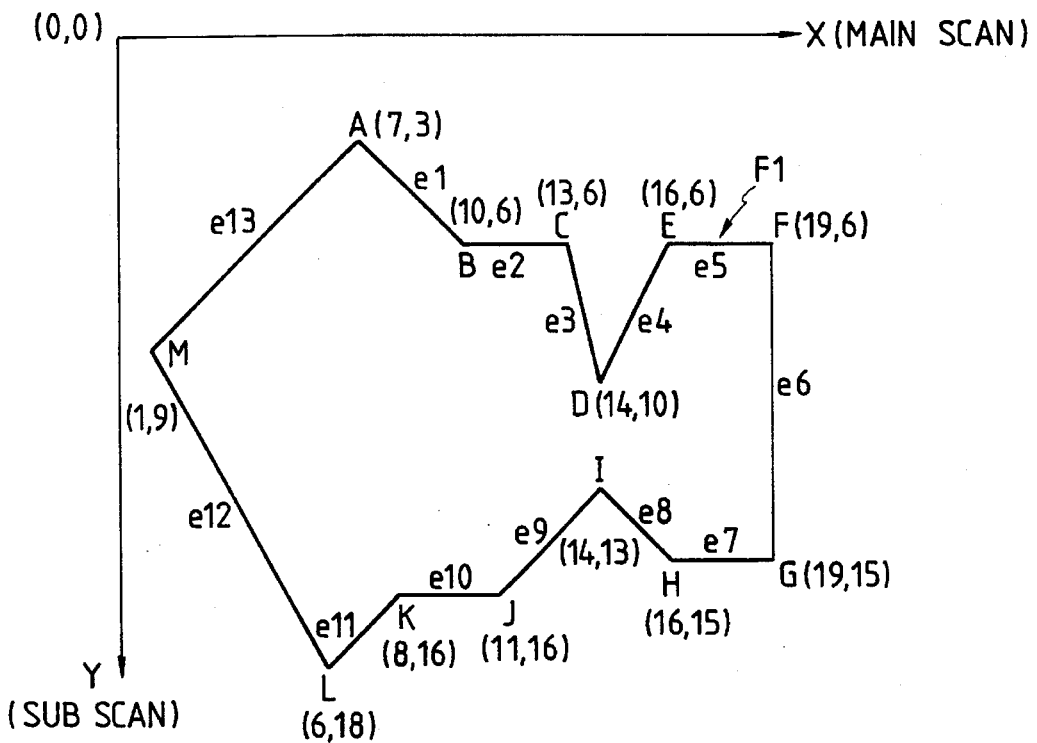
FIG. 64A is a view showing an example of outline figure data.
Figure 64B:
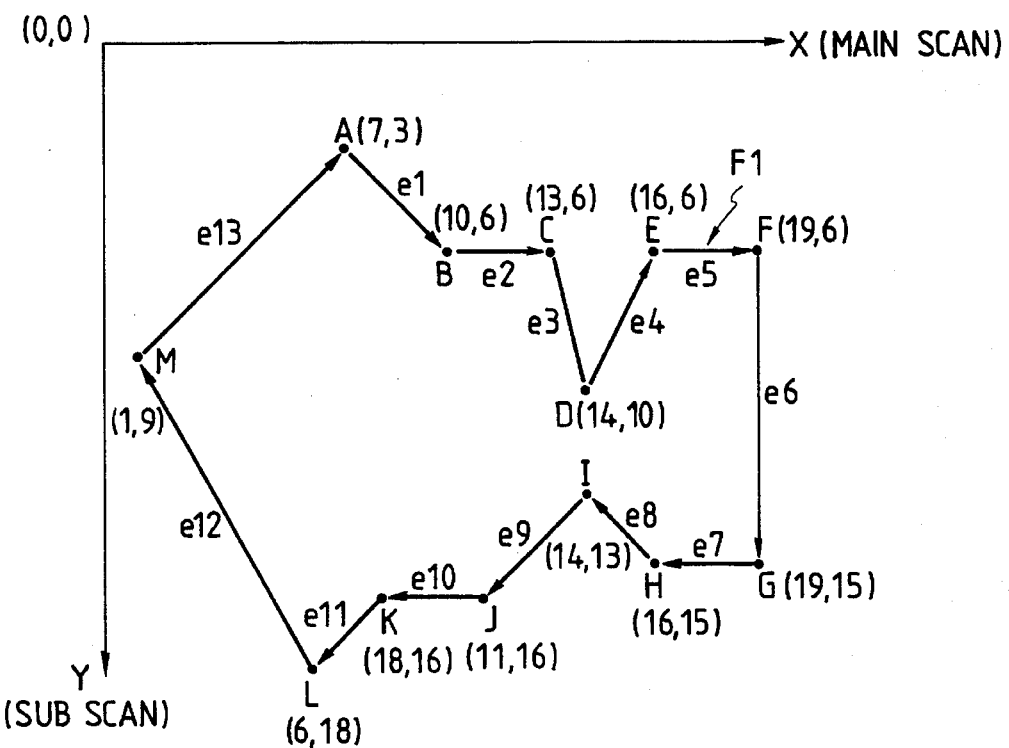
FIG. 64B is a view showing an example of clockwise outline figure data used in the embodiment.

As described above, in this embodiment, contour data is considered as a group of data aligned in a predetermined direction. For example, FIG. 64B shows an example of clockwise outline data, and its contour data is as shown in FIG. 76. In FIG. 76, the outline of a figure F1 shown in FIG. 64B is expressed as a series of points which make a round in the order of A→B →C→D→E→F→G→H→I→J→K→L→M→A to have the point A as the start point.

In the following description of this embodiment, assume that the origin of coordinates is present at the upper left corner of an image, the main scan direction (right direction) is defined as the x-axis, and the sub scan direction (vertical direction) is defined as the y-axis. In addition, an outline is assumed to have a clockwise data expression. Note that the start point in each closed loop can be an arbitrary point on the loop.

<Description of Main Processing>

Figure 77:
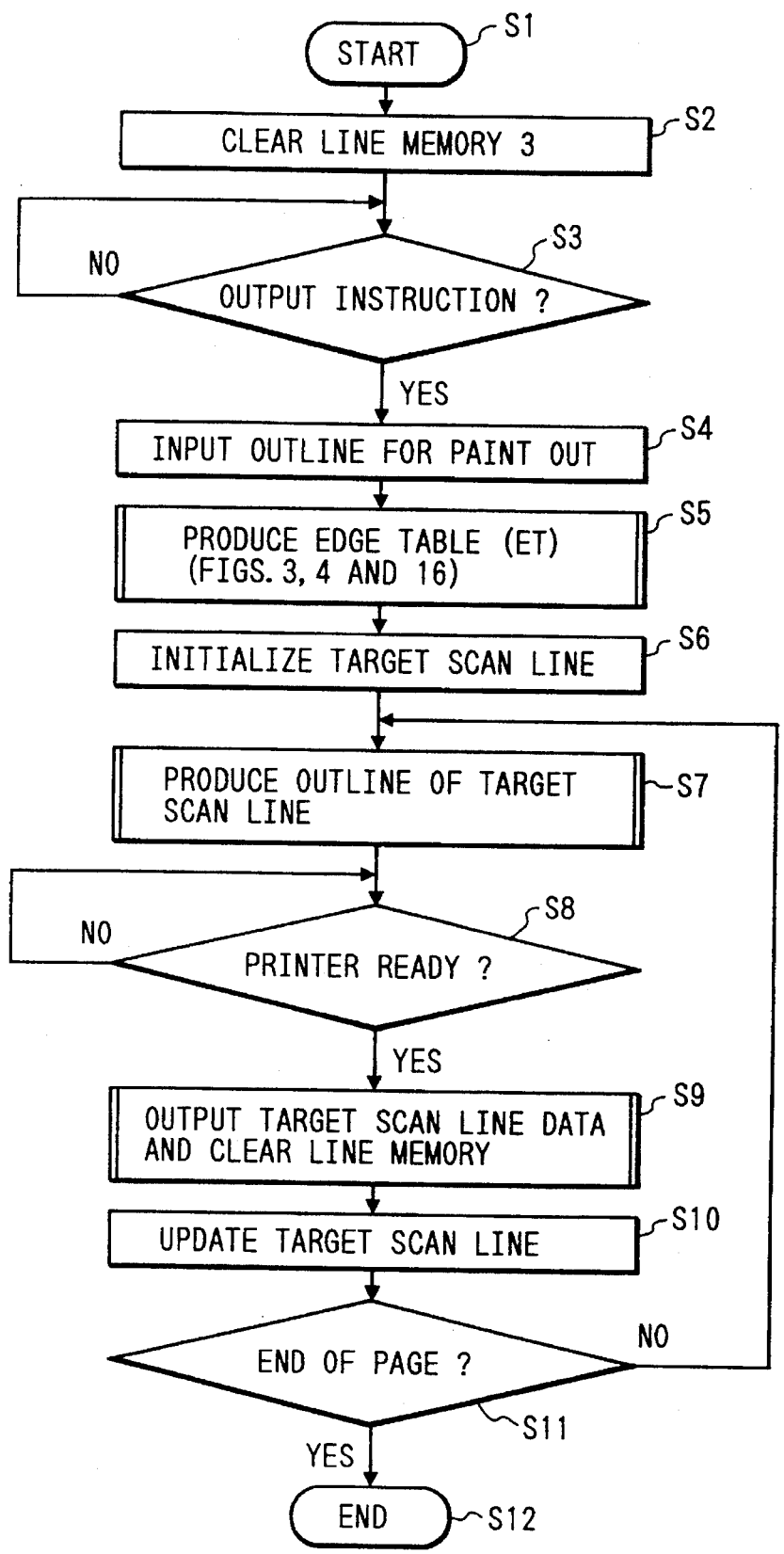
FIG. 77 is a flow chart showing an operation of the apparatus of the embodiment.

FIG. 77 shows the operation processing sequence of the CPU 1 of this embodiment, and the operation processing sequence will be described below.

Figures 65, 67:
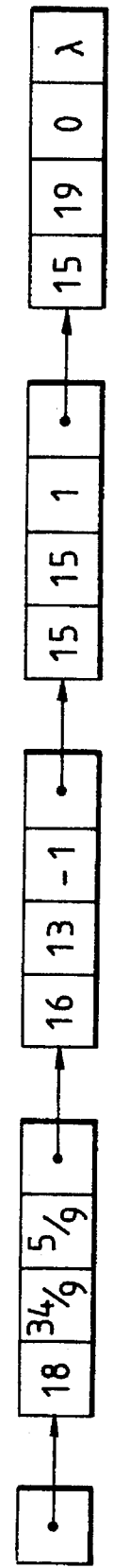
FIG. 65 is a view showing edge bucket data.
FIG. 67 is an explanatory view of an active edge table (AET)
Figure 66:
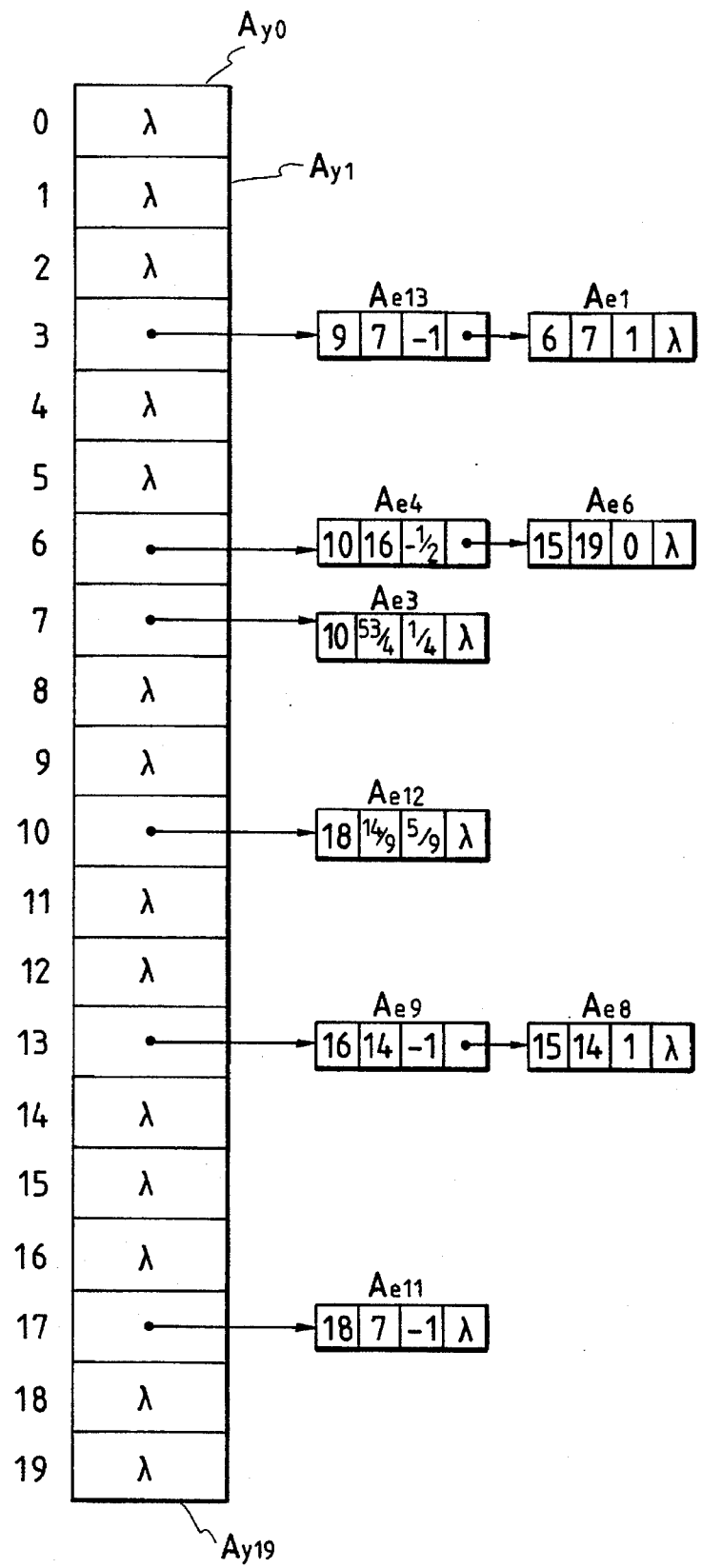
FIG. 66 is an explanatory view of an edge table (ET) of the figure shown in FIG. 64A according to a conventional method.
Figure 69:
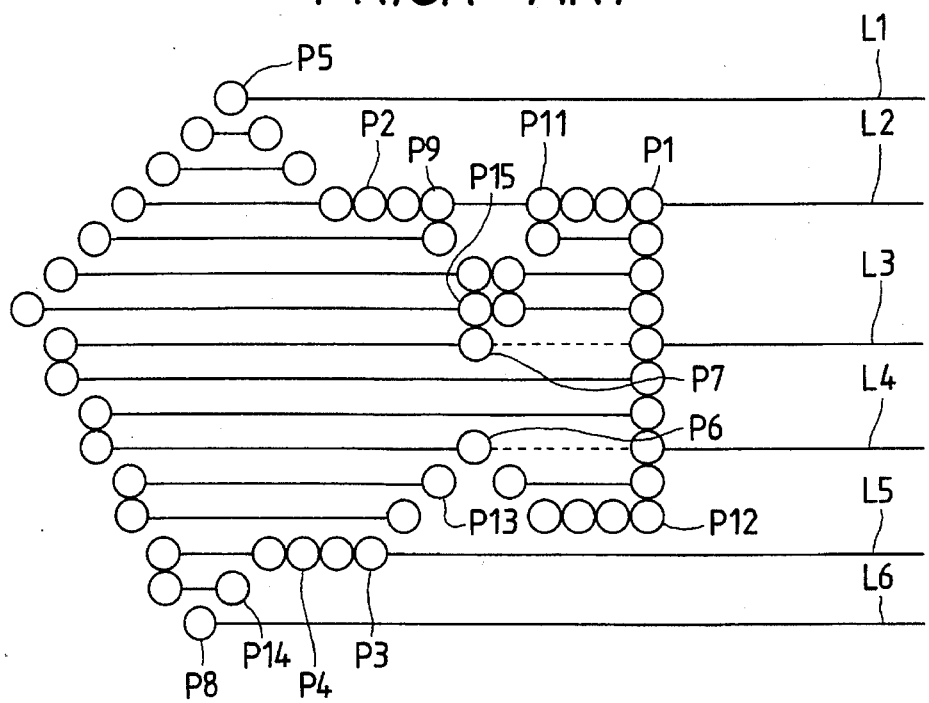
FIG. 69 is a view for explaining a problem inherent in the odd-even inversion method.
Figure 70:
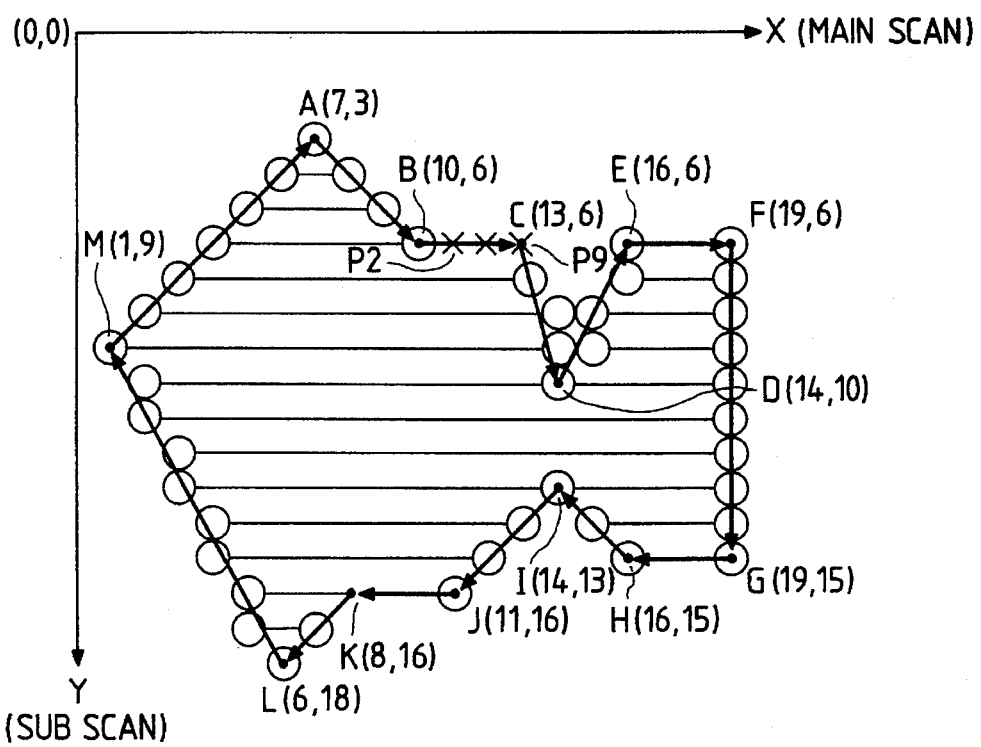
FIG. 70 is an explanatory view of a processing result of the figure shown in FIG. 64A according to the conventional method.
Figure 71:
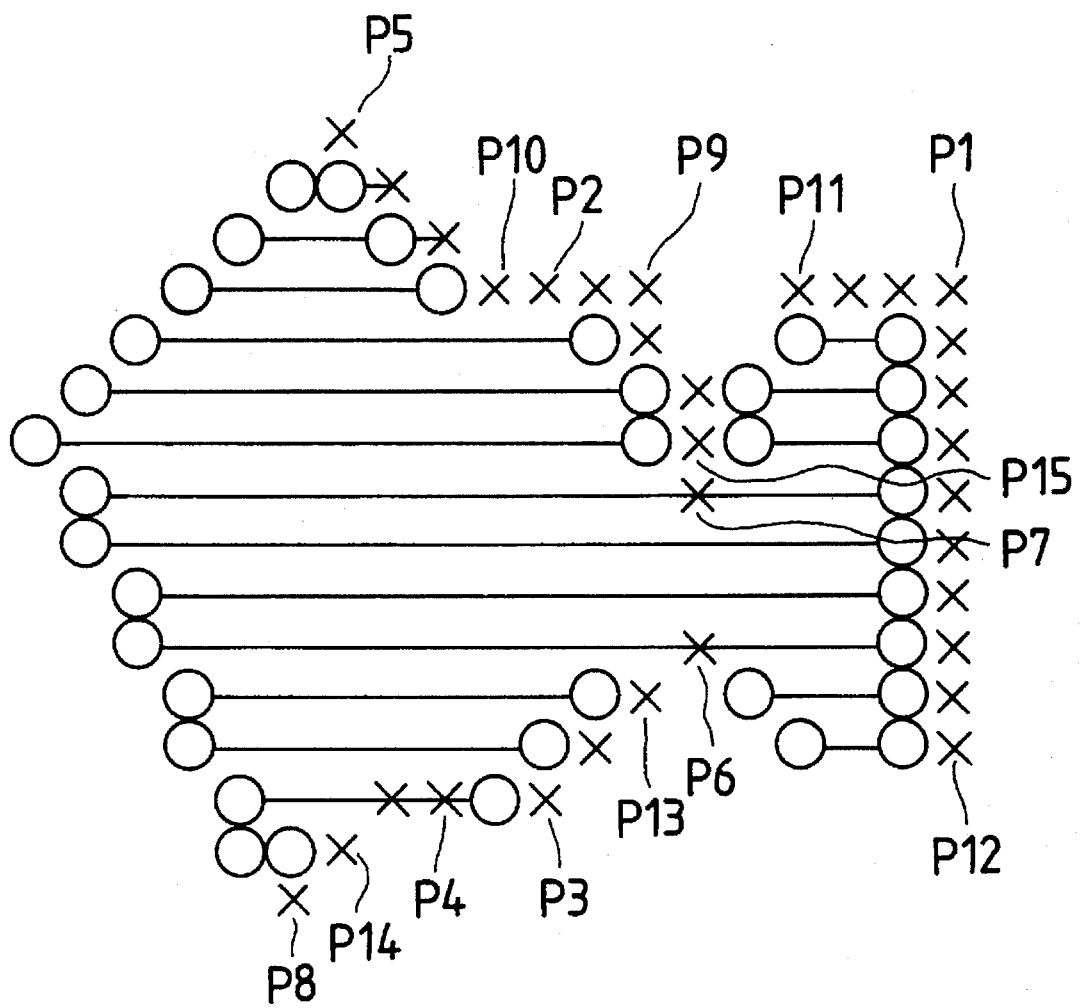
FIG. 71 is an explanatory view of a processing result of the figure shown in FIG. 64A according to the second conventional method.
Figure 72:
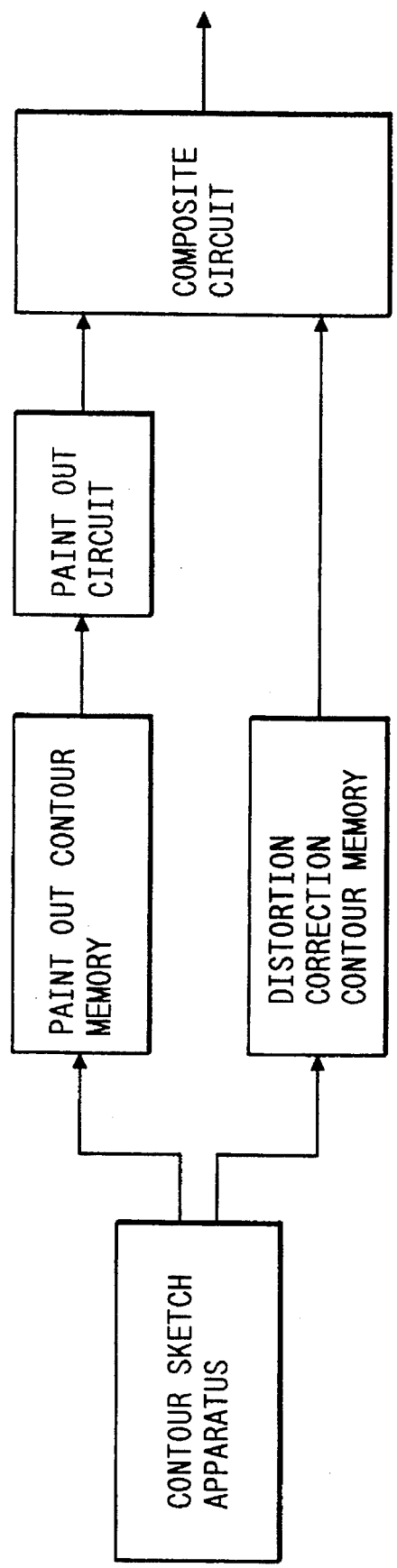
FIG. 72 is a diagram of an arrangement according to another conventional method obtained by improving the second conventional method.

When the CPU 1 starts its processing in step S1, the flow advances to step S2. In step S2, the line memory 3 is reset. At this time, the CPU 1 sets an additional circuit (not shown) to write a predetermined value "0" in the line memory as input data, and at the same time, controls the sync control circuit 6 to write the predetermined value in the line memory 3 for one frame, thereby resetting the line memory 3. Upon reception of an instruction from the CPU 1, the sync control circuit 6 sequentially generates addresses over the entire area in the line memory so as to write the predetermined value set by the CPU 1 in the line memory 3, and generates sync signals required for this write access so as to write the predetermined value in a series of predetermined address areas in the line memory 3, thereby resetting the line memory. Thereafter, the sync control circuit 6 informs a signal indicating the end of the reset operation to the CPU 1 through a control register (not shown). Upon detection of this signal, the CPU 1 can detect that the line memory is reset. After the CPU 1 clears the line memory in step S2, the flow then advances to step S3. In step S3, the CPU 1 checks if an image is input from an external circuit via the I/O port 4, and waits for until an output instruction is issued. If the CPU 1 determines in step S3 that the image is input from the external circuit, the flow advances to step S4. In step S4, the CPU 1 receives paint out contour data from the external circuit through the I/O port 4, and stores the data in the RAM 2. Note that the external circuit means not only an apparatus connected through an external interface but also an auxiliary storage device (not shown). The paint out contour data is a group of outline vector data expressed in a format shown in, e.g., FIG. 75, as described above. In step S5, data corresponding to edges are generated in the data format shown in FIG. 65 described above according to rules shown in FIG. 92, and an edge table (ET) in the format shown in FIG. 66 is generated. Thereafter, the flow advances to step S6. The details of the processing in step S5 will be described later.

In step S6, a target scan line position is set at the start scan line position in a page. More specifically, a scan line position of y=0 is set. In addition, an active edge pointer area shown in FIG. 67 is assured. The flow then advances to step S7. In step S7, an active edge table (AET) in the format shown in FIG. 67 described above is generated at the target scan position, and contour points are plotted on the line memory 3 on the basis of this table. The details of the processing in step S7 will be described later. Upon completion of the processing in step S7, the flow advances to step S8, and the control waits for until a printer is set in a recording enable state (ready).

When the printer is ready, the flow advances to step S9. In step S9, an operation for painting out an area between contour points is performed on the basis of contour point data at the scan line position sketched in step S7, while the line memory is simultaneously cleared again. The processing content of step S9 will be described later. Upon completion of the processing in step S9, the flow advances to step S10. In step S10, the target scan line position is advanced by one line. More specifically, when the target scan line position is y=i so far, a new scan line position is determined as y=i+1. The flow then advances to step S11. In step S11, it is checked if processing is completed up to the final scan line position in the page. If YES in step S11, the flow advances to step S12, and a series of processing operations are ended. If NO in step S11, the flow returns to step S7 to continue processing for the next line. Whether or not the processing reaches the final scan line is discriminated as follows in a routine (not shown). That is, the number of scan lines included in a page to be sketched is held in advance, and is compared with the target scan line position.

<Description of Edge Table Generation Processing>

Figures 78, 78A:
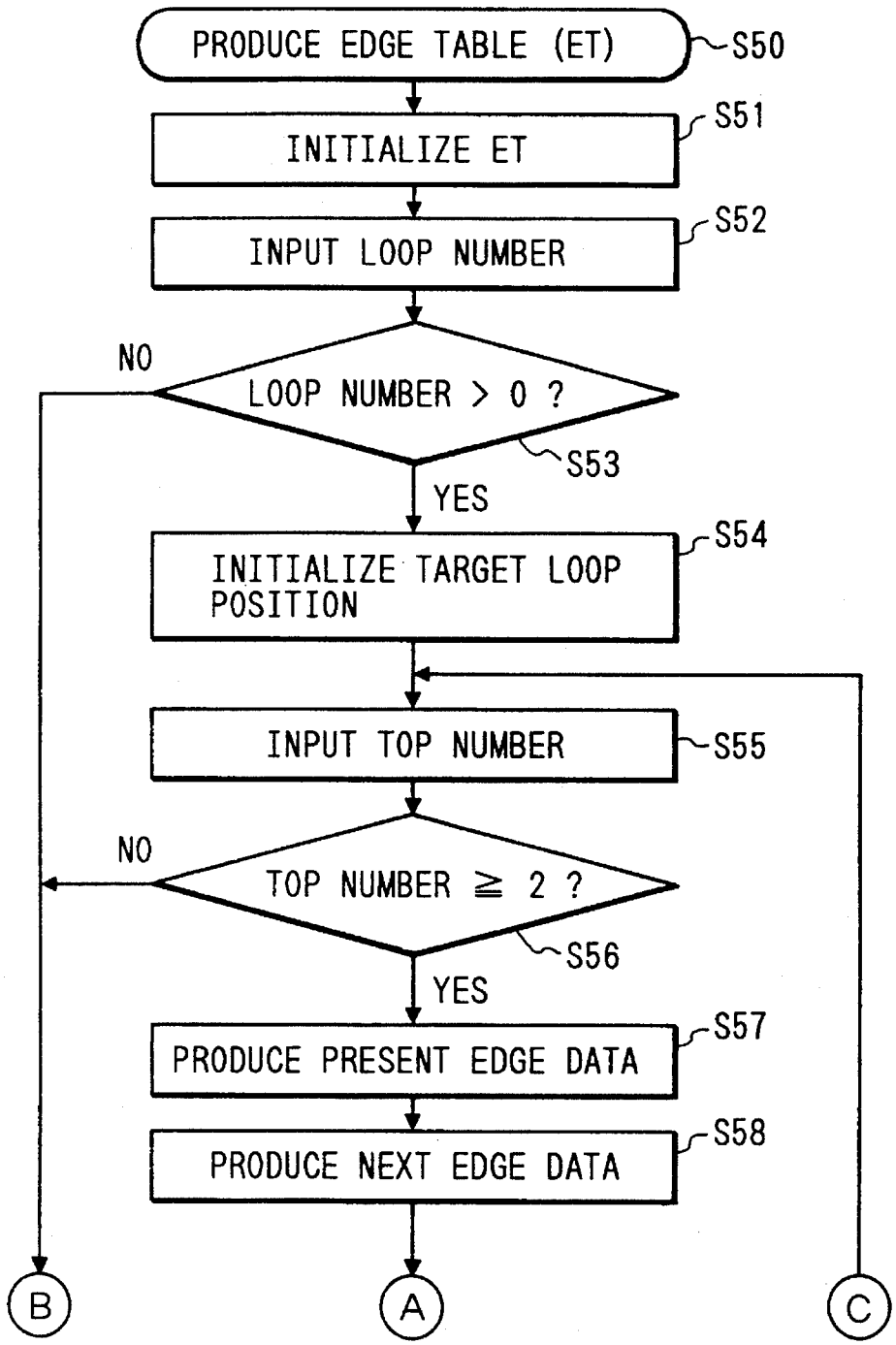
FIGS. 78, 78A and 78B are flow charts showing a generation sequence of an edge table (ET) in the embodiment.
Figure 78B:
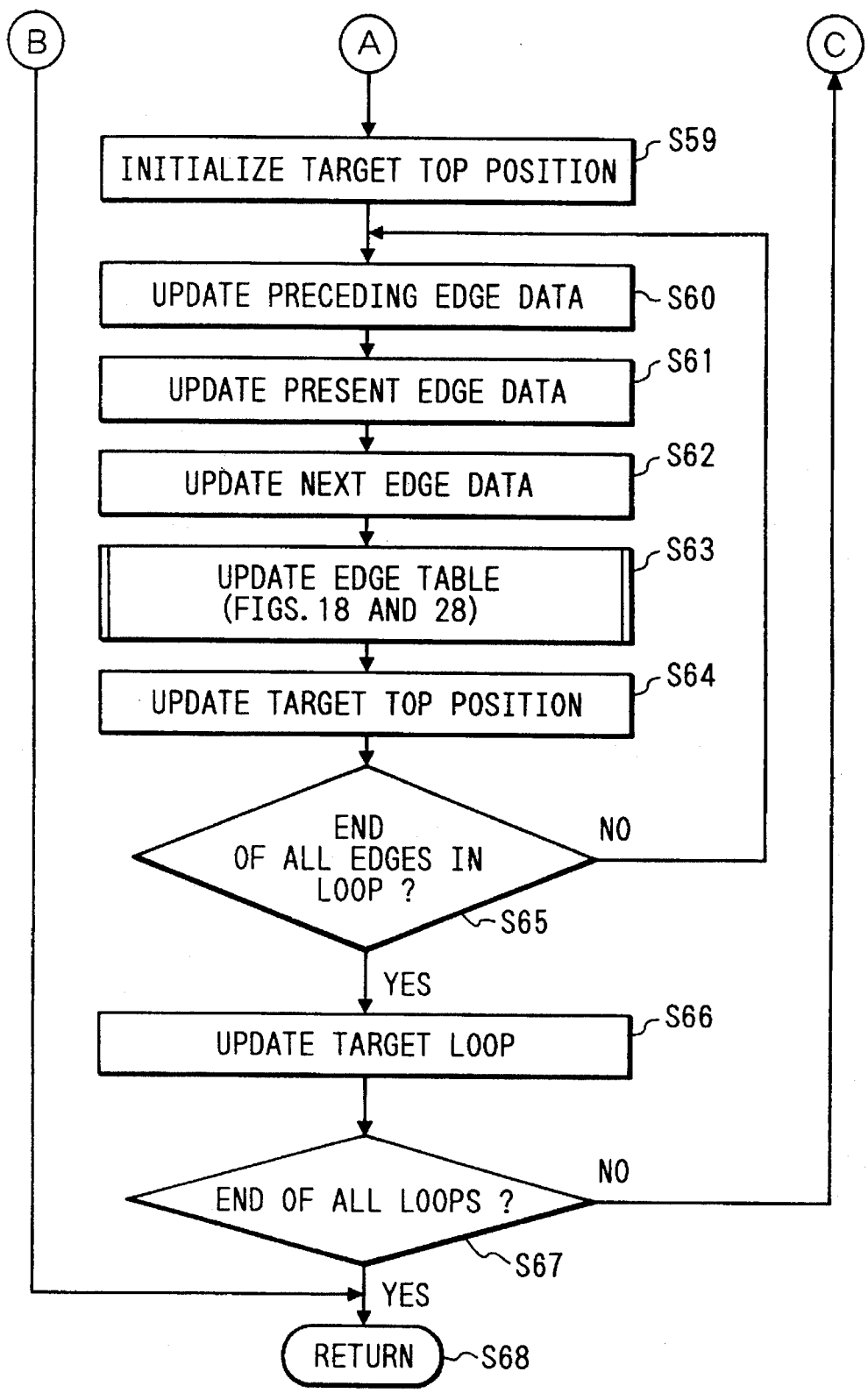

The details of the edge table generation processing in step S5 will be described below with reference to the flow chart shown in FIG. 78.

When the processing is started in step S50, the flow advances to step S51. In step S51, an edge table is initialized. More specifically, as shown in FIG. 79, address pointer (to be also referred to as "pointer bucket" hereinafter) areas Ay0 to AyN corresponding to the number of scan lines ((N+i) lines from 0 to N) included in a page to be generated are assured on the RAM 2, and a marker value "λ" indicating the absence of reference data is stored in each area. In step S52, the number N of closed loops of outline data given in the format shown in FIG. 75 is looked up, and the flow then advances to step S53. It is checked in step S53 if the number N of loops is a value larger than 0. If NO in step S53, the flow advances to step S68 to end the series of processing operations. The control then returns to the main routine. However, if YES in step S53, the flow advances to step S54. In step S54, an intra-loop top number table pointer is initialized to a position where the number of tops in a 0th loop of each intra-loop top number table of outline data given in the format shown in FIG. 75 is stored, and the flow then advances to step S55. In step S55, intra-loop top number data at the position indicated by the intra-loop top number table pointer is looked up, and the flow advances to step S56. In step S56, it is checked if the number of tops is 2 or more. If NO in step S56, since this does not express a closed area, the flow advances to step S68. However, if YES in step S56, the flow advances to step S57.

In step S57, an edge having the final top of the corresponding loop as a start point, and the first top as an end point is considered as a present edge (target edge), and the direction and x increment of this edge are calculated. More specifically, assuming that the start point coordinates of the present edge are represented by (xstart, ystart), and the end point coordinates are represented by (xend, yend), when ystart=yend, it is determined that the direction of the edge is the horizontal direction, and the x increment is not calculated. At this time, when xstart xend, the present edge is determined as a leftward edge; when xstart<xend, the present edge is determined as a rightward edge. At this time, xstart=xend means an edge of only one point, i.e., having a start point coinciding with an end point, and this edge is a portion of an edge before or after it, or an isolated point. Assume that such an edge is excluded from a top string of edges constituting a contour when data shown in FIG. 75 are formed.

When ystart>yend, the direction of the edge is determined as an upward direction, and the x increment is calculated by (xstart−xend)/(ystart−yend).

When ystart<yend, the direction of the edge is determined as a downward direction, and the x increment is calculated by (xend−xstart)/(yend−ystart).

Upon completion of the processing in step S57, the flow advances to step S58. In step S58, an edge having the first top (0th top) of the corresponding loop as the start point, and the next top (1st top) as the end point is determined as the next edge (an edge connected next to the target edge on the contour loop, i.e., an edge having the end point of the target edge as the start point), and the direction and x increment of this edge are calculated in the same manner as in step S57. Upon completion of the processing in step S58, the flow advances to step S59. In step S59, the target top coordinate table pointer is set to be an address value where 0th top coordinate data of the corresponding loop in FIG. 75 is stored, and the flow advances to step S60. In step S60, the present edge data (the direction and x increment of the present edge) immediately before this time is determined as a preceding edge (an edge connected immediately before the target edge on the contour loop, i.e., an edge having the start point of the target edge as the end point). The flow then advances to step S61. In step S61, the next edge data (the direction and x increment of the next edge) immediately before this time is determined as present edge data. The flow then advances to step S62. In step S62, the next edge data (the direction and x increment of the next edge) is calculated in the same manner as in step S57. At this time, the start point of the next edge is the end point of the present edge, and the end point of the next edge is the next top on the loop with respect to the end point of the present edge, as a matter of course. These points can be obtained by looking up data of the top position next to the target top position and the top position next to the next top position. When the target top position at this time is present at the final top of the corresponding loop, the next edge has the 0th top of the corresponding loop as the start point, and has the 1st top as the end point. When the target top position is present at a top immediately before the final top of the corresponding loop, control is made so that the next edge has the final top as the start point, and the 0th top as the end point.

Upon completion of the processing in step S62, the flow advances to step S63. In step S63, bucket data in the format shown in FIG. 65 described above are generated for the present edge data on the basis of the preceding edge data, the present edge data, and the next edge data at this time. The generated bucket data are added in the edge table to update the edge table. The content of this processing will be described in detail later. Upon completion of the processing in step S63, the flow advances to step S64. In step S64, the value of the target top coordinate table pointer is updated to the position of the coordinate table of the next top on the loop. In step S65, it is checked if processing for all the edges in the corresponding loop is completed. If YES in step S65, the flow advances to step S66; otherwise, the flow returns to step S60 to continue the series of processing operations for the next edge. Whether or not processing for all the edges is completed can be determined as follows. That is, the number of times of execution of step S65 is counted, and it is checked if the number of times exceeds the number of tops included in the corresponding loop.

In step S66, the intra-loop top number table pointer is updated to a position where the next loop data is held, and the flow then advances to step S67. In step S67, it is checked if the series of processing operations are completed for all the loops included in this contour data. If YES in step S67, the flow advances to step S68; otherwise, the flow returns to step S55 to continue the series of processing operations for the next loop.

Whether or not processing for all the loops is completed can be determined as follows. That is, the number of times of execution of step S67 is counted, and it is checked if the number of times exceeds the number of loops included in the contour data. In step S68, the edge table (ET) generation processing is ended, and the control returns to the main routine.

<Description of Edge Table Updating Processing>

The processing content in step S63 of FIG. 78 will be described below with reference to FIG. 92 and FIGS. 80A and 80B.

In step S63, the processing progresses using the directions of the present edge, the preceding edge, and the next edge. FIG. 92 shows generation rules upon generation of bucket data in the format shown in FIG. 65 for the present edge.

When the present edge is a horizontal edge, i.e., a leftward or rightward edge, no bucket data is generated for this edge, and the edge table is not updated. Therefore, FIG. 92 has no description about this edge. When the present edge is an upward or downward edge, cases of start 1 to start 8 and end 1 to end 9 are considered depending on the content of the preceding edge data.

Paying attention to processing of the start point of the present edge, cases (start 1 to start 5) wherein the present edge is an upward edge will be described below.

When the preceding edge is also an upward edge (case No. start 1), bucket data is generated, so that the start point of the present edge is located at a point moved from the actual position toward the end point along the edge by one scan line. When the preceding edge is a downward edge (case No. start 2), bucket data is generated so that the start point is the point itself at the actual position. When the preceding edge is a leftward edge (case No. start 3), bucket data is generated so that the start point is the point itself at the actual position. When the preceding edge is a rightward edge (case No. 4), bucket data is generated so that the start point of the present edge is located at a point moved from the actual position toward the end point along the edge by one scan line.

Cases (start 5 to start 8) wherein the present edge is a downward edge will be examined below. When the preceding edge is an upward edge (case No. start 5), bucket data is generated so that the start point is the point itself at the actual position. When the preceding edge is a rightward edge (case No. start 8), bucket data is generated so that the start point is the point itself at the actual position. When the preceding edge is a downward edge (case No. start 6), and is a leftward edge (case No. start 7), bucket data is generated so that the start point of the present edge is located at a point moved from the actual position toward the end point along the edge by one scan line.

Cases paying attention to processing of the end point of the present edge will be explained below. Cases (end 1 to end 4) wherein the present edge is an upward edge will be described below.

When the next edge is also an upward edge (case No. end 1), bucket data is generated so that the end point of the present edge is the point itself at the actual position. When the next edge is a downward edge (case No. end 2), bucket data is generated so that the end point of the present edge is the point itself at the actual position. When the next edge is a leftward edge (case No. end 3), bucket data is generated so that the end point of the present edge is located at a point returned from the actual position toward the start point along the edge by one scan line. When the next edge is a rightward edge (case No. end 4), bucket data is generated so that the end point of the present edge is the point itself at the actual position.

Cases (end 5 to end 8) wherein the present edge is a downward edge will be described below.

When the next edge is an upward edge (case No. end 5), bucket data is generated so that the end point of the present edge is the point itself at the actual position. When the next edge is a downward edge (case No. end 6), bucket data is generated so that the end point of the present edge is the point itself at the actual position. When the next edge is a leftward edge (case No. end 7), bucket data is generated so that the end point is the point itself at the actual position. When the next edge is a rightward edge (case No. end 8), bucket data is generated so that the end point of the present edge is located at a point returned from the actual position toward the start point along the edge by one scan line.

According to the above-mentioned generation rules, bucket data in the format shown in FIG. 65 is generated in correspondence with the present edge.

The above-mentioned processing is performed in step S63. After all, the CPU 1 executes processing according to the flow charts shown in FIGS. 80A and 80B.

When the series of processing operations are started in step S630, the flow advances to step S631. At this time, input data include the preceding edge data (the direction of the preceding edge) updated in step S60, the present edge data (the coordinate values (xstart, ystart) and (xend, yend) of the start and end points, direction, and x increment Δxnow of the present edge) updated in step S61, and the next edge data (the direction of the next edge) generated in step S62.

In step S631, it is checked if the present edge is a horizontal edge (i.e., one of rightward and leftward edges). If YES in step S631, the flow advances to step S641 to end the series of processing operations, and the control returns to step (S64) next to the step that called this processing.

If NO in step S631, the flow advances to step S632 to check if the present edge is an upward edge. If YES in step S632, the flow advances to step S633, and bucket data for the upward edge is generated. However, if NO in step S632 (i.e., if the present edge is a downward edge), the flow advances to step S642, and bucket data for the downward edge is generated.

If it is determined that the present edge is an upward edge, and the flow advances to step S633, an edge bucket in the format of FIG. 65 is temporarily generated without modifications. More specifically, the edge bucket is formed to have ymax=ystart, xmin= xend, and Δx=Δxnow, and a pointer stores λ (a marker indicating no connection destination) in this case. In step S640, a value ymin indicating to which pointer bucket this edge bucket is to be connected upon registration of this edge bucket in the ET is also set. In this case, ymin=yend is set. Note that ymax is a y value of an edge point having a larger y coordinate value of the two edge points (start and end points) of the present edge, and xmin and ymin are x and y values of an edge point having a smaller y coordinate value. In addition, the x increment Δx means a change in x coordinate per scan line when a point on the present edge is moved from a point having a smaller y coordinate value toward a point having a larger y coordinate value along the present edge. In this embodiment, since the positive direction of the x coordinate is assumed to be the rightward direction, and the positive direction of the y coordinate is assumed to be the downward direction, ymax, xmin, Δx, and ymin are set, as described above.

Upon completion of the processing in step S633, the flow advances to step S643. In step S634, it is checked if the preceding edge is an upward edge. If YES in step S634, it is determined that the start point of the present edge corresponds to the case No. start 1, and the flow advances to step S636; otherwise, the flow advances to step S635. In step S635, it is checked if the start point of the present edge corresponds to the case No. start 4. If YES in step S635, the flow advances to step S636; otherwise (i.e., if the start point of the present edge corresponds to the case No. start 2 or start 3), the flow advances to step S637. In step S636, ymax is decreased by "1", i.e., the position of the start point of the upward edge is closed by one scan line. Upon completion of the processing in step S636, the flow advances to step S637. Thus, processing for the start point when the present edge is an upward edge is ended.

In step S637, it is checked if the next edge is a leftward edge. If YES in step S637, it is determined that the end point of the present edge corresponds to the case No. end 3, and the flow advances to step S638. Otherwise, it is determined that the end point of the present edge corresponds to one of the case Nos. end 1, end 2, and end 4, and the flow advances to step S640. In step S638, xmin is increased by $\Delta x$, i.e., the x coordinate value is corrected so that the position of the end point of the upward edge is closed by one scan line. Upon completion of the processing in step S638, the flow advances to step S639, and ymin is increased by "1". That is, the y coordinate value is corrected so that the position of the end point of the upward edge is closed by one scan line. Upon completion of the processing in step S639, the flow advances to step S640.

A case will be explained below wherein it is determined in step S632 that the present edge is not an upward edge, i.e., is a downward edge.

In this case, the flow advances to step S642, and an edge bucket in the format of FIG. 65 is temporarily generated without modifications. More specifically, the edge bucket is formed to have ymax=yend, and xmin =xstart, $\Delta x = \Delta x$now, and a pointer stores $\lambda$ (a marker indicating no connection destination) in this case. In addition, ymin=ystart is set. In step S643, it is checked if the preceding edge is a downward edge. If YES in step S643, it is determined that the start point of the present edge corresponds to the case No. start 6, and the flow advances to step S645; otherwise, the flow advances to step S644. In step S644, it is checked whether or not the start point of the present edge corresponds to the case No. start 7 (or case No. start 5 or start 8). If YES in step S644, the flow advances to step S645; otherwise, the flow advances to step S647. In step S645, xmin is increased by $\Delta x$, i.e., the x coordinate value is corrected, so that the position of the start point of the downward edge is closed by one scan line. Upon completion of the processing in step S645, the flow advances to step S646, and ymin is increased by "1". That is, the y coordinate value is corrected so that the position of the start point of the downward edge is closed by one scan line. Thus, processing for the start point of the present edge is ended.

Upon completion of the processing in step S646, the flow advances to step S647. In step S647, it is checked if the next edge is a rightward edge. If YES in step S647, it is determined that the end point of the present edge corresponds to the case No. end 8, and the flow advances to step S648; otherwise, it is determined that the end point of the present edge corresponds to one of the case Nos. end 5, end 6, and end 7, and the flow advances to step S640. In step S648, ymax is decreased by "1", i.e., the position of the end point of the downward edge is closed by one scan line. Upon completion of the processing in step S648, the flow advances to step S640.

As described above, an edge bucket for the present edge is generated according to the rules described in FIG. 92 depending on whether the present edge is an upward or downward edge.

In step S640, the generated edge bucket is additionally registered in the edge table (ET). More specifically, the edge bucket of the present edge is added to a list connection of edge buckets connected to the pointer bucket Ay ymin corresponding to y=ymin in the edge table. An area for holding the edge bucket of the present edge is assured on the RAM 2. Then, the value of the pointer bucket Ay ymin is checked. If the value is still "$\lambda$", it is rewritten to an address of the area for holding the edge bucket of the present edge, and the edge bucket of the present edge is list-connected to the pointer bucket. When the value of the pointer bucket Ay ymin already has a value other than "$\lambda$", since there are some list-connected edge buckets, the edge bucket of the present edge is inserted in the list-connected edge bucket string so that the values xmin of these edge buckets are sorted in the ascending order when viewed from the pointer bucket side. This insertion can be realized as follows. That is, the value of a point of a bucket at a position immediately before an insertion position is copied to the pointer portion of the edge bucket of the present edge to rewrite the pointer portion of the immediately preceding bucket with the address value of the edge bucket of the present edge. In this manner, when the processing in step S640 is completed, the flow advances to step S641. In step S641, the series of processing operations for updating the edge table are ended, and the control returns to a main routine that called this processing.

<Description of Target Scan Line Contour Generation Processing>

The "target scan line contour generation processing" in step S7 in FIG. 77 will be described below. Note that processing progresses according to the following sequence using an active edge table (AET) at that time.

Note that the active edge table (AET) is initialized in step S6, and is initially in an empty state (written with a marker $\lambda$). Even when the flow advances to step S8 by temporarily ending the processing, the state of the active edge table is held until step S7 is executed again.

(1) A new active edge table (AET) for connecting edge bucket data associated with a scan line y coordinate value is formed by combining information of the edge table (ET) and information of the active edge table (AET) at that time, while maintaining the sort order of x coordinate values (xmin) of the active edge table (AET).

(2) Bucket data connected to the active edge table (AET) are accessed from one having a smaller x coordinate value (xmin), and a value held at an address on the line memory 2 corresponding to an odd-numbered x coordinate value position is rewritten as a value obtained by EX-ORing a bit value (0 or 1) stored at that address with "1". A value held at an address on the line memory 3 corresponding to a right neighboring pixel of a pixel at an even-numbered x coordinate value position is rewritten as a value obtained by EX-ORing a bit value (0 or 1) stored at that address with "1". In this case, when the pixel position of the even-numbered x coordinate value is the same as that of the odd-numbered x coordinate value immediately thereafter, no points are sketched.

(3) Edge bucket data having the scan line y coordinate value as a y value (ymax) of an edge point having a larger y coordinate value is deleted from the active edge table (AET) for an operation on the next scan line.

(4) The x coordinate values (xmin) of edge bucket data remaining in the active edge table (AET) are updated by utilizing increment data ($\Delta x$) for an operation on the next scan line. More specifically, a new xmin is obtained by xmin+$\Delta x$.

(5) After the x coordinate values (xmin) are updated, the edge bucket data are re-sorted on the basis of the updated x coordinate values (xmin).

In this manner, only a contour of a closed figure on a target scan line at that time is sketched, so that a point intersecting the scan line at an odd-numbered position is written at the corresponding memory address of the line memory, and as a point intersecting the scan line at an even-numbered position, its right neighboring point by one pixel is written at the corresponding memory address of the line memory. In this case, when the even-numbered point intersecting the scan line is the same as the odd-numbered point intersecting the scan line immediately thereafter, both the points are not sketched. When the active edge table (AET) is empty at that time, nothing is sketched. In this manner, step S7 is ended. The line memory 3 has a capacity corresponding to pixels aligned in the scan direction (x direction) included in the scan line, and stores pixel data so that the addresses are continuously increased in the ascending order along the main scan direction.

<Description of Target Scan Line Data & Line Memory Clear Processing>

The processing content in step S9 in FIG. 77 will be described below.

Figure 81:
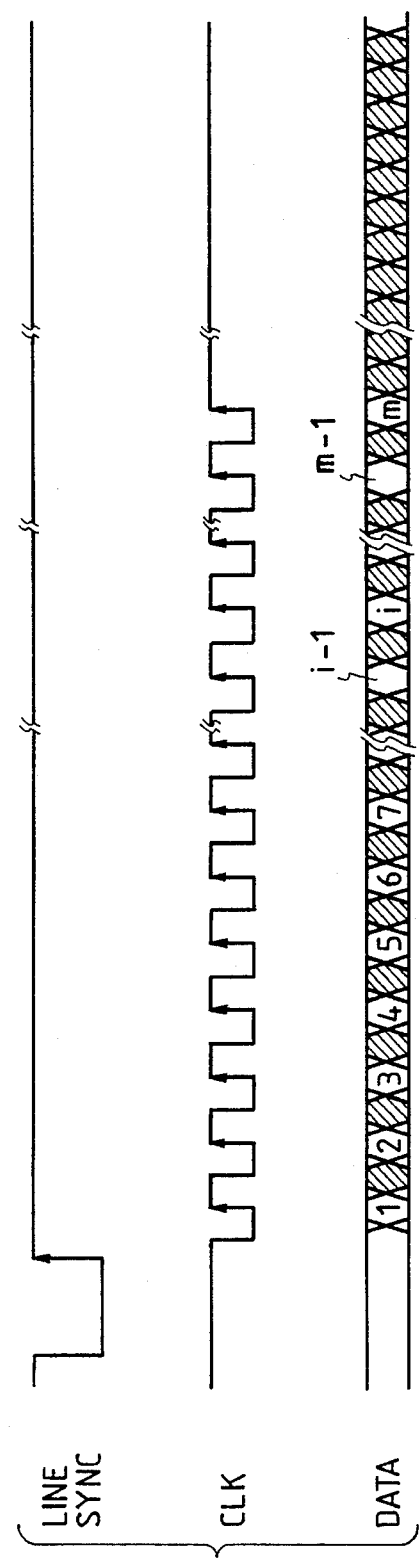
FIG. 81 is an explanatory view of a sync signal generated by a sync control circuit.

In step S9, an operation for painting an area between contour points is performed on the basis of contour point data at the scan line position sketched in step S7, while the line memory is simultaneously cleared again. When the flow advances to step S9, the CPU 1 sets the additional circuit (not shown), so that data to be input to the line memory 3 until the processing in step S9 is completed becomes a predetermined value "0", and at the same time, enables the sync control circuit 6 to output data of one scan line. The CPU 1 then waits for a signal indicating the end of the series of operations sent back from the sync control circuit 6. When the sync control circuit 6 is enabled by the CPU 1, it generates addresses from the start address of the line memory 3, and causes the line memory 3 to output data held at the corresponding address positions onto a signal line 10. At the same time, the sync control circuit 6 executes an operation for writing the predetermined value "0" set by the CPU 1 at each address. The sync control circuit 6 stops after this operation is performed by the predetermined number of pixels, and outputs a signal for informing the end of the series of processing operations for the scan line to the CPU 1. In synchronism with this series of operations, the sync control circuit 6 outputs a sync signal shown in FIG. 81 as a signal 12 to the paint in circuit 5, and a sync signal 13 to the printer 8. "Line Sync" in FIG. 81 represents a scan line sync signal, and the leading edge of this signal means the start of processing for one scan line. "CLK" is a pixel sync signal, and the leading edge of this signal indicates an effective data timing. The leading edge of the signal CLK immediately after the signal Line Sync indicates the effective data timing of the first pixel of the corresponding scan line, and thereafter, the leading edge after one clock indicates the data timing of a pixel adjacent to the first pixel in the main scan direction. FIG. 81 shows the sync signals when m pixels are present on the scan line.

Figure 82:
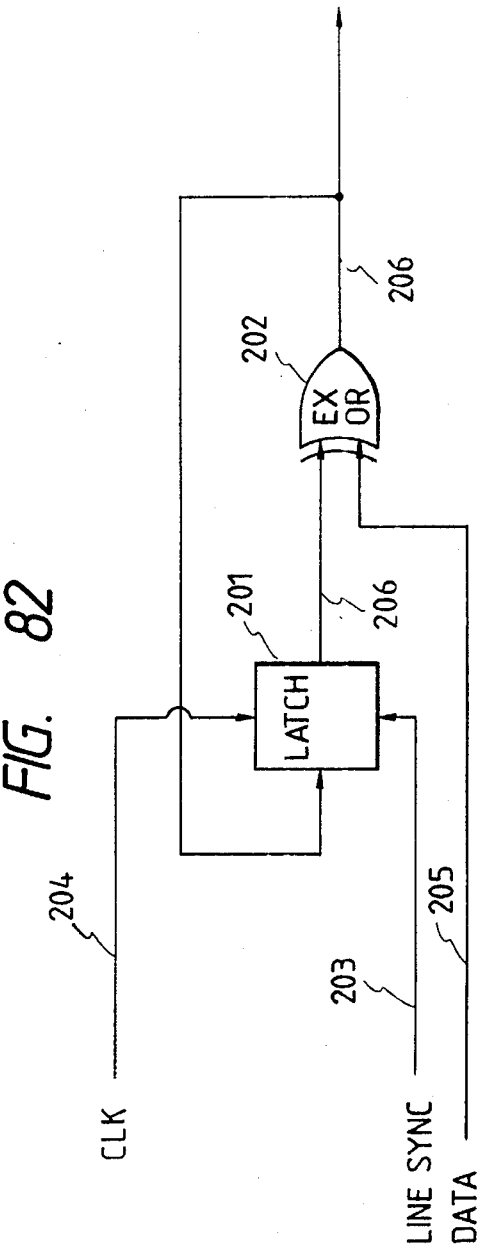
FIG. 82 is a diagram of a paint in circuit.

FIG. 82 shows an arrangement of the paint in circuit 5 of this embodiment. With the above-mentioned operations, the data 10 output from the line memory 3 is only contour data on one scan line. The circuit shown in FIG. 82 outputs pixel signals "1" from an odd-numbered contour pixel signal on the data 10 to a pixel signal immediately before an even-numbered contour pixel, and outputs pixel signals "0" for other pixel areas using the sync signal 12. At this time, the input data 10 is input as a Data signal 205, and includes "1"s corresponding to only contour positions, and "0"s for other positions. In response to the input Line Sync signal, a value held by a latch 201 is initialized to "0", and is reset to output "0" to an EX-OR gate 202. Then, the gate 202 outputs an EX-ORed result of data 205 input in synchronism with the CLK signal 204 and an output 206 from the latch 201 onto 10 the signal line 206. Data on the signal line 206 is output data 11 to the printer 8. The data on the signal line 206 is latched by the latch 201 in synchronism with the CLK signal 204, and is held for generating the next data. This series of operations are repeated by the number of pixels.

Figure 83:
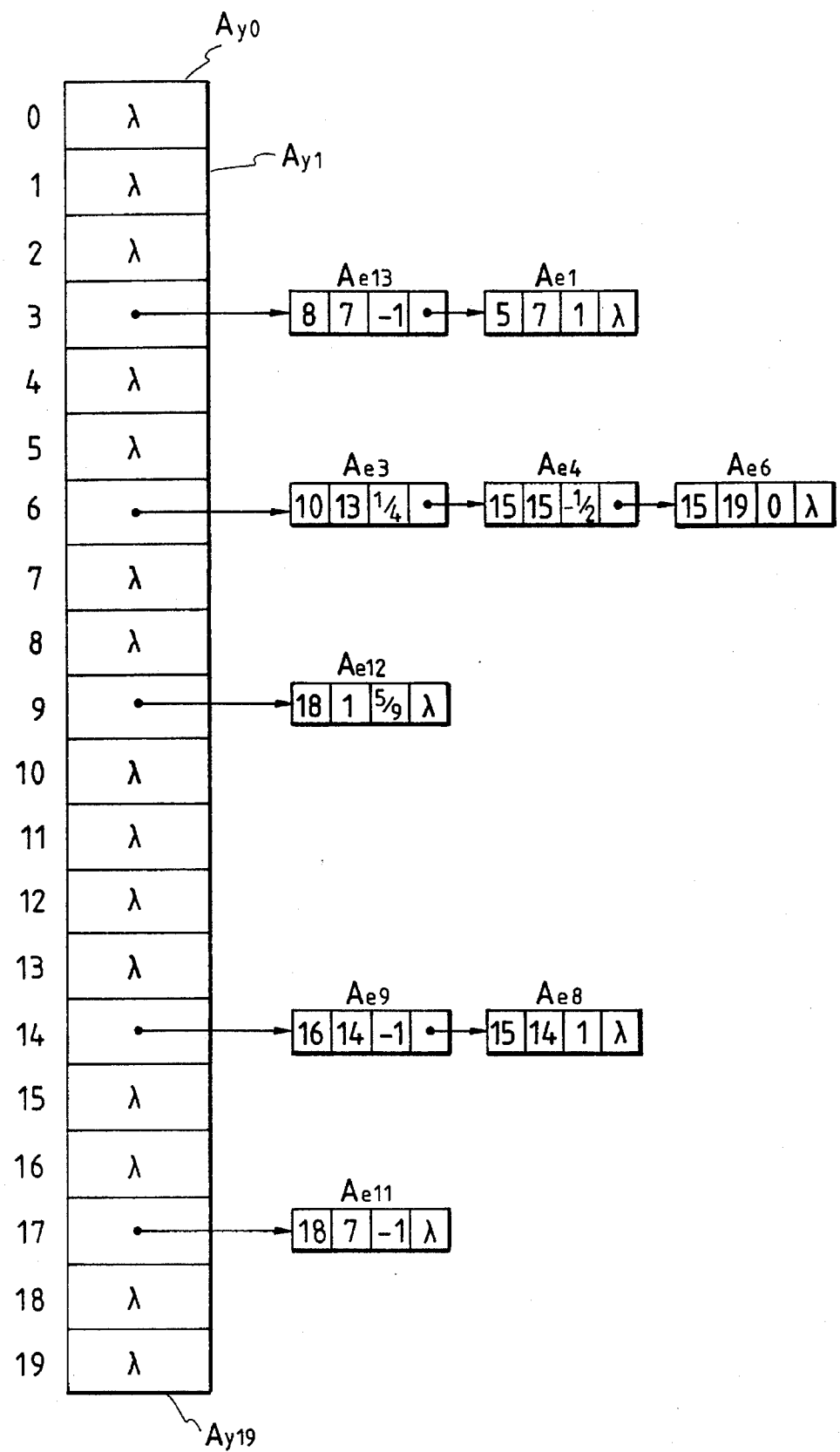
FIG. 83 is an explanatory view of an edge table (ET) based on the figure shown in FIG. 64B.

FIG. 83 shows the edge table obtained by this embodiment for FIG. 64B. As for a figure F1 in FIG. 64B, an edge e13 is an upward edge, its preceding edge e12 is an upward edge, and the next edge e1 is a downward edge. For this reason, since the start point of the edge e13 corresponds to the case No. start 1 in FIG. 28, and its end point corresponds to the case No. end 2 in FIG. 28, we have:

e13: ymax=8, xmin=7, Δx=−1, ymin=3

Similarly, the edge e1 is a downward edge, its start point corresponds to the case No. start 5, and its end point corresponds to the case No. end 8. Therefore, we have:

e1: ymax=5, xmin=7, Δx=1, ymin=3

Since an edge e2 is a horizontal edge, no edge bucket is generated.

An edge e3 is a downward edge, its start point corresponds to the case No. start 8, and its end point corresponds to the case No. end 5. Therefore, we have:

e3: ymax=10, xmin=13, Δx=¼, ymin=8

An edge e4 is an upward edge, its start point corresponds to the case No. start 2, and its end point corresponds to the case No. end 4. Therefore, we have:

e4: ymax=10, xmin=16, Δx=−½, ymin=6

Since an edge e5 is a horizontal edge, no edge bucket is generated.

An edge e6 is a downward edge, its start point corresponds to the case No. start 8, and its end point corresponds to the case No. end 7. Therefore, we have:

e6: ymax=15, xmin=19, Δx=0, ymin=6

Since an edge e7 is a horizontal edge, no edge bucket is generated.

An edge e8 is an upward edge, its start point corresponds to the case No. start 3, and its end point corresponds to the case No. end 2. Therefore, we have:

e8: ymax=15, xmin=14, Δx=1, ymin=13

An edge e9 is a downward edge, its start point corresponds to the case No. start 5, and its end point corresponds to the case No. end 7. Therefore, we have:

e9: ymax=16, xmin=14, Δx=−1, ymin=13

Since an edge e10 is a horizontal edge, no edge bucket is generated.

An edge e11 is a downward edge, its start point corresponds to the case No. start 7, and its end point corresponds to the case No. end 5. Therefore, we have:

e11: ymax=18, xmin=7, Δx=−1, ymin=17

An edge e12 is an upward edge, its start point corresponds to the case No. start 2, and its end point corresponds to the case No. end 1. Therefore, we have:

e12: ymax=18, xmin=1, Δx=⅝, ymin=9

Figure 85:
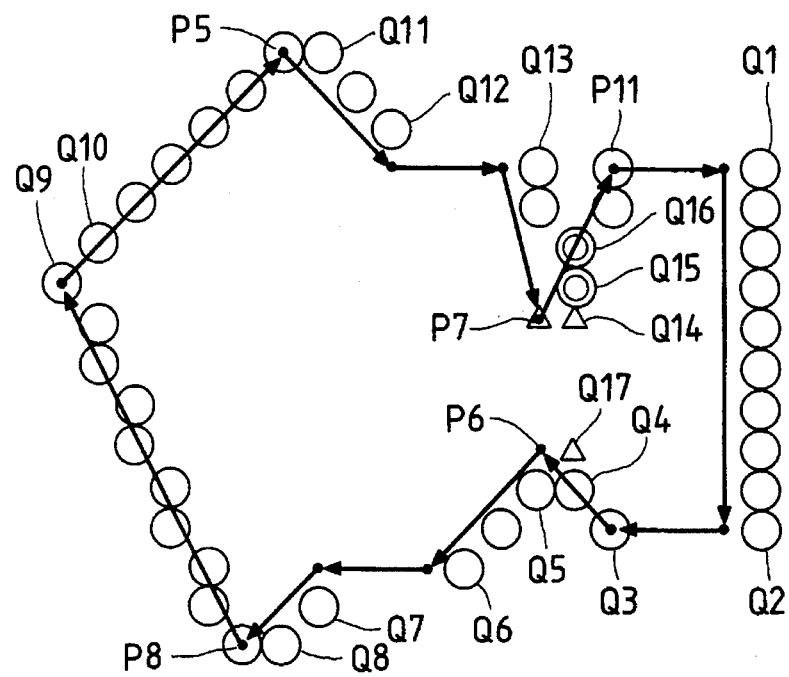
FIG. 85 is an explanatory view of contour pixels output for the figure shown in FIG. 64B.

FIG. 83 shows the edge table summarizing the abovementioned data. FIG. 84 shows a change in active edge table (AET) when the AET is generated based on FIG. 83, and a target scan line is sequentially incremented from y=0 by one. FIG. 85 shows a figure obtained by plotting pixels at an x-min position of an odd-numbered edge bucket and a pixel adjacent to an xmin position of an even-numbered edge bucket in the main scan direction as contour pixels in each scan line according to the AET shown in FIG. 84. In FIG. 85, when the pixel position of xmin of the even-numbered edge bucket is the same as that of xmin of the odd-numbered edge bucket immediately thereafter, both the points are not plotted. In FIG. 85, pixels at positions between P5 and Q10 are contour pixels for the edge e13, and pixels at positions between Q11 and Q12 are contour pixels for the edge e1. Similarly, pixels at positions between Q9 and P8, between Q13 and Q15, between P11 and Q15, between Q1 and Q2, between Q4 and Q3, between Q5 and Q6, and between Q7 and Q8 are contour pixels for the edges e12, e3, e4, e6, e8, e9, and e11, respectively. Pixels Q15 and Q16 indicated by ⊚ in FIG. 85 are those plotted as contour pixels for both the edges e3 and e4. As described above, since the plot method is a method of rewriting values obtained by EX-ORing bit values (0 or 1) already stored at corresponding address positions on the line memory and "1", the states of these pixels are returned to a non-plot state. Pixels P7 and P14, and P6 and Q17 indicated by A correspond to the case wherein "when the pixel position of the even-numbered x coordinate value is the same as that of the odd-numbered x coordinate value immediately thereafter, both the points are not sketched" described in the procedure (2) explained above at the target scan line positions y=10 and y=13 in the processing in step S7 described above. These points correspond to tops of recessed portions of a closed figure. When these points are plotted, isolated white pixels are undesirably generated in the recessed portion after the paint in processing (in this case, the positions of the points P7 and P6 correspond to isolated white pixels). For this reason, the above-mentioned processing in the double quotation marks has an important meaning.

Figure 90:
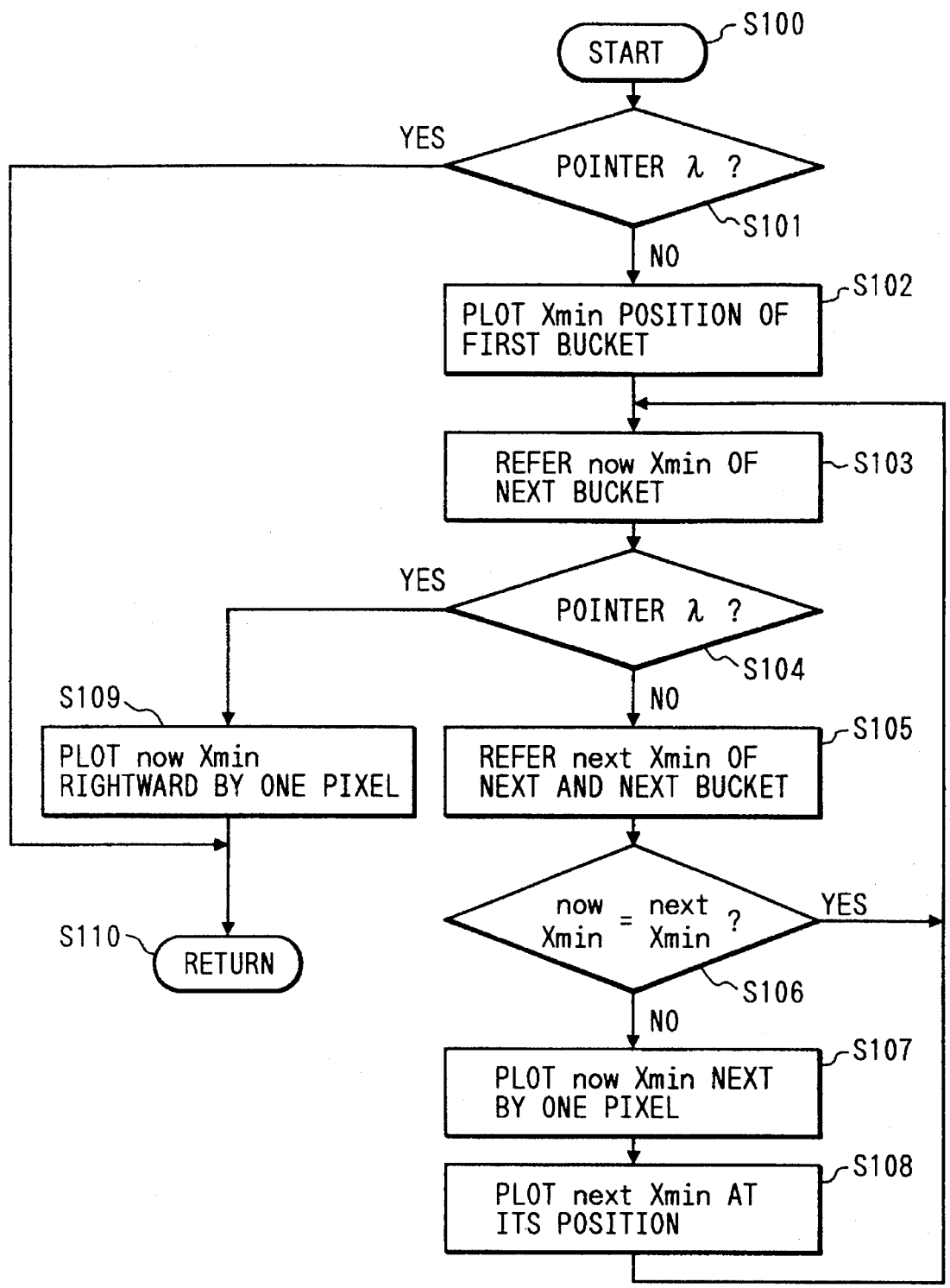
FIG. 90 is a flow chart for explaining a portion of target line contour portion generation processing shown in FIG. 77.

FIG. 90 shows the detailed processing content of the procedure (2), and this processing content will be described below.

When a series of processing operations are started in step S100, the flow advances to step S101 to check if the content of an active edge pointer of the active edge table (AET) is the marker λ indicating that there is no edge bucket to be connected. If YES in step S101, this processing (procedure (2)) is ended. If NO in step S101, the flow advances to step S102, a pixel is plotted at an address position on the line memory 3 corresponding to the pixel position of the coordinate value xmin in the first bucket connected by the active pointer, i.e., by a method of rewriting a value obtained by EX-ORing a bit value (0 or 1) already stored at that position and "1". The flow then advances to step S103. In step S103, xmin of an edge bucket (even-numbered edge bucket) connected by the pointer in step S102 is referred to, and the flow advances to step S104. In step S104, it is checked if the content of the pointer of the edge bucket referred in step S102 is the marker λ indicating that there is no edge bucket to be connected next. If NO in step S104, the flow advances to step S105; otherwise, the flow advances to step S109.

In step S109, a pixel is plotted at a right neighboring pixel position of the pixel position having the coordinate value given by xmin referred in step S103 using an EX-ORed value, and the flow then advances to step S110.

In step S105, xmin of an edge bucket (odd-numbered edge bucket) connected by the pointer referred in step S103 is referred to, and the flow advances to step S106. In step S106, it is checked if the pixel position expressed by xmin referred in step S103 is the same as that expressed by xmin referred in step S105. If YES in step S106, the flow returns to step S103, and processing for the next edge bucket is not performed. If NO in step S106, the flow advances to step S107, and a pixel is plotted at an address on the line memory corresponding to a right neighboring pixel position of the pixel position of the coordinate value given by xmin referred in step S103 using an EX-ORed result like in step S102. The flow then advances to step S108. In step S108, a pixel is plotted at an address on the line memory corresponding to the pixel position of the coordinate value given by xmin referred in step S105 using an EX-ORed result like in step S102. The flow then returns to step S103 to execute processing for the next edge bucket.

In the above-mentioned processing sequence, the procedure (2) can be realized.

Figure 86:
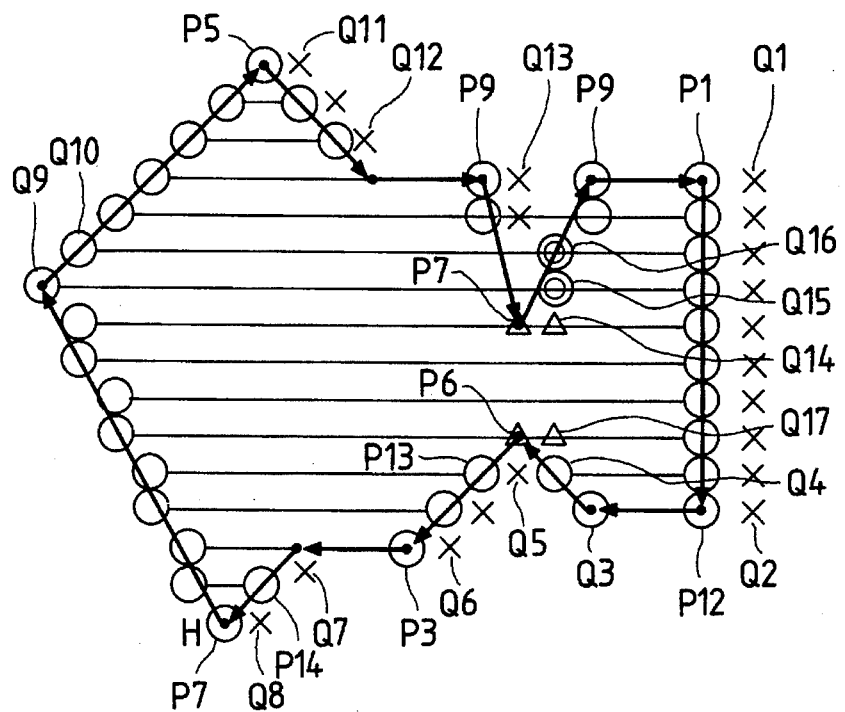
FIG. 86 is an explanatory view of a processing result of the figure shown in FIG. 64B.

FIG. 86 shows an output obtained when contour data shown in FIG. 85 is painted from the odd-numbered contour pixel on each scan line to a pixel immediately before the even-numbered pixel, as described above. According to this method, all the top pixels and pixels on the horizontal edges can be painted without being distorted.

In the above-mentioned discussion, ymax and ymin are processed as a non-negative integer. xmin and Δx are processed as real number data having sufficient precision (i.e., having decimal part information) in use. An x coordinate value used when a scan line is updated to the next line has a value obtained by adding calculated Δx to the x coordinate value of the immediately preceding edge in a calculation. However, a pixel on the memory can only be plotted at an integer position. Therefore, an actual x coordinate value changes when a carry is generated from the fraction by adding Δx.

<Description of 33rd Embodiment>

In the 32nd embodiment described above, the rules for the pairs of case Nos. start 1 and end 1 and start 6 and end 6 in the edge bucket generation rules shown in FIG. 92 may be changed as follows.

More specifically, case No. start 1: the position of the start point of the present edge is set "as it is", and case No. end 1: the position of the end point of the present edge is "closed by one scan line".

Case No. start 6: the position of the start point of the present edge is set "as it is", and case No. end 6: the position of the end point of the present edge is "closed by one scan line".

Figure 80A:
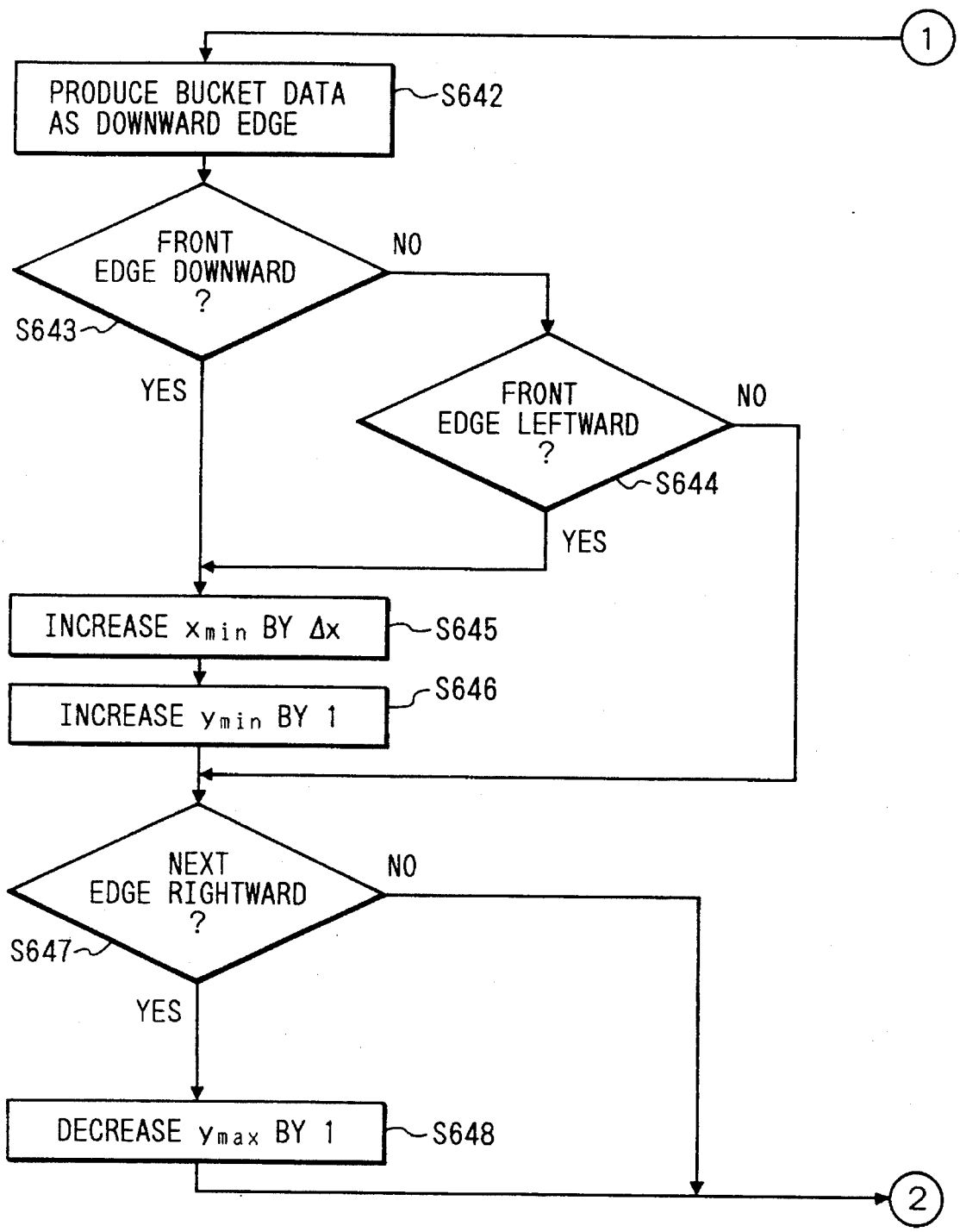
FIGS. 80A and 80B are flow charts showing a sequence for generating bucket data and updating an edge table.
Figure 80B:
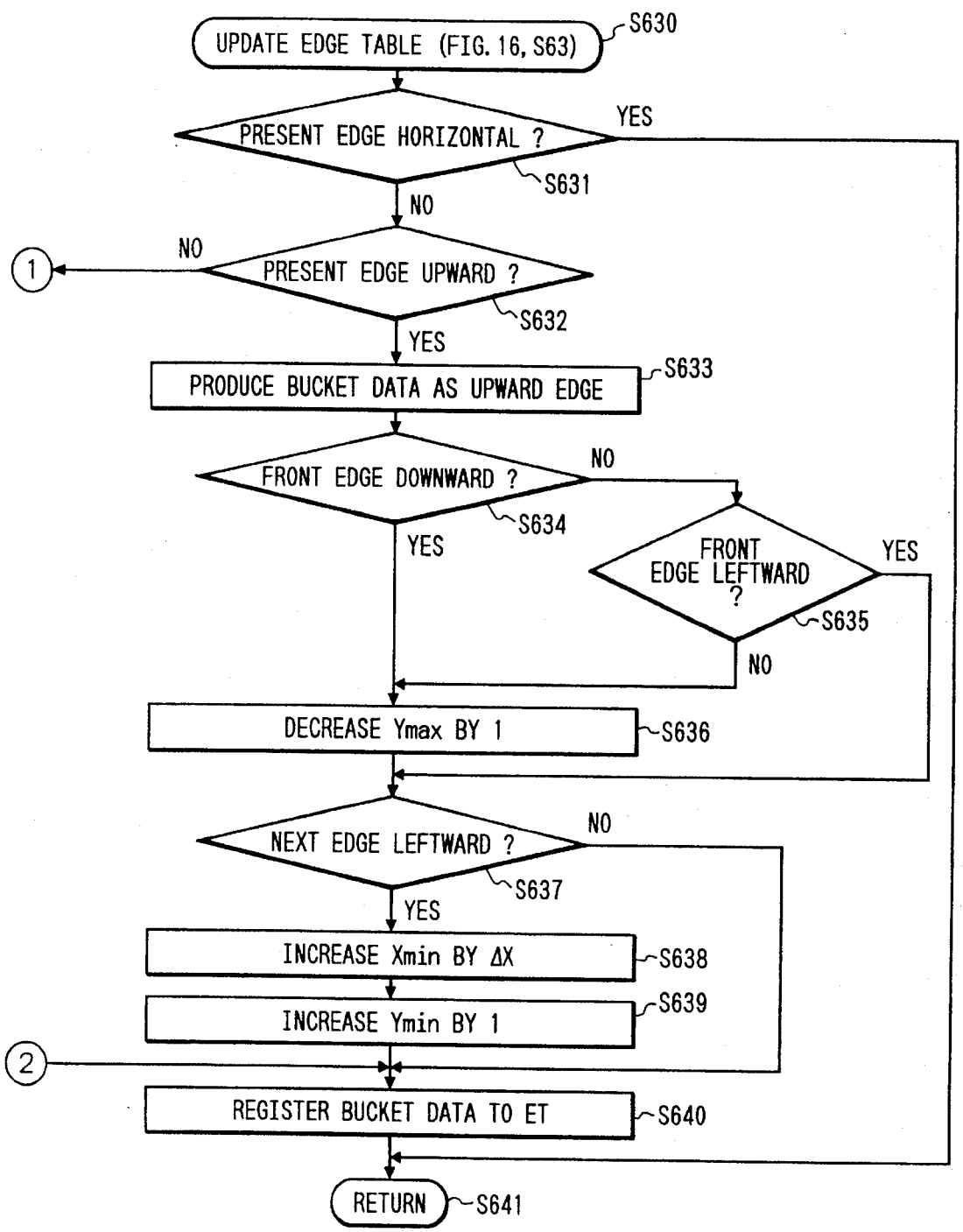

In the processing flow shown in FIGS. 80A and 80B, it is obvious to those who are skilled in the art that step S634 for the case No. start 1, and step S637 for the case No. end 1 are changed according to the change in rule. Also, it is obvious to those who are skilled in the art that step S643 for the case No. start 6, and step S647 for the case No. end 6 are changed according to the change in rule.

The above-mentioned changes imply that a top common to two outline edges as two continuous upward or downward edges may be processed either as only a point on an edge having the top as an end point or as only a point on an edge having the top as a start point. That is, such a top may be subjected to either one of the above-mentioned operations unless it is processed as a point on both the edges or is determined as a point excluded from both the edges.

<Description of 34th Embodiment>

In the description of the 32nd embodiment, an outline has a clockwise data expression. However, the present invention is not limited to this, but may be applied to an outline having a counterclockwise data expression. In the case of the counterclockwise data expression, edge bucket generation rules shown in FIG. 93 can be used. In this case, processing of the start point of the present edge is determined on the basis of the directions of the present and preceding edges, and processing of the end point of the present edge is determined on the basis of the basis of the directions of the present and next edges. The edge table updating processing flow according to the edge bucket generation rules in the counterclockwise data expression is substantially the same as those shown in FIGS. 80A and 80B, and can be realized by modifying steps S634, S635, S637, S643, S644, and S647.

<Description of 35th Embodiment>

Like in the modification for the 32nd embodiment described in the 33rd embodiment, in the rules shown in FIG. 93 of the 34th embodiment, case Nos. start 9 and end 9, and case Nos. start 14 and end 14 may be combined, and may be modified as follows:

Case No. start 9: the position of the start point of the present edge is "closed by one scan line", and case No. end 9: the position of the end point of the present edge is set "as it is".

Case No. start 14: the position of the start point of the present edge is set "as it is", and case No. end 14: the position of the end point of the present edge is "closed by one scan line".

<Description of 36th Embodiment>

In the above embodiment, the origin of the coordinates is set at the upper left corner of the image. However, the present invention is not limited to this. More specifically, when directions, the discrimination methods, and processing of ymax, ymin, xmin, $\Delta$x, and the like in the above description may be changed according to the origin position and the direction of the coordinates, the same processing as described above can be attained.

<Description of 37th Embodiment>

In the above embodiment, the main scan direction in the paint out operation is determined as a left-to-right direction of an image. However, the present invention is not limited to this. The main scan direction may be a direction opposite to the left-to-right direction, i.e., is a right-to-left direction. In this case, when contour pixels are to be sketched from the active edge table (AET) on the line memory, as for an odd-numbered x coordinate value upon accessing from a smaller x coordinate value (xmin), a pixel as an EX-ORed result with "1" is sketched at a memory address corresponding to a pixel adjacent to the pixel at that position, and as for an even-numbered x coordinate value, a pixel as an EX-ORed result with "1" is sketched at a memory address corresponding to the pixel at that position. Thereafter, contour pixel data is read out from the line memory in a direction opposing the right-to-left direction of an image to execute the paint in method.

<Description of 38th Embodiment>

In the above embodiment, an edge having only one point, i.e., an edge whose start point coincides with an end point (point edge) is excluded in advance from a top string of edges constituting a contour when the data shown in FIG. 75 is formed. However, the present invention is not limited to this. More specifically, when edge data is checked, point edge data may be ignored, and the above-mentioned processing may be continued. In the processing shown in FIG. 78, in present edge data generation step S57, next edge data generation step S58, and next edge data generation step S62, if an edge being processed is a point edge, the next top data is immediately read, and is determined as a new point (xend, yend), thus continuing the processing. At this time, the target top position may be updated or the number of processed tops may be adjusted according to the number of skipped tops. In this manner, point edges can be removed during generation of the edge table.

<Description of 39th Embodiment>

Figures 87, 88:
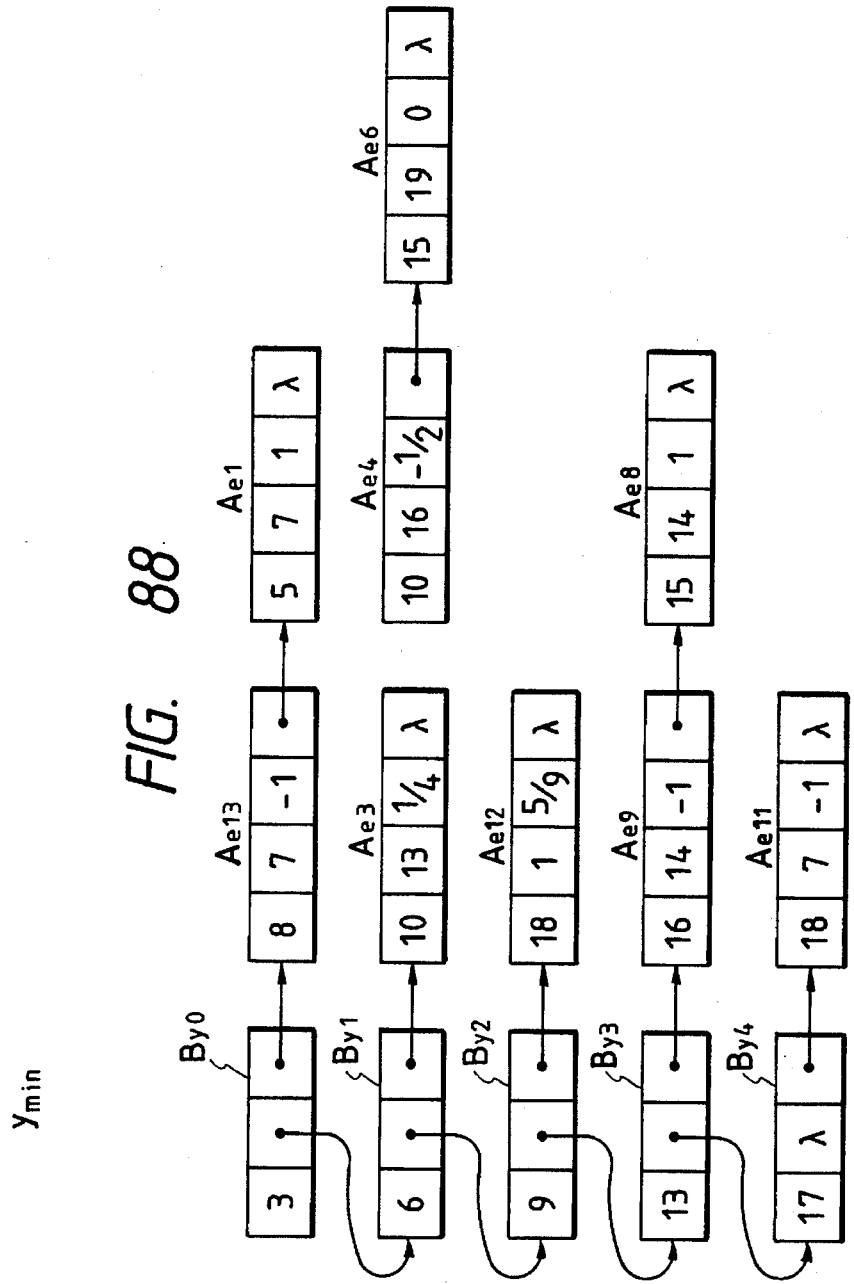
FIG. 87 is an explanatory view of a pointer bucket according to still another embodiment of the present invention.
FIG. 88 is an explanatory view of an edge table (ET) of the figure shown in FIG. 64B in the embodiment shown in FIG. 87.

The architecture of the edge table is not limited to the above-mentioned architecture. More specifically, a pointer bucket may have a data format having a two-dimensional list structure, as shown in FIG. 87. The pointer bucket is constituted by an item for holding a y coordinate value (ymin) (paying attention to the fact that even when a plurality of edge buckets are list-connected from this pointer bucket, the plurality of all these edges have an equal ymin) of an edge point having a smaller y coordinate value of an edge of an edge bucket list-connected from this pointer bucket, an item of a pointer to the next one of pointer buckets having list-connected edge buckets when the y coordinate values are viewed in the ascending order, and an item of a pointer to the edge bucket connected to the pointer bucket. FIG. 88 shows an edge table constituted by pointer buckets in the format shown in FIG. 87. FIG. 88 shows the edge table generated for an outline figure shown in FIG. 64B. In this manner, the edge table having a two-dimensional list structure can be generated in substantially the same procedure as in the above embodiment. However, in this embodiment, pointer bucket areas are not assured in advance in correspondence with the number of scan lines of an image. Every time one edge bucket is generated, it is checked if the existing pointer buckets hold ymin of an edge expressed by the generated edge bucket. If such a pointer bucket is found, the generated edge bucket is added to the list of edge buckets of the pointer bucket; otherwise, a new pointer bucket is generated, and ymin is stored in the pointer bucket to list-connect the generated edge bucket. Thereafter, the new pointer bucket is added and inserted in the list of pointer buckets in the order of ymin.

An active edge table can be generated using the above-mentioned edge table in the same manner as in the 32nd embodiment.

When the two-dimensional list structure is employed, pointer bucket areas corresponding to the number of scan lines of an image need not be prepared. In particular, when an image to be processed has a larger size, a random-memory area required for an edge table can be advantageously decreased.

<Description of 40th Embodiment>

Figure 89:
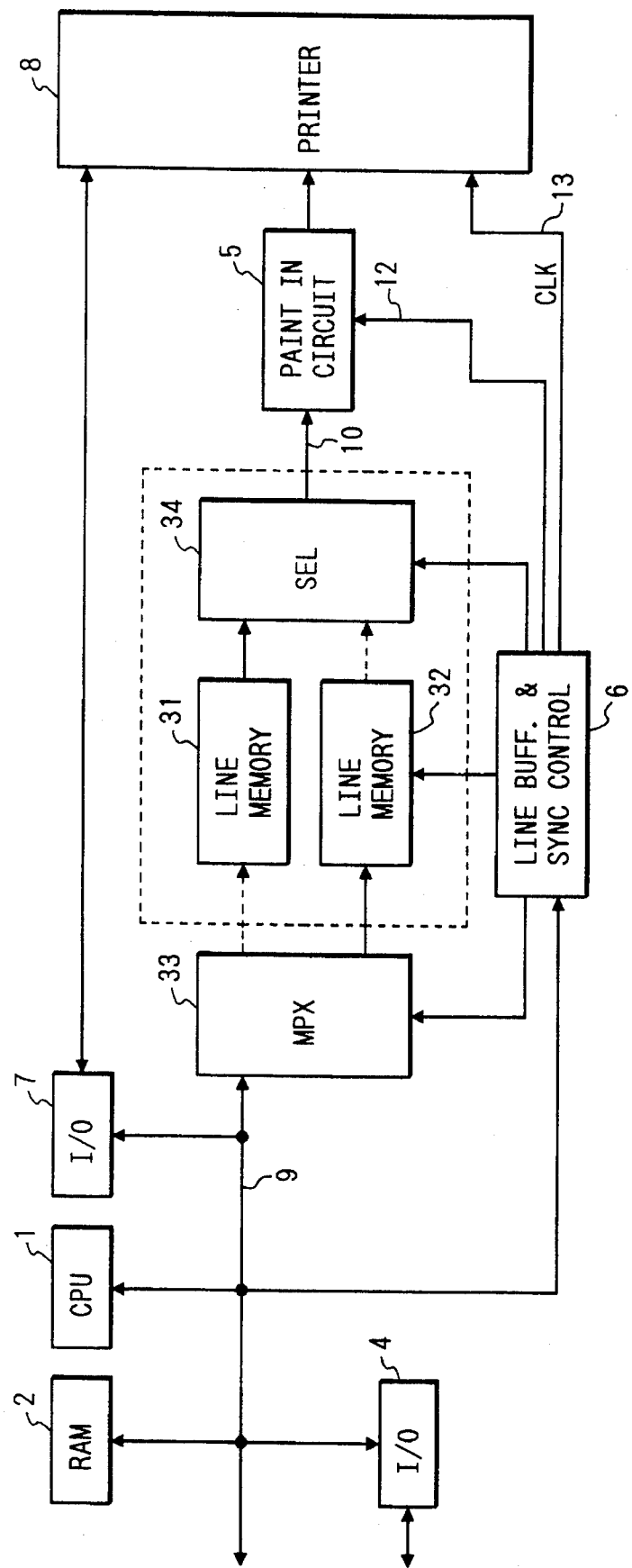
FIG. 89 is a block diagram showing an arrangement of an apparatus applied to a raster-scan type video printer according to the embodiment shown in FIG. 87.

This embodiment can be realized by an apparatus arrangement having a plurality of line memories, as shown in FIG. 89. In FIG. 89, the same reference numerals denote the same parts as in FIG. 1. In FIGS. 89, two lines memories 31 and 32 for two scan lines are prepared. One of the two line memories is used when a CPU 1 sketches contour pixels on a given scan line, and the other memory is used when contour pixel data on the other scan line sketched immediately therebefore are output to a paint in circuit 5. More specifically, two processing operations can be simultaneously executed. The line memory which completed the output operation is used for storing contour pixels for the next scan line to be sketched. In order to attain a toggle operation in this manner, a multiplexer 33 and a selector 34 are used to switch the inputs/outputs of the line memories 31 and 32. The multiplexer 33 and the selector 34 are controlled by a sync control buffer 6'. The sync control buffer switches the line memories to be connected to the multiplexer 33 and the selector 34 every time the CPU 1 completes the write operation of contour pixels, and enables the memory to output the scan line data, and every time the other line memory completes the generation/output operation of painted in data. Every time the line memories are switched, the sync control buffer informs of the CPU 1 that the sketch operation of the next scan line is allowed, and causes the memory on which contour pixels are sketched to perform the generation/output operation of painted in data.

In this manner, the wait time required between adjacent processing operations for a plurality of scan lines can be decreased, and high-speed processing can be realized as a whole.

<Description of 41st Embodiment>

The condition "when the pixel position of the even-numbered x coordinate value is the same as that of the odd-numbered x coordinate value immediately thereafter, both the points are not sketched" in the procedure (2) in the processing in step S7 described in the 32nd embodiment may be limitatively applied to only a case wherein the pixel position is an edge point of a contour edge. In this case, an edge bucket is constituted to include a y value (ymin) of an edge point having a smaller y coordinate value in addition to a y value (ymax) of an edge point having a larger y coordinate value, an x value (xmin) of the edge point having the smaller y coordinate value, and an x increment ($\Delta x$) shown in FIG. 65, and an active edge table (AET) is constituted by such edge buckets with respect to each target scan line position. Thus, the above-mentioned processing can be realized as follows. That is, for only an edge bucket whose ymin is the same as the target scan line position, and an edge bucket whose ymax is the same as the target scan line position, if a corresponding edge bucket is an odd-numbered one, the xmin values of the odd-numbered bucket and an even-numbered bucket immediately thereafter may be compared with each other, or if a corresponding edge bucket is an even-numbered one, the xmin values of the even-numbered bucket and an odd-numbered bucket immediately thereafter may be compared with each other.

Figure 91A:
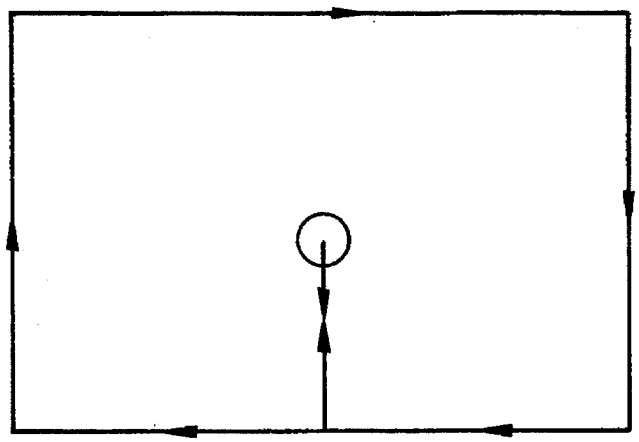
FIGS. 91A and 91B are views for explaining a feature of a result obtained in the embodiment shown in FIG. 87.
Figure 91B:
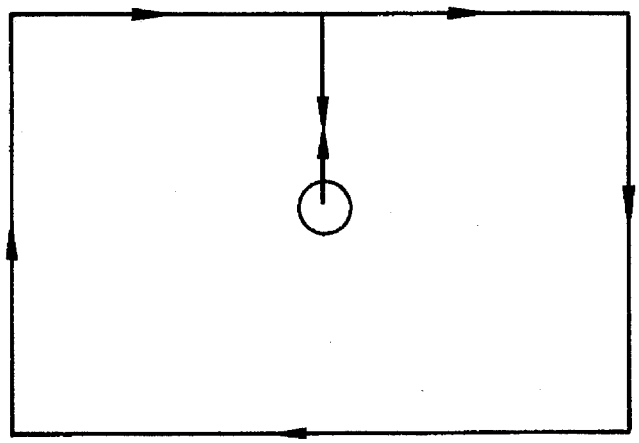

In this manner, even when a recessed top of a staple-like closed figure shown in FIGS. 91A and 91B is to be processed, only its top can be limited to an object of "when the pixel position of the even-numbered x coordinate value is the same as that of the odd-numbered x coordinate value immediately thereafter, both the points are not sketched" in the above-mentioned procedure (2).

Note that the present invention may be applied to a system constituted by a plurality of devices, or an apparatus consisting of a single device. The present invention may also be applied to a case wherein the present invention is achieved by supplying a program to a system or apparatus.

As described above, according to this embodiment, the direction of a present outline vector is checked, and whether or not edge points of the present vector are used in judgment of boundary points defining a closed section of a closed figure is discriminated on the basis of the direction of an outline vector immediately before the present outline vector, and the direction of an outline vector immediately after the present vector. Thereafter, contour pixel data are generated in units of scan lines by plotting a pixel at a corresponding pixel position on the memory when an odd-numbered boundary judgment edge intersecting the scan line is detected in units of scan lines, and plotting a pixel at a position of a right neighboring pixel of a corresponding pixel position on the memory when an even-numbered boundary judgment edge is found (in this case, when the even-numbered boundary edge position and the odd-numbered boundary edge position indicate the same pixel positions, both the pixels are not plotted). Thereafter, the contour pixel data for one scan line are horizontally scanned, and it is determined that a portion between an odd-numbered contour pixel and an even-numbered contour pixel is an inner area of a closed figure. Thus, figure paint out processing can be performed at high speed and with low cost without causing distortion.

As described above, according to the present invention, when a portion inside a contour is painted out, an intended painted out result can be obtained at high speed using a small memory capacity.

<Description of Edge Table Preparation Processing>

Figure 94:
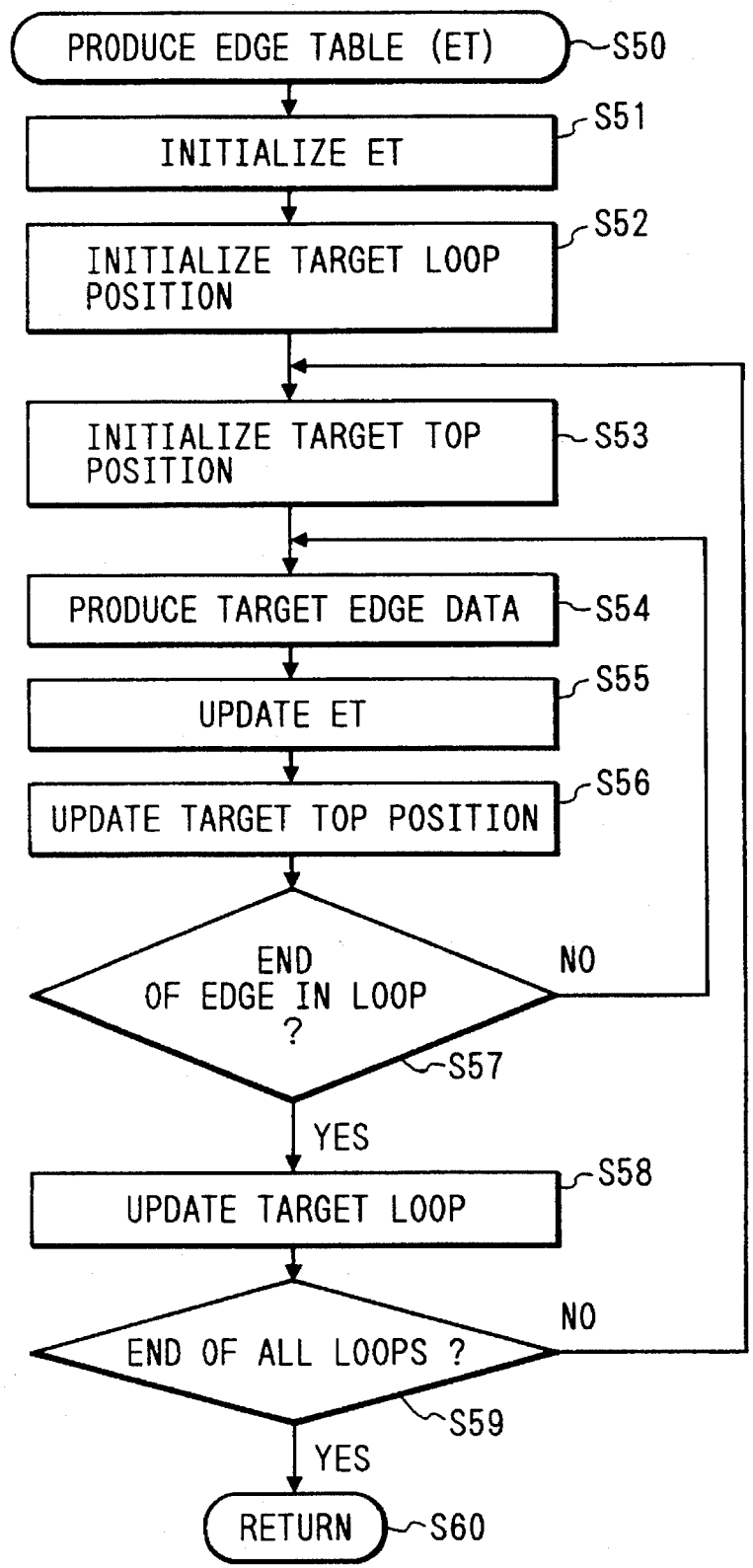
FIG. 94 is a flowchart showing the generating procedure for the edge table (ET) in an embodiment.

FIG. 94 is a flowchart showing the details of the edge table (ET) preparation processing at the step S5 in FIG. 77.

In step S51, the address pointer area (hereinafter, referred to also as pointer bucket) Ay0 to AyN are reserved on the RAM 2 for the scanning line portion (here, N+1 lines for 0 to N) included in the page to be generated as shown in FIG. 79, and the edge table (ET) is initialized after storing the marker value "$\lambda$" which indicates that no reference data are present in each of the areas. Then, the process will proceed to step S52 where the target loop number is set up in accordance with the closed loop number of the outline data given in the form shown in FIG. 75, and the pointer indicating the table for the vertex number in each of the loops is initialized at the position which indicates the vertex number in the 0th loop, thus proceeding to step S53. In the step S53, the 0th vertex coordinate data of the loop concerned in the vertex coordinate table indicated by the pointer is defined at the address value where it is stored. In step S54, the bucket data of the form as shown in the FIG. 4 described earlier are produced from the current data edge and the data edge immediately preceding it. Then, the process will proceed to step S55 to update the edge table by adding the bucket data thus produced to the edge table. Subsequently, the process will proceed to step S56 to update the target vertex and start the next edge processing. These operations will be repeated until the processing of the entire loops is completed.

Hereinafter, each processing for the steps S54 and S55 in FIG. 94 will be described in detail.

FIG. 95 shows the generating regulations for the bucket data in the step S54. Here, given the starting point coordinate of a certain edge as ($x_{start}$, $y_{start}$) and ending point coordinate as ($x_{end}$, $y_{end}$) and if $y_{start}=y_{end}$, they are horizontal; if $x_{start}>x_{end}$, counter-clockwise; if $x_{start}<x_{end}$, clockwise; and also $y_{start}>y_{end}$, upward; and $y_{start}<y_{end}$, downward, respectively.

Also, the increment $\Delta x$ of x is given by the following equation:

$$\Delta x=(x_{end}-x_{start})/(y_{end}-y_{start})$$

Now, in accordance with the generating regulations shown in FIG. 95, the current edge is divided into its starting point and others to generate the bucket data. Unlike the conventional example, however, even if the current edge is horizontal, the starting point of the current edge is defined as data provided that the current edge is toward its right-hand direction and the edge immediately preceding is downward (at c in FIG. 95) or the current edge is toward its left-hand direction and the edge immediately preceding is horizontal and toward its right-hand direction (at e in FIG. 95). Also, if the current edge is not horizontal, the edge bucket data are prepared by removing its starting point. As regards the starting point of the current edge, when the current edge is downward, it is defined as data provided that the edge immediately preceding is horizontal and toward its right-hand direction and upward (at i and m in FIG. 95). When the current edge is upward, it is defined as data provided that the edge immediately preceding is horizontal and toward its left-hand direction and downward only (at p and q in FIG. 95). In this respect, in FIG. 95, a mark ◯ indicates a case where the bucket data are prepared while a mark X indicates a case where no bucket data are prepared. These are the same in FIGS. 100 to 102 which will be described later.

Here, the bucket data at the starting point is a special case of the edge bucket which has the matching points at its start and end as ($x_{min}=x_{max}$, $y_{min}=y_{max}$, and $\Delta x=0$).

Subsequently, in step S55, the edge bucket produced as above is registered additionally on the edge table (ET). In other words, the edge bucket of the current edge is added to the list connection of the edge bucket connected to the pointer bucket $Ayy_{min}$ corresponding to the $y=y_{min}$ in the edge table. At first, the area holding the edge bucket of the current edge is reserved on RAM2. Then, the value of the pointer bucket $Ayy_{min}$ is examined, and if such value is still "λ", it is rewritten into the address of the area holding the edge bucket of the current edge. The edge bucket of the current edge is thus connected to the pointer bucket through the list. If the value of the pointer bucket $Ayy_{min}$ has already had a value other than the "λ", there exist several edge buckets which are list connected. Therefore, the edge bucket of the current edge is inserted into the array of the edge bucket already list connected so that the values $x_{min}$ of these edge buckets are arranged in the ascending order, observed from the pointer bucket side. This can be implemented in such a manner that the value of the bucket pointer immediately preceding to the location where the edge bucket is inserted is copied to the pointer section of the edge bucket of the current edge, and the pointer section of the immediately preceding bucket is rewritten into the address value of the edge bucket of the current edge. Thus, when the processing in the step S55 is terminated, the process will proceed to step S56.

<Description of the Contour Generation Processing of the Target Scanning Line>

Now, the description will be made of the "contour generation processing of the target scanning line" in the step S7 in FIG. 77 described earlier. In this respect, the processes will proceed in accordance with the procedure given below using the active edge table (AET) at that time. Here, this active edge table (AET) is initialized in the step S6, and it should be of the blank state (that is, the marker λ has been written). Thereafter, even when the processing is terminated once and the process proceed to step S8, the state of the active edge table is maintained as it is until when the process enters the step S7 again.

(1) While the sorting order of the active edge table (AET) is maintained at the x coordinate value ($x_{min}$) the information of the edge table (ET) at that time and the information of the active edge table (AET) are combined to produce a new active edge table (AET) which connects the edge bucket related to the coordinate value y of the scanning line.

(2) The access is given starting from the smaller coordinate value ($x_{min}$) of the active edge table (AET), and a value held at an address on the line memory 3 corresponding to the pixel positioned at the x coordinate value of odd order is rewritten by executing exclusive OR on the bit value (0 or 1) stored at that address and "1". Also, a value held at the address on the line memory 3 corresponding to the pixel one after the next pixel on the right-hand side of the pixel positioned at the x coordinate value of even order is rewritten into a value obtainable by executing exclusive OR on the bit value (0 or 1) stored at that address and "1". However, if the x coordinate value of an even order is positioned at the same pixel position of the x coordinate value of odd order immediately after such a value, neither of them is depicted.

(3) The edge bucket having the y value as ($y_{max}$) at the larger end of the y coordinate value of the target scanning line is removed from the active edge table (AET) in order to perform the operation in the next scanning line.

(4) The x coordinate value of the edge buckets remaining in the active edge table (AET) is renewed using the incremental data ($\Delta x$) for the operation in the next scanning line. In other words, with ($x_{min}+\Delta x$) it is modified as a new $x_{min}$.

(5) After such an updating of the x coordinate value ($x_{min}$) the sorting is done over again on the basis of the x coordinate value ($x_{min}$).

In this way, the point intersecting the scanning line of the contour of the closed figure the target scanning line at this time in an odd order is depicted at the memory address of the corresponding line buffer, and the point intersecting in an even order is depicted at the memory address of the line buffer to which corresponds the point on the right-hand side one pixel apart therefrom. However, when the intersecting point of an even order is positioned at the same position of the point of an odd order intersecting immediately thereafter, neither of these two points is depicted. Also, at that time, if the active edge table (AET) is blank, none of them will be depicted. Thus, the process in the step S7 is terminated. Also, the line buffer 3 holds the contents corresponding to the number of pixels arranged in the scanning direction (x axis direction) included in the scanning line, and the structure is arranged so that the addresses of the data of each pixel are incremented in succession in its ascending order in the main scanning direction.

<Description of the Clear Process of the Target Scanning Line Data Outputs and Line Memory 3>

Now, the contents of the process in the step S9 in FIG. 77 will be described.

In the step S9, on the basis of the contour dot information at each position of the scanning line drawn in the step S7, the operation is being carried out to paint the area between the contour dots and at the same time, the line memory 3 is again cleared. When the CPU1 allows the process to proceed to the step S9, an additional circuit, which is not shown, is actuated to set all the data, which will be inputted into the line memory 3 thereafter, at a given value, "0", until the processing in the step S9 is terminated and at the same time, causes the synchronous control circuit 6 to output the data on one scanning line, thus waiting for a signal from the synchronous control circuit 6 to indicate that a series of the operations is completed. At this juncture, the synchronous control circuit 6, when actuated by the CPU1, generates addresses sequentially from the leading address of the line memory 3 to output the data held at the address position to the signal line 10 and, simultaneously, executes the operation to allow the given value "0", set by the CPU1 to be written at the same address for each of the addresses. Then, after conducting this operation for the predetermined number of pixels, the synchronous control circuit suspends the writing operation and outputs a signal to the CPU1 to notify that a series of the processings related to the aforesaid scanning line is terminated.

On the other hand, in synchronism with this series of operations, a synchronous signal such as shown in FIG. 81 is output to the intermediate painting circuit 5 as the signal 12 and to the printer 8 as the synchronous signal 13. The Line Sync signal in FIG. 81 is a synchronous signal of the horizontal scanning line, and with the rising signal thereof, it is meant that the processing of one scanning line has begun. The CLK signal is a pixel synchronous signal, and with the rising signal thereof, an effective data timing is indicated. The rising of the CLK signal immediately after the Line Sync signal indicates the effective timing of the initial pixel of that scanning line, and thereafter, it indicates the timing of the data of the next pixel in the direction of main scanning each after one clock. FIG. 81 illustrates the synchronous signal when the pixels are present in m number on the scanning line.

FIG. 80 is a block diagram showing a structural example of the intermediate painting circuit 5 according to the present embodiment. According to the above-mentioned operations, the data 10 being output from the line memory 3 are only the contour data that are present on the scanning line. In FIG. 80, signals from a contour pixel signal of odd order on the data 10 to the pixel signal immediately before a contour pixel of even order are output as "1", and all the other areas are output as "0". At this juncture, the input data 10 are of the signals made as "1" only for the contour positions and "0" for all others. At first, when the Line Sync signal is inputted, the value held by the latch 201 is initialized as "0", and the resetting is made so that the "0" is output to the exclusive OR gate 206. Then, there is output to the signal line 206 an exclusive Or value of the data 10, which is inputted in synchronism with the CLK signal 204 output from the synchronous control circuit 6, and the output 206 of the latch 210. The data of this signal line 206 become the output data 11 for the printer 8. Also, this signal line 206 is drawn to the latch 201 in synchronism with the CLK signal 204, which is held for the production of the next data. This series of operations is repeated for the number of pixels.

Figure 96:
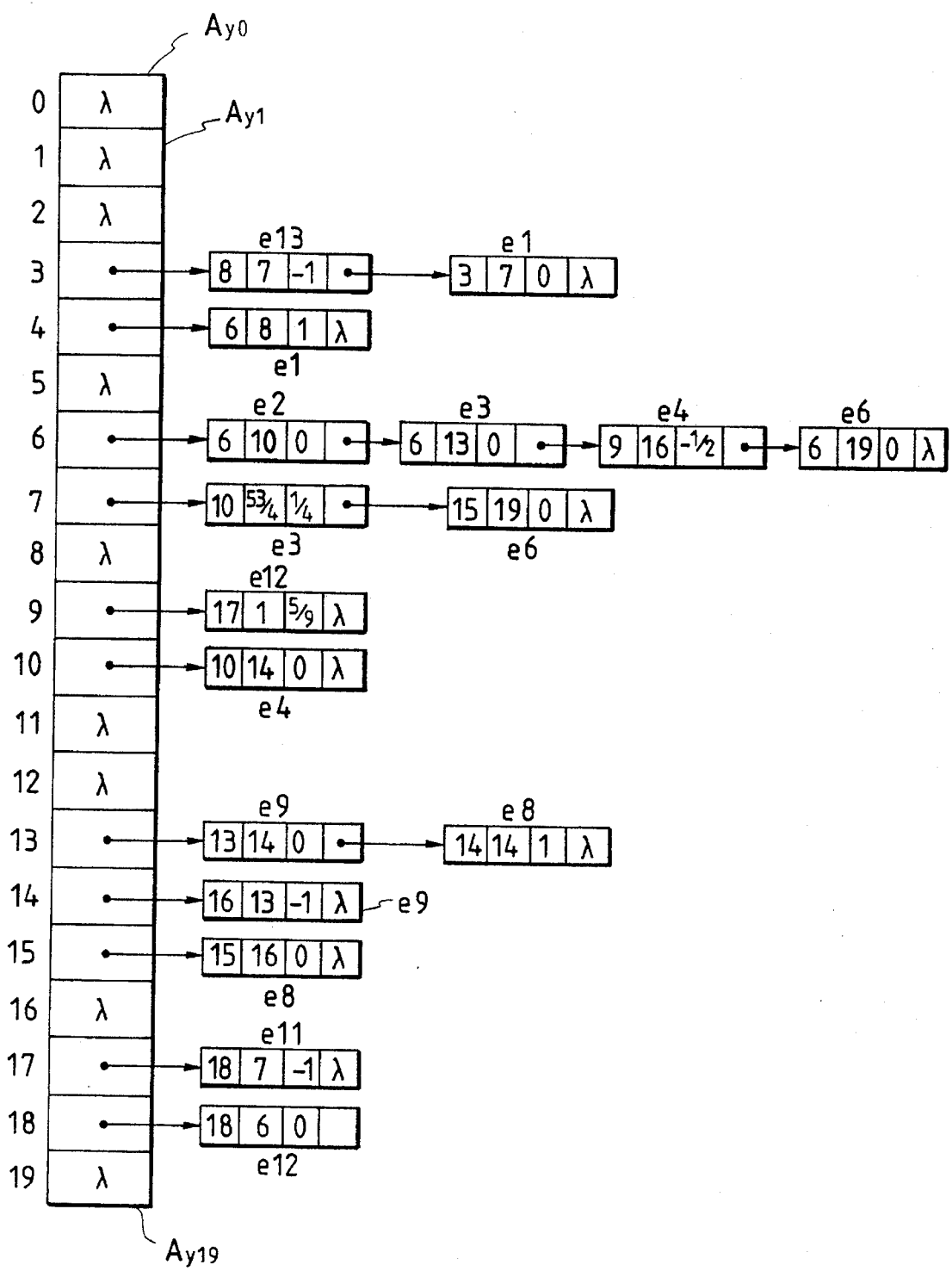
FIG. 96 is a view for the explanation of the edge table (ET) in accordance with the figures shown in FIG. 64B according to the first embodiment.

FIG. 96 is a view showing an edge table obtained with respect to FIG. 64B according to the present embodiment.

When reference is made to the regulations shown in FIG. 95, the edge e1 is such that the current edge is downward while the edge immediately preceding is upward, and thus the case is of the one shown at m in FIG. 95. Therefore, two bucket data, the starting point of the current edge 1 and other edges, are generated. Likewise, the edge e2 is of the case shown at c in FIG. 95. The bucket data having the starting point as the current edge e2 is generated. The edge e3 is of the case shown at i in FIG. 95, and two bucket data, the starting point of the current edge and edges other than the starting point, are generated. The edge e4 is of the case shown at q in FIG. 95 where two bucket data are generated too. Further, the edge e5 is of the case shown at e in FIG. 95, and no bucket data are generated. The edge e6 is of the case shown at i in FIG. 95 and two bucket data are generated. The edge e7 is of the case at g in FIG. 95 and no bucket data are generated. The edge e8 is of the case at p in FIG. 95 and two bucket data are generated. Also, the edge e9 is of the case at m in FIG. 95 and two bucket data are generated. Further, the edge e10 is of the case at g in FIG. 95 and no bucket data are generated. The edge e11 is of the case at j in FIG. 95 and the bucket data other than the starting point are generated. Then, the edge e12 is of the case at q in FIG. 95 and two bucket data are generated, and lastly, the edge e13 is the case at r in FIG. 95 and the bucket data other than the starting point are generated.

FIG. 97 is a view showing the variations of the active edge table (AET) when the AET is generated on the basis of FIG. 96 and the target scanning lines are sequentially incremented from y=0.

Figure 98:
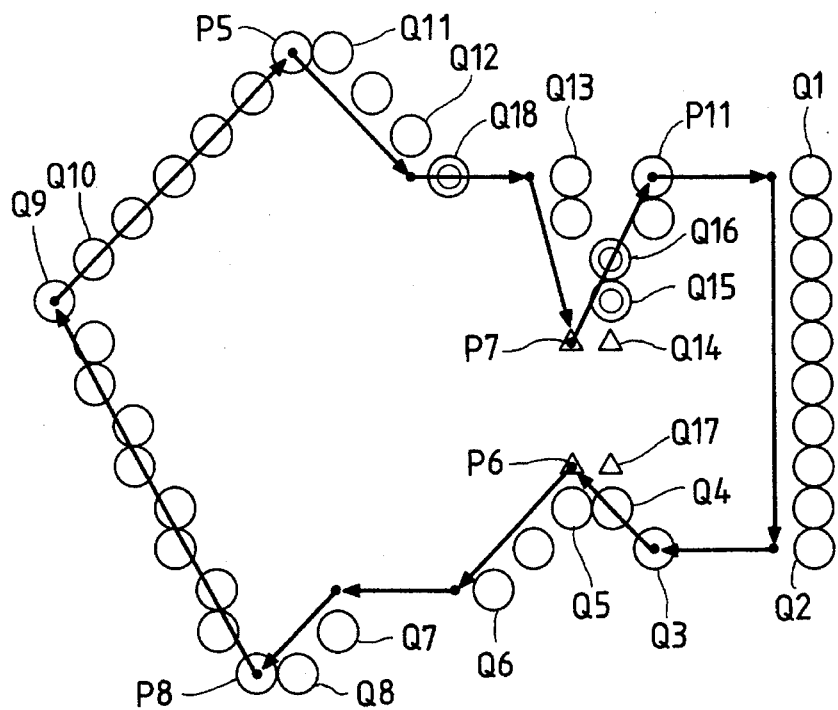
FIG. 98 is a view for the explanation of the contour pixel outputs for the figures shown in FIG. 64B according to the first embodiment.

In accordance with FIG. 97, FIG. 98 is shown, immediately next to the position $x_{min}$ of the edge in which the pixels in the main scanning direction bucket of odd order and the position $x_{min}$ of the edge bucket of even order in each scanning line are plotted as contour pixels.

In FIG. 98, reference numerals Q11 to Q18 designate the contour pixels for the edge e1, and Q18, the contour pixel for the edge e2. Likewise, Q13 to Q15, Q15 to P11, Q1 to Q2, Q3 to Q4, Q5 to Q6, Q7 to Q8, P8 to Q9, and Q10 to P5 designate the contour pixels for the edge e3, e4, e6, e8, e9, e11, e12, and e13, respectively. In this respect, the Q15 and Q16 which are indicated with ⊙ in FIG. 98 are plotted respectively for the edges e3 and e4 as the respective contour pixels, and the Q18 is plotted as the contour pixels for the edges e1 and e2. As described earlier, this plotting method is such a method in which the bit value (0 or 1) already stored at the corresponding address position on the line memory 3 is rewritten into a value obtainable by the exclusive Or with "1". Therefore, the state will return to the one which is not plotted after all. Also, the P7 and Q14 and P6 and Q17 indicated by a mark a respectively correspond to the case where "x coordinate value of even order is positioned at the same position as the pixel position of x coordinate value of odd order immediately thereafter and at such a position, neither of them is depicted" as described in the procedure (2) earlier when the positions y=10 and y=13 of the target scanning line are discussed in relation to the processing in the afore-said step S7. Therefore, the positions of these pixels are not plotted. These points are the concave vertexes of the closed figure, and if they are plotted as they are, an isolated white pixel is generated as a point in the convex portion after the intermediate painting.

Now, the specific contents of the processing (2) described earlier will be given as a flowchart shown in FIG. 90 and the description thereof will be set forth below.

At first, in step S100, when a series of the operation is started, the process will proceed to step S101 to examine the contents of the active edge pointer in the active edge table (AET) and determine whether it is the marker "λ" indicating that there is no edge bucket to be connected or not. If the marker "λ" is found, the process will proceed to step S110 to terminate the present processing (procedure (2)).

If no marker "λ" is found, the process will proceed to step S102 to execute plotting with the method that at the address position on the line memory 3 corresponding to the pixel position indicated by the coordinate value given by the $x_{min}$ of the initial bucket to be connected by the active pointer, the bit value (0 or 1) stored in that position is rewritten into the value which is obtainable by giving an exclusive OR to the bit value with "1". Then, the process will proceed to step S103 to refer to the $x_{min}$ of the edge bucket (edge bucket of even order) to be connected by the point in the step S102 and then to step S104. In the step S104, whether the pointer of the edge bucket to which the reference is made in the step S102 is the marker "λ" indicating no presence of any edge bucket or not is determined. If negative, the process will proceed to step S105 and if positive, to step S109.

In the step S109, a plotting is executed at the pixel position which is on the right-hand side one pixel apart from the pixel position of the coordinate value given by the $x_{min}$ referred to in the step S103 by execising the exclusive OR as in the case of the step S102. Then, the process will proceed to step S110.

Also, in step S105, the process refers to the $x_{min}$ of the edge bucket (edge bucket of odd order) connected by the pointer of the edge bucket referred to in the step S103, and will proceed to step S106. In the step S106, whether the pixel positions themselves represented by the $x_{min}$ referred to in the earlier step S103 and the $x_{min}$ referred to the step S105 are in the same position or not determined. If they are in the same positions, the process will return to the step S103 and will not execute the next bucket processing. Also, if they are not in the same position, the process will proceed to step S107 to conduct plotting at an address on the line memory 3 corresponding to the pixel position on the right-hand side one pixel apart from the pixel position of the coordinate value given by the $x_{min}$ referred to in the earlier step S103 by exercising an exclusive OR as in the step S102, and thus proceed to step S108. In the step S108, the process conducts plotting at an address on the line memory 3 corresponding to the pixel position of the coordinate value given by the $x_{min}$ referred to in the step S105 by exercising an exclusive OR as in the step S102, and thus return to the step S103 to execute the next bucket processing.

With the processing procedure described above, it is possible to implement the procedure (2) described earlier.

Figure 99:
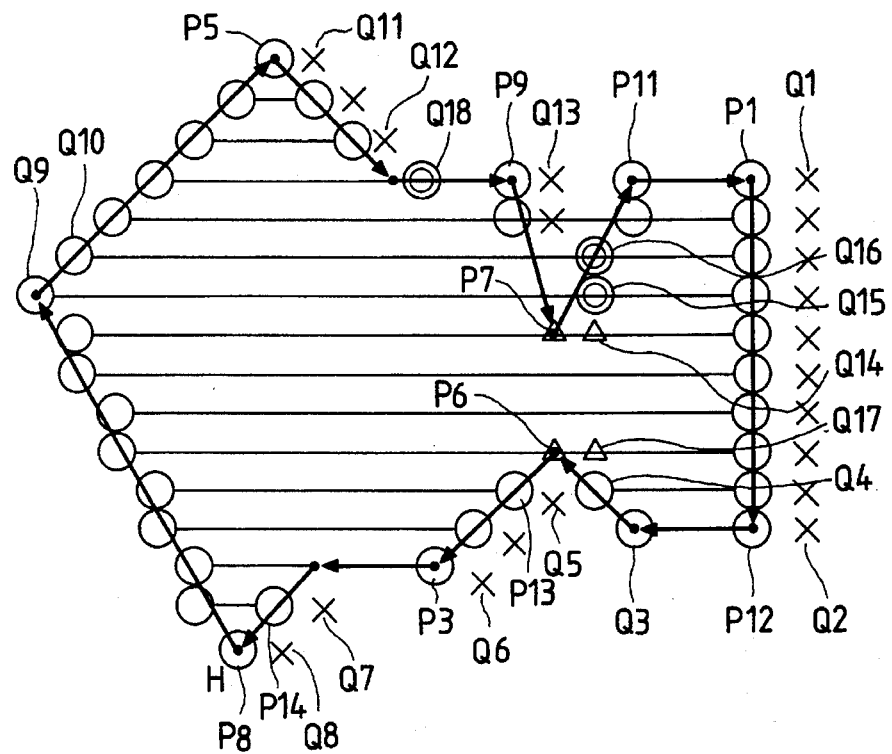
FIG. 99 is a view for the explanation of the processing results of the figures in FIG. 64B according to the first embodiment.

Here, FIG. 99 is a view representing the outputs for the contour data such as shown in FIG. 98 when the contour pixel of odd order to the position immediately before the contour pixel of even order on the aforesaid scanning line are painted. According to this method, all the vertex pixels as well as the pixels on the horizontal edge are painted without any distortion.

In this respect, the $y_{max}$ and $y_{min}$ are given as positive and negative integral values in the description set forth above. Also, the $x_{min}$ and $\Delta x$ are treated as real-valued data having a sufficient precision (that is, having information expressed in decimal part) when they are adopted. However, whereas the x coordinate at the time of up-dating the position of the scanning line to the next line position becomes a value obtainable by adding the $\Delta x$ to the x coordinate of the edge immediately preceding in calculation, the pixels on the memory are set on the integral positions but not any others. Therefore, the real x coordinate is changed when any carry is generated from the decimal places with the added $\Delta x$.

[Second Embodiment]

In the aforesaid first embodiment, while the description has been made that the outline should represent data in clockwise, the present invention is not confined to it, and the invention is equally applicable to the data representation in counterclockwise. FIG. 100 is a view showing the edge bucket generating regulations in such a case. In this case, too, the determination is made as to the way of treatment of the starting point and other parts in the edge in consideration of the directions of the current edge and last edge. In accordance with this generating regulations, the flow of processing to update the edge table is the same as in the case where the processing flow is in clockwise.

[Third Embodiment]

In the present embodiment, whereas the processing has been executed by dividing the current edge into its starting point and other parts, it may be possible to divide the current edge into its terminating point and other parts. FIG. 101 is a view showing the edge bucket generating regulations in this case.

[Fourth Embodiment]

It is possible for the third embodiment to set the outline in counter-clockwise for the data representation as in the case described for the second embodiment against the aforesaid first embodiment. FIG. 102 is a view showing the edge data generating regulations in this case.

Also, in the aforesaid embodiments, while the description has been made that the origin of the coordinate axes is established on the upper left-hand side, the present invention is not limited thereto. In other words, only if the method to determine the directions, the treatments of $y_{max}$, $y_{min}$, $x_{min}$, $\Delta x$, and others in the aforesaid description are modified in accordance with the position of the origin and the directions of the coordinate axes, it is of course possible to execute the processings in the same fashion.

Further, in the above-mentioned embodiments, the description has been made of the case where the direction of the main scanning is from the left-hand side to the right-hand side of an image when a painting operation is performed. However, the present invention is not confined thereto. On the contrary, if the scanning direction is from the right-hand side to the left-hand side of the image, the pixel representation is executed by exercising an exclusive OR with 1 at the memory address corresponding to the pixel next to one pixel apart from the position of that pixel with respect to the x coordinate value of odd order at the time of accessing the x coordinate values ($x_{min}$) from the smaller ones when the contour pixels are drawn on the line buffer from the aforesaid active edge table (AET), and for the x coordinate value of even order, subsequent to the pixel representation by an exclusive OR with 1 at the memory address corresponding to the position of that pixel, the contour pixel data are read from the aforesaid memory buffer in the direction opposite to the direction from the right-hand side to the left-hand side. Then, the aforesaid intermediate painting method should be implemented.

[Fifth Embodiment]

Figure 103:
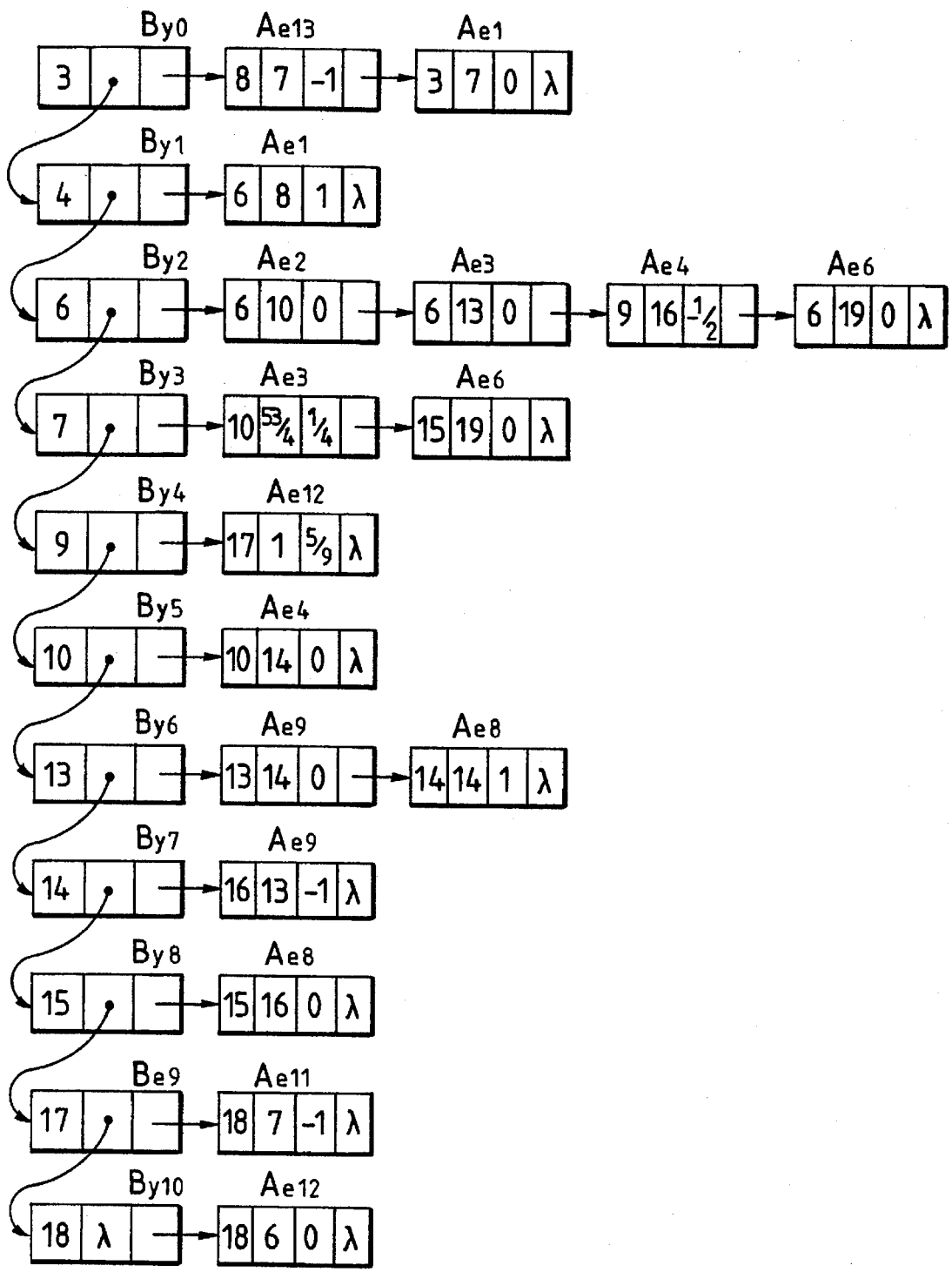
FIG. 103 is a view illustrating the edge table (ET) of the figures in FIG. 64B formed in accordance with a fifth embodiment according to the present invention.

The structure of the edge table is not necessarily limited to the aforesaid structure. In other words, it may be possible to arrange the pointer bucket in a data form having a two-dimensional list structure as shown in FIG. 87. The pointer bucket is structured with an item for the y coordinate values ($y_{min}$) being mainted at the smaller end point of the edge y coordinate of the edge bucket that is list connected from that pointer bucket—attention should be given to the fact that even when plural edge buckets are list connected sequentially from this pointer bucket, the $y_{min}$ values of those plural edges are all the same—and an item for the pointer to the pointer bucket that comes next among the pointer buckets having those list connected when the y coordinate values are observed in its ascending order, and an item for the pointer to the edge bucket that is list connected to it. FIG. 103 is a view showing an example of the edge table which is structured with the pointer buckets of the type shown in FIG. 87.

FIG. 103 illustrates the edge table formed for the outline figure given in FIG. 64B. The edge table thus formed with two-dimensional list can be prepared substantially in the same procedure as the aforesaid embodiment. However, the pointer bucket area is not reserved in advance for the image scanning lines, and at each time one edge bucket is generated, whether there is any one in the pointer buckets already available that helds the $y_{min}$ edge representing the aforesaid edge bucket or not is determined. Then, if there is any, the aforesaid edge bucket is added to the listed array of the edge buckets formed by such pointer bucket. If not, a new pointer bucket is created and the $y_{min}$ is stored in it. Then, after conducting the list connection for aforesaid edge bucket, an operation is executed to add and insert the newly created pointer bucket into the list connection of the pointer buckets in the order of the $y_{min}$.

The generation of the active edge table using such edge table as this is carried out in the same manner as the aforesaid first embodiment.

To adopt a two-dimensionally structured list such as this makes it unnecessary to prepare the pointer bucket area for the required number of image scanning lines, and particularly, there is a unique effect that the greater the size of an image to be treated, the less is the random memory area required for the edge table.

[Sixth Embodiment]

In the sixth embodiment, it may be possible to implement an apparatus with the structure in which a plurality of line memories are held as shown in FIG. 89. In FIG. 89, the same reference numerals as in FIG. 1 are given to designate the same elements. In FIG. 89, two line memories 31 and 32, that is, the line memories 31 and 32 for two scanning line portions, are provided. One of the two line memories 31 and 32 is used for representing the contour pixels on the scanning line where the CPU1 exists while the other is used for outputting to the intermediate painting circuit 5 the contour pixel data on the other scanning line which has been drawn just preceding thereto. In other words, these two are arranged in order to execute the two processings at the same time. Then, the line memory which has completed its output is used for writing the contour pixels for the scanning line to be drawn next. In order to perform a toggle operation to switch over such line memories as these, a multiplexer 33 and a selector 34 are used to arrange switching over the input/output of the line memories 31 and 32. The multiplexer 33 and selector 34 are controlled by a synchronous control buffer 6a. In other words, the synchronous control buffer 6a executes its operation in such a manner that when the CPU1 has completed writing the contour pixels for one of the line memories, it allows the data output of the scanning line to be actuated while operating to switch over the line memories to which the multiplexer 33 and selector 34 are connected each time the output for generating the intermediate painting data from the other line memory is terminated. Each time when these line memories are switched over, the control circuit informs the CPU1 that the depiction by the next scanning line is possible, and outputs an indication signal to the intermediate painting circuit 5 for the generation and output of the intermediate painting data from the contour pixels.

In this way, it becomes possible to reduce the waiting time which is required between the processings for each of the plural scanning lines, and an effect is obtained in uniquely enhancing the processing speed as a whole. In this respect, the structure shown in FIG. 89 can be implemented for each of the embodiments which will be described later, but in order to avoid any repeated description, the details are not given in particular.

[Seventh Embodiment]

The condition "however, if the x coordinate value of even order is positioned at the same pixel position of the x coordinate value of odd order immediately following, neither of them is depicted" of the procedure (2) for the process in the step S7, which is described in the aforesaid first embodiment, may be applicable provided that the application is limited to a case where the pixel position is at the end point of the contour edge. This can be implemented in such a manner that the edge bucket is structured including the y value ($y_{max}$) at the larger end point of the y coordinate in the edge bucket shown in FIG. 64B the x value ($x_{min}$) at the smaller end point of the y coordinate value, the increment of x ($\Delta x$), and the y value ($y_{min}$) at the smaller end point of the y coordinate added to the pointer, and the active edge table (AET) is structured with this edge bucket with respect to each position of the target scanning lines, and thus, only for the edge bucket which is the same as the target scanning position having the same $y_{min}$ value and the target scanning position having the same $y_{max}$ value, the $x_{min}$ values themselves are compared for the even-numbered bucket immediately preceding if the aforesaid edge bucket is of an odd order or for the odd-numbered edge bucket immediately following if the aforesaid edge bucket is of an even order.

Thus, even for the concave vertex in the closed figure of the needle type as shown in FIG. 91 it is possible to define only the vertex as the object for the proviso of the aforesaid procedure (2), that is, "if the x coordinate value of even order is positioned at the same pixel position of the x coordinate value of odd order immediately following, neither of them is depicted".

As described above, according to the present embodiment, there is an effect that the painting processing can be executed at a high speed with a smaller memory capacity without any distortion only from the target line element and line element immediately preceding or following it by dividing the target line element into plural parts, its end point and others, to create contour line data.

[Eighth Embodiment]

Figure 105:
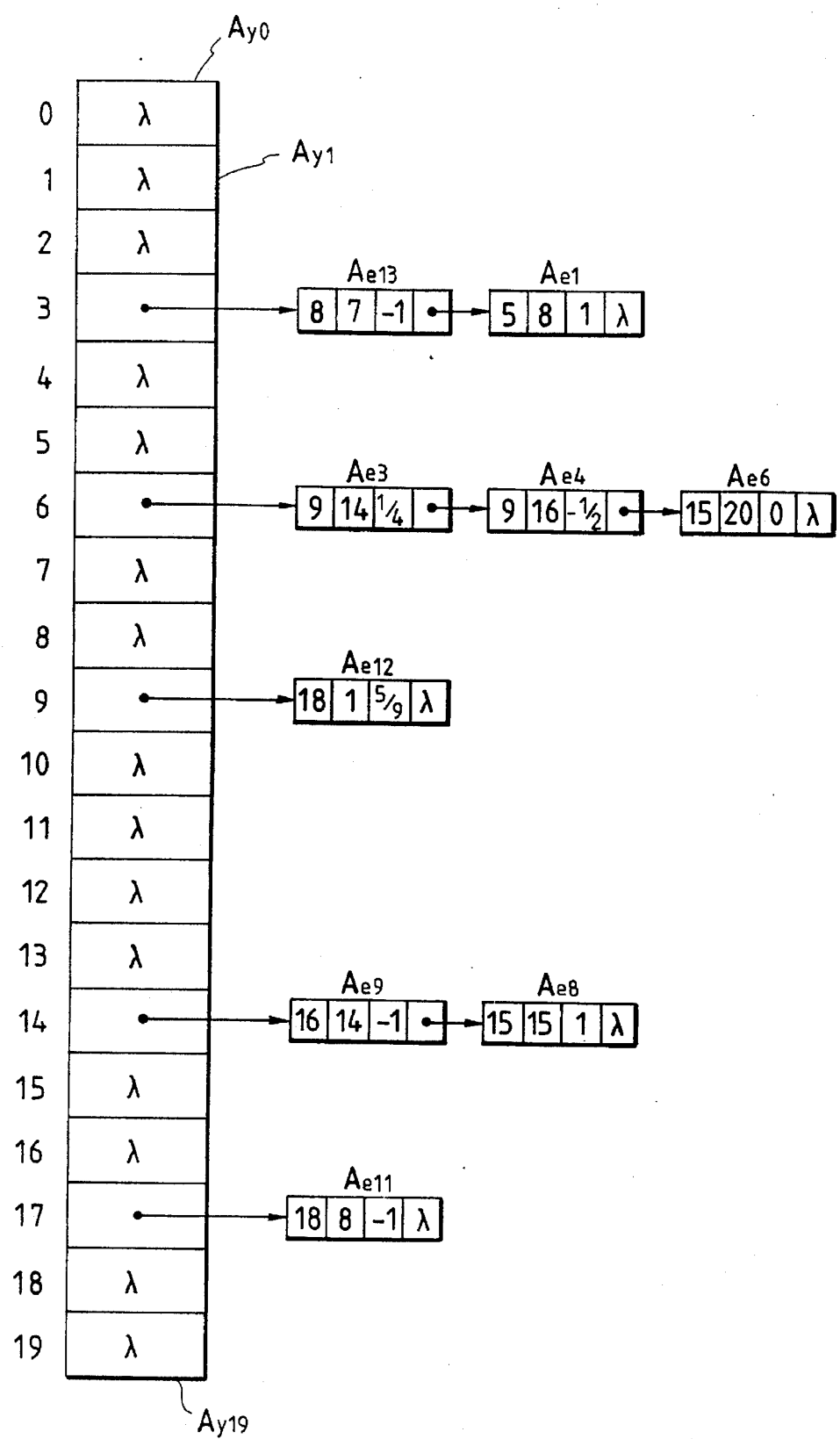
FIG. 105 is a view showing an example of the edge table (ET) on the basis of the figures in FIG. 64B formed in accordance with the eighth embodiment.

FIG. 105 is a view showing an edge table obtained in accordance with this eighth embodiment in relation to the closed figure F1 shown in FIG. 64B. FIG. 104 shows the regulations required at this time. In other words, in the step S5 in FIG. 77, the data for each of the edges on the basis of the closed figure shown in the aforesaid 64B are produced in accordance with the regulations shown in FIG. 104.

The formation process of this edge table is shown in the flowchart in FIG. 94, which is substantially equal to the aforesaid explanation, but what differs in the process in the step S54 will be given below.

At first, if the current edge is of a horizontal edge, that is, if the direction of the current edge faces toward either the left-hand side or the right-hand side, no data will be generated nor the edge table is updated. Therefore, no representation will be made in FIG. 104. When the current edge is upward or downward, the cases can be considered for the starting 1 to 10 and end 1 to 10 depending on the contents of the preceding edge data. In FIG. 104, in the column for the state at the starting points, the current edge is represented by an arrow of solid line and the preceding edge is represented by an arrow of broken line. The direction of the arrows indicate the direction of the respective edges. The side of each edge shown by oblique lines indicates the area to be painted. Also, in the column for the state at the ending points, the current edge is represented by an arrow of solid line, and the next edge, by an arrow of broken line. The direction of arrow indicates the direction of the respective edges. The side of each edge shown by oblique lines indicates the area to be painted.

Now, attention will be given to the way of dealing with the starting point of the current edge and the description will be made of the case where the current edge is upward (start 1 to start 5). When the preceding edge faces also upward (case: start 1), it is assumed that the starting point of the current edge is shifted toward the end point along the edge by a portion of one scanning line from the actual position, and thus the bucket data are prepared. When the preceding edge faces downward, the bucket data are prepared with an assumption that the starting point is also shifted toward the end point side along the edge by a portion of one scanning line from the actual position if the end point of the preceding edge, that is, the starting point of the current edge is at the concave vertex of the closed figure (case: start 2). Also, when the current edge is at the convex vertex (case: start 3), the bucket data are prepared with the starting point being positioned at its actual point. In this respect, the discrimination of the cases, start 2 or start 3, can be made by comparing the x incremental portion of the current edge and the x incremental portion of the preceding edge to determine their sizing relations. In other words, given the x incremental portion of the preceding edge as $\Delta x_{pre}$ and the x incremental portion of the current edge as $\Delta x_{now}$, the resultant comparison, $\Delta x_{pre} > \Delta x_{now}$, represents the case start 2 while $\Delta x_{pre} < \Delta x_{now}$, the case start 3. Here if $\Delta x_{pre} = \Delta x_{now}$, the case is regarded as the start 3. Now, if the preceding edge faces toward the left-hand side (case: start 4), the bucket data are prepared with the starting point of the current edge as being its actual position while if the preceding edge faces toward the right-hand side, the bucket data are prepared with the starting point of the current edge as being shifted toward the end point side along the current edge by a portion of one scanning line from the actual position.

Subsequently, the cases where the current edge is downward (start 6 to start 10) are considered. If, then, the preceding edge faces upward, that is, the starting point of the current edge is at the convex vertex of the closed figure (case: start 6), the bucket data are prepared with the starting point of the current edge as being in a position where it is shifted toward the right-hand side by one pixel. On the other hand, if the starting point of the current edge is at the concave vertex of the closed figure (case: start 7), the bucket data are prepared with the starting point of the current edge as being in a position where it is shifted toward the end point along the edge by a portion of one scanning line from the actual position. Also, when the preceding edge faces downward (case: start 8) and is toward the right-hand side (case: start 10), the bucket data are prepared with the starting point of the current edge as being in a position where it is shifted to the right-hand side by one pixel. Also, when the preceding edge faces the left-hand side (case: start 9), the bucket data are prepared with the starting point as being in a position where it is shifted to the right-hand side by further one pixel. Here, the discrimination of whether the case is the start 6 or start 7 can be made by comparing the incremental portion $\Delta x_{now}$ of the current edge x and the incremental portion $\Delta x_{pre}$ of the preceding edge x to determine the sizing relations between them. In other words if the result is $\Delta x_{pre} < \Delta x_{now}$, the case is the start 6 while the result is $\Delta x_{pre} > \Delta x_{now}$, the case is 7. Here, if the result is $\Delta x_{pre} = \Delta x_{now}$, the case is assumed to be the start 6.

Now, the description will be made while giving attention to the treatment of the end point of the current edge.

At first, the cases where the current edge is upward (end 1 to end 5) will be described. Now, if the next edge is also upward (case: end 1), the bucket data are prepared with the end point of the current edge as being in a position which is the actual position as it is. Also, in the case where the next edge is downward, if the starting point of the next edge, that is, the end point of the current edge, is at the concave vertex (case: end 3), the bucket data are prepared with the end point of the current edge as being in a position where it is returned toward the starting side by a portion of one scanning line from the actual position. On the other hand, when it is at the convex vertex of the closed figure (case: end 2), the bucket data are prepared with the end of the current edge as being in a position which is the actual position as it is. Also, when the next edge faces toward the left-hand side (case: end 4), the bucket data are prepared with the end point of the current edge as being in a position where it is returned toward the starting side along the edge by a portion of one scanning line from the actual position. Further, the next edge faces toward the right-hand side (case: end 5), the bucket data are prepared with the end point of the current edge as being in a position which is the actual position as it is. Here, the discrimination of whether the case is the end 2 or end 3 can be made by comparing the x incremental portion of the current edge $\Delta x_{now}$ and the x incremental portion of the next edge $\Delta x_{post}$ to determine the sizing relations between them. In other words, if $\Delta x_{now} < \Delta x_{post}$, the case is the end 2, and if $\Delta x_{now} > \Delta x_{post}$, the case is the end 3. However, if $\Delta x_{now} = \Delta x_{post}$, the case is assumed to be the end 2.

Now, the description will be made of the cases where the current edge is downward (end 6 to end 10). When the next edge is upward, the starting point of the next edge, that is, the end point of the current edge is at the convex vertex of the closed figure (case: end 6), the bucket data are prepared with the end point of the current edge as being in a position where it is shifted toward the right-hand side by one pixel. When it is at the concave vertex of the closed figure (case: end 7), the bucket data are prepared with the end point of the current edge as being in a position where it is shifted toward the right-hand side by one pixel from the point where it is returned toward the starting side by a portion of one scanning line from the actual position. Further, when the next edge is downward (case: end 8), the bucket data are prepared with the end point of the current edge as being in a position where it is further shifted toward the right-hand side by one pixel from the point where it is returned toward the starting side by a portion of one scanning line from the actual position. Also, the next edge faces toward the left-hand side (case: end 9), the bucket data are prepared with the end point of the current edge as being in a position where the end point of the current edge is shifted toward the right-hand side by one pixel. Further, the next edge faces toward the right-hand side (case: end 10), the bucket data are prepared with the end point of the current edge as being in a position where it is further shifted toward the right-hand side by one pixel from the point where it is returned toward the starting side by a portion of one scanning line from the actual position. Here, the discrimination of whether the case is the end 6 or end 7 can be made by comparing the x incremental portion of the current edge $\Delta x_{now}$ and the x incremental portion of the next edge $\Delta x_{post}$ to determine the sizing relations between them. In other words, if $\Delta x_{now} < \Delta x_{post}$, the case is the end 6 and if $\Delta x_{now} > \Delta x_{post}$, the case is the end 7. However, if $\Delta x_{now} = \Delta x_{post}$, the case is assumed to be the end 6.

In accordance with the above-mentioned generation regulations, the bucket data shown in the format illustrated in FIG. 65 are prepared for the current edge. Thus, proceeding to step S55, the process will execute the same operations explained in conjunction with the aforesaid FIG. 77.

In this respect, the target scanning line contour generation processing in the step S7 in FIG. 77 differs only in the item (2) in relation to the aforesaid first embodiment. In other words, the item (2) is replaced as follows:

(2) The x coordinate values ($x_{min}$) of the active edge table (AET) are accessed from the smaller value, and the value held at the address on the line memory 3 corresponding to the pixel at the position of the x coordinate value is rewritten by exercising an exclusive OR of the stored bit value (0 or 1) at that address with "1".

All the items other than this are the same as the aforesaid first embodiment. Thus, in the step S7, only the varied points of the closed figure area in the target scanning line at that time are depicted at the memory address of the line buffer.

FIG. 105 is a view showing an example of the edge table data thus obtained for the closed figure in FIG. 64B.

The edge e1 is an edge which faces downward, and since the front edge e13 against the edge e1 is an edge which faces upward as well as the next edge e2 is an edge facing toward the right-hand side, the starting point of the edge e1 corresponds to the case, start 6, and the end point thereof, to the case, end 10. Likewise, the edge e2 is an edge facing toward the right-hand side, its starting point corresponds to the case, start 6 while its end point, to the case, end 10. This edge e2 is a horizontal edge. Therefore, no edge bucket is generated for it. The edge e3 is an edge facing downward, and its starting point corresponds to the case, start 10, while its end point, to the case, end 7. Thereafter, likewise, the edge e4 is an edge facing upward and its starting point corresponds to the case, start 2 while its end, to the case, end 5. The edge e5 being a horizontal edge, no bucket data are generated therefor. The edge e6 is an edge facing downward, and its starting point corresponds to the case, start 10 and its end point, to the case, end 9. The edge e7 being a horizontal edge, no bucket data are generated therefor. The edge e8 is an edge facing upward, and its starting point corresponds to the case, start 4, and its end point, to the case, end 3. The edge e9 is an edge facing downward, and its starting point corresponds to the case, start 7, and its end point, to the case, end 9. The edge e10 being a horizontal edge, no bucket data are generated therefor, and the edge e11 is an edge facing downward with its starting point corresponding to the case, start 9 and its end point, to the case, end 6. The edge e12 is an edge facing upward and its starting point corresponds to the case, start 3, and its end point, to the case, end 1. Lastly, the edge e13 is an edge facing upward, and its starting point corresponds to the case, start 1, and its end point, to the case, end 2.

FIG. 106 is a view showing the processes in which an active edge table (AET) is being produced in accordance with FIG. 105 as well as the variation of the AET when the target scanning lines are increased sequentially form y=0. Further, FIG. 107 is a view in which the pixel at the $x_{min}$ position of each edge bucket in each of the scanning lines is plotted as the contour pixel in accordance with the AET shown in FIG. 106.

Figure 107:
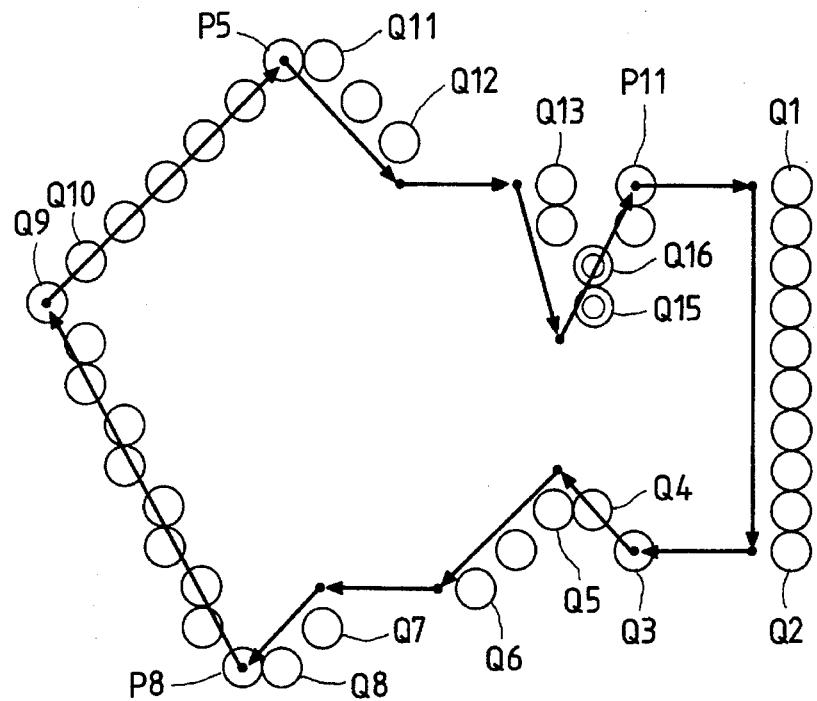
FIG. 107 is a view showing an example of the contour pixel outputs for the figures in FIG. 64B according to the eighth embodiment.

In FIG. 107, Q11 to Q12 are the contour pixels for the edge e1, and Q13 to Q15 are the contour pixels for the edge e3. Likewise, Q15 to P11, Q1 to Q2, Q3 to Q4, Q5 to Q6, Q7 to Q8, P8 to Q9, and Q10 to P5 are the contour pixels for e4, e6, e8, e9, e11, e12, and e13, respectively.

The Q15 and Q16 which are indicated by a mark ⊙ in FIG. 107 are both plotted as the contour pixels for the edge e3 and edge e4. This plotting method is as described earlier to rewrite a value by exercising an exclusive OR of the bit value (0 or 1) already stored at the corresponding address position on the line memory 3 with "1". Therefore, they will return to a state where no plotting has been conducted after all.

Figure 108:
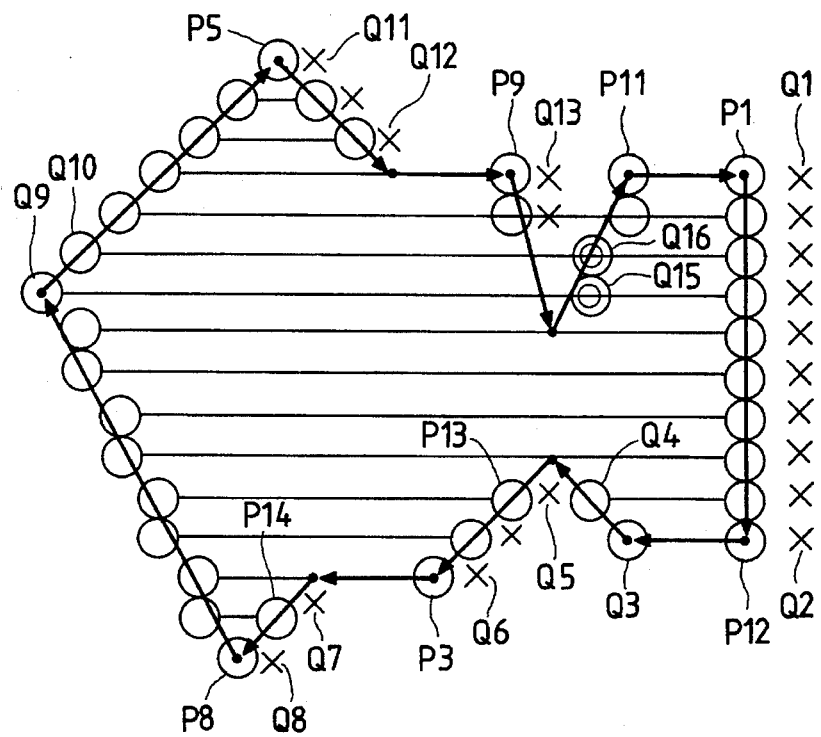
FIG. 108 is a view showing the processing results of the figures shown in FIG. 64B according to the eighth embodiment.

FIG. 108 is a view showing the outputs when the contour from the contour pixel of odd order to that of even order on the scanning line has painted the contour data shown in FIG. 107 immediately before such contour. According to this method of the eighth embodiment, not only the vertex pixels but all the pixels on the horizontal edge will be painted.

In this respect, according to the aforesaid eighth embodiment, it may be possible to modify the regulations as given below for each set of the case, start 1 and case, end 1, and case, start 8 and case, end 8 among the generation regulations for the edge bucket shown in FIG. 104.

Case, start 1 : The starting point of the current edge is left as it is without drawing closely, and Case, end 1 : The end point of the current edge is to be drawn closely by one scanning line. Also, Case, start 8 : The starting point of the current edge is shifted toward the right-hand side by one pixel and drawn closely by one scanning line, and Case, end 8 : The end point of the current edge is to be shifted toward the right-hand side by one pixel and left as it is without being drawn closely.

The above-mentioned modification suggests that the vertex shared by the two outline edges of the continuous upward edges themselves or downward edges themselves could be treated either only as a point on the edge having such a vertex as its ending point or only as a point on the edge having such a vertex as its starting point. It may be conceivable that either will do unless such vertex is processed as a point on both edges or if it is not treated as any point on either of them.

FIG. 110 is a view showing the generation regulations for the edge bucket which is applicable even when the data are represented as counter-clockwise. In this case, too, the way of dealing with the starting point of the current edge is determined on the basis of the directions and inclination of the current edge and preceding edge, and, further, the way of dealing with the end point of the current edge is determined on the basis of the direction and inclination of the current edge and the following edge.

As in the variation of the aforesaid embodiment described in connection with the aforesaid eighth embodient, the case, start 11 and case, end 11, and case, start 18 and case, end 18, in FIG. 110 are combined, respectively, it may be possible to arrange as follows:

Case, start 11 : The starting point of the edge is to be shifted toward the right-hand side by one pixel and is drawn closely by one scanning line, and Case, end 11 : The end point of the edge is not shifted toward the right-hand side and left as it is. Also, Case, start 18 : The starting point of the edge is not drawn closely and left as it is, and Case, end 18 : The end point of the edge is drawn closely by one scanning line.

Figure 109:
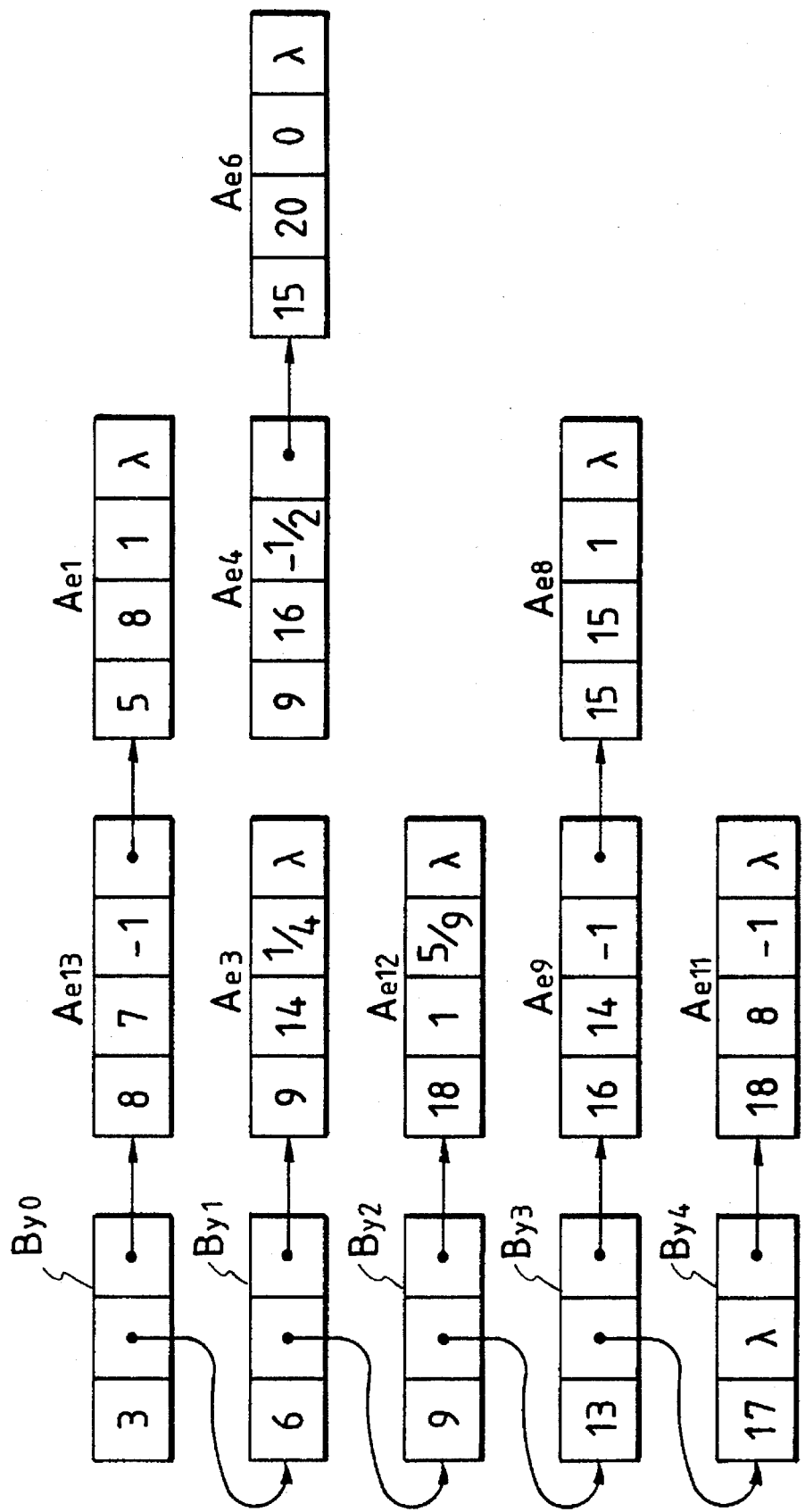
FIG. 109 is a view showing an example of the edge table for the closed figures shown in FIG. 64B according to another embodiment of the eighth embodiment.

FIG. 109 is a view showing an example of the edge table for the closed figure shown in FIG. 64B, which is arranged by the data structure of the same pointer bucket as in the case of the aforesaid FIG. 87. The descriptions of these drawings should be self-explanatory when reference is made to the descriptions of the aforesaid FIG. 87 and FIG. 103. Here, therefore, any further description will be omitted.

As described above, according to the eighth embodiment, there is an effect that the painting of the figures can be performed at a high speed with a smaller memory capacity without creating any distortion by generating the contour line data on the basis of varying points of the pixels resulting from the target line elements and line elements preceding and following them.

[Ninth Embodiment]

This ninth embodiment is such that the processes in the steps S54 and S55 in FIG. 94 are executed in accordance with the generation regulations for the bucket data shown in FIG. 111. In the processes described in conjunction with FIG. 94 for the aforesaid first embodiment, what differs from the processes for this ninth embodiment will be described. At first, the description will be made of the target edge data formation processing in the step S54.

Here, as in the case of the aforesaid first embodiment, if the starting point coordinate of a certain edge is defined to be ($x_{start}$ and $y_{start}$) and the end point coordinate is defined to be ($x_{end}$ and $y_{end}$), the edge is horizontal when $y_{start} = y_{end}$, and if $x_{start} > x_{end}$, the edge faces toward the left-hand side while if $x_{start} < x_{end}$ the edge faces toward the right-hand side. Also, if $y_{start} > y_{end}$, the edge faces upward, and if $y_{start} < y_{end}$, the edge faces downward.

Also, the x incremental portion Δx will be given by the following equation:

$$\Delta x = (x_{end} - x_{start})/(y_{end} - y_{start})$$

The bucket data are generated by dividing the current edge into the starting point and other part in accordance with the bucket data generation regulations shown in FIG. 111. Unlike the conventional example, however, it is necessary to prepare the bucket data even when the current edge is horizontal. If the current edge faces toward the right-hand side and the edge immediately preceding is horizontal and faces toward the right-hand side (FIG. 111B) or the current edge faces towards the left-hand side and the edge immediately preceding faces upward (FIG. 111H), the starting point of the current edge is made a bucket data as it is. Also, when the current edge faces toward the right-hand side and the edge immediately preceding faces downward (FIG. 111C) or the current edge faces towards the left-hand side and the edge immediately preceding is horizontal and faces towards the right-hand side (FIG. 111E), the bucket data are prepared by shifting the starting point toward the right-hand side by one pixel.

Also, when the current edge is not horizontal, the data are prepared for the bucket without its starting point if the current edge faces upward, and if the current edge faces downward, the data are prepared by shifting the edge toward the right-hand side by one pixel for the bucket without the starting point. As regards the starting point, when the current edge faces downward and the immediately preceding edge is horizontal as well as faces toward the right-hand side, the bucket data are prepared by shifting the starting point towards the right-hand side by one pixel. Also, when the immediately preceding edge faces upward, the bucket data are prepared by shifting the starting point toward the right-hand side by one pixel if the sum of the x incremental portion of the edge immediately preceding and the x incremental portion of the current edge is "0" or positive. On the other hand, if such sum is negative, the bucket data are prepared with the starting point as it is. Also, when the current edge faces upward, the starting point is defined as the bucket data if the immediately preceding edge is horizontal and faces toward the left-hand side. If the immediately preceding edge faces downward, the bucket data are prepared by shifting the starting point toward the right-hand side by one pixel if the sum of the x incremental portion of the immediately preceding edge and the incremental portion of the current edge is positive. If such sum is "0" or negative, the starting point is defined as bucket data as it is. Thus, the process will proceed to step S55 in FIG. 94. The processes thereafter are the same as the aforesaid description. Therefore, any further description will be omitted.

Figure 112:
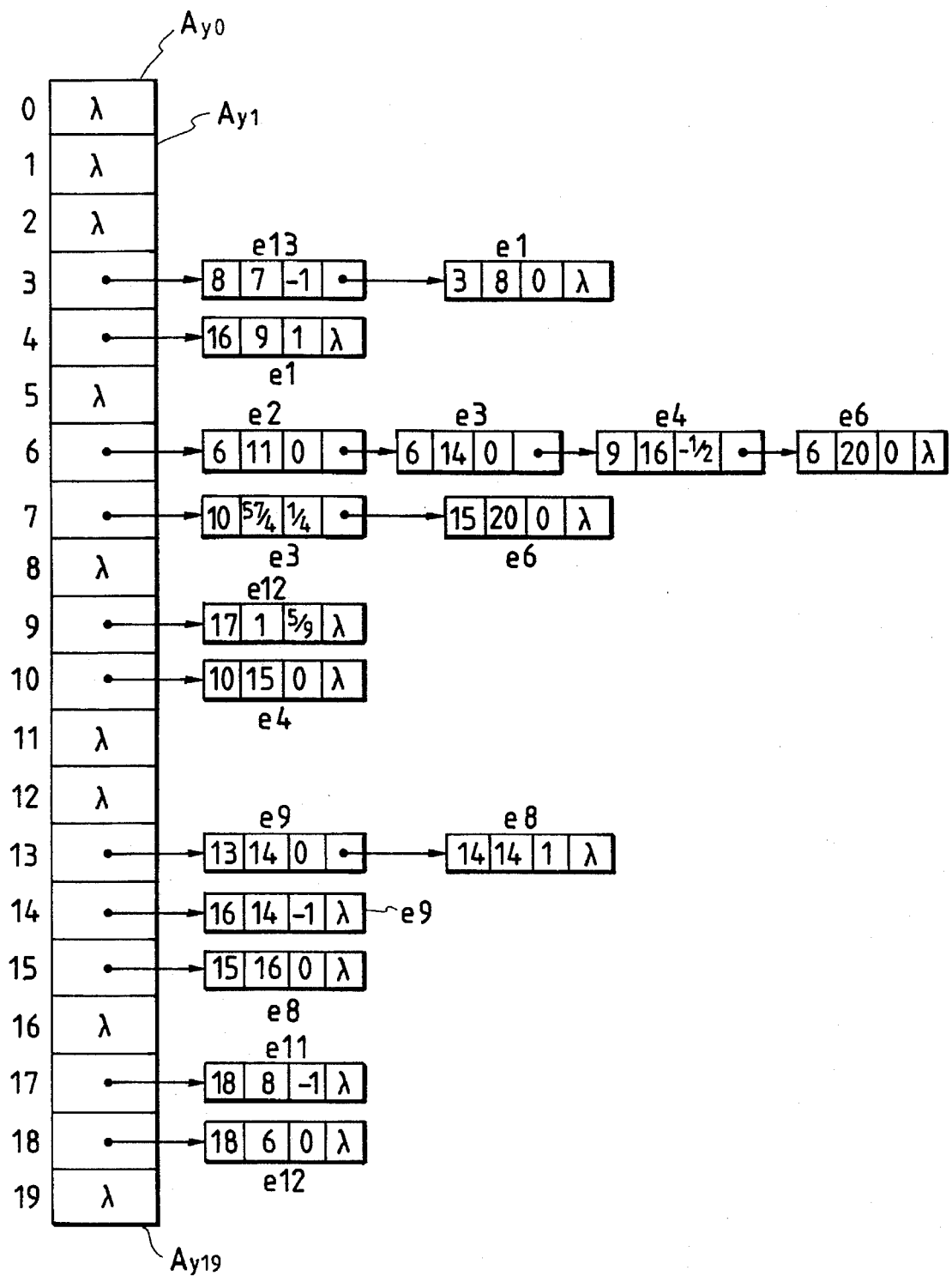
FIG. 112 is a view showing the edge table prepared on the basis of the figures shown in FIG. 64B according to the ninth embodiment.

FIG. 112 is a view showing the edge table obtained according to the ninth embodiment for the closed figure F1 shown in FIG. 64B. FIG. 111 shows the regulations at this time.

The edge e1 represents the case at m in FIG. 111, and there are generated the bucket data having the starting point which is shifted towards the right-hand side by one pixel and the edge other than the starting point which has been shifted toward the right-hand side by one pixel. The edge e2 is the case at c in FIG. 111, and the bucket data of the starting point shifted toward the right-hand side by one pixel are generated. The edge e3 is the case at i in FIG. 111, and two bucket data shifted toward the right-hand side by one pixel are generated. The edge e4 is the case at r in FIG. 111, and the bucket data of the starting point shifted toward the right-hand side by one pixel and the bucket data of the edge other than the starting point are generated. The edge e5 is the case at d in FIG. 111, and no bucket data are generated. The edge e6 is the case at i in FIG. 111, and the bucket data shifted toward the right-hand side by one pixel are generated. The edge e7 is the case at g in FIG. 111, and no bucket data are generated. The edge e8 is the case at q in FIG. 111, and two bucket data are generated. The edge e9 is the case at n in FIG. 111, and the bucket data of the starting point and bucket data of the edge other than the starting point shifted toward the right-hand side by one pixel are generated. The edge e10 is the case at g in FIG. 111, and no bucket data are generated. The edge e11 is the case at j in FIG. 111, and the bucket data of the edge other than the starting point shifted toward the right-hand side by one pixel are generated. The edge e12 is the case at s in FIG. 111, and two bucket data are generated. The edge e13 is the case at t in FIG. 111, and the bucket data of the edge other than the starting point are generated.

In this way, the active table (AET) is produced on the ET shown in FIG. 112, and FIG. 113 is a view showing the variation of the AET when the target scanning lines are being increased one by one. Further, FIG. 114 is a view showing an example in which the pixel at the position $x_{min}$ of each edge bucket in each of the scanning lines is plotted as the contour pixel in accordance with the AET shown in FIG. 113.

Figure 114:
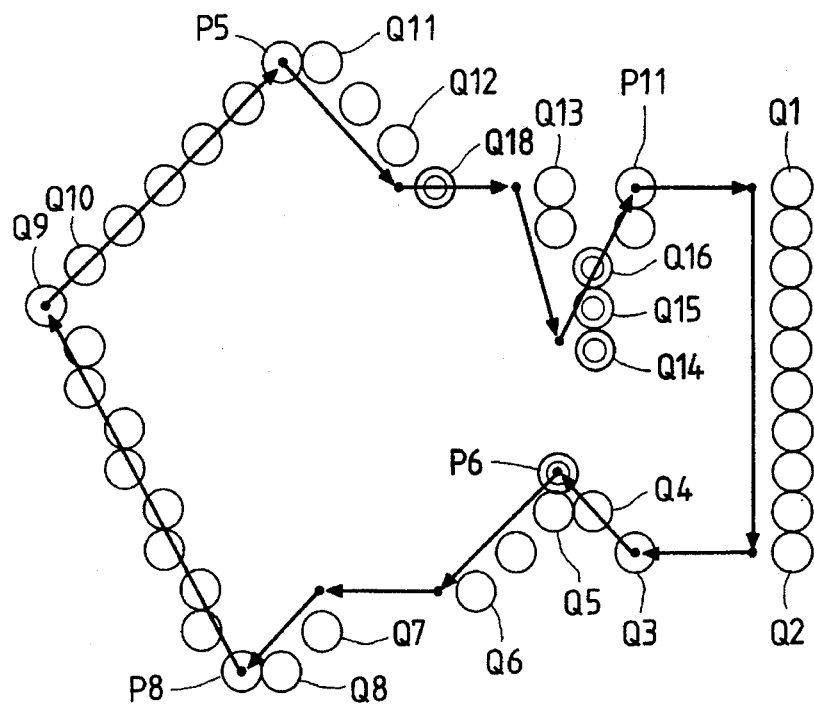
FIG. 114 is a view for the explanation of the contour pixel outputs for the figures shown in FIG. 64B according to the ninth embodiment.

In FIG. 114, Q11 to Q18 are the contour pixels for the edge e1, and Q18 is the contour pixel for the edge e2. Likewise, Q13 to Q14, Q14 to P11, Q1 to Q2, Q3 to P6, P6 to Q6, Q7 to Q8, P8 to Q9, and Q10 to P5 are the contour pixels for the edges e3, e4, e6, e8, e9, e11, e12, and e13, respectively. In this respect, the Q18 indicated with a mark ⊙ in FIG. 114 is plotted as the contour pixel for the edges e1 and e2. Also, Q14 to Q16 are plotted as the contour pixels for the edges e3 and e4, and P6 is plotted as the contour pixels for the edges e8 and e9. This plotting method is as described earlier to rewrite a value to be obtained by exercising an exclusive OR of the bit value (0 or 1) already stored at the corresponding address position on the line memory 3 with "1". Therefore, they will return to the state which is not plotted after all.

Figure 115:
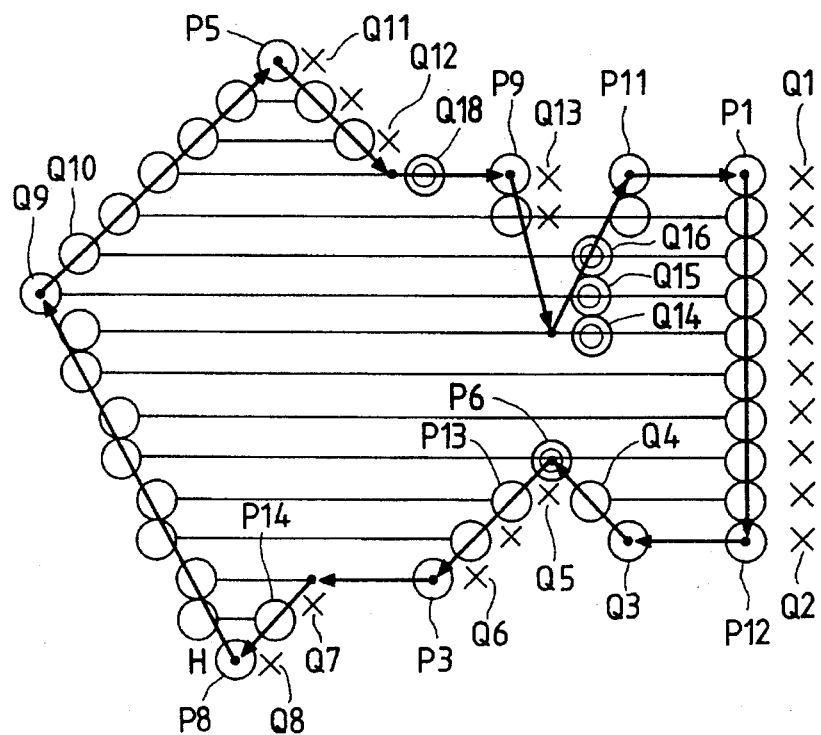
FIG. 115 is a view illustrating the processing results of the figures in FIG. 64B according to the ninth embodiment.

FIG. 115 is a view showing the outputs when the contour from the contour pixel of odd order to that of even order on the scanning line has painted the contour data shown in FIG. 114 immediately before such contour. According to the method of this ninth embodiment, the vertex pixels on the contour and pixels on the horizontal edge will be all painted.

In this respect, while the description has been made that the outline should represent the data in clockwise in the aforesaid embodiment, the present invention is not confined thereto. The invention is applicable to the data representation in counter-clockwise. FIG. 117 is a view showing the generation regulations of the edge bucket in this case. At this time, too, the way of dealing with the starting point and other part of the edge is determined by the directions of the current edge and the preceding edge. The flow of updating processes for the edge table according to the generation regulation in this case is the same as the aforesaid one for the processes in clockwise.

Also, in the ninth embodiment, the current edge is divided into the starting point and other part for the required processes, but it may be possible to execute the processes by dividing the current edge into the end point and other part. FIG. 118 is a view showing the generation regulations for the edge bucket in this case.

Furthermore, as in the case of FIG. 117, it is possible to perform the data representation in counter-clockwise for the end points in FIG. 118. The edge bucket generation regulations in this case are shown in FIG. 50.

Figure 116:
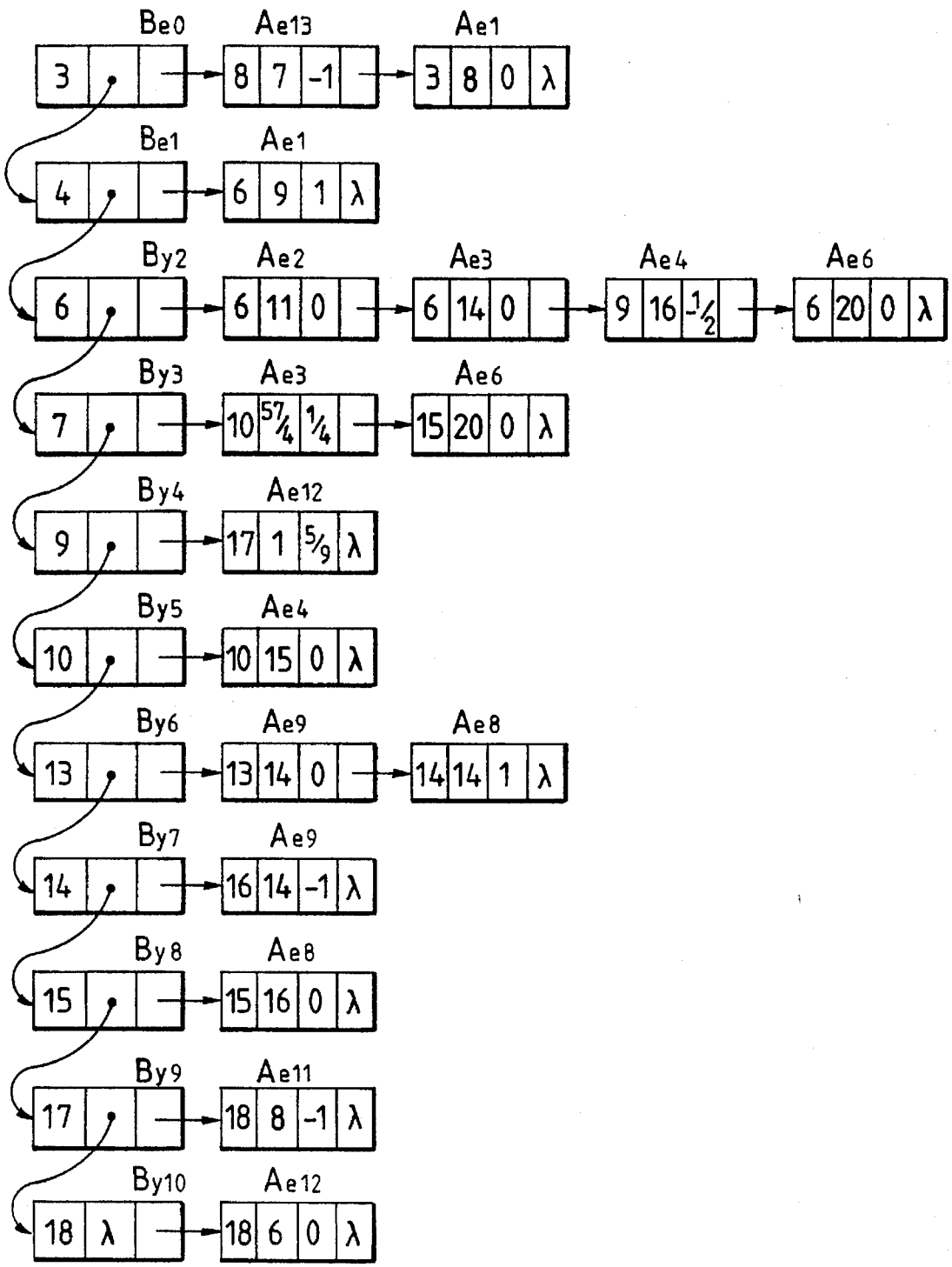
FIG. 116 is a view illustrating the edge table (ET) for the figures shown in FIG. 64B according to a variation of the ninth embodiment.

Also, as in the case of the aforesaid embodiments, it may be possible to adopt the type of data having the two-dimensional list structure as shown in FIG. 87 for this ninth embodiment, too. FIG. 116 is a view showing the edge table structured for the outline figure shown in FIG. 64B for the use in such a case as this.

As described above, according to the ninth embodiment, it is possible to perform the painting process for figures at a high speed with a smaller memory capacity and without any distortion in accordance with the target line elements and line elements immediately preceding or immediately following them by dividing the target line elements into plural portions such as the end portion and other part in order to generate the contour line data on the basis of the varying points of pixels.

In this respect, the present invention is not only applicable to a system comprising a plurality of equipment, but also to an apparatus comprising only one equipment. Also, the present invention can be applied to the case where the implementation of a system or an apparatus is made by supplying the program which executes the present invention as a matter of course.

According to the present invention as set forth above, there is an effect that figures can be painted at a high speed with a smaller memory capacity and without any distortion.

What is claimed is:

1. An image processing apparatus which executes a painting process within an outline defined by a plurality of vectors, said apparatus comprising:

means for selectively writing a boundary pixel corresponding to an edge point of the outline at one of (a) a position of the edge point and (b) a position adjacent to the edge point or writing no such boundary pixel at the position of the edge point, and for writing a pixel corresponding to a point other than the edge point at one of (c) a position of a point on the outline and (d) a position adjacent to the outline; and means for painting an area bounded by one of a first pixel detected upon painting and a second pixel adjacent to the detected first pixel, based on the boundary pixel written by said means for writing.

2. An apparatus according to claim 1, further comprising output means for outputting an image based on the area painted by said means for painting.

3. An apparatus according to claim 2 wherein said output means comprises a printer.

4. An apparatus according to claim 1, wherein said means for writing writes the pixel at one of the position of the edge point and the position adjacent to the edge point based on (i) a combination of a direction of the vector including the edge point and a direction of a preceding vector that is adjacent to the vector including the edge point in one direction, (ii) a combination of a direction of the vector including the edge point and a direction of a subsequent vector that is adjacent to the vector including the edge point in the opposite direction from the preceding vector, and (iii) a combination of a direction of the vector including the edge point, a direction of the preceding vector, and a direction of the subsequent vector.

5. An apparatus according to claim 4, wherein said means for writing writes the pixel(i) at the position of the edge point if the edge point is a terminal point of an upward vector different in direction from the subsequent vector, (ii) at the adjacent position if the edge point is a terminal point of a downward vector different in direction from the subsequent vector, (iii) at the adjacent position if the edge point is a terminal point of an upward vector different in direction from the preceding vector, and (iv) at the position of the edge point if the edge point is a terminal point of a downward vector different in direction from the preceding vector.

6. An apparatus according to claim 1, wherein said means for writing either writes the corresponding pixel at one of the position of the edge point and the adjacent position on the basis of a combination of a direction of the vector including the edge point and a direction of the adjacent pixel, or does not write the corresponding pixel on the basis of that combination.

7. An apparatus according to claim 1, further comprising additional writing means for, upon writing a pixel on a side forming part of the outline defined by a vector, writing a pixel at one of (i) a position on the side and (ii) an adjacent position on the side, on the basis of a direction of a vector corresponding to the side.

8. An apparatus according to claim 7, wherein said additional writing means writes the pixel at the position on the side for an upward vector and at the adjacent position on the side for a downward vector.

9. An apparatus according to claim 1, wherein said means for writing executes a writing operation based on a combination of a direction of a first one of the vectors, which includes the edge point and a direction of a second one of the vectors adjacent to the first vector.

10. An apparatus according to claim 9, wherein said means for writing writes the pixel corresponding to a point other than the edge point at one of a position of a point on the outline and a position adjacent to the outline, depending on the direction of the first vector.

11. An apparatus according to claim 9, wherein said means for writing writes the pixel corresponding to a point other than the edge point at one of a position of a point on the outline and a position adjacent to the outline, depending on whether that pixel is a (2n)th pixel on a scan line, n being an integer.

12. An apparatus according to claim 1, wherein said means for painting executes a painting operation through an exclusive OR operation.

13. An image processing method for executing a painting process within an outline defined by a plurality of vectors, said method comprising the steps of:

writing a boundary pixel corresponding to an edge point of the outline at one of (a) a position of the edge point and (b) a position adjacent to the edge point or writing no such boundary pixel at the position of the edge point, and writing a pixel corresponding to a point other than the edge point at one of (c) a position of a point on the outline and (d) a position adjacent to the outline; and painting an area bounded by one of a first pixel detected upon painting and a second pixel adjacent to the detected first pixel, based on the boundary pixel written in said writing step.

14. A method according to claim 13, further comprising outputting an image based on the area painted by said means for painting.

15. A method according to claim 14 wherein said outputting step comprises outputting an image using a printer.

16. A method according to claim 13, wherein said writing step comprises writing the pixel at one of the position of the edge point and the position adjacent to the edge point based on (i) a combination of a direction of the vector including the edge point and a direction of a preceding vector that is adjacent to the vector including the edge point in one direction, (ii) a combination of a direction of the vector including the edge point and a direction of a subsequent vector that is adjacent to the. vector including the edge point in the opposite direction from the preceding vector, and (iii) a combination of a direction of the vector including the edge point, a direction of the preceding vector, and a direction of the subsequent vector.

17. A method according to claim 16, wherein said writing step comprises writing the pixel (i) at the position of the edge point if the edge point is a terminal point of an upward vector different in direction from the subsequent vector, (ii) at the adjacent position if the edge point is a terminal point of a downward vector different in direction from the subsequent vector, (iii) at the adjacent position if the edge point is a terminal point of an upward vector different in direction from the preceding vector, and (iv) at the position of the edge point if the edge point is a terminal point of a downward vector different in direction from the preceding vector.

18. A method according to claim 13, wherein said writing step comprises either writing the corresponding pixel at one of the position of the edge point and the adjacent position on the basis of a combination of a direction of the vector including the edge point and a direction of the adjacent pixel, or not writing the corresponding pixel on the basis of that combination.

19. A method according to claim 13, further comprising an additional writing step for, upon writing a pixel on a side forming part of the outline defined by a vector, writing a pixel at one of (i) a position on the side and (ii) an adjacent position on the side, on the basis of a direction of a vector corresponding to the side.

20. A method according to claim 19, wherein said additional writing step comprises writing the pixel at the position on the side for an upward vector and at the adjacent position on the side for a downward vector.

21. A method according to claim 13, wherein said writing step executes a writing operation based on a combination of a direction of a first one of the vectors, which includes the edge point and a direction of a second one of the vectors adjacent to the first vector.

22. A method according to claim 21, wherein said writing step writes the pixel corresponding to a point other than the edge point at one of a position of a point on the outline and a position adjacent to the outline, depending on the direction of the first vector.

23. A method according to claim 21, wherein said writing step writes the pixel corresponding to a point other than the edge point at one of a position of a point on the outline and a position adjacent to the outline, depending on whether that pixel is a (2n)th pixel on a scan line, n being an integer.

24. A method according to claim 13, wherein said painting step executes a painting operation through an exclusive OR operation.

* * * * *

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

ON THE COVER PAGE

[57] ABSTRACT

Line 3, delete "a".

COLUMN 1

Line 44, "code X" should read --code $\lambda$--.

COLUMN 2

Line 17, delete "10".
Line 43, delete "10".

COLUMN 3

Line 8, delete "a".
Line 23, delete "10".

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 15

Line 54, delete "for".
Line 56, delete "10".

COLUMN 16

Line 13, delete "until".
Line 13, delete "10".

COLUMN 20

Line 4, "<$\Delta$xpost" should read --> $\Delta$xpost--.
Line 39, delete "After all," and "the" should read --The--.
Line 67, "X" should read --$\lambda$--.

COLUMN 22

Line 16, "Ax" should read --$\Delta$x--.
Line 18, delete "10".

UNITED STATES PATENT AND TRADEMARK OFFICE
CERTIFICATE OF CORRECTION

PATENT NO. : 5,561,534  Page 3 of 10
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 24

Line 54, "are" should read --is--.

COLUMN 26

Line 50, delete "10".

COLUMN 28

Line 43, delete "of".

COLUMN 31

Line 51, delete "10".

COLUMN 32

Line 30, delete "10".

COLUMN 35

Line 42, delete "10".
Line 65, delete "10".

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 36

Line 7, "holds" should read --hold--.

COLUMN 40

Line 3, "for until" should read --until--.
Line 41, "$(xi_o - xi_{\ Li-1})$" should read --$(xi_o - xi_{Li-1})$--.
Line 42, delete "Li-1 Li-1".

COLUMN 43

Line 18, "'1." should read -- -1 --.

COLUMN 44

Line 3, "for until" should read --until--.

COLUMN 45

Line 28, "209" should read --2209--.
Line 60, "holds" should read --hold--.

UNITED STATES PATENT AND TRADEMARK OFFICE
CERTIFICATE OF CORRECTION

PATENT NO. : 5,561,534         Page 5 of 10
DATED      : October 1, 1996
INVENTOR(S) : YOSHIHIRO ISHIDA, ET AL.

It is certified that error appears in the above-indentified patent and that said Letters Patent is hereby corrected as shown below:

COLUMN 48

Line 45, "pixels positions" should read --pixel positions--.

COLUMN 50

Line 48, "Paint out" should read --Paint Out--.

COLUMN 54

Line 52, "After all," should be deleted and "the" should read --The--.

COLUMN 55

Line 18, "Ax" should read --$\Delta$x--.

COLUMN 61

Line 65, "pixels positions" should read --pixel positions--.

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 63

Line 17, "are" should read --is--.

COLUMN 64

Line 34, "for until" should read --until--.
Line 59, "for until" should read --until--.

COLUMN 65

Line 21, "AyO" should read --AyO--.
Line 53 "xstart xend" should read --xstart>xend--.

COLUMN 68

Line 18, delete "After all,", and "the" should read --The--.

COLUMN 72

Line 5, delete "10".
Line 9, "are" should read --is--.

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 73

Line 28, "A" should read --$\Delta$--.

COLUMN 74

Line 29, "Ax" should read --$\Delta$x--.
Line 33, "Ax" should read --$\Delta$x--.

COLUMN 76

Line 54, "FIGS." should read --FIG.--.

COLUMN 77

Line 7, delete "of".

COLUMN 78

Line 17, "AyO" should read --AyO--.

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 79

Line 33, delete "to".
Line 50, "proceed" should read --proceeds--.
Line 51, delete "when".

COLUMN 80

Line 17, "figure the" should read --figure in the--.
Line 32, delete "its".

COLUMN 81

Line 63, "shown, immedi-" should read --shown, in which the pixels in the main scanning direction immediately--.
Line 64, delete "ately", and delete "in which the pixels".
Line 65, delete "in the main scanning direction".

COLUMN 82

Line 14 "Or" should read --OR--.
Line 16, "mark a" should read --mark Δ--.
Line 56, "execising" should read --exercising--.
Line 65, "not determined" should read --not is determined--.

UNITED STATES PATENT AND TRADEMARK OFFICE
CERTIFICATE OF CORRECTION

PATENT NO. : 5,561,534
DATED : October 1, 1996
INVENTOR(S) : YOSHIHIRO ISHIDA, ET AL.

It is certified that error appears in the above-indentified patent and that said Letters Patent is hereby corrected as shown below:

COLUMN 83

Line 42, "this" should read --these--.

COLUMN 84

Line 29, "mainted" should read --maintained--.

COLUMN 85

Line 30, delete "when".

COLUMN 86

Line 30, "nor the edge table is updated." should read --nor is the edge table updated.--.

UNITED STATES PATENT AND TRADEMARK OFFICE
CERTIFICATE OF CORRECTION

PATENT NO.  : 5,561,534
DATED       : October 1, 1996
INVENTOR(S) : YOSHIHIRO ISHIDA, ET AL.

It is certified that error appears in the above-indentified patent and that said Letters Patent is hereby corrected as shown below:

<u>COLUMN 88</u>

Line 3, "$\Delta x_{post,}$the" should read --$\Delta x_{post,}$ the--.

<u>COLUMN 92</u>

Line 66, delete "the". (2nd occurrence)

<u>COLUMN 93</u>

Line 55, "pixel(i)" should read --pixel (i)--.

<u>COLUMN 94</u>

Line 63, "the. vector" should read --the vector--.

Signed and Sealed this

Twenty-ninth Day of April, 1997

*Attest:*

BRUCE LEHMAN

*Attesting Officer*   *Commissioner of Patents and Trademarks*